(12) United States Patent
Kishigami

(10) Patent No.: US 12,360,229 B2
(45) Date of Patent: Jul. 15, 2025

(54) RADAR APPARATUS

(71) Applicant: Panasonic Intellectual Property Management Co., Ltd., Osaka (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 537 days.

(21) Appl. No.: 17/875,101

(22) Filed: Jul. 27, 2022

(65) Prior Publication Data

US 2023/0059058 A1 Feb. 23, 2023

(30) Foreign Application Priority Data

Aug. 6, 2021 (JP) ................................. 2021-129947
Mar. 4, 2022 (JP) ................................. 2022-033509

(51) Int. Cl.
*G01S 13/58* (2006.01)
(52) U.S. Cl.
CPC .................................. *G01S 13/583* (2013.01)
(58) Field of Classification Search
CPC .. G01S 13/343; G01S 13/583; G01S 13/9047; G01S 13/42; G01S 13/584
See application file for complete search history.

(56) References Cited

U.S. PATENT DOCUMENTS

| 10,613,195 | B2 * | 4/2020 | Kishigami | ........... H04B 7/0413 |
| 10,921,436 | B2 | 2/2021 | Jansen | |
| 11,099,267 | B2 * | 8/2021 | Wu | .......................... G01S 7/354 |
| 11,486,994 | B2 * | 11/2022 | Kishigami | ............ G01S 7/4026 |
| 11,555,882 | B2 * | 1/2023 | Bai | ........................... G01S 7/35 |
| 11,988,768 | B2 * | 5/2024 | Sion | .......................... G01S 7/35 |
| 2008/0303711 | A1 | 12/2008 | Matsuoka | |

(Continued)

FOREIGN PATENT DOCUMENTS

| JP | 2008-304417 A | 12/2008 |
| JP | 2011-526371 A | 10/2011 |

(Continued)

OTHER PUBLICATIONS

Cadzow. "Direction-of-Arrival Estimation Using Signal Subspace Modelling," IEEE Transactions on Aerospace and Electronic Systems, 28(1):64-79, Jan. 1992.

(Continued)

*Primary Examiner* — Peter M Bythrow
(74) *Attorney, Agent, or Firm* — Seed IP Law Group LLP

(57) ABSTRACT

Provided is a radar apparatus that detects a target object with high accuracy. The radar apparatus includes: transmission circuitry, which, in operation, alternately outputs a first transmission signal with a first central frequency and a second transmission signal with a second central frequency higher than the first central frequency for each transmission period; and one or a plurality of transmission antennas, which, in operation, transmit the fast transmission signal and the second transmission signal. The second central frequency is higher than a frequency (1+1/Nc) times the first central frequency, where Nc is an integer indicating a number of times of transmission of each of the first transmission signal and the second transmission signal for the each transmission period within a predetermined duration.

18 Claims, 22 Drawing Sheets

(56) References Cited

U.S. PATENT DOCUMENTS

| | | | |
|---|---|---|---|
| 2011/0074620 A1 | 3/2011 | Wintermantel | |
| 2014/0253365 A1* | 9/2014 | Kirsch | G01S 13/58 342/112 |
| 2016/0033632 A1* | 2/2016 | Searcy | G01S 13/424 342/153 |
| 2016/0154091 A1* | 6/2016 | Yosoku | G01S 7/0232 342/201 |
| 2017/0276769 A1* | 9/2017 | Kishigami | G01S 7/0234 |
| 2020/0025914 A1* | 1/2020 | Li | G01S 13/878 |
| 2020/0150260 A1* | 5/2020 | Lang | G01S 13/42 |
| 2020/0209380 A1 | 7/2020 | Takayama | |
| 2020/0292663 A1* | 9/2020 | Bai | G01S 13/42 |
| 2021/0080537 A1* | 3/2021 | Melzer | G01S 13/584 |
| 2021/0156982 A1* | 5/2021 | Stettiner | G01S 7/35 |
| 2021/0333386 A1* | 10/2021 | Park | G01S 7/356 |
| 2022/0120884 A1* | 4/2022 | Subburaj | G06F 17/142 |

FOREIGN PATENT DOCUMENTS

| | | |
|---|---|---|
| JP | 2014-119344 A | 6/2014 |
| JP | 2017-177539 A | 10/2017 |
| WO | 2019/054504 A1 | 3/2019 |

OTHER PUBLICATIONS

Kronauge et al., "Fast Two-Dimensional CFAR Procedure," IEEE Transactions on Aerospace and Electronic Systems, 49(3):1817-1823, Jul. 2013.

Li et al., "MIMO Radar with Colocated Antennas," IEEE Signal Processing Magazine, 24(5):106-114, Sep. 2007.

\* cited by examiner

RADAR APPARATUS

TECHNICAL FIELD

The present disclosure relates to a radar apparatus.

BACKGROUND ART

In recent years, a study of radar apparatuses using a short-wavelength radar transmission signal including a microwave or a millimeter wave that allows high resolution has been carried out. Further, it has been required to develop radar apparatuses (wide-angle radar apparatuses) that detect not only vehicles but also small objects, such as pedestrians and fallen objects, in a wide-angle range in order to improve the outdoor safety.

As a configuration of a radar apparatus having a wide-angle detection range, there is a configuration using a technique of receiving a reflected wave by an array antenna formed of a plurality of antennas (antenna elements), and estimating the angle of arrival (the direction of arrival) of the reflected wave by using a signal processing algorithm based on a received phase difference with respect to the element interval (antenna interval) (angle-of-arrival estimation technique, Direction of Arrival (DOA) estimation). Examples of the angle-of-arrival estimation technique include a Fourier method and, as methods that allow high resolution, a Capon method, Multiple Signal Classification (MUSIC), and Estimation of Signal Parameters via Rotational Invariance Techniques (ESPRIT).

Further, as a radar apparatus, for example, a configuration in which a receiver as well as a transmitter include a plurality of antennas (array antenna) and beam scanning is performed through signal processing using transmission and reception array antennas (also referred to as Multiple Input Multiple Output (MIMO) radar) has been proposed (for example, see Non-Patent Literature (hereinafter referred to as "NPL") 1).

CITATION LIST

Patent Literature

PTL 1
Japanese Patent Application Laid-Open No. 2008-304417
PTL 2
Japanese Unexamined Patent Application Publication (Translation of PCT Application) No. 2011-526371
PTL 3
Japanese Patent Application Laid-Open No. 2014-119344
PTL 4
WO 2019/054504

Non Patent Literature

NPL 1
J. Li, and P. Stoica, "MIMO Radar with Colocated Antennas", Signal Processing Magazine, IEEE Vol. 24, Issue: 5, pp. 106-114, 2007
NPL 2
M. Kronauge, H. Rohling, "Fast two-dimensional CFAR procedure", IEEE. Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

Technical Problem

However, methods for a radar apparatus (for example, a MIMO radar) to detect a target object (or a target) have not been sufficiently studied.

One non-limiting and exemplary embodiment facilitates providing a radar apparatus capable of detecting a target object with high accuracy.

A radar apparatus according to one exemplary embodiment of the present disclosure includes: transmission circuitry, which, in operation, transmits outputs a first transmission signal with a first central frequency and a second transmission signal with a second central frequency for each transmission period, where the second central frequency is higher than the first central frequency; and one or a plurality of transmission antennas, which, in operation, transmit the first transmission signal and the second transmission signal. The second central frequency is higher than a frequency $(1+1/Nc)$ times the first central frequency, where Nc is an integer indicating a number of times of transmission of each of the first transmission signal and the second transmission signal for the each transmission period within a predetermined duration.

It should be noted that general or specific embodiments may be implemented as a system, a method, an integrated circuit, a computer program, a storage medium, or any selective combination thereof.

According to one exemplary embodiment of the present disclosure, a radar apparatus is capable of detecting a target object with high accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or anchor advantages.

DESCRIPTION OF EMBODIMENTS

Figure 1:
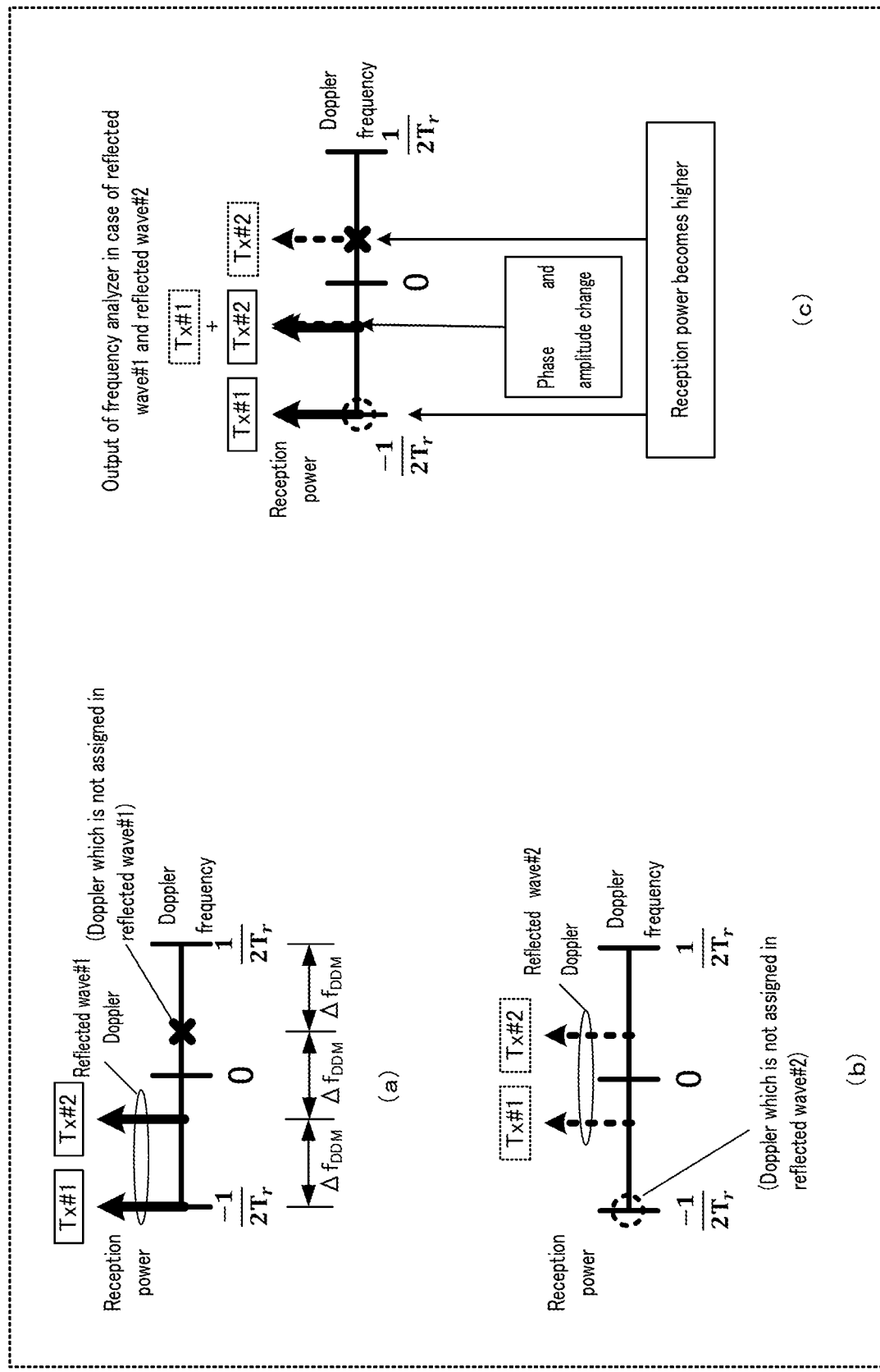
FIG. 1 illustrates an example of Doppler multiplex transmission with unequal intervals.

A MIMO radar, for example, transmits signals (radar transmission waves) multiplexed by using time division, frequency division, or code division from a plurality of transmission antennas (or referred to as a transmission array antenna), and receives signals (radar reflected waves) reflected by surrounding objects by using a plurality of reception antennas (or referred to as a reception array antenna) to demultiplex and receive a multiplexed transmission signal from each reception signal. With such processing, the MIMO radar can extract a propagation path response indicated by the product of the number of transmission antennas and the number of reception antennas, and performs array signal processing by using these reception signals as a virtual reception array.

Further, the MIMO radar makes it possible to increase the antenna aperture virtually and to achieve improvement in the angular resolution by appropriately arranging element intervals in transmission and reception array antennas.

[Time-Division Multiplex Transmission]

For example, Patent Literature (hereinafter referred to as "PTL") 1 discloses a MIMO radar (hereinafter referred to as "time-division multiplexing MIMO radar") that uses, as a multiplex transmission method for the MIMO radar, time-division multiplex transmission by which signals are transmitted at transmission times deviated for each transmission antenna. The time-division multiplex transmission can be realized with a simpler configuration in comparison with frequency multiplex transmission or code multiplex transmission. Further, the time-division multiplex transmission makes it possible to maintain proper orthogonality between transmission signals by sufficiently increasing transmission time intervals. The time-division multiplexing MIMO radar outputs transmission pulses, which are an example of transmission signals, while sequentially switching between transmission antennas in a predetermined period. The time-division multiplexing MIMO radar receives, at a plurality of reception antennas, signals that are the transmission pulses reflected by an object, performs processing of correlating the reception signals with the transmission pulses, and then performs, for example, spatial fast Fourier transform (FFT) processing (processing of estimation of the direction of arrival of reflected waves).

The time-division multiplexing MIMO radar sequentially switches between transmission antennas, from which transmission signals (for example, transmission pulses or radar transmission waves) are transmitted, in a predetermined period. Accordingly, in the time-division multiplex transmission, the time required for completion of transmission of transmission signals from every transmission antenna may become long in comparison with frequency-division transmission or code-division transmission. For this reason, in a case where transmission signals are transmitted from transmission antennas, respectively, and Doppler frequencies (for example, the relative velocities of a target) are detected from reception phase changes thereof as in PTL 2, for example, the time interval (for example, the sampling interval) for observing the reception phase changes in application of Fourier frequency analysis to detect the Doppler frequencies becomes long. Accordingly, the maximum Doppler frequency range based on the sampling theorem (for example, a Doppler frequency range detectable without aliasing or a detectable target relative velocity range) decreases.

Further, in a case where reception of a reflected wave signal from a target, which has a Doppler frequency exceeding the maximum Doppler frequency based on the sampling theorem, is assumed, a radar apparatus may observe a Doppler frequency of an aliasing component, which differs from the true frequency. In this case, it is difficult for the radar apparatus to identify whether the reflected wave signal is an aliasing component, and ambiguity (uncertainty) of a Doppler frequency (for example, a target relative velocity) occurs.

For example, in a case where a radar apparatus transmits transmission signals (transmission pulses) by sequentially switching between Nt transmission antennas in predetermined period $T_r$, the transmission time for completing the transmission of transmission signals from all the transmission antennas is $T_r \times Nt$. In a case where such time-division multiplex transmission is repeated Nc times and Fourier frequency analysis is applied for Doppler frequency detection (relative velocity detection), the Doppler frequency range in which a Doppler frequency can be detected without aliasing is $\pm 1/(2T_r \times Nt)$ according to the sampling theorem. Thus, the Doppler frequency range in which a Doppler frequency can be detected without aliasing decreases as number Nt of transmission antennas increases, and the ambiguity of a Doppler frequency is likely to occur even for a lower relative velocity.

[Doppler Multiplex Transmission]

Since the time-division multiplexing MIMO radar is likely to cause the ambiguity of a Doppler frequency described above, the following description will focus on a method of simultaneously multiplexing and transmitting transmission signals from a plurality of transmission antennas, as an example.

Examples of the method of simultaneously multiplexing and transmitting transmission signals from a plurality of transmission antennas include a method of transmitting signals such that a receiver is capable of demultiplexing a plurality of transmission signals on a Doppler frequency axis (hereinafter, the method will be referred to as Doppler multiplex transmission) (see, for example, NPL 3).

In the Doppler multiplex transmission, with respect to a transmission signal transmitted from a transmission antenna serving as a reference, for example, a transmitter gives a Doppler shift amount larger than the Doppler frequency bandwidth of a reception signal to a transmission signal transmitted from a transmission antenna different from the transmission antenna serving as the reference, and simultaneously transmits transmission signals are from a plurality of transmission antennas in the same transmission period (in the same transmission slot). In the Doppler multiplex transmission, a receiver performs filtering on a Doppler frequency axis to demultiplex and receive transmission signals transmitted from each transmission antenna.

In the Doppler multiplex transmission, simultaneous transmission of transmission signals from a plurality of transmission antennas in the same transmission period makes it possible to reduce the time interval for observing a reception phase change in application of Fourier frequency analysis for detecting a Doppler frequency (or a relative velocity) in comparison with time-division multiplex transmission. In the Doppler multiplex transmission, however, filtering is performed on a Doppler frequency axis to demultiplex transmission signals from each transmission antenna so that the effective Doppler frequency bandwidth per transmission signal is restricted.

For example, a case where a radar apparatus transmits transmission signals from Nt transmission antennas in period $T_r$ in the Doppler multiplex transmission will be described. When the Doppler multiplex transmission as such is repeated Nc times within a predetermined duration and Fourier frequency analysis is applied for Doppler frequency (or relative velocity) detection, the Doppler frequency range in which a Doppler frequency can be detected without aliasing is $\pm 1/(2 \times T_r)$ according to the sampling theorem. For example, the Doppler frequency range in which a Doppler frequency can be detected without aliasing in the Doppler multiplex transmission is increased by Nt times in comparison with the case of time-division multiplex transmission (for example, $\pm 1/(2T_r \times Nt)$). Note that, the predetermined duration is formed of a Doppler multiplex transmission duration (period $T_r \times Nc$)+a non-transmission duration.

In the Doppler multiplex transmission, however, filtering is performed on a Doppler frequency axis to demultiplex transmission signals as described above. Accordingly, the effective Doppler frequency bandwidth per transmission signal is narrower than the Doppler frequency range in which a Doppler frequency can be detected without aliasing. For example, when Doppler frequency range $\pm 1/(2 \times T_r)$ in which a Doppler frequency can be detected without aliasing is equally divided into Nt transmission signals, the effective Doppler frequency range of each signal is restricted to $1/(T_r \times Nt)$, and therefore becomes the same Doppler frequency range as that in a case where time-division multiplex transmission is performed. Further: in the Doppler multiplex transmission, in a Doppler frequency band exceeding the effective Doppler frequency range per transmission signal, the transmission signal and a signal in a Doppler frequency band of another transmission signal different from the transmission signal are mixedly present so that it may be difficult to demultiplex transmission signals correctly.

[Doppler Multiplex Transmission with Unequal Intervals]

Examples of a method of extending the maximum Doppler frequency range detectable in the Doppler multiplex transmission as such includes a method in which Doppler frequency range $\pm 1/(2T_r)$ in which a Doppler frequency can be detected without aliasing is equally divided, Nt Doppler shift amounts among Nt+1 divided Doppler shifts amounts are assigned to Nt transmission signals, and the transmission signals are simultaneously transmitted from Nt transmission antennas (see, for example, PTL 4).

In this Doppler multiplex transmission, for example, no transmission signal is assigned to part of Nt+1 equally divided Doppler shifts amounts so that Doppler shift intervals given to transmission signals to be Doppler-multiplexed (hereinafter, the Doppler shift intervals will be referred to as "Doppler multiplexing intervals") become unequal intervals. Hereinafter, such Doppler multiplex transmission is referred to as "Doppler multiplex transmission with unequal intervals".

Next, an example of processing of receiving radar reflected waves in a case where the Doppler multiplex transmission with unequal intervals is used will be described.

In an output to which Fourier frequency analysis is applied for Doppler frequency detection (relative velocity detection), for example, the Doppler reception power level corresponding to a Doppler shift amount, to which no transmission signal is assigned, among Nt+1 equally divided Doppler shift amounts is lower than the Doppler reception power level corresponding to a Doppler shift amount to which a transmission signal is assigned. For example, a radar apparatus may utilize this difference in reception power level to estimate a Doppler frequency. This estimation processing allows the radar apparatus to estimate the Doppler frequency of a radar reflected wave in Doppler frequency range $\pm 1/(2T_r)$.

Thus, even in a case where a target object with a Doppler frequency exceeding Doppler frequency domain $\pm 1/(2T_r \times (Nt+1))$ to be divided is included, the Doppler multiplex transmission with unequal intervals which gives Doppler shifts with unequal intervals in a Doppler frequency domain allows a radar apparatus to suppress the ambiguity of a Doppler frequency and to extend the maximum Doppler frequency, which can be detected, to $\frac{1}{2}T_r$ by detecting a Doppler domain with unequal intervals. Thus, in the Doppler multiplex transmission with unequal intervals, for example, the detectable Doppler frequency range is extended Nt times in comparison with the method described in PTL 3.

For example, in PTL 4, a Doppler frequency (or relative velocity) exceeding maximum Doppler frequency $\frac{1}{2}T_r$ which that can be detected, is not detected due to constraints of the sampling theorem of Fourier frequency analysis. For example, although a Doppler detection range can be extended by reducing transmission period $T_r$, reducing transmission period $T_r$ while maintaining a detectable distance range or distance resolution uses a faster sampling-rate AD converter so that the hardware configuration becomes complicated. Further, the power consumption or heat generation of a radar apparatus may also increase by a higher sampling rate of an A/D converter. In a case where transmission period $T_r$ is reduced under constraints of the sampling rate of an AD converter, on the other hand, the distance detection range or distance separation performance of a radar apparatus may deteriorate due to the reduction of a detectable distance range or the deterioration of distance resolution.

Further, in the Doppler multiplex transmission with unequal intervals, for example, in a case where there is a plurality of reflected waves from approximately the same distance to a radar apparatus and in a case where the Doppler intervals of those reflected waves match Doppler multiplexing intervals (referred to as "$\Delta f_{DDM}$", for example) or a multiple of Doppler multiplexing intervals, detection errors of a Doppler domain with unequal intervals are likely to occur and demultiplexing errors of a multiple wave or angle measurement errors of a plurality of reflected waves are likely to increase in a radar apparatus.

For example, as illustrated in FIG. 1, a case where a radar apparatus uses Nt=two transmission antennas to perform Doppler multiplex transmission with unequal intervals, in which two Doppler shift amounts among three (=Nt+1) equally divided Doppler shift amounts are used, and to receive reflected wave #1 and reflected wave #2 from a target object at the same distance to the radar apparatus, where the difference between the Doppler frequencies of reflected wave #1 and reflected wave #2 is $\Delta f_{DDM}$, will be described.

Each of (a), (b) and (c) of FIG. 1 illustrates the output (for example, the output of a frequency analyzer) in which Fourier frequency analysis is applied for Doppler frequency detection (or relative velocity detection), (a) in FIG. 1 illustrates the reception power of reflected wave #1, (b) of FIG. 1 illustrates the reception power of reflected wave #2, and (c) of FIG. 1 illustrates a result of a combination of the reception signals of reflected wave #1 and reflected wave #2. Since the difference between the Doppler frequencies of reflected wave #1 and reflected wave #2 is $\Delta f_{DDM}$, reflected wave #2 in (b) of FIG. 1 is located at a position at which reflected wave #1 in (a) of FIG. 1 is shifted by $+\Delta f_{DDM}$ on the Doppler frequency axis.

As in (a) and (b) of FIG. 1, the reception power level of the Doppler frequency corresponding to, among Nt+1 equally divided Doppler shift amounts, the Doppler shift amount to which no transmission signal is assigned becomes lower (becomes a degree of a noise level) than the reception power level of the Doppler frequency corresponding to the Doppler shift amount to which a transmission signal is assigned, but is likely to become higher than the reception power level of the Doppler frequency corresponding to the Doppler shift amount in which a transmission signal is assigned in (c) of FIG. 1 due to the inclusion of the reception power of the other reflected wave.

For example, in the case of (c) of FIG. 1, Doppler frequency $-½T_r+2\Delta f_{DDM}$ corresponding to the Doppler shift amount, to which no transmission signal is assigned, in reflected wave #1 matches the Doppler frequency corresponding to the Doppler shift amount, to which a transmission signal is assigned, in reflected wave #2 that is the other reflected wave so that the reception power level is likely to become high. In the same manner. Doppler frequency $-½T_1$ corresponding to the Doppler shift amount, to which no transmission signal is assigned, in reflected wave #2 matches the Doppler frequency corresponding to the Doppler shift amount, to which a transmission signal is assigned, in reflected wave #1 that is the other reflected wave so that the reception power level is likely to become high.

Further, the reception signal is formed of the phase and the amplitude so that in reception power in which a plurality of transmission signals is combined, the value of the amplitude to be combined varies depending on the value of the phase. For example, in the case of (c) of FIG. 1, the Doppler frequency component of $-½T_r+\Delta f_{DDM}$ matches the Doppler shift amount, to which a transmission signal is assigned, in reflected wave #1 and reflected wave #2 so that each becomes the combined reception power and the value of the amplitude to be combined varies depending on the value of the phase.

For demultiplexing Doppler multiplexing with unequal intervals, a radar receiver of a radar apparatus, in which Doppler multiplex transmission with unequal intervals is used, uses, for example, a Doppler demultiplexer to be described later to detect a Doppler peak position matching Doppler multiplexing intervals, to which a transmission signal is assigned, to demultiplex a Doppler multiplex transmission signal. At this time, the Doppler demultiplexer demultiplexes the Doppler multiplex transmission signal by utilizing the fact that the reception power of a Doppler frequency component with Doppler multiplexing intervals to which no Doppler multiplex transmission signal is assigned is sufficiently low.

The utilization of the differences in the reception power level as such makes it possible to uniquely estimate a Doppler frequency in Doppler frequency range $\pm 1/(2T_r)$ and to perform demultiplexing processing of a Doppler multiplex transmission signal. For example, with respect to the reception power of reflected wave #1 in (a) of FIG. 1, Doppler peak positions of Doppler frequency components at $-1/2T_r$ matching Doppler multiplexing intervals $\Delta f_{DDM}$ and at $-½T_r+\Delta f_{DDM}$ are detected, and further the reception power of the Doppler frequency component $(-½T_r+2\Delta f_{DDM})$ deviated by Doppler multiplexing intervals $\Delta f_{DDM}$ from these Doppler peak positions is sufficiently low, and Doppler frequency estimation and Doppler multiplex transmission signal demultiplexing are performed.

However, for example, the reception power of Doppler frequency $-½T_r+2\Delta f_{DDM}$ in (c) of FIG. 1 has a Doppler position higher than the reception power in Doppler frequency $-½T_r+2\Delta f_{DDM}$ in (a) of FIG. 1, and Doppler frequency estimation of reflected wave #1 is likely to be erroneous, and the demultiplexing performance of a transmission antenna deteriorates. In the same manner, for example, the reception power of Doppler frequency $-½T_r$ in (c) of FIG. 1 has a Doppler position higher than the reception power in Doppler frequency $-½T_r$ in (b) of FIG. 1, and Doppler frequency estimation of reflected wave #2 is likely to be erroneous, and the demultiplexing performance of a transmission antenna deteriorates.

Further, in (c) of FIG. 1, since the Doppler of Tx #2 of reflected wave #1 and the Doppler of Tx #1 of reflected wave #2, which have phases and amplitudes different from each other, are combined in Doppler frequency $(-½T_r+1\Delta f_{DDM})$, each phase and amplitude change from the states in (a) and (b) of FIG. 1, and the angle measurement accuracy deteriorates.

For example, in (c) of FIG. 1, since the difference between the Doppler frequencies of reflected wave #1 and reflected wave #2 is $+\Delta f_{DDM}$, the Doppler frequency component to which a transmission signal by Tx #2 is assigned in reflected wave #2 is received in an overlapped manner in the Doppler frequency (the solid-line x mark, $-½T_r+2\Delta f_{DDM}$) corresponding to the Doppler shift amount to which no transmission signal is assigned in reflected wave #1.

Further, since the difference between the Doppler frequencies of reflected wave #2 and reflected wave 1 is $-\Delta f_{DDM}$, the Doppler frequency component to which a transmission signal by Tx #1 is assigned in reflected wave #1 is received in an overlapped manner in the Doppler frequency (the dotted-line circle mark, $-½T_r$) corresponding to the Doppler shift amount to which no transmission signal is assigned in reflected wave #2.

Accordingly, in a case where reflected wave #1 and reflected wave #2 from a target object at the same distance are received and the difference in the Doppler frequencies of reflected wave #1 and reflected wave #2 is $\Delta f_{DDM}$, the Doppler frequency (the solid-line x mark or the dotted-line circle mark in (c) of FIG. 1) corresponding to the Doppler shift amount to which no transmission signal is assigned becomes originally lower than the Doppler reception power levels corresponding to the Doppler shift amounts (Tx #1 and Tx #2 of reflected wave #1 in (a) of FIG. 1 and Tx #1 and Tx #2 in reflected wave #2 in (b) of FIG. 1) to which a transmission signal is assigned.

However, the Doppler frequency corresponding to the Doppler shift amount to which no transmission signal is assigned includes the reception power of the other reflected wave and is therefore likely to become high. For example, the solid-line x mark in (a) of FIG. 1 includes Tx #2 of reflected wave #2 in (b) of FIG. 1 so that the combined reception power of the Doppler frequency=−1/2$T_r$+2$\Delta f_{DDM}$ in (c) of FIG. 1 is likely to become high.

For this reason, in the radar apparatus in the state of (c) of FIG. 1, there is an increased chance of erroneous Doppler frequency estimation. In the case of erroneous Doppler frequency estimation in the radar apparatus, appropriate transmission antenna demultiplexing is also likely to become erroneous and angle measurement errors are also likely to increase.

Further, even in the case of correct Doppler frequency estimation, when the Doppler component in which the Doppler-multiplexed signal of reflected wave #1 and the Doppler-multiplexed signal of reflected wave #2 match each other (the Doppler frequency is −½$T_r$+1$\Delta f_{DDM}$) is included as illustrated in (c) of FIG. 1, these signals are added (combined) as complex signals so that the amplitude components or the phase components change from the states in (a) or (b) of FIG. 1 and the angle measurement accuracy of the radar apparatus is likely to deteriorate.

Accordingly, in one non-limiting and exemplary embodiment of the present disclosure, a method of extending the range of a Doppler frequency in which no aliasing occurs (for example, no ambiguity occurs) in Doppler multiplex transmission will be described. Thus, a radar apparatus of one exemplary embodiment according to the present disclosure is capable of detecting a target object with high accuracy in a wider Doppler frequency range.

Further, in one non-limiting and exemplary embodiment of the present disclosure, a method of enabling each reflected wave from a plurality of target objects having approximately the same distance to a radar apparatus to be demultiplexed and detected even in a case where the Doppler interval of each reflected wave matches Doppler multiplexing intervals (or a multiple of Doppler multiplexing intervals) will be described.

Further, in one non-limiting and exemplary embodiment of the present disclosure, a method of enabling each reflected wave from a plurality of target objects having approximately the same distance to a radar apparatus to be demultiplexed and detected even in a case where the range of a Doppler frequency (relative velocity) in which no aliasing occurs in Doppler multiplex transmission is extended and the Doppler interval of each reflected wave matches Doppler multiplexing intervals (or a multiple of Doppler multiplexing intervals) will be described.

Note that, a radar apparatus according to one exemplary embodiment of the present disclosure may be mounted in, for example, a moving body such as a vehicle. The positioning output (information on an estimation result) of the radar apparatus mounted in the moving body may be outputted to a control electronic control unit (ECU) (not illustrated), such as an advanced driver assistance system (ADAS), which enhances crash safety, or an autonomous driving system, and may be utilized for vehicle driving control or alarm calling control.

Further, a radar apparatus according to one exemplary embodiment of the present disclosure may be attached to, for example, a structure at a relative elevation (not illustrated), such as a roadside utility pole or traffic light. The radar apparatus as such can be utilized as, for example, a sensor in a support system that enhances the safety of a passing vehicle or pedestrian or a suspicious individual intrusion prevention system. Further, the positioning output of the radar apparatus may be outputted to, for example, a controller (not illustrated) in a support system that enhances safety or a suspicious individual intrusion prevention system, and may be utilized for alarm calling control or abnormality detection control.

Note that, the uses of the radar apparatus are not limited thereto and may be utilized in other uses.

Hereinafter, embodiments according to exemplary embodiments of the present disclosure will be described in detail with reference to the drawings. Note that, in the embodiments, the same constituent elements are denoted with the same reference signs, and descriptions thereof will be omitted because of redundancy.

Hereinafter, a configuration of a radar apparatus in which a transmission branch simultaneously transmits different multiplexed transmission signals from a plurality of transmission antennas and a reception branch performs reception processing by demultiplexing each transmission signal (for example, a MIMO radar configuration) will be described.

Further, hereinafter, a configuration of a radar system (also referred to as chirp pulse transmission (fast chirp modulation), for example) using a frequency-modulated pulse wave such as a chirp pulse will be described as an example. However, the modulation scheme is not limited to the frequency modulation. For example, one exemplary embodiment of the present disclosure is also applicable to a radar system using a pulse compression radar that phase-modulates or amplitude-modulates a pulse train and transmits the pulse train.

Embodiment 1

[Configuration of Radar Apparatus]

Figure 2:
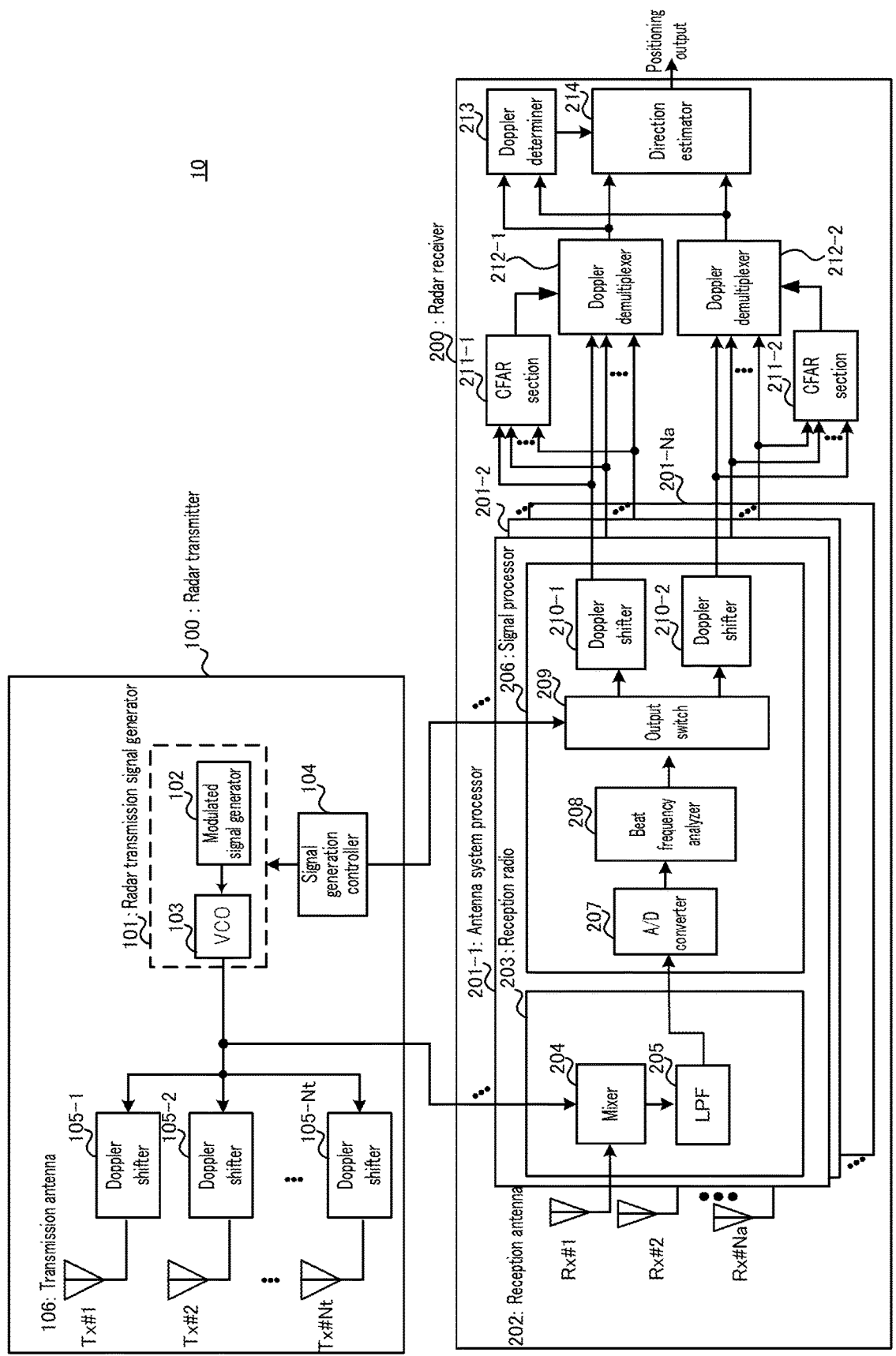
FIG. 2 is a block diagram illustrating a configuration example of a radar apparatus.

Radar apparatus 10 in FIG. 2 includes radar transmitter (transmission branch) 100 and radar receiver (reception branch) 200.

Radar transmitter 100 generates a radar signal (radar transmission signal) and transmits the radar transmission signal in a predetermined transmission period by using a transmission array antenna formed of a plurality of transmission antennas 106-1 to 106-Nt.

Radar receiver 200 receives a reflected wave signal, which is a radar transmission signal reflected by a target object (a target; not illustrated), by using a reception array antenna including a plurality of reception antennas 202-1 to 202-Na. Radar receiver 200 performs signal processing on a reflected wave signal received by each reception antenna 202 to, for example, detect the presence or absence of a target object or estimate the direction of arrival of the reflected wave signal.

Note that, the target object is an object to be detected by radar apparatus 10. Examples of the target object include vehicles (including four-wheel vehicles and two-wheel vehicles), persons, blocks, or curbs.

[Configuration of Radar Transmitter 100]

Radar transmitter 100 includes radar transmission signal generator 101, signal generation controller 104, Doppler shifters 105-1 to 105-Nt, and transmission antennas 106-1 to 106-Nt. For example, radar transmitter 100 includes Nt transmission antennas 106, and transmission antennas 106 are connected to individual Doppler shifters 105, respectively.

Radar transmission signal generator 101 generates a radar transmission signal based on control from signal generation controller 104, for example. Radar transmission signal generator 101 includes, for example, modulated signal generator 102 and voltage controlled oscillator (VCO) 103. Hereinafter, each component in radar transmission signal generator 101 will be described.

Modulated signal generator 102 periodically generates sawtooth-shaped modulated signals, for example. Here, the radar transmission period is $T_r$.

VCO 103 generates a frequency-modulated signal (hereinafter referred to as frequency chirp signal or chirp signal, for example) based on a modulated signal outputted from modulated signal generator 102, and outputs the frequency modulated signal to Doppler shifters 105-1 to 105-Nt and radar receiver 200 (mixer 204 to be described later).

Signal generation controller 104 controls the generation of a radar transmission signal with respect to radar transmission signal generator 101 (for example, modulated signal generator 102 and VCO 103). For example, signal generation controller 104 may configure chirp signal-related parameters (for example, modulation parameters) such that chirp signals with different central frequencies are alternately transmitted.

Hereinafter, two chirp signals with different central frequencies are referred to as "first chirp signal" and "second chirp signal", respectively.

Figure 3:
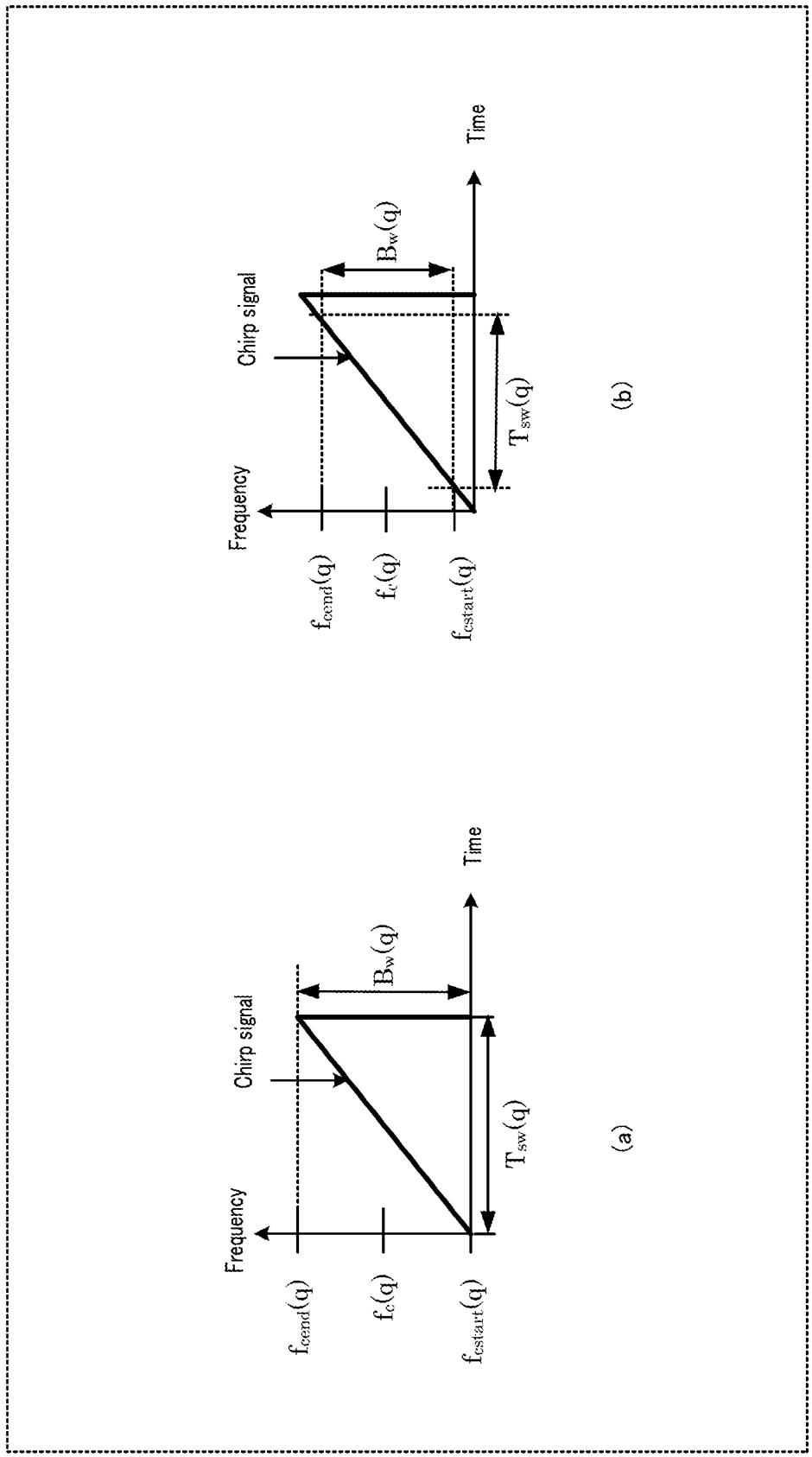
FIG. 3 illustrates examples of chirp signals.

FIG. 3 illustrates examples of chirp signals (for example, the first and second chirp signals).

As illustrated in FIG. 3, the chirp signal-related modulation parameters may include, for example, central frequency $f_c(q)$, frequency sweep bandwidth $B_w(q)$, sweep starting frequency $f_{cstart}(q)$, sweep ending frequency $f_{cend}(q)$, frequency sweeping time $T_{sw}(q)$, and frequency sweeping rate-of-chance $D_m(q)$. Note that, $D_m(q)=B_w(q)/T_{sw}(q)$. Further, $B_w(q)=f_{cend}(q)-f_{cstart}(q)$ and $f_c(q)=(f_{cstart}(q)+f_{cend}(q))/2$. Further, for example, q=1 or 2, and a case where q=1 may represent the modulation parameters of the first chirp signal, and a case where q=2 may represent the modulation parameters of the second chirp signal.

Further, frequency sweeping time $T_{sw}(q)$ corresponds to, for example, a time range (also referred to as range gate) for capturing A/D sample data in A/D converter 207 of radar receiver 200 to be described later. Frequency sweeping time $T_{sw}(q)$ may be configured, for example, in the entire slot of the chirp signal as illustrated in (a) of FIG. 3 or may be configured in part of the slot of the chirp signal as illustrated in (b) of FIG. 3.

Note that, although FIG. 3 indicates an example of the waveform of an up-chirp in which a modulation frequency gradually increases with time, the present disclosure is not limited thereto, and a down-chirp in which a modulation frequency gradually decreases with time may also be applied. The same effect can be obtained regardless of an up-chirp modulation frequency or a down-chirp modulation frequency.

Signal generation controller 104 may configure (or select), for example, central frequency $f_c(q)$ satisfying a predetermined condition (an example thereof will be described later).

Note that, hereinafter, a case where, among the modulation parameters configured to each of the first and second chirp signals, central frequencies fact) are different from each other and other modulation parameters other than the central frequency are the same (or common) will be described as an example. However, the present disclosure is not limited thereto. Since the application of one exemplary embodiment of the present disclosure requires, for example, a matching resolution of the distance axis in the first and second chirp signals, chirp signals in which frequency sweep bandwidths $B_w(q)$ are in the same relationship may be configured (an example thereof will be described later).

Further, hereinafter, signal generation controller 104 may control modulated signal generator 102 and VCO 103 such that each of two chirp signals with different central frequencies $f_c(q)$ is alternately transmitted Nc times, for example.

Figure 4:
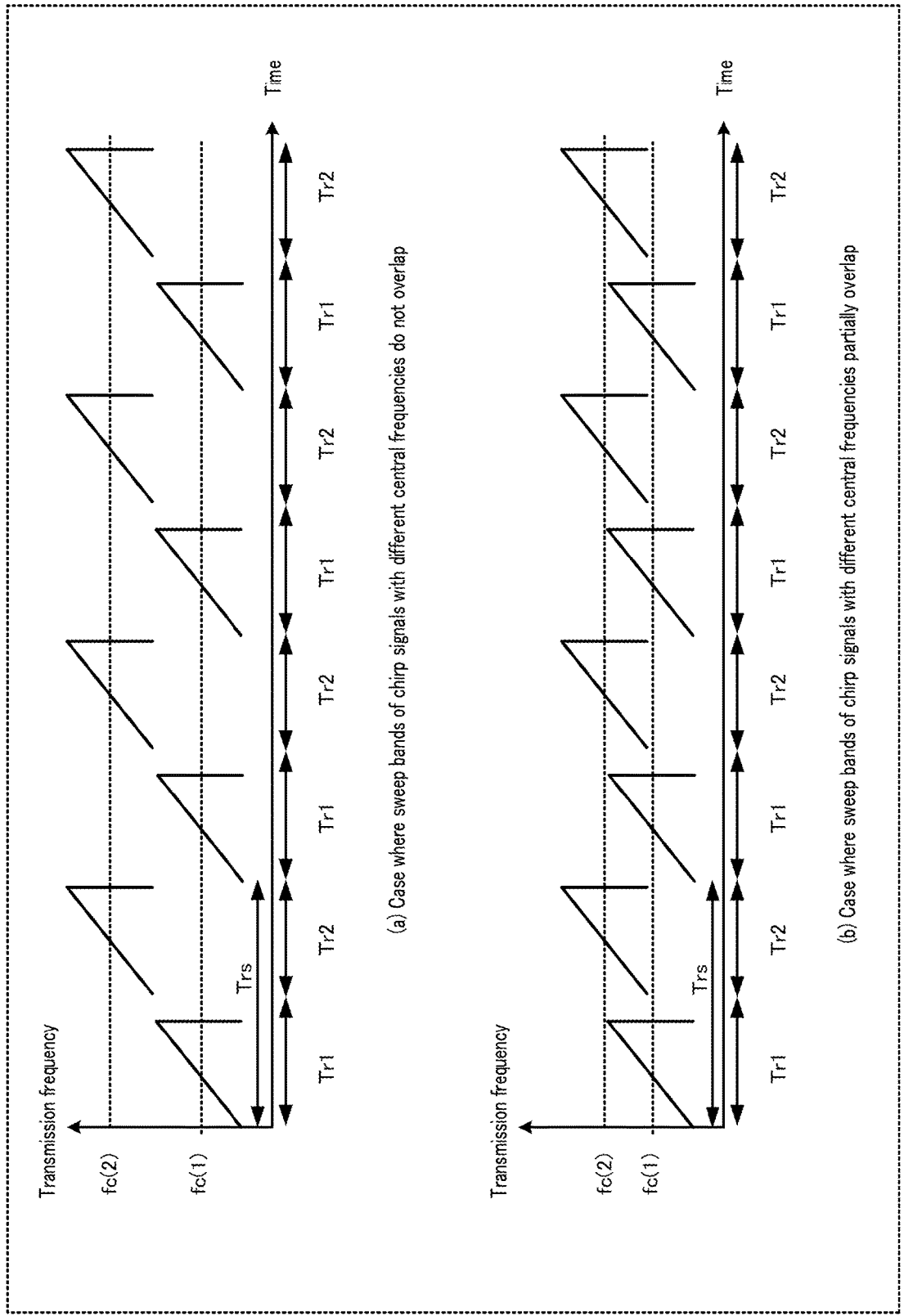
FIG. 4 illustrates examples of radar transmission signals.

FIG. 4 illustrates examples of chirp signals outputted by radar transmission signal generator 101 based on the control of signal generation controller 104.

In FIG. 4, transmission period $T_{r1}$ of the first chirp signal and transmission period $T_{r2}$ of the second chirp signal may be different $(T_{r1} \neq T_{r2})$ and may be the same $(T_{r1}=T_{r2})$. Further, hereinafter, each period obtained by combining each transmission period $T_{r1}$ and each transmission period $T_{r2}$ is referred to as "$T_{rs}$". For example, transmission period $T_{rs}$ indicates a transmission period in which a set of the first and second chirp signals is transmitted, where $T_{rs}=T_{r1}+T_{r2}$. Further, in the following description, unless otherwise specified, each of transmission periods $T_{r1}$ and $T_{r2}$ represents a parameter of the same value (for example, $T_{r1}=T_{r2}$), and may be referred to as transmission period $T_r$ for convenience.

In the same manner, the frequency sweep bandwidth, the frequency sweeping time (or referred to as the range gate), and the frequency sweeping rate-of-change represent, unless otherwise specified, the same-valued parameters with respect to each of the first and second chirp signals, and may be expressed as $B_w(1)=B_w(2)=B_w$, $T_{sw}(1)=T_{sw}(2)=T_{sw}$, and $D_m(1)=D_m(2)=D_m$.

Further, the frequency sweep bandwidth of each of the chirp signals with different central frequencies may not include an overlapping band as illustrated in (a) of FIG. 4 or may include an overlapping band as illustrated in (b) of FIG. 4. In one exemplary embodiment of the present disclosure, for example, when the central frequency relationship between the first and second chirp signals satisfies a predetermined condition, the same effect can be obtained regardless of whether the frequency sweep bandwidths include an overlapping band.

Note that, in one exemplary embodiment of the present disclosure, transmission period $T_{rs}$ may be configured to, for example, several hundreds of Its or less, and the transmission time intervals of radar transmission signals may be configured to be relatively short. Thus, for example, even in a case where the first and second chirp signals have different central frequencies, the frequency of the beat signal of a received reflected wave (for example, beat frequency index) does not change so that radar apparatus 10 is capable of detecting a change in Doppler frequency.

Each chirp signal outputted from radar transmission signal generator 101 (for example, VCO 103) is inputted to, for example, each mixer 204 of radar receiver 200 and Nt Doppler shifters 105, respectively.

Doppler shifter 105 gives phase rotation q n to a chirp signal inputted from VCO 103 in order to give Doppler shift amount $DOP_n$ for each transmission period of the chirp signal (for example, $T_{r1}$ or $T_{r2}$), and outputs the signal subjected to the Doppler shift to transmission antenna 106. Here, n=1, . . . , Nt. Note that, an example of the method of applying Doppler shift amount DON (for example, phase rotation $\varphi_n$) in Doppler shifter 105 will be described later.

The output signals of Doppler shifters 105-1 to 105-Nt are amplified to predetermined transmission power and are radiated from each of transmission antennas 106 (for example, Tx #1 to Tx #Nt) to space.

[Configuration of Radar Receiver 200]

In FIG. 2, radar receiver 200 includes Na reception antennas 202 (for example, Rx #1 to Rx #Na), which form an array antenna. Further, radar receiver 200 includes Na antenna system processors 201-1 to 201-Na, constant false alarm rate (CFAR) section 211, Doppler demultiplexer 212, Doppler determiner 213, and direction estimator 214.

Note that, CFAR section 211 may include, for example, CFAR sections 211-1 and 211-2 that correspond to the first and second chirp signals with different central frequencies, respectively. In the same manner, Doppler demultiplexer 212 may include, for example, Doppler demultiplexers 212-1 and 212-2 that correspond to the first and second chirp signals with different central frequencies, respectively. Note that, although FIG. 2 indicates a configuration in which CFAR sections 211 are provided in parallel (CFAR sections 211-1 and 211-2), it may also be configured such that one CFAR section 211 is provided and the input thereof is sequentially switched and processed. Further, although FIG. 2 indicates a configuration in which Doppler demultiplexers 212 are provided in parallel (Doppler demultiplexers 212-1 and 212-2), it may also be configured such that one Doppler demultiplexer 212 is provided and the input thereof is sequentially switched and processed.

Each reception antenna 202 receives reflected wave signals that are radar transmission signals reflected by a target object (target), and outputs, as reception signals, the received reflected wave signals to corresponding antenna system processors 201.

Each antenna system processor 201 includes reception radio 203 and signal processor 206.

Reception radio 203 includes mixer 204 and low pass filter (LPF) 205. In reception radio 203, mixer 204 mixes a received reflected wave signal (reception signal) with a chirp signal that is a transmission signal. Further, a beat signal with a frequency in accordance with a delay time of a reflected wave signal is taken out by passing the output of mixer 204 through LPF 205. For example, the difference frequency between the frequency of a transmission signal (transmission frequency-modulated wave) and the frequency of a reception signal (reception frequency-modulated wave) is obtained as the beat frequency (or beat signal).

Signal processor 206 in each antenna system processor 201-$z$ (where z=one of 1 to Na) includes A/D converter 207, beat frequency analyzer 208, and Doppler analyzer 210. Note that, Doppler analyzer 210 may include, for example, Doppler analyzers 210-1 and 210-2 that correspond to the first and second chirp signals with different central frequencies, respectively.

In signal processor 206, A/D converter 207 converts a signal (for example, a beat signal) outputted from LPF 205 into discrete sample data that is discretely sampled.

Beat frequency analyzer 208 performs FFT processing on $N_{data}$ pieces of discrete sample data, which are obtained in a predetermined time range (range gate), for each transmission period $T_r$. Here, frequency sweeping time $T_{sw}(q)$ is configured for the range gate. Here, for example, q=1 or 2, and $T_{sw}(q)$ in a case where q=1 represents the frequency sweeping time of the first chirp signal, and $T_{sw}(q)$ in a case where q=2 represents the frequency sweeping time of the second chirp signal. Thus, signal processor 206 outputs a frequency spectrum in which a peak appears at a beat frequency in accordance with a delay time of a reflected wave signal (radar reflected wave). Note that, during the FFT processing, beat frequency analyzer 208 may perform multiplication by a window function coefficient such as a Han window or a Hamming window, for example. The use of the window function coefficient makes it possible to suppress side lobes that appear around beat frequency peaks.

Here, a beat frequency response outputted from beat frequency analyzer 208 in z-th signal processor 206, which is obtained through the m-th chirp pulse transmission of the q-th chirp signal, is represented by $RFT_{z,q}(f_b, m)$, where $f_b$ represents the beat frequency index and corresponds to the index (bin number) of FFT. For example, $f_b=0, \ldots, N_{data}/2-1, z=1, \ldots, Na, m=1, \ldots, Nc$, and q=1 or 2. As beat frequency index $f_b$ decreases, beat frequency index $f_b$ indicates a beat frequency with a smaller delay time of a reflected wave signal (for example, with a closer distance to a target object).

Further, beat frequency index $f_b$ can be converted into distance information $R(f_b)$ by using following equation 1.

(Equation 1)

$$R(f_b) = \frac{C_0}{2B_w} f_b \quad [1]$$

Accordingly, hereinafter, beat frequency index $f_b$ will be referred to as "distance index $f_b$".

Here, $B_w$ represents the frequency sweep bandwidth in a chirp signal, and $C_0$ represents the velocity of light. Further, in equation 1, $C_0/2B_w$ represents the distance resolution, which will be expressed hereinafter as distance resolution $\Delta R = C_0/2B_w$.

Output switch 209 selectively switches between two Doppler analyzers 210 and outputs the output of beat frequency analyzer 208 in accordance with the transmission period of the first chirp signal or the transmission period of the second chirp signal based on a control signal outputted from signal generation controller 104. For example, output switch 209 outputs the output of beat frequency analyzer 208 in transmission period $T_{r1}$ of the first chirp signal (for example, q=1) to Doppler analyzer 210-1. Further, for example, output switch 209 outputs the output of beat frequency analyzer 208 in transmission period $T_{r2}$ of the second chirp signal (for example, q=2) to Doppler analyzer 210-2.

Doppler analysis is performed by q-th Doppler analyzer 210 (also referred to as Doppler analyzer 210-$q$) for each distance index $f_b$ by using beat frequency responses $RFT_{z,q}(f_b, 1), RFT_{z,q}(f_b, 2), \ldots, RFT_{z,q}(f_b, Nc)$ obtained by Nc times chirp pulse transmissions of the q-th chirp signal outputted from output switch 209. For example, q-th Doppler analyzer 210 may estimate a Doppler frequency from a reflected wave signal that is the q-th chirp signal reflected by a target.

For example, in a case where Nc is the value of a power of two, FFT processing can be applied in Doppler analysis. In this case, the FFT size is Nc, and the maximum Doppler frequency at which no abasing occurs and which is derived from the sampling theorem is $\pm 1/(2T_{rs})$. Further, the Doppler frequency intervals of Doppler frequency index $f_s$ are $1/(Nc \times T_{rs})$, and the range of Doppler frequency index $f_s$ is $f_s=-Nc/2, \ldots, 0, \ldots, Nc/2-1$.

Hereinafter, a case where Nc is the value of a power of two will be described as an example. Note that, in a case where Nc is not a power of two, inclusion of zero-padded data makes it possible to perform FFT processing with power-of-two data sizes, for example. Further, during the FFT processing, Doppler analyzer 210 may perform multiplication by a window function coefficient such as a Han window or a Hamming window. The application of the window function makes it possible to suppress side lobes that appear around beat frequency peaks.

For example, output $VFT_{z,q}(f_b, f_s)$ of q-th Doppler analyzer 210 in z-th signal processor 206 is indicated by following equation 2, where j is the imaginary unit, z=1 to Na, and q=1 or 2.

(Equation 2)

$$VFT_{z,q}(f_b, f_s) = \Sigma_{m=1}^{N_c} RFT_{z,q}(f_b, m) \exp\left[-\frac{j2\pi(m-1)f_s}{N_c}\right] \quad [2]$$

The processing in each component of signal processor 206 has been described above.

In FIG. 2, CFAR section 211 performs CFAR processing (for example, adaptive threshold determination) by using the outputs from Doppler analyzers 210 of the first to Na-th signal processors 206 and extracts distance index $f_{b\_cfar}$ and Doppler frequency index $f_{s\_cfar}$ that give a local peak signal. As illustrated in FIG. 2, CFAR section 211 may include first CFAR section 211 (or referred to as CFAR section 211-1) that performs CFAR processing by using the output of first Doppler analyzer 210, and second CFAR section 211 (or referred to as CFAR section 211-2) that performs CFAR processing by using the output of second Doppler analyzer 210.

For example, q-th CFAR section 211 (q=1 or 2) performs power addition of outputs $VFT_{1,q}(f_b, f_s)$, $VFT_{2,q}(f_b, f_s)$, ..., $VFT_{Na,q}(f_b, f_s)$ of q-th Doppler analyzer 210 of the first to Na-th signal processors 206 as in following equation 3 and performs two-dimensional CFAR processing formed of the distance axis and the Doppler frequency axis (corresponding to the relative velocity) or CFAR processing combined with one-dimensional CFAR processing.

[3]

$$\text{PowerFT}_q(f_b, f_s) = \Sigma_{z=1}^{N_a} |VFT_{z,q}(f_b, f_s)|^2 \quad \text{(Equation 3)}$$

Processing disclosed in, for example, NPL 2 may be applied as the two-dimensional CFAR processing or the CFAR processing combined with the one-dimensional CFAR processing.

A threshold is adaptively configured by q-th CFAR section 211, and q-th CFAR section 211 outputs distance index $f_{b\_cfar}(q)$, Doppler frequency index $f_{s\_cfar}(q)$, and reception power information $\text{PowerFT}(f_{b\_cfar}(q), f_{s\_cfar}(q))$, which become reception power larger than the threshold, to q-th Doppler demultiplexer 212.

Doppler demultiplexer 212 may include first Doppler demultiplexer 212 (or referred to as Doppler demultiplexer 212-1) that performs Doppler demultiplexing processing by using the outputs of first Doppler analyzer 210 and first CFAR section 211, and second Doppler demultiplexer 212 (or referred to as Doppler demultiplexer 212-2) that performs Doppler demultiplexing processing by using the outputs of second Doppler analyzer 210 and second CFAR section 211.

Based on information inputted from q-th CFAR section 211 (for example, distance index $f_{b\_cfar}(q)$, Doppler frequency index $f_{s\_cfar}(q)$, and reception power information $\text{PowerFT}(f_{b\_cfar}(q), f_{s\_cfar}(q))$), q-th Doppler demultiplexer 212 (q=1 or 2) demultiplexes a transmission signal to be transmitted from each transmission antenna 106 (for example, a reflected wave signal with respect to the transmission signal) from a Doppler-multiplexed and transmitted signal (hereinafter referred to as "Doppler-multiplexed signal") by using the output from q-th Doppler analyzer 210. For example, q-th Doppler demultiplexer 212 outputs information on a demultiplexed signal to Doppler determiner 213 and direction estimator 214. The information on a demultiplexed signal may include, for example, distance index $f_{b\_cfr}(q)$ and Doppler frequency index (hereinafter may also be referred to as demultiplexing index information) $(f_{demand\_Tx\ \#1}(q), f_{demand\_Tx\ \#2}(q), \ldots, f_{demand\_Tx\ \#Nt}(q))$ both of which correspond to the demultiplexed signal. Further, q-th Doppler demultiplexer 212 outputs the output from q-th Doppler analyzer 210 to direction estimator 214.

Hereinafter, an operation example of q-th Doppler demultiplexer 212 will be described along with the operation of Doppler shifter 105.

[Method of Configuring Doppler Shift Amount]

First, an example of a method of configuring a Doppler shift amount to be given by Doppler shifter 105 will be described.

Doppler shifters 105-1 to 105-Nt give different Doppler shift amounts DOPE to chirp signals to be individually inputted. In one exemplary embodiment of the present disclosure, among Doppler shifters 105-1 to 105-Nt (for example, among transmission antennas 106-1 to 106-Nt), the intervals of Doppler shin amounts DOPE (Doppler shift intervals) are configured not to be equal, but are configured such that at least one Doppler interval is different.

For example, n-th Doppler shifter 105 gives phase rotation $\varphi_m(m)$ to the m-th and q-th chirp signal, which has been inputted, such that Doppler shift amounts $DOP_n$ are different from each other, and outputs the chirp signal. Thus, Doppler shift amounts different from each other are given to transmission signals to be transmitted from the plurality of transmission antennas 106. For example, Doppler multiplexing number $N_{DM}$=Nt in one exemplary embodiment. Here, m=an integer of 1 to Nc, n=an integer of 1 to Nt, and q=1 or 2.

Further, in q-th Doppler analyzer 210, a range of Doppler frequency $f_d$ which is derived from the sampling theorem and in which no aliasing occurs is $-1/(2T_{rs}) \leq f_d < 1/(2T_{rs})$.

Thus, it is assumed that phase rotation $\varphi_n(m)$ that causes Doppler shift intervals to be equal interval $1/(Nt \times T_{rs})$ with respect to transmission signals to be transmitted from Nt transmission antennas 106 is indicated by following equation 4.

(Equation 4)

$$\phi_n(m) = \{\frac{2\pi}{N_c} \text{round}\left(\frac{N_c}{Nt}\right)(n-1) + \Delta\phi_0\}(m-1) + \phi_0 \quad [4]$$

Here, $\varphi_0$ is an initial phase and $\Delta\varphi_0$ is a reference Doppler shift phase. Further, round(x) is a round function that outputs a rounded integer value with respect to real number x. Note that, the term round(Nc−Nt) is introduced in order to cause the phase rotation amount to be an integer multiple of the Doppler frequency interval in Doppler analyzer 210.

It is assumed, for example, that in a case where phase rotation $\varphi_n(m)$ indicated by equation 4 is used, every interval of the phase rotation among transmission signals, where the phase rotation is given to the m-th and q-th chirp signal, becomes equal and $2\pi$ round(Nc/Nt)/Nc.

As an example, in a case where phase rotation $\varphi_n(m)$ is given in equation 4 where Nt=2, $\Delta\varphi_0$=0, and $\varphi_0$=0, the Doppler shift amounts become $DOP_1$=0 and $DOP_2$=−1/$(2T_{rs})$.

For example, the respective intervals of Doppler shift amounts that are given to transmission signals to be transmitted from the plurality of transmission antennas 106 are equally configured in a Doppler frequency range (for example, a Doppler frequency range in which no aliasing occurs) in radar apparatus 10 (radar receiver 200). For example, the intervals of Doppler shift amounts that are given to transmission signals to be transmitted from Nt=two transmission antennas 106 are configured to be an interval ($1/(2T_{rs})$ in the example described above) obtained by dividing a Doppler frequency range (for example, $-1/(2T_{rs}) \leq f_d < 1/(2T_{rs})$), in which no aliasing occurs, by the number of transmission antennas 106 (for example. Nt=2). For this reason, the Doppler interval between Doppler peaks P1 and P2 is $1/(2T_{rs})$.

Figure 5:
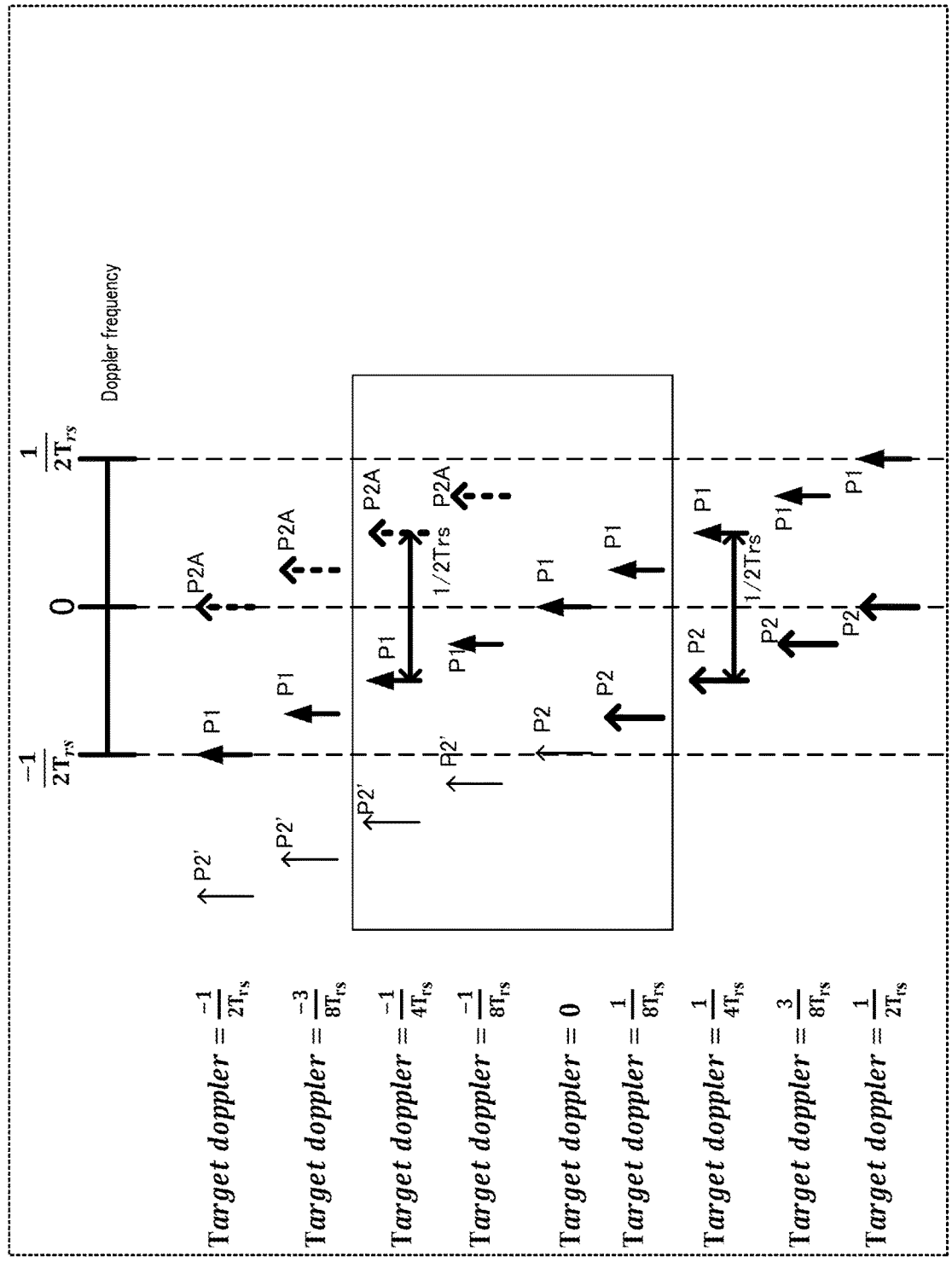
FIG. 5 illustrates examples of Doppler peaks.

FIG. 5 illustrates examples of Doppler peaks that are assumed to be obtained by Doppler analysis (FFT) in Doppler analyzer 210 in a case where Doppler shift amounts of $DOP_1=0$ and $DOP_2=1/(2T_{rs})$ are used for transmission signals to be transmitted from Nt=two transmission antennas 106 (hereinafter referred to as Tx #1 and Tx #2).

As illustrated in FIG. 5, Nt (Nt=two in FIG. 5) Doppler peaks are generated with respect to one target Doppler frequency (target doppler) $f_{d\_TargetDoppler}$ to be measured.

Hereinafter, as an example, the positional relationships between Doppler peaks generated when reflected wave signals with respect to transmission signals transmitted from transmission antenna Tx #1 are received and a Doppler peak generated when a reflected wave signal with respect to a transmission signal from transmission antenna Tx #2 is received in a case where target Doppler frequency $f_{d\_TargetDoppler}$ of the target to be measured=$-1/(4T_{rs})$ and in a case where $f_{d\_TargetDoppler}=1/(4T_{rs})$ are compared in FIG. 5.

<Case where Target Doppler Frequency $f_{d\_TargetDoppler}=-1/(4T_{rs})$>

In a case where $f_{d\_TargetDoppler}=-1/(4T_{rs})$, a Doppler peak generated when a reflected wave signal with respect to a transmission signal from transmission antenna Tx #2 is received is FFT-outputted as a peak (P2A) of an aliased signal as illustrated in FIG. 5. Thus, the case where $f_{d\_TargetDoppler}=1/(4T_{rs})$ results in the positional relationship between the Doppler peak (P1) generated when a reflected wave signal with respect to a transmission signal from transmission antenna Tx #1 is received and the Doppler peak (P2A) of the aliased signal described above as illustrated in FIG. 5. The Doppler interval between the Doppler peak (P1) and the Doppler peak (P2A) is $1/(2T_{rs})$. Note that, the Doppler peak (P2') is described for reference as a signal prior to aliasing, but is actually not present in the FFT-output.

<Case where Target Doppler Frequency $f_{d\_TargetDoppler}=1/(4T_{rs})$>

The case where $f_{d\_TargetDoppler}=1/(4T_{rs})$ results in the positional relationship between the Doppler peak (P1) generated when a reflected wave signal with respect to a transmission signal from transmission antenna Tx #1 is received and the Doppler peak (P2) generated when a reflected wave signal with respect to a transmission signal from transmission antenna Tx #2 is received as illustrated in FIG. 5. The Doppler interval between Doppler peaks P1 and P2 is $1/(2T_{rs})$.

As described above, in both of a case where $f_{d\_TargetDoppler}=-1/(4T_{rs})$ and a case where $f_{d\_TargetDoppler}=1/(4T_{rs})$, the Doppler interval between the Doppler peak (P1) corresponding to transmission antenna Tx #1 and the Doppler peak (P2 or P2A) corresponding to transmission antenna Tx #2 is $1/(2T_{rs})$. Accordingly, the positional relationship between the Doppler peaks corresponding to Tx #1 and Tx #2 cannot be distinguished in $f_{d\_TargetDoppler}=-1/(4T_{rs})$ and $1/(4T_{rs})$, which causes ambiguity. Thus, in the examples illustrated in FIG. 5, the target Doppler frequency range in which no ambiguity occurs is, for example, $-1/(4T_{rs}) \leq f_{d\_TargetDoppler} < 1/(4T_{rs})$.

Figure 6:
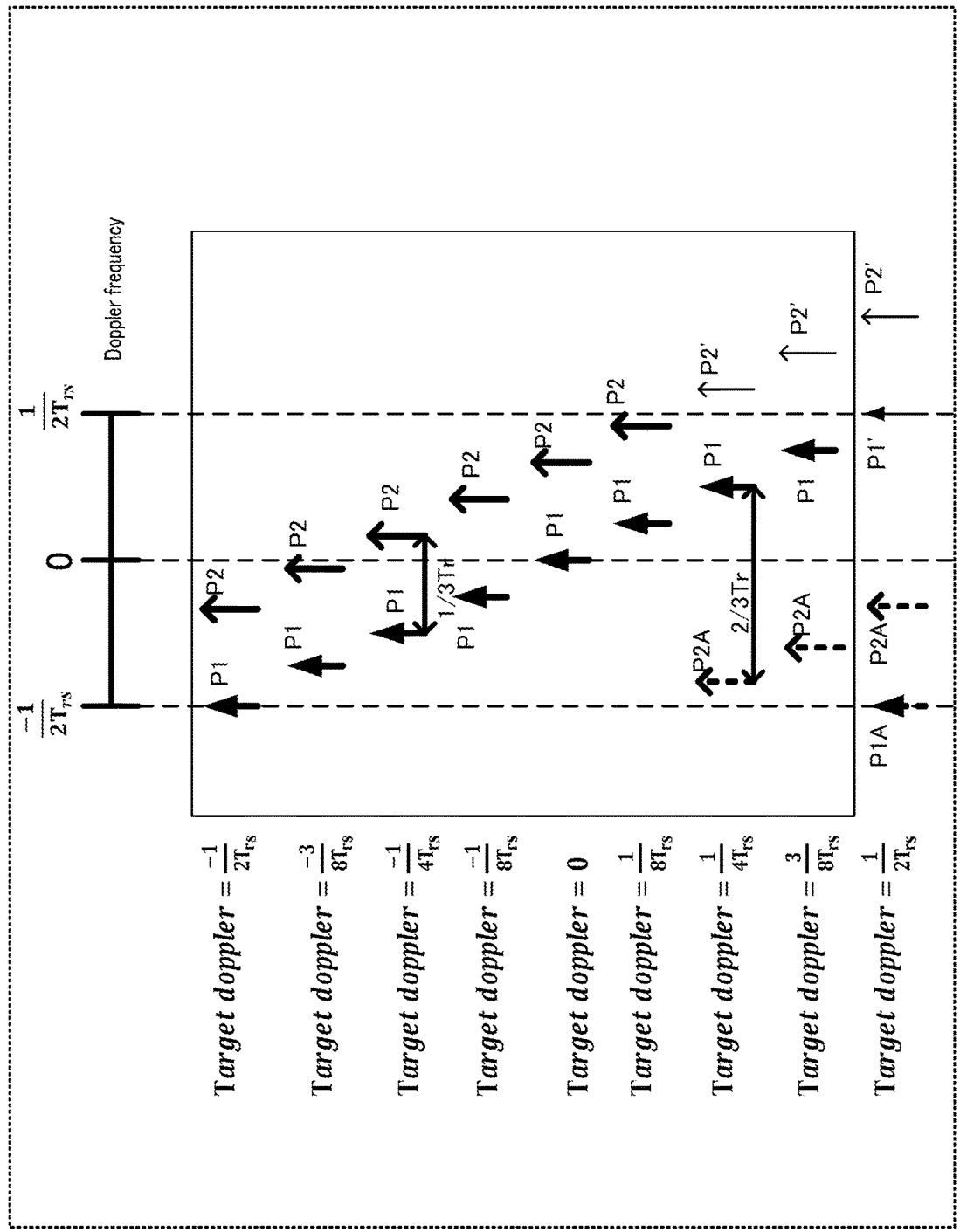
FIG. 6 illustrates examples of Doppler peaks.

On the other hand, as illustrated in FIG. 6, in Doppler shifter 105 according to one exemplary embodiment of the present disclosure, Doppler shift amounts for which the Doppler multiplexing intervals become unequal are configured. For example, Doppler shifter 105 may give a Doppler shift amount with intervals obtained by unequally dividing a Doppler frequency range based on which the number of times of aliasing of a Doppler frequency id determined. For example, in Doppler shifter 105, at least one interval of Doppler shift amounts $DOP_n$ (or phase rotations $\varphi_n(m)$) to be given to transmission signals transmitted from transmission antennas 106 is different.

Further, for example, Doppler shifter 105 increases the intervals of Doppler shift amounts to be given to transmission signals transmitted from Nt transmission antennas 106 as much as possible and gives Doppler shift amounts $DOP_n$ such that at least one interval of phase rotations $\varphi_n(m)$ is different. This improves the demultiplexing performance of Doppler multiplexing.

For example, n-th Doppler shifter 105 gives phase rotation $\varphi_n(m)$ as in following equation 5 to the m-th first chirp signal or second chirp signal, which has been inputted, such that Doppler shift amounts $DOP_n$ are different from each other among Doppler shifters.

(Equation 5)

$$\phi_n(m) = \{A \frac{2\pi}{N_c} \text{round}\left(\frac{N_c}{Nt+\delta}\right)(n-1) + \Delta\phi_0\}(m-1) + \phi_0 \quad [5]$$

Here, A is a coefficient giving positive or negative polarity, which is 1 or −1. Further, δ is an integer larger than or equal to one. Note that, the term round($N_c/(Nt+\delta)$) is introduced in order to cause the phase rotation amount to be an integer multiple of the Doppler frequency interval in Doppler analyzer 210, but the present disclosure is not limited thereto, and $2\pi/(Nt+\delta)$ may also be used instead of the term $(2\pi/N_c)\times$round($N_c/(Nt+\delta)$) in equation 5.

For example, radar apparatus 10 performs Doppler multiplexing with unequal intervals on the first and second chirp signals at the same Doppler multiplexing intervals.

As an example, in a case where phase rotation $\varphi_n(m)$ is applied with Nt=2, $\Delta\varphi_0=0$, $\varphi_0=0$, A=1, δ=1, and $N_c$ is a multiple of three in equation 5, the Doppler shift amounts are $DOP_1=0$ and $DOP_2=1/(3T_{rs})$.

FIG. 6 illustrates examples of Doppler peaks obtained by Doppler analysis in Doppler analyzer 210 in a case where Doppler shift amounts of $DOP_1=0$ and $DOP_2=1/(3T_{rs})$ are used with respect to transmission signals transmitted from Nt=two transmission antennas 106 (hereinafter referred to as Tx #1 and Tx #2).

As illustrated in FIG. 6, Nt Doppler peaks (Nt=2 in FIG. 6) are generated with respect to one target Doppler frequency (target doppler) $f_{d\_TargetDoppler}$ to be measured.

Hereinafter, as an example, the positional relationships between a Doppler peak generated when a reflected wave signal with respect to a transmission signal transmitted from transmission antenna Tx #1 is received and a Doppler peak generated when a reflected wave signal with respect to a transmission signal transmitted from transmission antenna Tx #2 is received in a case where target Doppler frequency $f_{d\_TargetDoppler}=-1/(4T_{rs})$ of the target to be measured and in a case where $f_{d\_TargetDoppler}=1/(4T_{rs})$ are compared in the output of Doppler analyzer 210 in FIG. 6.

<Case where Target Doppler Frequency $f_{d\_TargetDoppler}=-1/(4T_{rs})$>

The case where $f_{d\_TargetDoppler}=-1/(4T_{rs})$ results in the positional relationship between the Doppler peak (P1) generated when a reflected wave signal with respect to a transmission signal from transmission antenna Tx ##1 is received and the Doppler peak (P2) generated when a reflected wave signal with respect to a transmission signal from transmission antenna Tx #2 is received as illustrated in FIG. 6. The Doppler interval between Doppler peaks P1 and P2 is $1/(3T_{rs})$.

<Case where Target Doppler Frequency $f_{d\_TargetDoppler}=1/(4T_{rs})$>

In a case where $f_{d\_TargetDoppler}=1/(4T_{rs})$, a Doppler peak generated when a reflected wave signal with respect to a transmission signal from transmission antenna Tx #2 is received is FFT outputted as the peak (P2A) of an aliased signal as illustrated in FIG. 6. Thus, the case where $f_{d\_TargetDoppler}=1/(4T_{rs})$ results in the positional relationship between the Doppler peak (P1) generated when a reflected wave signal with respect to a transmission signal from transmission antenna Tx #1 is received and the Doppler peak (P2A) of the aliased signal described above. The Doppler interval between the Doppler peak (P1) and the peak (P2A) is $2/(3T_{rs})$.

As illustrated in FIG. 6, in a case where target Doppler frequency $f_{d\_TargetDoppler}=-1/(4T_{rs})$ and in a case where $f_{d\_TargetDoppler}=1/(4T_{rs})$, the positional relationships between the Doppler peak (P1) corresponding to transmission antenna Tx #1 and the Doppler peak (P2 or P2A) corresponding to transmission antenna Tx #2 are different from each other.

Thus, in the examples indicated in FIG. 6, Doppler demultiplexer 212 can distinguish between a case where target Doppler frequency $f_{d\_TargetDoppler}=-1/(4T_{rs})$ (for example, a case without aliasing) and a case where $f_{d\_TargetDoppler}=1/(4T_{rs})$ (for example, a case with aliasing).

For example, in a case where $-1/(2T_{rs}) \leq$ assumed target Doppler frequency $f_{d\_TargetDoppler}<1\%(2T_{rs})$, Doppler demultiplexer 212 can determine that no aliased signal is included in a case where target Doppler frequency $f_{d\_TargetDoppler}=-1/(4T_{rs})$. Thus, for example, in a case where $f_{d\_TargetDoppler}=-1/(4T_{rs})$ indicated in FIG. 6, Doppler demultiplexer 212 can determine reflected wave signals with respect to transmission signals from transmission antennas Tx #1 and Tx #2, respectively, based on Doppler peaks with no aliased signal included and with the smallest frequency.

Further, for example, in a case where $-1/(2T_{rs}) \leq$ assumed target Doppler frequency $f_{d\_TargetDoppler}<1\%(2T_{rs})$, Doppler demultiplexer 212 can determine that an aliased Doppler peak (for example, P2A) is included in a case where target Doppler frequency $f_{d\_TargetDoppler}=1/(4T_{rs})$, and can determine that Doppler frequency $f_{d\_TargetDoppler}=1/(4T_{rs})$. Accordingly, in a case where $f_{d\_TargetDoppler}=1/(4T_{rs})$ illustrated in FIG. 6, for example, an aliased signal (P2A) is included so that Doppler demultiplexer 212 can determine that, between Doppler peaks with the Doppler peak interval of $2/(3T_{rs})$, the higher Doppler peak is for a reflected wave signal corresponding to transmission antenna Tx #1 and the lower Doppler peak is for a reflected wave signal corresponding to transmission antenna Tx #2. Note that, P1' and P2' in FIG. 6 have been described for ease of illustration, but are not actually present in the output of Doppler analyzer 210.

Next, as another example, the positional relationships between a Doppler peak generated when a reflected wave signal with respect to a transmission signal transmitted from transmission antenna Tx #1 is received and a Doppler peaks generated when a reflected wave signal with respect to a transmission signal transmitted from transmission antenna Tx #2 is received in a case where target Doppler frequency $f_{d\_TargetDoppler}$ of a target to be measured $=-1/(2T_{rs})$ and in a case where $f_{d\_TargetDoppler}=1/(2T_{rs})$ are compared in FIG. 6.

<Case where Target Doppler Frequency $f_{d\_TargetDoppler}=-1/(2T_{rs})$>

The case where $f_{d\_TargetDoppler}=-1/(2T_{rs})$ results in the positional relationship between the Doppler peak (P1) generated when a reflected wave signal with respect to a transmission signal from transmission antenna Tx #1 is received and the Doppler peak (P2) generated when a reflected wave signal with respect to a transmission signal from transmission antenna Tx #2 is received as illustrated in FIG. 6. The Doppler interval between the Doppler peak (P1) and the Doppler peak (P2) is $1/(3T_{rs})$.

<Case where Target Doppler Frequency $f_{d\_TargetDoppler}=1/(2T_{rs})$>

In a case where $f_{d\_TargetDoppler}=1/(2T_{rs})$, the Doppler peak generated when a reflected wave signal with respect to a transmission signal from transmission antenna Tx #1 is received is FFT outputted as the Doppler peak (P1A) of an aliased signal and the Doppler peak generated when a reflected wave signal with respect to a transmission signal from transmission antenna Tx #2 is received is FFT outputted as the Doppler peak (P2A) of an aliased signal as illustrated in FIG. 6, which therefore results in the positional relationship between the Doppler peak (PIA) generated when a reflected wave signal with respect to a transmission signal from transmission antenna Tx #1 is received and the Doppler peak (P2A) of the aliased signal described above. The Doppler interval between the Doppler peak (P1A) and the Doppler peak (P2A) is $1/(3T_r)$.

As described above, in both of the cases where target Doppler frequency $f_{d\_TargetDoppler}=-1/(2T_{rs})$ and $f_{d\_TargetDoppler}=1/(2T_{rs})$, the Doppler interval between the Doppler peak (P1) corresponding to transmission antenna Tx #1 and the Doppler peak (P2 or P2A) corresponding to transmission antenna Tx #2 is $1/(3T_{rs})$. Accordingly, the positional relationship between the Doppler peaks corresponding to Tx #1 and Tx #2 cannot be distinguished in a case where $f_{d\_TargetDoppler}=-1/(2T_{rs})$ and $f_{d\_TargetDoppler}=1/(2T_{rs})$, which causes ambiguity. Thus, in the examples illustrated in FIG. 6, the target Doppler frequency range in which no ambiguity occurs in Doppler demultiplexer 212 is, for example, $-1/(2T_{rs}) \leq f_{d\_TargetDoppler}<1/(2T_{rs})$.

Accordingly, the Doppler shift configuration in FIG. 6 makes it possible to extend the target Doppler frequency range, in which no ambiguity occurs, Nt time (for example, twice in FIG. 6) in comparison with time-division multiplexing or Doppler multiplexing in a case where Doppler shill amounts are equally spaced (see, for example, FIG. 5).

In the present embodiment, a method of further extending the target Doppler frequency range, in which no ambiguity occurs, by processing of Doppler determiner 213 to be described later will be described.

Next, an example of a method of demultiplexing signals corresponding to each transmission antenna 106 in Doppler demultiplexer 212 will be described.

As an example, an operations of Doppler demultiplexer 212 in a case where Nt=2 will be described.

Hereinafter, a case where phase rotation $\varphi_n(m)$ indicated in equation 5 is given in Doppler shifter 105 will be described as an example. Note that, hereinafter, $\Delta\varphi_0=0$, $\varphi_0=0$, $\delta=1$, and $N_c$ is a multiple of three as an example. In a case where A=1, the Doppler shift amounts with respect to each transmission antenna 106 are $DOP_1=0$ and $DOP_2=1/(3T_r)$. In a case where A=−1, the Doppler shift amounts with respect to each transmission antenna 106 are $DOP_1=0$ and $DOP_2=-1/(3T_r)$.

In this case, q-th Doppler demultiplexer 212 demultiplexes a Doppler-multiplexed signal by using a peak (distance index $f_{b\_cfar}(q)$ and Doppler frequency index $f_{s\_cfar}(q)$) which is inputted from q-th CFAR section 211 and at which the reception power becomes larger than a threshold.

For example, q-th Doppler demultiplexer 212 determines, with respect to a plurality of Doppler frequency indices $f_{s\_cfar}(q)$ with the same distance index $f_{s\_cfar}(q)$, to which of transmission signals transmitted from transmission antennas Tx #1 to Tx #Nt each reflected wave signal corresponds, and q-th Doppler demultiplexer 212 demultiplexes and outputs the determined reflected wave signal for each of transmission antennas Tx #1 to Tx #Nt.

Hereinafter, an operation in a case where there is a plurality of Doppler frequency indices $f_{s\_cfar}(q)$, whose number is Ns, with the same distance index $f_{b\_cfar}(q)$ will be described. For example, $f_{s\_cfar}(q) \in \{fd_{\#1}, fd_{\#2}, \ldots, fd_{\#Ns}\}$.

Here, Nt=two Doppler peaks are generated with respect to one target Doppler frequency $f_{d\_TargetDoppler}$ by Doppler shift amounts $DOP_1$ and $DOP_2$ given to transmission signals transmitted from transmission antennas Tx #1 and Tx #2, respectively. The Doppler index interval corresponding to the Doppler interval between the Doppler peaks described above becomes round($N_c/(Nt+1)$) from the difference between phase rotation $\varphi_1(m)$ with respect to transmission antenna Tx #1 and phase rotation $\varphi_2(m)$ with respect to transmission antenna Tx #2 indicated by following equation 6.

(Equation 6)

$$\phi_2(m) - \phi_1(m) = A \frac{2\pi}{N_c} \text{round}\left(\frac{N_c}{Nt+1}\right) \quad [6]$$

Further, in a case where an aliased signal is included, the Doppler index interval corresponding to the Doppler interval between the Doppler peaks becomes Nc−round(Nc/(Nt+1)).

For example, q-th Doppler demultiplexer 212 calculates Doppler index intervals with respect to a plurality of Doppler frequency indices $f_{s\_cfar}(q) \in \{fd_{\#1}, fd_{\#2}, \ldots, fd_{\#Ns}\}$ with the same distance index $f_{b\_far}(q)$. Then, q-th Doppler demultiplexer 212 searches for Doppler frequency indices that match Doppler index interval round(Nc/(Nt+1)) corresponding to the interval of a Doppler shift amount in a case where no aliased signal is included, or searches for Doppler frequency indices that match Doppler index interval (Nc −round($N_c$/(Nt+1))) corresponding to the interval of a Doppler shift amount in a case where an aliased signal is included.

Based on the result of the search described above, q-th Doppler demultiplexer 212 performs the following processing.

(1) When there are Doppler frequency indices that match index interval round(Nc/(Nt+1)) corresponding to the interval of a Doppler shift amount in a case where no aliased signal is included, q-th Doppler demultiplexer 212 outputs a pair of the Doppler frequency indices described above (for example, represented as $fd_{\#p}$, and $fd_{\#q}$) as demultiplexing index information ($f_{demul\_Tx\ \#1}(q)$ and $f_{demul\_Tx\ \#2}(q)$) on Doppler-multiplexed signals.

Here, in a case where the Doppler shift amounts with respect to transmission antennas Tx #1 and Tx #2 have a relationship of $DOP_1<DOP_2$, q-th Doppler demultiplexer 212 determines the larger between $fd_{\#p}$ and $fd_{\#q}$ as Doppler frequency index $f_{demul\_Tx\ \#2}(q)$ corresponding to Tx #2, and determines the lower therebetween as Doppler frequency index $f_{demul\_Tx\ \#1}(q)$ corresponding to Tx ##1. In a case where the Doppler shift amounts with respect to transmission antennas Tx #1 and Tx #2 have a relationship of $DOP_1>DOP_2$, on the other hand, q-th Doppler demultiplexer 212 determines the larger between $fd_{\#p}$ and $fd_{\#q}$ as Doppler frequency index $f_{demul\_Tx\ \#1}(q)$ corresponding to Tx #1, and determines the lower therebetween as Doppler frequency index $f_{demul\_Tx\ \#2}(q)$ corresponding to Tx #2.

(2) When there are Doppler frequency indices that match index interval Nc−round(Nc/(Nt+1)) corresponding to the interval of a Doppler shift amount in a case where an aliased signal is included, q-th Doppler demultiplexer 212 outputs a pair of the Doppler frequency indices described above (for example, $fd_{\#p}$ and $fd_{\#q}$) as demultiplexing index information ($f_{demul\_Tx\ \#1}(q)$ and $f_{demul\_Tx\ \#2}(q)$) on Doppler-multiplexed signals.

Here, in a case where the Doppler shift amounts with respect to transmission antennas Tx #1 and Tx #2 have a relationship of $DOP_1<DOP_2$, q-th Doppler demultiplexer 212 determines the larger between $fd_{\#p}$ and $fd_{\#q}$ as Doppler frequency index $f_{demul\_Tx\ \#1}(q)$ corresponding to Tx #1, and determines the lower therebetween as Doppler frequency index $f_{demul\_Tx\ \#2}(q)$ corresponding to Tx #2. In a case where the Doppler shift amounts with respect to transmission antennas Tx #1 and Tx #2 have a relationship of $DOP_1>DOP_2$, on the other hand, q-th Doppler demultiplexer 212 determines the larger between $fd_{\#p}$ and $fd_{\#q}$ as Doppler frequency index $f_{demul\_Tx\ \#2}(q)$ corresponding to Tx #2, and determines the lower therebetween as Doppler frequency index $f_{demul\_Tx\ \#1}(q)$ corresponding to Tx #1.

(3) When there are neither Doppler frequency indices that match index interval round(Nc/(Nt+1)) corresponding to the interval of a Doppler shift amount in a case where no aliased signal is included nor Doppler frequency indices that match index interval Nc−round(Nc/(Nt+1)) corresponding to the interval of a Doppler shift amount in a case where an aliased signal is included, q-th Doppler demultiplexer 212 determines a generated Doppler peak as a noise component. In this case, Doppler demultiplexer 212 may omit the output of demultiplexing index information ($f_{demul\_Tx\ \#1}(q)$, $f_{demul\_Tx\ \#2}(q)$) on Doppler-multiplexed signals.

In the above-described manner, q-th Doppler demultiplexer 212 can demultiplex Doppler-multiplexed signals.

Note that, although an operation example of Doppler multiplexing in a case where Nt=2 has been described, number Nt of transmission antennas is not limited to two, but may be three or more. Hereinafter, an operation of radar apparatus 10 in a case where Nt=3 will be described as another example.

Hereinafter, a case where phase rotation $\varphi_n(m)$ indicated by equation 5 is given in Doppler shifter 105 will be described as an example. Note that, hereinafter, $\Delta\varphi_0=0$, $\varphi_0=0$, A=1, and $\delta=1$ as an example. In this case, the Doppler shift amounts with respect to each transmission antenna 106 are $DOP_1=0$, $DOP_2=1/(4T_{rs})$, and $DOP_3=-1/(2T_{rs})$.

Figure 7:
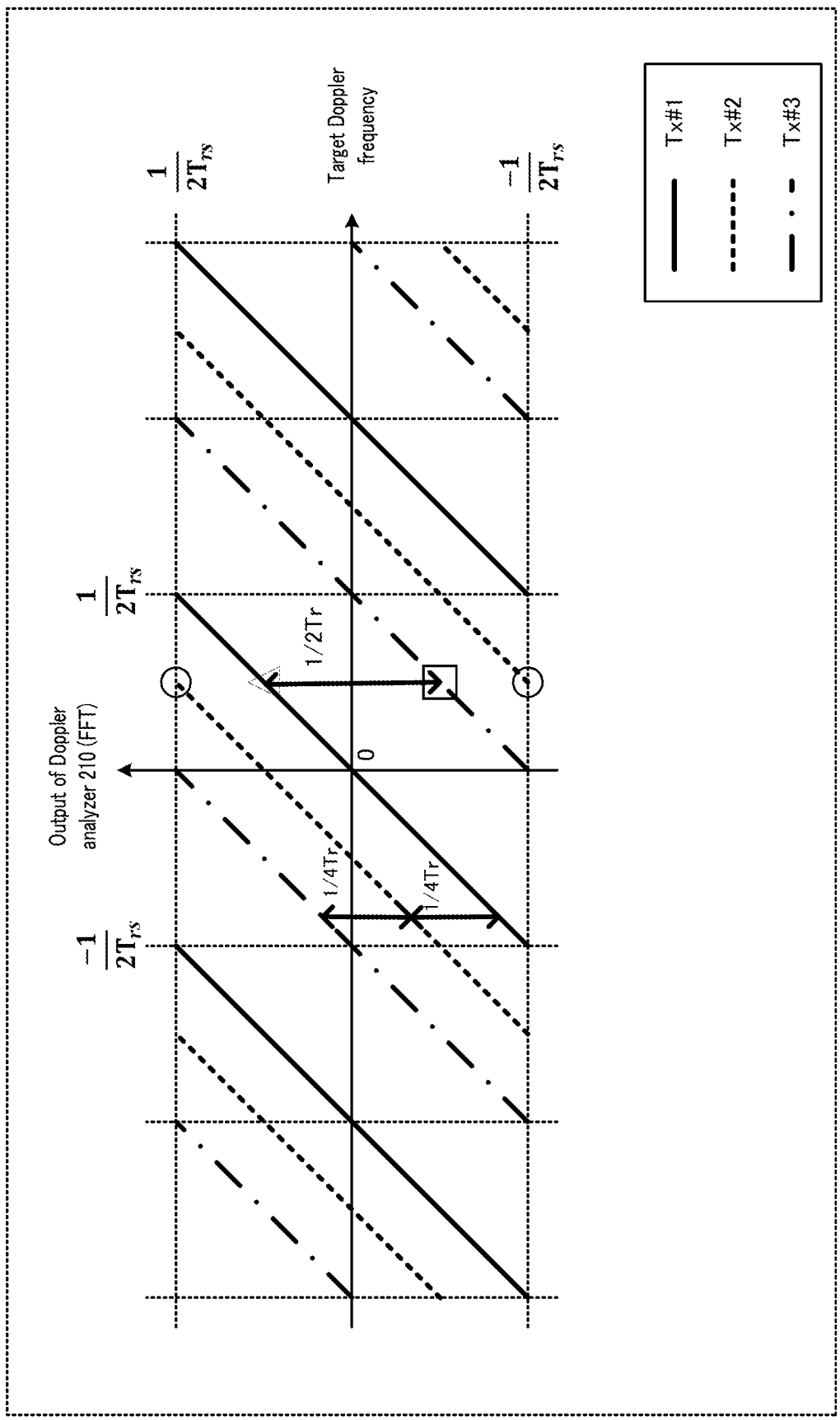
FIG. 7 illustrates examples of Doppler peaks.

When such Doppler shift amounts are used, for example, Nt (three in FIG. 7) Doppler peaks are generated with respect to one target Doppler frequency $f_{d\_TargetDoppler}$ to be measured as illustrated in FIG. 7. Note that. FIG. 7 illustrates changes in Doppler peaks with Nt=3 in a case where the horizontal axis indicates the target Doppler frequency and the vertical axis indicates the output of q-th Doppler analyzer 210 (FFT).

<Case where $0 \le$ Target Doppler Frequency $f_{d\_TargetDoppler} < 1/(2T_{rs})$>

As illustrated in FIG. 7, the Doppler interval between the Doppler peak (solid line) generated when a reflected wave signal with respect to a transmission signal from transmission antenna Tx #1 is received and the Doppler peak (dashed one-dot line) generated when a reflected wave signal with respect to a transmission signal from transmission antenna Tx #3 is received is $1/(2T_{rs})$. Further, since no aliased signal is included with respect to transmission antennas Tx #1, Tx #2, and Tx #3 in $0 \le f_{d\_TargetDoppler} < 1/(4T_{rs})$ in this case, q-th Doppler demultiplexer 212 can determine reflected wave signals with respect to transmission signals from transmission antennas Tx #3, Tx #1, and Tx #2, respectively, based on Doppler peaks with a low frequency.

Further, in this case, an aliased signal is included with respect to Tx #2 in $1/(4T_{rs}) \le f_{d\_TargetDoppler} < 1/(2T_{rs})$. For this reason, q-th Doppler demultiplexer 212 can determine that, among Doppler peaks with the Doppler peak interval of $1/(2T_{rs})$, the higher Doppler peak (solid-line triangle) is for a reflected wave signal corresponding to transmission antenna Tx #1, the lower Doppler peak (solid-line square) is for a reflected wave signal corresponding to transmission antenna Tx #3, and the remaining Doppler peak is for a reflected wave signal from transmission antenna Tx #2.

<Case where $-1/(2T_{rs}) \le$ Target Doppler Frequency $f_{d\_TargetDoppler} < 0$>

As illustrated in FIG. 7, an aliased signal is included with respect to Tx #1 so that the Doppler interval between the Doppler peak (solid line) generated when a reflected wave signal with respect to a transmission signal from transmission antenna Tx #1 is received and the Doppler peak (dotted line) generated when a reflected wave signal with respect to a transmission signal from transmission antenna Tx #2 is received is $1/(4T_{rs})$. Further, the Doppler interval between the Doppler peak (dotted line) generated when a reflected wave signal with respect to a transmission signal from transmission antenna Tx #2 is received and the Doppler peak (dashed one-dot line) generated when a reflected wave signal with respect to a transmission signal from transmission antenna Tx #3 is received is $1/(4T_{rs})$.

Further, since an aliased signal is included with respect to transmission antenna Tx #1 in this case, q-th Doppler demultiplexer 212 can determine reflected wave signals with respect to transmission signals from transmission antennas Tx #1, Tx #2, and Tx #3, respectively, based on Doppler peaks with a low frequency.

Accordingly, in the examples illustrated in FIG. 7, the target Doppler frequency range in which no ambiguity occurs is, for example, $-1/(2T_{rs}) \le f_{d\_TargetDoppler} < 1/(2T_{rs})$.

Next, an example of a method of demultiplexing signals corresponding to each transmission antenna 106 in q-th Doppler demultiplexer 212 to will be described.

Hereinafter, a case where phase rotation $\varphi_n(m)$ indicated by equation 5 is given in Doppler shifter 105 will be described as an example. Note that, hereinafter, Nt=3, $\Delta\varphi_0=0$, $\varphi_0=0$, $\delta=1$, and Nc is a multiple of 3 as an example. Ina case where A=1, the Doppler shift amounts with respect to each transmission antenna 106 are $DOP_1=0$, $DOP_2=1/(4T_{rs})$, and $DOP_3=1/(2T_{rs})=-1/(2T_{rs})$. In a case where A=−1, the Doppler shill amounts with respect to each transmission antenna 106 are $DOP_1=0$, $DOP_2=-1/(4T_{rs})$, and $DOP_3=-1/(2T_{rs})$.

By using a peak (distance index $f_{b\_cfar}(q)$ and Doppler frequency index $f_{s\_cfar}(q)$) which is inputted from q-th CFAR section 211 and in which the reception power is larger than a threshold, q-th Doppler demultiplexer 212 demultiplexes a Doppler-multiplexed signal.

For example, q-th Doppler demultiplexer 212 determines, with respect to a plurality of Doppler frequency indices $f_{s\_cfar}(q)$ with the same distance index $f_{b\_cfar}(q)$, to which of transmission signals transmitted from transmission antennas Tx #1 to Tx #Nt each reflected wave signal corresponds, and q-th Doppler demultiplexer 212 demultiplexes and outputs the determined reflected wave signal for each of transmission antennas Tx #1 to Tx #Nt.

Hereinafter, an operation in a case where there is a plurality of Doppler frequency indices $f_{s\_cfar}(q)$, whose number is Ns, with the same distance index $f_{b\_cfar}(q)$ will be described. For example, $f_{s\_cfar}(q) \in \{fd_{\#1}, fd_{\#2}, \ldots, fd_{\#Ns}\}$.

For example, q-th Doppler demultiplexer 212 calculates Doppler index intervals with respect to a plurality of Doppler frequency indices $f_{s\_cfar}(q) \in \{fd_{\#1}, fd_{\#2}, \ldots, fd_{\#Ns}\}$ with the same distance index $f_{b\_cfar}(q)$. Then q-th Doppler demultiplexer 212 searches for a set of Doppler frequency indices with two Doppler index intervals in a case where three Doppler frequency indices are viewed in ascending order, where the two Doppler index intervals match an index interval corresponding to the interval of a Doppler shift amount in a case where no aliased signal included. Alternatively, q-th Doppler demultiplexer 212 searches for a set of Doppler frequency indices with two Doppler index intervals in a case where three Doppler frequency indices are viewed in ascending order, where the two Doppler index intervals match an index interval corresponding to the interval of a Doppler shift amount in a case where an aliased signal is included.

Based on the result of the search described above, q-th Doppler demultiplexer 212 performs the following processing.

(1) In a case where there are sets of Doppler frequency indices that match an index interval corresponding to the interval of a Doppler shill amount with no aliased signal included, q-th Doppler demultiplexer 212 outputs those sets of the Doppler frequency indices (for example, represented as $fd_{\#1}$, $fd_{\#2}$, and $fd_{\#3}$) as demultiplexing index information ($f_{demul\_Tx\ \#1}(q)$, $f_{demul\_Tx\ \#2}(q)$, and $f_{demul\_Tx\ \#3}(q)$) on Doppler-multiplexed signals.

Here, in a case where the Doppler relationship of shift amounts with respect to transmission antennas Tx #1 to Tx #3 have a $DOP_3 < DOP_1 < DOP_2$, q-th Doppler demultiplexer 212 determines the largest of $fd_{\#p1}$, $fd_{\#p2}$, and $fd_{\#p3}$ as Doppler frequency index $f_{demul\_Tx\ \#2}(q)$ corresponding to Tx #2, determines the second largest thereof as Doppler frequency index $f_{demul\_Tx\ \#1}(q)$ corresponding to Tx #1, and determines the lowest thereof as Doppler frequency index $f_{demul\_Tx\ \#3}(q)$ corresponding to Tx #3 ($0 \le f_{d\_TargetDoppler} < 1/(4T_{rs})$ in FIG. 7). Further, in a case where the Doppler shift amounts with respect to transmission antennas Tx #1 to Tx #3 have a relationship of $DOP_1 > DOP_2 > DOP_3$, q-th Doppler demultiplexer 212 determines the largest of $fd_{\#p1}$, $fd_{\#p2}$, and $fd_{\#p3}$ as Doppler frequency index $f_{demul\_Tx\ \#1}(q)$ corresponding to Tx #1, determines the second largest thereof as Doppler frequency index $f_{demul\_Tx\ \#2}(q)$ corresponding to Tx #2, and determines the lowest thereof as Doppler frequency index $f_{demul\_Tx\ \#3}(q)$ corresponding to Tx #3.

(2) In a case where there are sets of Doppler frequency indices that match an index interval corresponding to the interval of a Doppler shift amount with an aliased signal included, q-th Doppler demultiplexer 212 outputs those sets of the Doppler frequency indices (for example, represented as $fd_{\#q1}$, $fd_{\#q2}$, and $fd_{\#q3}$) as demultiplexing index information ($f_{demul\_Tx\ \#1}(q)$, $f_{demul\_Tx\ \#2}(q)$, and $f_{demul\_\#Tx\ 3}(q)$) on Doppler-multiplexed signals.

For example, in a case where the Doppler shift amounts with respect to transmission antennas Tx #1 to Tx #3 have a relationship of $DOP_3 < DOP_1 < DOP_2$ and there is a set of Doppler frequency indices in which the Doppler frequency corresponding to $DOP_3$ is an aliased signal, q-th Doppler demultiplexer 212 determines the largest of $fd_{\#q1}$, $fd_{\#q2}$, and $fd_{\#q3}$ as Doppler frequency index $f_{demul\_Tx\ \#3}(q)$ corresponding to Tx #3, determines the second largest thereof as Doppler frequency index $f_{demul\_Tx\ \#2}(q)$ corresponding to Tx #2, and determines the lowest thereof as Doppler frequency index $f_{demul\_Tx\ \#1}(q)$ corresponding to Tx #1 ($-1/(2T_{rs})$ $\leq f_{d\_TargetDoppler} < 0$ in FIG. 7). Further, in a case where the Doppler shift amounts with respect to transmission antennas Tx #1 to Tx #3 have a relationship of $DOP_1 > DOP_2 > DOP_3$ and there is a set of Doppler frequency indices in which the Doppler frequency corresponding to $DOP_3$ is an aliased signal, q-th Doppler demultiplexer 212 determines the largest of $fd_{\#q1}$, $fd_{\#q2}$, and $fd_{\#q3}$ as Doppler frequency index $f_{demul\_Tx\ \#3}(q)$ corresponding to Tx #3, determines the second largest thereof as Doppler frequency index $f_{demul\_Tx\ \#1}(q)$ corresponding to Tx #1, and determines the lowest thereof as Doppler frequency index $f_{demul\_Tx\ \#2}(q)$ corresponding to Tx #2.

(3) In a case where there are sets of Doppler frequency indices that match an index interval corresponding to the interval of a Doppler shift amount with an aliased signal included, q-th Doppler demultiplexer 212 outputs those sets of the Doppler frequency indices (for example, represented as $fd_{\#u1}$, $fd_{\#u2}$, and $fd_{\#u3}$) as demultiplexing index information ($f_{demul\_Tx\ \#1}(q)$, $f_{demul\_Tx\ \#2}(q)$, and $f_{demul\_Tx\ \#3}(q)$) on Doppler-multiplexed signals.

Here, in a case where the Doppler shift amounts with respect to transmission antennas Tx #1 to Tx #3 have a relationship of $DOP_3 < DOP_1 < DOP_2$ and there is a set of Doppler frequency indices in which the Doppler frequency corresponding to $DOP_2$ is an aliased signal, q-th Doppler demultiplexer 212 determines the largest of $fd_{\#u1}$, $fd_{\#u2}$, and $fd_{\#u3}$ as Doppler frequency index $f_{demul\_Tx\ \#1}(q)$ corresponding to Tx #1, determines the second largest thereof as Doppler frequency index $f_{demul\_Tx\ \#3}(q)$ corresponding to Tx #3, and determines the lowest thereof as Doppler frequency index $f_{demul\_Tx\ \#2}(q)$ corresponding to Tx #2 ($1/(4T_{rs}) \leq f_{d\_TargetDoppler} < 1/(2T_{rs})$ in FIG. 7).

Further, in a case where the Doppler shift amounts with respect to transmission antennas Tx #1 to Tx #3 have a relationship of $DOP_1 > DOP_2 > DOP_3$ and there is a set of Doppler frequency indices in which the Doppler frequency corresponding to $DOP_1$ is an aliased signal, q-th Doppler demultiplexer 212 determines the largest of $fd_{\#u1}$, $fd_{\#u2}$, and $fd_{\#u3}$ as Doppler frequency index $f_{demul\_Tx\ \#2}(q)$ corresponding to Tx #2, determines the second largest thereof as Doppler frequency index $f_{demul\_Tx\ \#3}(q)$ corresponding to Tx #3, and determines the lowest thereof as Doppler frequency index $f_{demul\_Tx\ \#1}(q)$ corresponding to Tx #1.

(4) A Doppler peak corresponding to a Doppler frequency index that falls under none of (1), (2), and (3) described above is determined by q-th Doppler demultiplexer 212 as a noise component. In this case, q-th Doppler demultiplexer 212 may omit the output of demultiplexing index information ($f_{demul\_Tx\ \#1}(q)$, $f_{demul\_Tx\ \#2}(q)$, and $f_{demul\_Tx\ \#3}(q)$) on Doppler-multiplexed signals.

Doppler demultiplexer 212 can demultiplex Doppler-multiplexed signals in the above-described manner.

Further, although a case where phase rotation $\varphi_n(m)$ indicated by equation 5 is used has been described as an example of phase rotation corresponding to Doppler shift amount $DOP_n$ given to a transmission signal, the phase rotation is not limited to phase rotation $\varphi_n(m)$ indicated by equation 5.

As another example, n-th Doppler shifter 105 may give, to the m-th chirp signal (transmission signal) which has been inputted, phase rotation q (m) in following equation 7 in which Doppler shift amount $DOP_n$ is different from that in the case of using equation 5.

(Equation 7)
$$\phi_n(m) = \{A\frac{2\pi}{N_c} \text{ round}\left(\frac{N_c}{Nt}\right)(n-1) + \Delta\phi_0\}(m-1) + dp_n + \phi_0 \quad [7]$$

Note that, the term round($N_c/(Nt+\delta)$) is introduced in order to cause the phase rotation amount to be an integer multiple of the Doppler frequency interval in Doppler analyzer 210, but the present disclosure is not limited thereto, and $2\pi/Nt$ may also be used instead of the term $(2\pi/N_c) \times$ round($N_c/Nt$) in equation 7.

Here, $dp_n$ is a component that involves a phase rotation with unequal intervals in a Doppler frequency range. For example, $dp_1$, $dp_2$, ..., $dp_{Nt}$ are values in a range where $-\text{round}(N_c/Nt)/2 < dp_n < \text{round}(N_c/Nt)/2$ in which not every value is the same and a component with at least one different value is included. Note that, the term round($N_c/Nt$) is introduced in order to cause the phase rotation amount to be an integer multiple of the Doppler frequency interval in Doppler analyzer 210.

As an example, in a case where phase rotation $\varphi_n(m)$ with Nt=2, $\Delta\varphi_0=0$, $\varphi_0=0$, A=1, $dp_1=0$, $dp_2=\pi/5$ in equation 7 is given, the Doppler shift amounts are $DOP_1=0$ and $DOP_2=1/(2T_{rs})+1/(10T_{rs})=6/(10T_{rs})=-4/(10T_{rs})$.

Figure 8:
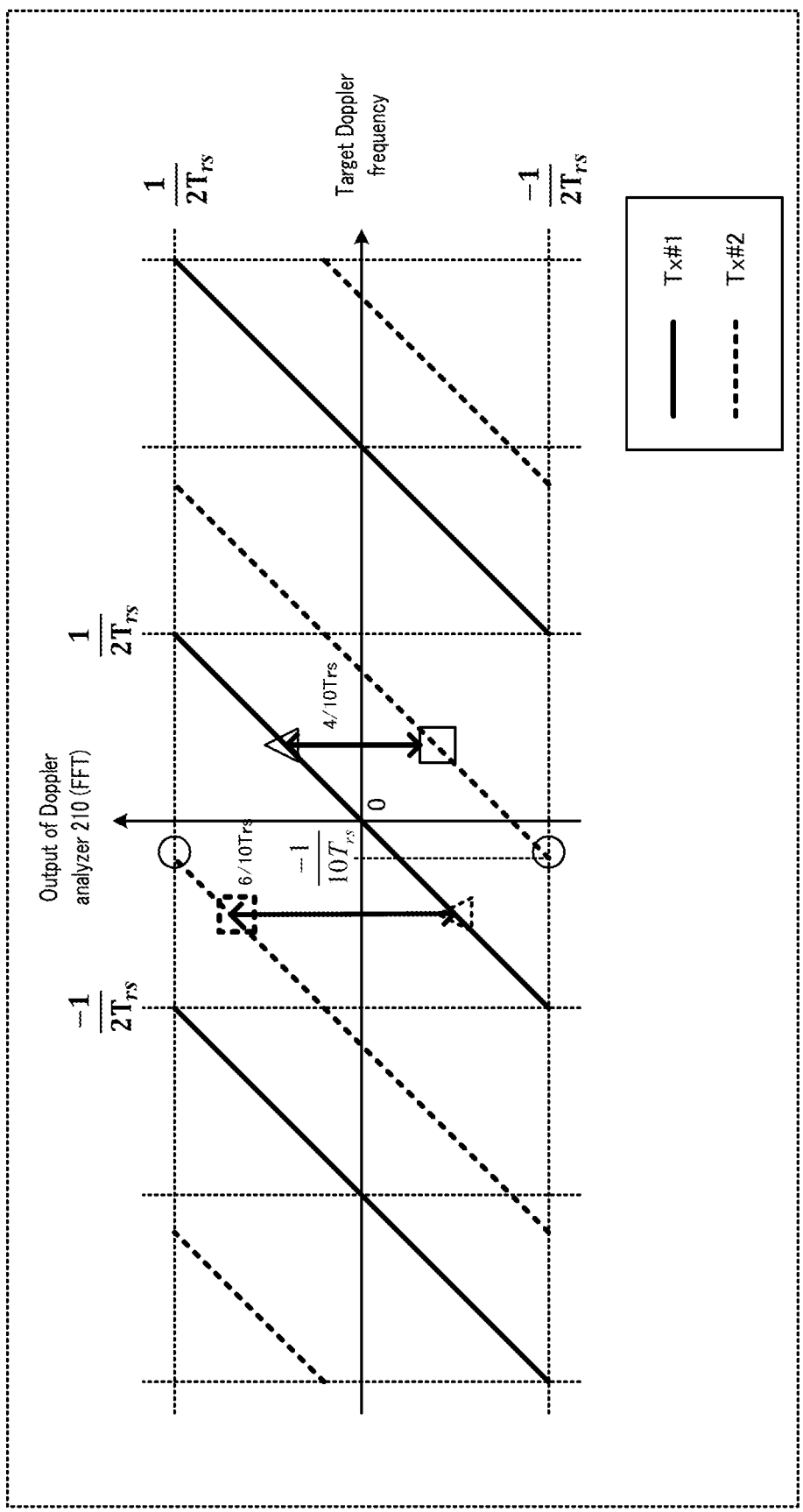
FIG. 8 illustrates examples of Doppler peaks.

FIG. 8 illustrates changes in Doppler peaks with Nt=2, $DOP_1=0$, and $DOP_2=-4/(10T_{rs})$ in a case where the horizontal axis indicates the target Doppler frequency and the vertical axis indicates the output of Doppler analyzer 210 (FFT). In this case, $DOP_1 > DOP_2$.

<Case where $-1/(10T_{rs}) \leq$ Target Doppler Frequency $F_{d\_TargetDoppler} < 1/(2T_{rs})$>

As illustrated in FIG. 8, the Doppler interval between the Doppler peak (solid line) generated when a reflected wave signal with respect to a transmission signal from transmission antenna Tx #1 is received and the Doppler peak (dotted line) generated when a reflected wave signal with respect to a transmission signal from transmission antenna Tx #2 is received is $4/(10T_{rs})$.

Further, in this case, no aliased signal is included with respect to both transmission antennas Tx #1 and Tx #2. For this reason, q-th Doppler demultiplexer 212 can determine that, between the Doppler peaks with the Doppler peak interval of $4/(10T_{rs})$, the higher Doppler peak (solid-line triangle) is the reflected wave signal corresponding to transmission antenna Tx #1, and the lower Doppler peak (solid-line square) is the reflected wave signal corresponding to transmission antenna Tx #2.

<Case where $-1/(2T_{rs}) \leq$ Target Doppler Frequency $f_{d\_TargetDoppler} < -1/(10T_{rs})$>

As illustrated in FIG. 8, the Doppler interval between the Doppler peak (solid line) generated when a reflected wave signal with respect to a transmission signal from transmission antenna Tx #1 is received and the Doppler peak (dotted line) generated when a reflected wave signal with respect to a transmission signal from transmission antenna Tx #2 is received is $6/(10T_{rs})$.

Further, in this case, an aliased signal is included with respect to Tx #2 (solid-line circle). For this reason, q-th Doppler demultiplexer 212 can determine reflected wave signals with respect to transmission signals from transmission antennas Tx #1 and Tx #2, respectively, based on the Doppler peak with a low frequency (dotted-line triangle), for example.

Accordingly, in the examples illustrated in FIG. 8, the target Doppler frequency range in which no ambiguity occurs is, for example, $-1/(2T_{rs}) \leq f_{d\_TargetDoppler} < 1/(2T_{rs})$.

An operation example of Doppler demultiplexer 212 has been described above. Note that, in the description of the operation example of Doppler demultiplexer 212 described above, a case where radar apparatus 10 performs Doppler multiplexing with unequal intervals on the first and second chirp signals at the same (unequally divided) Doppler multiplexing intervals has been described, but the present disclosure is not limited thereto, and radar apparatus 10 may also perform Doppler multiplexing with unequal intervals on the first and second chirp signals by using different parameters such as different (unequally divided) Doppler multiplexing intervals.

For example, in a case where Nt=2, Doppler multiplexing with unequal intervals may be performed on the first chirp signal, with the Doppler shift amounts with respect to each transmission antenna 106 as $DOP_1=0$ and $DOP_2=1/(3T_r)$ in Doppler shifter 105, and on the second chirp signal, with the Doppler shift amounts with respect to each transmission antenna 106 as $DOP_1=0$ and $DOP_2=1/(4T_{rs})$ in Doppler shifter 105, by using parameters in which Doppler multiplexing intervals are different between the first and second chirp signals.

Alternatively, for example, in a case where Nt=2, Doppler multiplexing with unequal intervals may be performed on the first chirp signal, with the Doppler shift amounts with respect to each transmission antenna 106 as $DOP_1=0$ and $DOP_2=1/(3T_r)$ in Doppler shifter 105, and on the second chirp signal, with the Doppler shift amounts with respect to each transmission antenna 106 as $DOP_1=L/(4T_r)$ and $DOP_2=-1/(2T_r)$ in Doppler shifter 105, by using parameters in which Doppler multiplexing intervals are different between the first and second chirp signals.

Even in such cases, the first chirp signal is processed by first Doppler analyzer 210 and first Doppler demultiplexer 212 and the second chirp signal is processed by second Doppler analyzer 210 and second Doppler demultiplexer 212 independently of each other in radar receiver 200 so that the above-described operation can be applied. As described above, since individual reception processing is performed on each chirp signal in radar apparatus 10, causing parameters for performing Doppler multiplexing with unequal intervals to be common between chirp signals may be omitted.

In FIG. 2, Doppler determiner 213 determines Doppler frequencies corresponding to Doppler peaks based on the respective outputs of first Doppler demultiplexer 212 and second Doppler demultiplexer 212. For example, even in a case where a target object with target object Doppler frequency $f_{d\_TargetDoppler}$ exceeding Doppler frequency range $-1/(2T_{rs}) \leq f_{d\_TargetDoppler} \leq 1/(2T_{rs})$ is included, Doppler determiner 213 can further extend a Doppler detection range by determining the Doppler frequency of the target object.

For example, Doppler determiner 213 determines the Doppler frequency of a target object including a Doppler frequency exceeding Doppler frequency range $-1/(2T_{rs}) \leq f_{d\_TargetDoppler} \leq 1/(2T_{rs})$ by using demultiplexing index information ($f_{demul\_Tx\ \#1}(1)$, $f_{demul\_Tx\ \#2}(1)$, . . . , $f_{demul\_Tx\ \#Nt}(1)$) on Doppler-multiplexed signals outputted from first Doppler demultiplexer 212 and demultiplexing index information ($f_{demul\_Tx\ \#1}(2)$, $f_{demul\_Tx\ \#2}(2)$, . . . , $f_{demul\_Tx\ \#2}(2)$) on Doppler-multiplexed signals outputted from second Doppler demultiplexer 212, where distance index $f_{b\_cfar}(1)$ and distance index $f_{b\_cfar}(2)$ are common.

The Doppler frequency determination by Doppler determiner 213 utilizes the fact that central frequencies differ from each other between the first and second chirp signals that are radar transmission signals generated by signal generation controller 104 and radar transmission signal generator 101.

Hereinafter, the operation principle of the Doppler frequency determination processing and an operation example of Doppler determiner 213 will be described.

Note that, hereinafter, an example in which Doppler determiner 213 performs processing using demultiplexing index information on Doppler-multiplexed signals outputted from first Doppler demultiplexer 212 and second Doppler demultiplexer 212, where distance index $f_{b\_cfar}(1)$ and distance index $f_{b\_cfar}(2)$ are common. For this reason, hereinafter, the distance index will be described by being abbreviated to "$f_{b\_cfar}$" ($=f_{b\_cfar}(1)=f_{b\_cfr}(2)$).

For example, when the central frequency of the first chirp signal and the central frequency of the second chirp signal differ, the Doppler frequency of a reflected wave also changes. For example, in a case where radar apparatus 10 is in a stationary state and a target object moves in the direction of radar apparatus 10 at velocity v, Doppler frequency $f_d(1)$ observed by using the first chirp signal becomes $f_d(1)=2v \times f_c(1)/C_0$, and Doppler frequency $f_d(2)$ observed by using the second chirp signal becomes $f_d(2)=2v \times f_c(2)/C_0$. Accordingly, the relationship between the both Doppler frequencies is expressed as $f_d(2)/f_d(1)=f_c(2)/f_c(1)$. For example, $f_d(2)$ can be calculated by multiplying $f_d(1)$ by central frequency ratio $f_c(2)/f_c(1)$ ($fd(2)=(f_c(2)/f_c(1)) \times fd(1)$). Here, $C_0$ represents the velocity of light.

Further, for example, in a case where target object Doppler frequency $f_{d\_TargetDoppler}$ is assumed to exceed Doppler frequency range $-1/(2T_{rs}) \leq f_{d\_TargetDoppler} \leq 1/(2T_{rs})$ and an estimated Doppler frequency value to be detected by first Doppler analyzer 210 and first Doppler demultiplexer 212 is $f_{d\_VFT}(1)$, target object Doppler frequency $f_{d\_TargetDoppler}$ is expressed by following equation 8 in view of Doppler aliasing.

$$f_{d\_TargetDoppler} = f_{d\_VFT}(1) + n_{a1}/T_{rs} \qquad \text{(Equation 8)}$$

Here, $n_{a1}$ represents the number of Doppler aliasing and takes an integer value.

Since it is difficult to determine number $n_{a1}$ of Doppler aliasing from the outputs of first Doppler analyzer 210 and first Doppler demultiplexer 212, a condition that allows number nut of Doppler aliasing to be determined by using the outputs of second Doppler analyzer 210 and second Doppler demultiplexer 212 is derived below. Here, the Doppler frequency observed by using the second chirp signal is obtained by multiplying equation 8 by central frequency ratio $f_c(2)/f_c(1)$ as in following equation 9.

$$f_c(2)/f_c(1) \times f_{d\_TargetDoppler} = f_c(2)/f_c(1) \times (f_{d\_VFT(1)} + n_{a1}/T_{rs})$$ (Equation 9)

For example, the Doppler frequency observed by using the second chirp signal is $f_c(2)/f_c(1) \times f_{d\_VFT}(1)$ in a case where number $n_{a1}$ of Doppler aliasing=0, is $f_c(2)/f_c(1) \times (f_{d\_VFT}(1)+1/T_{rs})$ in a case where number $n_{a1}$ of Doppler aliasing=1, and is $f_c(2)/f_c(1) \times (f_{d\_VFT}(1)-1/T_{rs})$ in a case where number $n_{a1}$ of Doppler aliasing=−1. The same applies to other numbers of Doppler aliasing.

As described above, the difference between Doppler frequencies due to the difference in number n of Doppler aliasing has a relationship of an integer multiple of $f_c(2)/f_c(1)/T_{rs}$.

Here, in a case where the difference between $f_c(2)/f_c(1)/T_{rs}$ and $1/T_{rs}$ which is the aliasing frequency interval of second Doppler analyzer 210 is larger than Doppler frequency resolution $\Delta f_d$ in second Doppler analyzer 210, Doppler determiner 213 is capable of detecting (for example, capable of determining) the difference between Doppler frequencies due to the difference in number $n_{a1}$ of Doppler aliasing.

Accordingly, for example, radar apparatus 10 (for example, signal generation controller 104) may determine central frequency $f_c(1)$ of the first chirp signal and central frequency $f_c(2)$ of the second chirp signal such that the condition (or referred to as determinable condition) indicated by following equation 10 is satisfied.

(Equation 10)

$$\left| \frac{f_c(2)}{f_c(1)T_{rs}} - \frac{1}{T_{rs}} \right| > \Delta f_d = \frac{1}{N_c T_{rs}} \qquad [8]$$

Here, for example, in a case where $f_c(2) > f_c(1)$, the determinable condition with respect to $f_c(1)$ and $f_c(2)$ indicated by equation 10 is expressed by following equation 11.

(Equation 11)

$$\frac{f_c(2)}{f_c(1)} > 1 + \frac{1}{N_c} \qquad [9]$$

Further, for example, in a case where $f_c(2) < f_c(1)$, the determinable condition with respect to $f_c(1)$ and $f_c(2)$ indicated by equation 10 is expressed by following equation 12.

(Equation 12)

$$\frac{f_c(2)}{f_c(1)} < 1 - \frac{1}{N_c} \qquad [10]$$

Further, for example, the determinable condition indicated by following equation 13 may also be used.

(Equation 13)

$$\left| \frac{f_c(2)}{f_c(1)T_{rs}} - \frac{1}{T_{rs}} \right| > \alpha \times \Delta f_d = \frac{\alpha}{N_c T_{rs}} \qquad [11]$$

Here, $\alpha \geq 1$.

Equation 13 defines a condition for central frequencies $f_c(1)$ and $f_c(2)$ satisfying a condition that the difference between $f_c(2)/f_c(1)/T_{rs}$ and $1/T_{rs}$, which is the aliasing frequency interval of second Doppler analyzer 210, is larger than integer multiple a of Doppler frequency resolution $\Delta f_d$ in second Doppler analyzer 210. According to the determinable condition indicated by equation 13, Doppler determiner 213 can more easily determine the difference between Doppler frequencies due to the difference in number $n_{a1}$ of Doppler aliasing in comparison with the determinable condition indicated by equation 10. For example, in comparison with the determinable condition indicated by equation 10, the determinable condition indicated by equation 13 makes it possible to improve the determination accuracy even in a case where there is a noise influence, such as a case where the reception signal level is low.

Here, for example, in a case where $f_c(2) > f_c(1)$, the determinable condition with respect to $f_c(1)$ and $f_c(2)$ indicated by equation 13 is expressed by following equation 14.

(Equation 14)

$$\frac{f_c(2)}{f_c(1)} > 1 + \frac{\alpha}{N_c} \qquad [12]$$

Further, for example, in a case where $f_c(2) < f_c(1)$, the determinable condition with respect to $f_c(1)$ and $f_c(2)$ indicated by equation 13 is expressed by following equation 15.

(Equation 15)

$$\frac{f_c(2)}{f_c(1)} < 1 - \frac{\alpha}{N_c} \qquad [13]$$

As an example, when $f_c(2) > f_c(1)$ in a case where $f_c(1)=78$ GHz, $f_c(2)$ is configured to be larger than 78.61 GHz with $\alpha=1$ and Nc=128 and $f_c(2)$ is configured to be larger than 79.22 GHz with $\alpha=2$ and Nc=128 based on equation 14.

As described above, Doppler determiner 213 can determine the Doppler frequencies of target objects by configuring central frequencies $f_c(1)$ and $f_c^{(2)}$ satisfying one of the determinable conditions of equations 10 to 15 even in a case where a target object with a Doppler frequency exceeding Doppler frequency range $-1/(2T_{rs}) \leq f_{d\_TargetDoppler} \leq 1/(2T_{rs})$ is included (for example, in a case where Doppler aliasing occurs).

For example, Doppler determiner 213 may use demultiplexing index information ($f_{demul\_Tx\ \#1}(1)$, $f_{demul\_Tx\ \#2}(1)$, ..., $f_{demul\_Tx\ \#Nt}(1)$) on Doppler-multiplexed signals in distance index $f_{b\_cfar}(1)$ outputted from first Doppler demultiplexer 212 and demultiplexing index information ($f_{demul\_Tx\ \#1}(2)$, $f_{demul\_Tx\ \#2}(2)$, ..., $f_{demul\_Tx\ \#Nt}(2)$) on Doppler-multiplexed signals in distance index $f_{b\_cfar}(2)$ outputted from second Doppler demultiplexer 212 to perform Doppler determination processing as described below.

For example, in a case where there are one piece of demultiplexing index information ($f_{demul\_Tx\ \#1}(1)$, $f_{demul\_Tx\ \#2}(l)$, ..., $f_{demul\_Tx\ \#Nt}(1)$) on Doppler-multiplexed signals in distance index $f_{b\_cfar}(1)$ outputted from first Doppler demultiplexer 212 and one piece of demultiplexing index information ($f_{demul\_Tx\ \#1}(2)$, $f_{demul\_Tx\ \#2}(2)$, ... $f_{demul\_Tx\ \#Nt}(2)$) on Doppler-multiplexed signals in distance index $f_{b\_cfar}(2)$ outputted from second Doppler demultiplexer 212, Doppler determiner 213 may perform a Doppler determination operation described below.

Further, for example, in a case where there are a plurality of pieces of demultiplexing index information ($f_{demul\_Tx\ \#1}(1)$, $f_{demul\_Tx\ \#2}(1)$, ..., $f_{demul\_Tx\ \#Nt}(1)$) on Doppler-multiplexed signals in distance index $f_{b\_cfar}(1)$ outputted from first Doppler demultiplexer 212 and a plurality of pieces of demultiplexing index information ($f_{demul\_Tx\ \#1}(2)$, $f_{demul\_Tx\ \#2}(2)$, . . . , $f_{demul\_Tx\ \#Nt}(2)$) on Doppler-multiplexed signals in distance index $f_{b\_cfar}(2)$ outputted from second Doppler demultiplexer 212, Doppler determiner 213 may compare the reception powers indicated by those indices and associate pieces of demultiplexing index information with the same degree of reception power level as each pair.

Thereafter. Doppler determiner 213 may use demultiplexing index information on Doppler-multiplexed signals outputted from first Doppler demultiplexer 212 and demultiplexing index information on Doppler-multiplexed signals outputted from second Doppler demultiplexer 212, which are associated as each pair, to perform a Doppler determination operation described below. For example, Doppler determiner 213 may sequentially perform the Doppler determination operation described below for each pair of demultiplexing index information on Doppler-multiplexed signals outputted from first Doppler demultiplexer 212 and demultiplexing index information on Doppler-multiplexed signals outputted from second Doppler demultiplexer 212, which are associated, and repeat the Doppler determination operation until the operation described below is completed for every pair.

Hereinafter, an example of a Doppler determination operation in Doppler determiner 213 will be described.

First, Doppler determiner 213 calculates, based on demultiplexing index information ($f_{demul\_Tx\ \#1}(1)$, $f_{demul\_Tx\ \#2}(1)$, . . . , $f_{demul\_Tx\ \#Nt}(1)$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(2T_{rs}) \leq f_{d\_TargetDoppler} \leq 1/(2T_{rs})$.

Here, demultiplexing index information ($f_{demul\_Tx\ \#1}(1)$, $f_{demul\_Tx\ \#2}(1)$, . . . , $f_{demul\_Tx\ \#Nt}(1)$) on Doppler-multiplexed signals in distance index $f_{b\_cfar}(1)$ outputted from first Doppler demultiplexer 212 includes a component with a predetermined Doppler shift amount given for each transmission antenna 106 in radar transmitter 100. For example, Doppler determiner 213 may calculate estimated Doppler frequency value $f_{d\_VFT}(1)$ from which a component with a Doppler shift amount is eliminated.

In the same manner, Doppler determiner 213 calculates, based on demultiplexing index information ($f_{demul\_Tx\ \#1}(2)$, $f_{demul\_Tx\ \#2}(2)$, . . . , $f_{demul\_Tx\ \#Nt}(2)$) on Doppler-multiplexed signals in distance index $f_{b\_cfar}(2)$ outputted from second Doppler demultiplexer 212, estimated Doppler frequency value $f_{d\_VFT}(2)$ in a case where the Doppler frequency of a target object is assumed to be within Doppler frequency range $-1/(2T_{rs}) \leq f_{d\_TgargetDoppler} \leq 1/(2T_{rs})$.

Here, demultiplexing index information ($f_{demul\_Tx\ \#1}(2)$, $f_{demul\_Tx\ \#2}(2)$, . . . , $f_{demul\_Tx\ \#Nt}(2)$) on Doppler-multiplexed signals in distance index $f_{b\_cfar}(2)$ outputted from second Doppler demultiplexer 212 includes a component with a predetermined Doppler shift amount given for each transmission antenna 106 in radar transmitter 100. For example, Doppler determiner 213 may calculate estimated Doppler frequency value $f_{d\_VFT}(2)$ from which a component with a Doppler shift amount is eliminated.

Next, Doppler determiner 213 calculates number $n_{s1}$ of Doppler aliasing in which following equation 16 becomes minimum.

(Equation 16)

$$\min_{n_{al}}\{f_{d\_VFT(2)} - f_{est}(f_{d\_VFT(1)}, n_{al})]\} \quad [14]$$

Here, number $n_{a1}$ of Doppler aliasing is an integer value and is calculated within a range of integer values covering an assumed Doppler frequency range of a target.

Further, as in following equation 17, for example, $F_{est}(f_{d\_VFT}(1), n_{a1})$ represents a function that outputs a value obtained by calculating Doppler frequency $(f_{d\_VFT}(1)+n_{a1}/T_{rs})$ in a case where estimated Doppler frequency value $f_{d\_VFT}(1)$ is assumed to be number $n_{a1}$ of Doppler aliasing and by multiplying Doppler frequency $(f_{d\_VFT}(1)+n_{a1}/T_{rs})$ by $f_c(2)/f_c(1)$ so as to convert Doppler frequency $(f_{d\_VFT}(1)+n_{a1}/T_{rs})$ into a Doppler frequency observed by using the second chirp signal of central frequency $f_c(2)$.

(Equation 17)

$$f_{est}(f_{d\_VFT(1)}, n_{al}) = F\mathrm{mod}\left[\frac{f_c(2)}{f_c(1)}\left(f_{d\_VFT(1)} + \frac{n_{al}}{T_{rs}}\right)\right] \quad [15]$$

For example, $f_{est}(f_{d\_VFT}(1), n_{a1})$ represents the estimated Doppler frequency value corresponding to the second chirp signal estimated based on estimated Doppler frequency value $f_{d\_VFT}(1)$.

Note that, in equation 17. F mod[x] is a function for calculating the Doppler frequency in view of aliasing of Doppler analyzer 210 of $\pm\frac{1}{2}T_{rs}$. In a case where $x \geq 1/(2T_{rs})$, F mod[x] calculates n mod=floor $(((|x|-1/(2T_{rs}))/T_{rs})+1$, and outputs x−n mod $T_{rs}$. Further, in a case where $x \leq -1/(2T_{rs})$, F mod[x] calculates n mod=ceil $(|x|-1/(2T_{rs}))/T_{rs})$, and outputs x+n mod/$T_{rs}$. Here, floor(x) is a floor-function and is a function that outputs the maximum integer value that does not exceed x. Further, ceil(x) is a ceiling function and is a function that outputs the minimum integer value exceeding x.

Hereinafter, number $n_{a1}$ of Doppler aliasing in a case where agreement (or the degree of agreement or closeness) between Doppler frequency $f_{est}(f_{d\_VFT}(1), n_{a1})$, where number $n_{a1}$ of Doppler aliasing is variable, and estimated Doppler frequency value $f_{d\_VFT}(2)$ is the highest (for example, $n_{a1}$ when equation 16 becomes minimum) is referred to as "estimated value $n_{a1est}$ of a number of Doppler aliasing".

Figure 9:
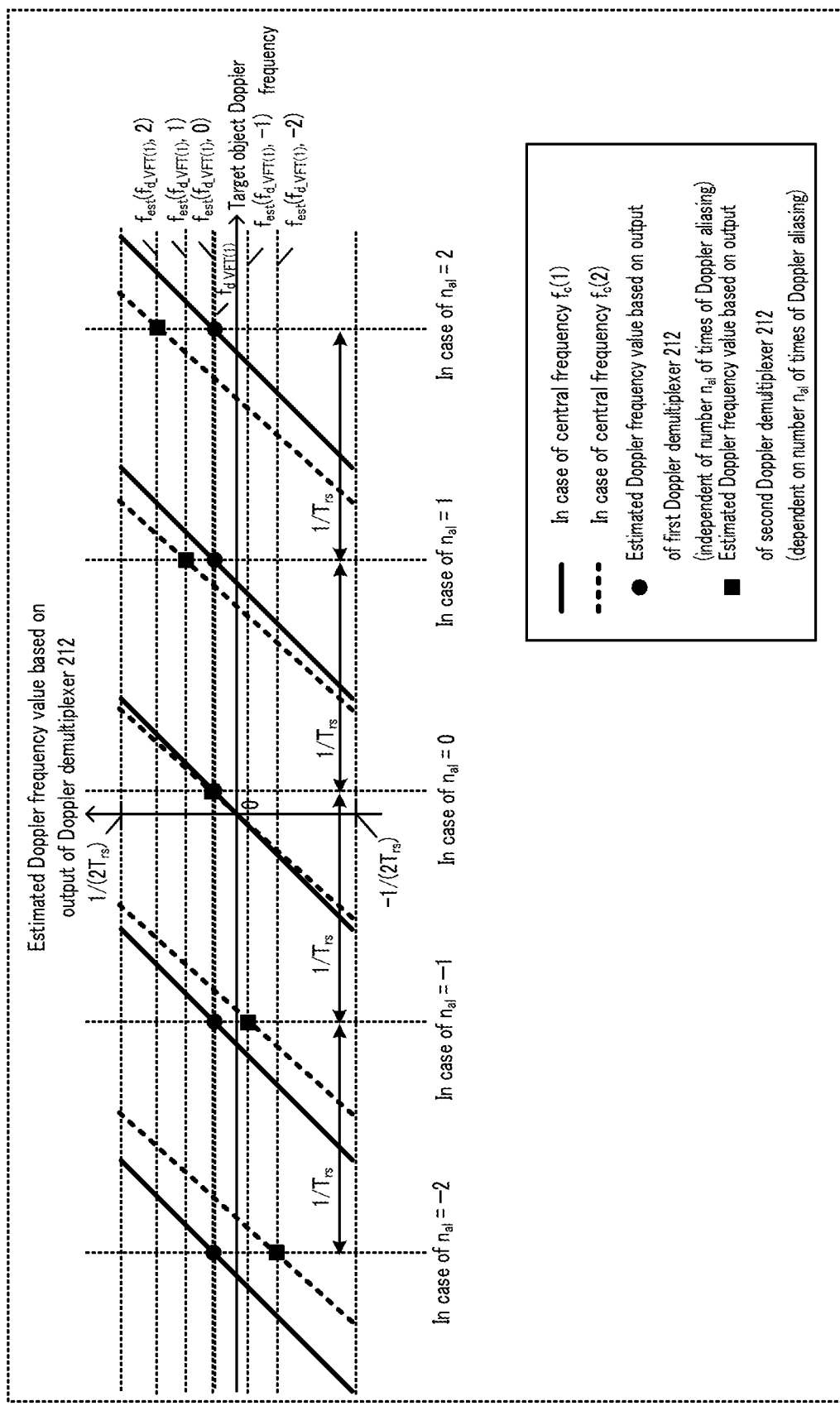
FIG. 9 illustrates examples of Doppler determination processing.

Next, examples of the aforementioned Doppler determination operation will be described with reference to FIG. 9. In FIG. 9, the horizontal axis represents the Doppler frequency of a target object and the vertical axis represents the estimated Doppler frequency value based on the outputs of first Doppler demultiplexer 212 and second Doppler demultiplexer 212.

Further, in FIG. 9, the solid line represents the estimated Doppler frequency value (for example, $f_{d\_VFT}(1)$) in a case where the first chirp signal of central frequency $f_c(1)$ is used, and the dotted line represents estimated Doppler frequency value ($f_{d\_VFT}(2)$) in a case where the second chirp signal of central frequency $f_c(2)$ is used. FIG. 9, however, illustrates examples in a case where $f_c(2) > f_c(1)$.

Further, in FIG. 9, the circle mark represents the estimated Doppler frequency value based on the output of first Doppler demultiplexer 212 with respect to Doppler frequency $f_{d\_VFT}(1)+n_{a1}/T_{rs}$. As illustrated in FIG. 9, the estimated Doppler frequency value (the value of the vertical axis) indicated by the circle mark is a value (for example, $f_{d\_VFT}(1)$) independent of number $n_{a1}$ of Doppler aliasing.

Further, in FIG. 9, the square mark represents the estimated Doppler frequency value based on the output of second Doppler demultiplexer 212 with respect to Doppler frequency $f_{d\_VFT}(1)+n_{a1}/T_{rs}$. As illustrated in FIG. 9, the estimated Doppler frequency value (the value of the vertical axis) indicated by the square mark is a value dependent on number $n_{a1}$ of Doppler aliasing (for example, $f_{est}(f_{d\_VFT}(1), n_{a1})$). Further, for example, the interval between the square marks in the vertical axis direction in FIG. 9 is an interval larger than Doppler frequency resolution $\Delta_{fd}$ in second Doppler analyzer 210 and is detectable as an estimated Doppler frequency value that varies depending on number $n_{a1}$ of Doppler aliasing.

For example, Doppler determiner 213 may calculate the plot of the square mark illustrated in FIG. 9 by using $f_{est}(f_{d\_VFT}(1), n_{a1})$ indicated by equation 17 based on estimated Doppler frequency value $f_{d\_VFT}(1)$. Then, for example, Doppler determiner 213 may configure, as estimated value $n_{a1est}$ of a number of Doppler aliasing, number $n_{a1}$ of Doppler aliasing (for example, $n_{a1}$ in which equation 16 becomes minimum) in which the calculated value (the value of the vertical axis of the plot of the square mark illustrated in FIG. 9) most matches estimated Doppler frequency value $f_{d\_VFT}(2)$ (the dotted line illustrated in FIG. 9) in a case where the second chirp signal of central frequency $f_c(2)$ is used.

As described above, Doppler determiner 213 may estimate, based on a Doppler peak (for example, the circle mark: the first peak position in FIG. 9) observed in a reflected wave signal corresponding to the first chirp signal of central frequency $f_c(1)$ and ratio $f_c(2)/f_c(1)$ of central frequency $f_c(2)$ to central frequency $f_c(1)$, a Doppler peak (for example, the square mark: the second peak position in FIG. 9) observed in a reflected wave signal corresponding to the second chirp signal of central frequency $f_c(2)$, and may determine estimated value $n_{a1est}$ of the number of times of aliasing based on the degree of agreement (closeness) between the estimated Doppler peak and a Doppler peak (for example, the dotted line; the third peak position in FIG. 9) observed in a reflected wave signal corresponding to the second chirp signal. Note that, the degree of agreement represents closeness in view of the value of the Doppler peak that varies by aliasing.

Note that, since the difference in $f_{est}(f_{d\_VFT}(1), n_{a1})$ in accordance with number $n_{a1}$ of aliasing (for example, the difference with $f_{d\_VFT}(1)$) increases as $f_c(2)/f_c(1)$ in $f_c(2)>f_c(1)$ is larger or as $f_c(2)/f_c(1)$ in $f_c(2)<f_c(1)$ is smaller, it will be easy for Doppler determiner 213 to make a distinction between Doppler frequencies by number $n_{a1}$ of times of aliasing (for example, determination of number $n_{a1}$ of times of aliasing).

On the other hand, when the difference in Doppler frequency due to number $n_{a1}$ of times of aliasing becomes large and exceeds $\pm 1/(2T_{rs})$, the ambiguity of Doppler frequency occurs so that the probability of estimation error of estimated value $n_{a1est}$ of a number of Doppler aliasing may increase.

Here, the condition that the difference between Doppler frequency aliasing component $n_{a1} \times f_c(2)/f_c(1)/T_{rs}$ observed by using the second chirp signal of central frequency $f_c(2)$ and $n_{a1}/T_{rs}$ which is the frequency intervals of number $n_{a1}$ of times of aliasing of second Doppler analyzer 210 does not exceed $\pm 1/(2T_{rs})$ in the case of number $n_{a1}$ of Doppler aliasing is expressed by following equation 18.

(Equation 18)

$$\frac{1}{2T_{rs}} > \left| \frac{f_c(2)}{f_c(1)} \frac{n_{a1}}{T_{rs}} - \frac{n_{a1}}{T_{rs}} \right| = \Delta_{n_{a1}} \qquad [16]$$

For example, in a case where $n_{a1}$ is positive, $\Delta n_{a1}$ is in the range of $\pm 1/(2T_{rs})$ until maximum $n_{a1}$ satisfying following equation 19, and Doppler determiner 213 can estimate aliasing without ambiguity. Note that, maximum $n_{a1}$ satisfying following equation 19 is referred to as "$n_{a1\ max}$". Further, for example, in a case where $n_{a1}$ is negative, following equation 19 is satisfied in the same manner when $n_{a1}=-n_{a1\ max}$.

(Equation 19)

In a case where $f_c(2) > f_c(1)$: $1 + \dfrac{1}{2n_{a1}} > \dfrac{f_c(2)}{f_c(1)}$ [17]

In a case where $f_c(2) < f_c(1)$: $1 + \dfrac{1}{2n_{a1}} > \dfrac{f_c(1)}{f_c(2)}$ Given the above, the Doppler frequency detection range is extended $n_{a1\ max}$ times with respect to the Doppler frequency range at the time of one transmission antenna, for example.

For example, when $n_{a1\ max}$=two, $f_c(2)$ may be configured to a frequency lower than 1.25 times $f_c(1)$ in a case where $f_c(2)>f_c(1)$, and $f_c(1)$ may be configured to a frequency lower than 1.25 times $f_c(2)$ in a case where $f_c(2)<f_c(1)$. Further, for example, when $n_{a1\ max}$=three, $f_c(2)$ may be configured to a frequency lower than (7/6) times $f_c(1)$ in a case where $f_c(2)>f_c(1)$, and $f_c(1)$ may be configured to a frequency lower than (7/6) times $f_c(2)$ in a case where $f_c(2)<f_c(1)$. Note that, the value of $n_{a1\ max}$ is not limited to two or three, but may be any other value.

For example, when $f_c(1)$ and $f_c(2)$ satisfy the condition in a case where $n_{a1\ max}$=two, the detection range of Doppler frequency $f_d$ becomes $\pm 2(T_{rs})$, which is extended twice with respect to the Doppler frequency range at the time of one transmission antenna.

Note that, $f_c(1)$ and $f_c(2)$ may be configured within the pass frequency range of radar transmitter 100 or radar receiver 200. The extension of the Doppler frequency detection range may be subjected to constraints of the pass-frequency characteristics of radar transmitter 100 or radar receiver 200.

For example, in the configurations of $f_c(1)$ and $f_c(2)$, maximum number $n_{a1\ max}$ of Doppler aliasing may be determined and the determinable condition and $f_c(1)$ and $f_c(2)$ satisfying equation 17 may be determined based on an assumed maximum target object Doppler frequency. Further, $f_c(1)$ and $f_c(2)$ may be determined such that $f_c(1)$ and $f_c(2)$ are within the pass frequency range of radar transmitter 100 or radar receiver 200.

An operation example of Doppler determiner 213 has been described above.

In FIG. 2, direction estimator 214 performs target direction estimation processing based on information inputted from q-th Doppler demultiplexer 212 (for example, distance index $f_{b\_cfar}(q)$ and demultiplexing index information ($f_{demul\_Tx\ \#1}(q), f_{demul\_Tx\ \#2}(q), \ldots, f_{demul\_Tx\ \#Nt}(q)$)) on Doppler-multiplexed signal(q).

For example, direction estimator 214 extracts the output of q-th Doppler analyzer 210 from the output of q-th Doppler demultiplexer 212 based on distance index $f_{b\_cfar}$(q) and demultiplexing index information ($f_{demul\_Tx\ \#1}$(q), $f_{demul\_Tx\ \#2}$(q), ..., $f_{demul\_Tx\ \#Nt}$(q)) on Doppler-multiplexed signal(q), and generates q-th virtual reception array correlation vector $h_q(f_{b\_cfar}$(q), $f_{demul\_Tx\ \#1}$(q), $f_{demul\_Tx\ \#2}$(q), ... $f_{demul\_Tx\ \#Nt}$(q)) as indicated by following equation 20 to perform the direction estimation processing. Here, q=1 or 2.

As indicated by equation 20, q-th virtual reception array correlation vector $h_q(f_{b\_cfar}$(q), $f_{demul\_Tx\ \#1}$(q), $f_{demul\_Tx\ \#2}$(q), ..., $f_{demul\_Tx\ \#Nt}$(q)) includes Nt×Na elements, the number of which is the product of number Nt of transmission antennas and number Na of reception antennas. Q-th virtual reception array correlation vector $h_q(f_{b\_cfar}$(q), $f_{demul\_Tx\ \#1}$(q), $f_{demul\_Tx\ \#2}$(q), ..., $f_{demul\_Tx\ \#Nt}$(q)) is used for processing of performing, on a reflected wave signal from a target, direction estimation based on the phase difference between reception antennas 202. Here, integer z=1, ..., Na.

(Equation 20)

$$h_q(f_{b\_cfar}, f_{demul\_Tx\#1}(q), f_{demul\_Tx\#2}(q), \ldots, f_{demul\_Tx\#N_t}(q)) = \begin{bmatrix} h_{cal[1]} VFT_{1,q}(f_{b\_cfar}, f_{demul\_Tx\#1}(q)) \\ h_{cal[2]} VFT_{2,q}(f_{b\_cfar}, f_{demul\_Tx\#1}(q)) \\ \vdots \\ h_{cal[N_a]} VFT_{N_a,q}(f_{b\_cfar}, f_{demul\_Tx\#1}(q)) \\ h_{cal[N_a+1]} VFT_{1,q}(f_{b\_cfar}, f_{demul\_Tx\#2}(q)) \\ h_{cal[N_a+2]} VFT_{2,q}(f_{b\_cfar}, f_{demul\_Tx\#2}(q)) \\ \vdots \\ h_{cal[2N_a]} VFT_{N_a,q}(f_{b\_cfar}, f_{demul\_Tx\#2}(q)) \\ \vdots \\ h_{cal[N_a(N_t-1)+1]} VFT_{1,q}(f_{b\_cfar}, f_{demul\_Tx\#N_t}(q)) \\ h_{cal[N_a(N_t-1)+2]} VFT_{2,q}(f_{b\_cfar}, f_{demul\_Tx\#N_t}(q)) \\ \vdots \\ h_{cal[N_aN_t]} VFT_{N_a,q}(f_{b\_cfar}, f_{demul\_Tx\#N_t}(q)) \end{bmatrix}$$ [18]

Note that, since direction estimator 214 performs direction estimation processing by using the outputs of first and second Doppler demultiplexers 212 with the same distance index, $f_{b\_cfar}$(1)=$f_{b\_cfar}$(2)=$f_{b\_cfar}$.

In equation 20, $h_{cal[b]}$ is an array correction value for correcting phase deviations and amplitude deviations among transmission array antennas and among reception array antennas, and integer b=1 to (Nt×Na).

For example, direction estimator 214 calculates a spatial profile, with azimuth direction $\theta_u$ in direction estimation evaluation function value $P_H(\theta_u, f_{b\_cfar}, f_{demul\_Tx\ \#1}$(1), ..., $f_{demul\_Tx\ \#Nt}$(1), $f_{demul\_Tx\ \#1}$(2), ..., $f_{demul\_Tx\ \#Nt}$(2)) being variable within a predetermined angular range. Direction estimator 214 extracts a predetermined number of local maximum peaks in the calculated spatial profile in descending order, and outputs the azimuth directions of the local maximum peaks as direction-of-arrival estimation values (for example, positioning output).

Note that, there are various methods with respect to direction estimation evaluation function value $P_H(\theta_u, f_{b\_cfar}, f_{demul\_Tx\ \#1}$(1), ..., $f_{demul\_Tx\ \#Nt}$(1), $f_{demul\_Tx\ \#2}$(2), ..., $f_{demul\_Tx\ \#Nt}$(2)) depending on direction-of-arrival estimation algorithms. For example, the estimation method using an array antenna, as disclosed in NPL 3, may be used.

For example, in a case where Nt×Na-virtual reception array antennas are linearly arranged at equal intervals $d_H$, a beamformer method can be given by following equation 21.

(Equation 21)

$$P_H(\theta_u, f_{b\_cfar}, f_{demaul\_Tx\#1}(1) \ldots, f_{demaul\_Tx\#N_t}(1), f_{demaul\_Tx\#1}(2) \ldots,$$
$$f_{demaul\_Tx\#N_t}(2)) = \sum_{q=1}^{2} |a_q^H(\theta_u) h_q(f_{b\_cfar}, f_{demul\_Tx\#1}(q),$$
$$f_{demul\_Tx\#2}(q), \ldots, , f_{demul\_Tx\#N_t}(q))|^2$$ [19]

In addition to the beamformer method, a technique such as Capon and MUSIC is also applicable. Note that, in equation 21, superscript H is the Hermitian transpose operator.

Further, in equation 21, $a_q(\theta_u)$ denotes the direction vector of a virtual reception array with respect to an arrival wave in azimuth direction % and is given by equation 22.

(Equation 22)

$$a_q(\theta_u) = \begin{bmatrix} 1 \\ \exp(-j2\pi d_H \sin\theta_u/\lambda_q) \\ \vdots \\ \exp(-j2\pi(N_tN_a-1)d_H\sin\theta_u/\lambda_q) \end{bmatrix}$$ [20]

In equation 22, $\lambda_q$ is the wavelength of a radar transmission signal (for example, the q-th chirp signal) in the case of central frequency $f_c$(q), and $\lambda_q=C_0/f_c$(q).

Further, azimuth direction $\theta_u$ is a vector that is changed with predetermined azimuth interval $\beta_1$ in an azimuth range in which direction-of-arrival estimation is performed. For example, $\theta_u$ is configured as follows.

$\theta_u=\theta$ min+u$\beta_1$, integer u=0, ..., NU, and
NU=floor[($\theta$ max−$\theta$ min)/$\beta_1$]+1.

Here, floor(x) is a function that returns the maximum integer value that does not exceed real number x.

For example, instead of direction vector $a_q(\theta_u)$ indicated by equation 22, direction estimator 214 may commonly use direction vector $a(\theta_u)$ of a virtual reception array with respect to an arrival wave in azimuth direction $\theta$ in the average central frequency of central frequencies $f_c$(1) and $f_c$(2) as indicated by equation 23.

(Equation 23)

$$a(\theta_u) = \begin{bmatrix} 1 \\ \exp(-j2\pi d_H\sin\theta_u/\lambda_a) \\ \vdots \\ \exp(-j2\pi(N_tN_a-1)d_H\sin\theta_u/\lambda_a) \end{bmatrix}$$ [21]

Here, $\lambda_a$ is the wavelength of a radar transmission signal in the case of central frequency ($f_c$(1)+$f_c$(2))/2, and $\lambda_a$=2$C_0$/($f_c$(1)+$f_c$(2)). In this case, direction estimator 214 can commonly use direction vector $a(\theta_n)$ of the virtual reception array in processing on each chirp signal, and it is also possible to obtain an effect capable of reducing the memory capacity for storing the direction vector of the virtual reception array.

Further, although the example described above is where direction estimator 214 calculates the azimuth direction as a direction-of-arrival estimation value, the present disclosure is not limited thereto, and the direction-of-arrival estimation of an elevation angle direction or, by using MIMO antennas arranged in a rectangular grid shape, the direction-of-arrival estimation of an azimuth direction and an elevation angle direction are also possible. For example, direction estimator 214 may calculate an azimuth direction and an elevation angle direction as direction-of-arrival estimation values and configure the azimuth direction and the elevation angle direction as positioning output.

With the above operation, direction estimator 214 may output, as positioning output, direction-of-arrival estimation values in distance index $f_{b\_cfar}(q)$ and demultiplexing index information ($f_{demul\_Tx~\#1}(q)$, $f_{demul\_Tx~\#2}(q)$, . . . , $f_{demul\_Tx~\#Nt}(q)$) on Doppler-multiplexed signals. In addition, direction estimator 214 may further output, as positioning output, distance index $f_{b\_cfar}(q)$ and demultiplexing index information ($f_{demul\_Tx~\#1}(q)$, $f_{demul\_Tx~\#2}(q)$, . . . , $f_{demul\_Tx~\#Nt}(q)$) on Doppler-multiplexed signals. For example, direction estimator 214 may output positioning output (or a positioning result) to a vehicle controller (not illustrated) in an in-vehicle-mounted radar (not illustrated) or to an infrastructure controller (not illustrated) in an infrastructure radar (not illustrated).

Further, for example, direction estimator 214 may output one or both of Doppler frequency information $f_{d\_VFT(1)} + n_{alest}/T_{rs}$ and $f_c(2)/f_c(1)(f_{d\_VFT(1)} + n_{alest}/T_{rs})$ determined by Doppler determiner 213.

Further, distance index $f_{b\_cfar}$ may be converted into distance information by using equation 1 and outputted.

Further, Doppler frequency information determined by Doppler determiner 213 may be converted into relative velocity information and outputted. Doppler frequency information $f_{d\_VFT(1)} + n_{alest}/T_{rs}$ by central frequency $f_c(1)$, which is determined by Doppler determiner 213, can be converted into relative velocity $v_d$ by using following equation 24.

(Equation 24)
$$v_d\left(f_{d\_VFT(1)} + \frac{n_{alest}}{T_{rs}}\right) = \frac{C_0}{2f_c(1)}\left(f_{d\_VFT(1)} + \frac{n_{alest}}{T_{rs}}\right) \quad [22]$$

In the same manner, when Doppler frequency information $f_c(2)/f_c(1)$ $(f_{d\_VFT(1)} + n_{alest}/T_{rs})$ by central frequency $f_c(2)$, which is determined by Doppler determiner 213, is converted into relative velocity $v_d$, relative velocity $v_d$ takes the same value as that in equation 24 as in following equation 25 so that the relative velocity information may be outputted as a common value (or a unified value) with respect to different central frequencies.

(Equation 25)
$$v_d\left(\frac{f_2(2)}{f_c(1)}\left(f_{d\_VFT(1)} + \frac{n_{alest}}{T_{rs}}\right)\right) = \frac{C_0}{2f_c(1)}\left(f_{d\_VFT(1)} + \frac{n_{alest}}{T_{rs}}\right) \quad [23]$$

As described above, in the present embodiment, radar apparatus 10 alternately switches between a first central frequency and a second central frequency that satisfy one of equations 10 to 15, for example, for each transmission period in which a transmission signal is transmitted from transmission antenna 106. Thus, radar apparatus 10 can determine the number of times of aliasing based on the deviation between Doppler frequencies in Doppler analysis in accordance with the difference between central frequencies. Thus, for example, radar apparatus 10 can extend a Doppler frequency range (or the maximum value of relative velocity) in which a Doppler-multiplexed signal can be demultiplexed in accordance with a determinable number of times of aliasing.

As described above, the present embodiment makes it possible to extend a Doppler frequency range (or the maximum value of relative velocity) in which no ambiguity occurs. Thus, radar apparatus 10 can detect a target object (for example, a direction of arrival) with high accuracy in a wider Doppler frequency range.

Further, in the present embodiment, a Doppler frequency range in which Doppler-multiplexed signals can be demultiplexed is extended by configuring the central frequencies of chirp signals so that, for example, the application of a method such as making the sampling rate of an A/D converter faster may be omitted. Thus, the present embodiment makes it possible to suppress complexity of the hardware configuration in radar apparatus 10 and further to suppress an increase in power dissipation or heat generation in radar apparatus 10. Further, in the present embodiment, a Doppler frequency range in which Doppler-multiplexed signals can be demultiplexed is extended by configuring the central frequencies of chirp signals so that the application of a method such as shortening transmission period $T_r$ may be omitted. Thus, the present embodiment makes it possible to reduce a distance range detectable by radar apparatus 10 or to suppress deterioration of the distance resolution.

Note that, in the present embodiment, a case where other parameters different from the central frequency in the modulation parameters with respect to the first and second chirp signals are common has been described, but the present disclosure is not limited thereto. For example, one exemplary embodiment of the present disclosure may be applied as long as distance resolutions match and frequency sweep bandwidths $B_w(q)$ in chirp signals have the same relationship.

Figure 10:
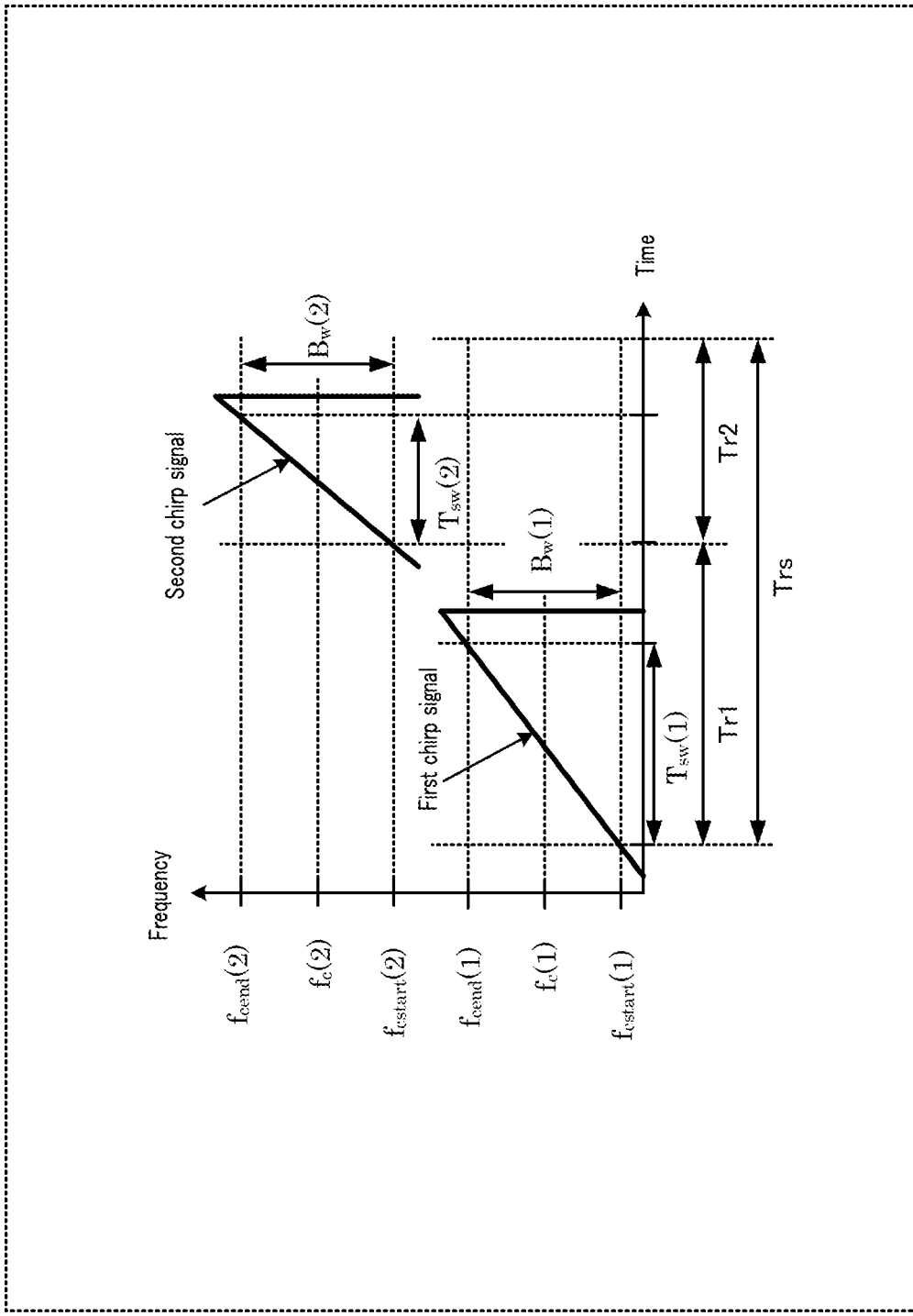
FIG. 10 illustrates another example of chirp signals.

For example, as illustrated in FIG. 10, the first and second chirp signals configured by modulation parameters in which $B_w(1)=B_w(2)$, $T_{sw}(1) \neq T_{sw}(2)$, and $D_m(1) \neq D_m(2)$ may be used. In this case, although frequency sweep times $T_{sw}$ of the first and second chirp signals differ, frequency sweep bandwidths $B_w$ are the same, and distance resolutions $\Delta R$ (=$C_0$/$2B_w$) match so that radar apparatus 10 makes it possible to obtain the same effect by performing the operation according to one exemplary embodiment of the present disclosure described above.

Further, for example, as illustrated in FIG. 10, the number of discrete sample data obtained in predetermined time range (range gate) $T_{sw}(1) \neq T_{sw}(2)$ when beat signals outputted from each reception radio 203 are discretely sampled in A/D converters 207 of each signal processor 206 is different by configuring $T_{sw}(1) \neq T_{sw}(2)$. Accordingly, for example, beat frequency analyzer 208 may perform, instead of performing FFT processing, the following operation on Nam pieces of discrete sample data obtained in predetermined time range (range gate) Tw for each transmission period $T_r$.

For example, beat frequency analyzer 208 may perform FFT processing on $N_{data}(1)$ pieces of discrete sampling data obtained in predetermined time range (range gate) $T_{sw}(1)$ in a period in which the first chirp signal is transmitted, and may perform FFT processing on $N_{data}(2)$ pieces of discrete sampling data obtained in predetermined time range (range gate) $T_{sw}(2)$ in a period in which the second chirp signal is transmitted. Then, for example, beat frequency analyzer 208 may perform subsequent processing with the smaller between $N_{data}(1)$ pieces and $N_{data}(2)$ pieces as $N_{data}$ pieces.

Embodiment 2

The radar apparatus according to the present embodiment may be the same as radar apparatus 10 illustrated in FIG. 2.

In Embodiment 1, the determinable condition of the number of Doppler aliasing with respect to central frequency $f_c(1)$ of the first chirp signal and central frequency $f_c(2)$ of the second chirp signal has been described. For example, in Embodiment 1, the determination operation of the number of Doppler aliasing in Doppler determiner 213 in a case where the determinable condition is satisfied has been described, and it has been described that the Doppler frequency range can be extended twice or more than twice the Doppler frequency range at the time of one transmission antenna.

Here, for example, in a MIMO radar using Doppler multiplex transmission with unequal intervals, in a case where there is a plurality of reflected waves from approximately the same distance and in a case where the Doppler intervals of those reflected waves match Doppler multiplexing intervals (or a multiple of Doppler multiplexing intervals), radar apparatus 10 is likely to erroneously detect a Doppler frequency domain with unequal interval, and may erroneously demultiplex a Doppler-multiplexed signal or an angle measurement error in the plurality of reflected waves may increase.

In the present embodiment, a radar apparatus capable of improving the detection performance even in such a situation in addition to the effect of Embodiment 1 will be described. For example, in the present embodiment, a determinable condition for a plurality of reflected waves with respect to central frequency $f_c(1)$ of the first chirp signal and central frequency $f_c(2)$ of the second chirp signal will be described. For example, the configuration condition (determinable condition) of central frequency $f_c(1)$ of the first chirp signal and central frequency $f_c(2)$ of the second chirp signal, which are configured in signal generation controller 104 of radar transmitter 100, and the operation of Doppler determiner 213 differ from those in Embodiment 1. Hereinafter, mainly the operations of the parts in the present embodiment different from those in Embodiment 1 will be described.

[Determinable Condition]

First, the configuration condition (determinable condition) for central frequency $f_c(1)$ of the first chirp signal and central frequency $f_c(2)$ of the second chirp signal, which are configured in signal generation controller 104 of radar transmitter 100, will be described.

For example, Doppler shifter 105 of radar transmitter 100 may use phase rotation $\varphi_n(m)$ indicated by equation 4. In this case, Doppler multiplexing intervals $\Delta f_{DDM}$ are expressed by following equation 26.

(Equation 26)
$$\Delta f_{DDM} = \frac{1}{T_{rs}(N_t + \delta)} \quad [24]$$

Part of Doppler multiplexing intervals $\Delta f_{DDM}$ indicated by equation 26 is not used for Doppler multiplexing and no transmission signal is assigned thereto, which therefore results in unequal intervals with a multiple of Doppler multiplexing intervals. Here, $\delta$ is an integer larger than or equal to one. Doppler multiplexing intervals $\Delta f_{DDM}$ become widest in a case where $\delta$ is one, and Doppler multiplexing intervals $\Delta f_{DDM}$ become narrower as $\delta$ increases. For example, the narrower the Doppler multiplexing intervals, the greater the mutual interference between Doppler-multiplexed signals so that it is more preferable to configure a smaller integer, such as $\delta=1$.

For example, in a case where Doppler frequencies $f_{d1\_T\ \#1}$ and $f_{d1\_T\ \#2}$ of reflected waves from two target objects (hereinafter referred to as "Target #1" and "Target #2") detected with the same distance index arrive at intervals that are Doppler multiplexing intervals $\Delta f_{DDM}$ (or multiple $N_{mul}$ of Doppler multiplexing intervals $\times \Delta f_{DDM}$), Doppler frequencies $f_{d1\_T\ \#1}$ and $f_{d1\_T\ \#2}$ are expressed by following equations 27 and 28, and Doppler frequencies $f_{d1\_T\ \#1}$ and $f_{d1\_T\ \#2}$ have the relationship of equation 29. Note that, the relational equations in a case where the first chirp signal of central frequency $f_c(1)$ is used are indicated here.

$$F_{d1\_T\ \#1} = f_{d\_T\ \#1\_VFT}(1) + n_{a1\_T\ \#1}/T_{rs} \quad \text{(Equation 27)}$$

$$F_{d1\_Tx\ 2} = f_{d1\_T\ \#2\_VFT}(1) + n_{a1\_T\ \#2}/T_{rs} \quad \text{(Equation 28)}$$

$$f_{d1\_T\ \#1} - f_{d1\_T\ \#2} = N_{mul} \times \Delta f_{DDM} \quad \text{(Equation 29)}$$

Here, $f_{d\_T\ \#1\_VFT}(1)$ is the estimated Doppler frequency value of Target #1 detected by first Doppler analyzer 210 and first Doppler demultiplexer 212, and $f_{d1\_T\ \#2\_VFT}(1)$ is the estimated Doppler frequency value of Target #2 detected by first Doppler analyzer 210 and first Doppler demultiplexer 212. Further, $n_{a1\_T\ \#1}$ represents the number of Doppler aliasing for Target #1, and $n_{a1\_T\ \#2}$ represents the number of Doppler aliasing for Target #2. Further, $n_{a1\_T\ \#1}$ and $n_{a1}\_T$ #2 take integer values.

Further, $N_{mul}$ is a natural number within an assumed Doppler frequency range. For example, by using maximum number $n_{a1\ max}$ of times of aliasing satisfying equation 19, $N_{mul}$ may be configured to $N_{mul} \in \{1, \ldots (Nt+\delta) \times n_{a1\ max}\}$ or may be configured to a value within a range narrower than $N_{mul} \in \{1, \ldots, (Nt+\delta) \times n_{a1\ max}\}$).

In a case where radar apparatus 10 observes a Doppler frequency by using the second chirp signal of central frequency $f_c(2)$ with respect to the relational equations of the two target objects (Target #1 and Target #2) represented as described above, the relational equations of following equations 30, 31, and 32 are obtained. Note that, the relational equations of equations 30, 31, and 32 utilize the fact that Doppler frequencies $f_{demul\_Tx\ \#1}$ and $f_{demul\_Tx\ \#2}$ in a case where the second chirp signal of central frequency $f_c(2)$ is used can be calculated by multiplying Doppler frequencies $f_{d2\_T\ \#1}$ and $f_{d2\_T\ \#2}$ by central frequency ratio $f_c(2)/f_c(1)$.

$$F_{d2\_T\ \#s1} = f_c(2)/f_c(1) \times (f_{d\_T\ \#1\_VFT}(1) + n_{a1\_T\ \#1}/T_{rs}) \quad \text{(Equation 30)}$$

$$F_{d2\_T\ \#2} = f_c(2)/f_c(1) \times (f_{d1\_T\ \#2\_VFT}(1) + n_{a1\_T\ \#2}/T_{rs}) \quad \text{(Equation 31)}$$

$$|f_{d2\_T\ \#1} - f_{d2\_T\ \#2}| = f_c(2)/f_c(1) \times (N_{mul} \times \Delta f_{DDM}) \quad \text{(Equation 32)}$$

Here, central frequency ratio $f_c(2)/f_c(1)$ may be configured such that the difference between $f_c(2)/f_c(1) \times (N_{mul} \times \Delta f_{DDM})$ and $N_{mul} \times \Delta f_{DDM}$ as Doppler multiplexing intervals (for example, the difference between the value of equation 32 and the value of equation 29) becomes larger than Doppler frequency resolution $\Delta f_d$ in second Doppler analyzer 210.

For example, radar apparatus 10 may determine central frequency $f_c(1)$ of the first chirp signal and central frequency $f_c(2)$ of the second chirp signal such that "second determinable condition (1)" of following equation 33 is satisfied.

(Equation 33)
$$\left| \frac{f_c(2)}{f_c(1)} N_{mul} \Delta f_{DDM} - N_{mul} \Delta f_{DDM} \right| > \Delta f_d = \frac{1}{N_c T_{rs}} \quad [25]$$

Thus, for example, when the outputs of second Doppler analyzer 210 and second Doppler demultiplexer 212, in which the second chirp signal of central frequency $f_c(2)$ is used, are used, the respective Doppler frequencies of Target #1 and Target #2 are observed as Doppler frequencies deviated from the respective estimated Doppler frequency values (for example, Doppler multiplexing intervals $\Delta f_{DDM}$ (or the intervals of multiples of $\Delta f_{DDM}$)) of Target #1 and Target #2 detected by first Doppler analyzer 210 and first Doppler demultiplexer 212 at least by Doppler frequency resolution $\Delta f_d$ in second Doppler analyzer 210.

Accordingly, for example, radar apparatus 10 can suppress overlapping of Doppler-multiplexed signal components between two reflected waves observed at the same distance and can improve the demultiplexing performance of the respective Doppler-multiplexed signals of the two reflected waves. For example, the second determinable condition (1) is a condition that the estimated Doppler frequency values of Target #1 and Target #2, which are detected by first Doppler analyzer 210 and first Doppler demultiplexer 212, become Doppler multiplexing intervals $\Delta f_{DDM}$ (or the intervals of multiples of $\Delta f_{DDM}$), that even when Doppler demultiplexing is difficult with respect to Target #1 and Target #2, Doppler demultiplexing can be performed with respect to Target #1 and Target #2 based on the outputs of second Doppler analyzer 210 and second Doppler demultiplexer 212 in which the second chirp signal is used, and that the estimated Doppler frequency values of Target #1 and Target #2 are obtained.

Here, in a case where $f_c(2) > f_c(1)$, the condition for $f_c(1)$ and $f_c(2)$ in the second determinable condition (1) is expressed by following equation 34.

(Equation 34)
$$\frac{f_c(2)}{f_c(1)} > 1 + \frac{N_t + \delta}{N_c N_{mul}} \qquad [26]$$

For example, when $N_{mul}=1$ is satisfied, a case where $N_{mul}>1$ also holds true so that the second determinable condition (1) may be expressed as in following equation 35.

(Equation 35)
$$\frac{f_c(2)}{f_c(1)} > 1 + \frac{N_t + \delta}{N_c} \qquad [27]$$

In the same manner, in a case where $f_c(2) < f_c(1)$, the condition for $f_c(1)$ and $f_c(2)$ in the second determinable condition (1) is expressed by following equation 36.

(Equation 36)
$$\frac{f_c(2)}{f_c(1)} < 1 - \frac{N_t + \delta}{N_{mul} N_c} \qquad [28]$$

For example, when $N_{mul}=1$ is satisfied, a case where $N_{mul}>1$ also holds true so that the second determinable condition (1) may be expressed as in following equation 37.

(Equation 37)
$$\frac{f_c(2)}{f_c(1)} < 1 - \frac{N_t + \delta}{N_c} \qquad [29]$$

In the same manner, in a case where Doppler frequencies $f_{d2\_T\#1}$ and $f_{d\_T\#2}$ of reflected waves from two target objects (for example, Target #1 and Target #2) detected with the same distance index arrive at intervals that are Doppler multiplexing intervals $\Delta f_{DDM}$ (or multiple $N_{mul}$ of Doppler multiplexing intervals $\times \Delta f_{DDM}$), Doppler frequencies $f_{d2\_T\#1}$ and $f_{d\_T\#2}$ are expressed by following equations 38 and 39, and Doppler frequencies $f_{d2\_T\#1}$ and $f_{d\_T\#2}$ have the relationship of equation 40. Note that, the relational equations in a case where the second chirp signal of central frequency $f_c(2)$ is used are indicated here.

$$F_{d2\_T\#1} = f_{d\_T\#1\_VFT}(2) + n_{a1\_T\#1}/T_{rs} \qquad \text{(Equation 38)}$$

$$F_{d2\_T\#2} = f_{d1\_T\#2\_VFT}(2) + n_{a1\_T\#2}/T_{rs} \qquad \text{(Equation 39)}$$

$$|f_{d2\_T\#1} - f_{d2\_T\#2}| = N_{mul} \times \Delta f_{DDM} \qquad \text{(Equation 40)}$$

Here, $f_{d\_T\#1\_VFT}(2)$ is the estimated Doppler frequency value of Target #1 detected by second Doppler analyzer 210 and second Doppler demultiplexer 212, and $f_{d1\_T\#2\_VFT}(2)$ is the estimated Doppler frequency value of Target #2 detected by second Doppler analyzer 210 and second Doppler demultiplexer 212. Further, $n_{a1\_T\#1}$ represents the number of Doppler aliasing for Target #1, and $n_{a1\_T\#2}$ represents the number of Doppler aliasing for Target #2. Further, $n_{a1\_T\#2}$ and $n_{a1\_T\#2}$ *take integer values*.

In a case where radar apparatus 10 observes a Doppler frequency by using the first chirp signal of central frequency $f_c(1)$ with respect to the relational equations of the two target objects (Target #1 and Target #2) represented as described above, the relational equations of following equations 41, 42, and 43 are obtained. Note that, the relational equations of equations 41, 42, and 43 utilize the fact that Doppler frequencies $f_{d1\_T\#1}$ and $f_{d1\_T\#2}$ in a case where the first chirp signal of central frequency $f_c(1)$ is used can be calculated by multiplying Doppler frequencies $f_{d2\_T\#1}$ and $f_{d2\_T\#2}$ by central frequency ratio $f_c(1)/f_c(2)$.

$$F_{d1\_T\#1} = f_c(1)/f_c(2) \times (f_{d\_T\#1\_VFT}(2) + n_{a1\_T\#1}/T_{rs}) \qquad \text{(Equation 41)}$$

$$F_{d1\_T\#2} = f_c(1)/f_c(2) \times (f_{d1\_T\#2\_VFT}(2) + n_{a1\_T\#2}/T_{rs}) \qquad \text{(Equation 42)}$$

$$|f_{d1\_T\#1} - f_{d1\_T\#2}| = f_c(1)/f_c(2) \times (N_{mul} \times \Delta f_{DDM}) \qquad \text{(Equation 43)}$$

Here, central frequency ratio $f_c(1)/f_c(2)$ may be configured such that the difference between $f_c(1)/f_c(2) \times (N_{mul} \times \Delta f_{DDM})$ and $N_{mul} \times \Delta f_{DDM}$ as Doppler multiplexing intervals (for example, the difference between the value of equation 43 and the value of equation 40) becomes larger than Doppler frequency resolution $\Delta f_d$ in first Doppler analyzer 210.

For example, radar apparatus 10 may determine central frequency $f_c(1)$ of the first chirp signal and central frequency $f_c(2)$ of the second chirp signal such that "second determinable condition (2)" of following equation 44 is satisfied.

(Equation 44)
$$\left| \frac{f_c(1)}{f_c(2)} N_{mul} \Delta f_{DDM} - N_{mul} \Delta f_{DDM} \right| > \Delta f_d = \frac{1}{N_c T_{rs}} \qquad [30]$$

Thus, for example, when the outputs of first Doppler analyzer 210 and first Doppler demultiplexer 212, in which the first chirp signal of central frequency $f_c(1)$ is used, are used, the respective Doppler frequencies of Target #1 and Target #2 are observed as Doppler frequencies deviated from the respective estimated Doppler frequency values (for example, Doppler multiplexing intervals $\Delta f_{DDM}$ (or the intervals of multiples of $\Delta f_{DDM}$)) of Target #1 and Target #2 detected by second Doppler analyzer 210 and second Doppler demultiplexer 212 at least by Doppler frequency resolution $\Delta f_d$ in first Doppler analyzer 210.

Accordingly, for example, radar apparatus 10 can suppress overlapping of Doppler-multiplexed signal components between two reflected waves observed at the same distance and can improve the demultiplexing performance of the respective Doppler-multiplexed signals of the two reflected waves. For example, the second determinable condition (2) is a condition that the estimated Doppler frequency values of Target #1 and Target #2, which are detected by second Doppler analyzer 210 and second Doppler demultiplexer 212, are Doppler multiplexing intervals $\Delta f_{DDM}$ (or the intervals of multiples of $\Delta f_{DDM}$), that even when Doppler demultiplexing is difficult with respect to Target #1 and Target #2, Doppler demultiplexing can be performed with respect to Target #1 and Target #2 based on the outputs of first Doppler analyzer 210 and first Doppler demultiplexer 212 in which the first chirp signal is used, and that the estimated Doppler frequency values of Target #1 and Target #2 are obtained.

Here, in a case where $f_c(2) > f_c(1)$, the condition for $f_c(1)$ and $f_c(2)$ in the second determinable condition (2) is expressed by following equation 45.

(Equation 45)
$$\frac{f_c(2)}{f_c(1)} > \frac{1}{1 - \frac{N_t + \delta}{N_c N_{mul}}} \quad [31]$$

For example, in a case where $N_{mul}=1$ is satisfied (which means that $N_{mul}>1$ also holds true), the second determinable condition (2) may be expressed as in following equation 46.

(Equation 46)
$$\frac{f_c(2)}{f_c(1)} > \frac{1}{1 - \frac{N_t + \delta}{N_c}} \quad [32]$$

Further, when the second determinable condition (2) is satisfied as in following equation 47, the second determinable condition (1) is also satisfied.

(Equation 47)
$$\frac{f_c(2)}{f_c(1)} > \frac{1}{1 - \frac{N_t + \delta}{N_c}} > 1 + \frac{N_t + \delta}{N_c} \quad [33]$$

Accordingly, for example, following equation 48 will be referred to as "second determinable condition" in a case where $f_c(2) > f_c(1)$.

(Equation 48)
$$\frac{f_c(2)}{f_c(1)} > \frac{1}{1 - \frac{N_t + \delta}{N_c}} \quad [34]$$

In the same manner, in a case where $f_c(2) < f_c(1)$, the condition for (1) and (2) in the second determinable condition (2) is expressed by following equation 49.

(Equation 49)
$$\frac{f_c(2)}{f_c(1)} < \frac{1}{1 - \frac{N_t + \delta}{N_c N_{mul}}} \quad [35]$$

For example, when $N_{mul}=1$ is satisfied (which means that $N_{mul}>1$ also holds true), the second determinable condition (2) may be expressed as in following equation 50.

(Equation 50)
$$\frac{f_c(2)}{f_c(1)} < \frac{1}{1 - \frac{N_t + \delta}{N_c}} \quad [36]$$

Further, for example, given equations 37 and 50, when the second determinable condition (2) is satisfied as in following equation 51, the second determinable condition (1) is also satisfied.

(Equation 51)
$$\frac{f_c(2)}{f_c(1)} < 1 - \frac{N_t + \delta}{N_c} < \frac{1}{1 - \frac{N_t + \delta}{N_c}} \quad [37]$$

Accordingly, for example, following equation 52 will be referred to as "second determinable condition" in a case where $f_c(2) < f_c(1)$.

(Equation 52)
$$\frac{f_c(2)}{f_c(1)} < 1 - \frac{N_t + \delta}{N_c} \quad [38]$$

Further, for example, in the second determinable condition indicated by equation 33 or 44, the condition for central frequencies $f_c(1)$ and $f_c(2)$ may satisfy a condition of being larger than an integer multiple (for example, a times) of Doppler frequency resolution $\Delta f_d$ (where $\alpha \geq 1$). In this case, the larger a is, the more easily radar apparatus 10 can perform Doppler separation even in a case where there is a noise influence, such as a case where the reception signal level is low. Further, for example, the second determinable condition indicated by equation 48 in a case where $f_c(2) > f_c(1)$, and the second determinable condition indicated by equation 52 in a case where $f_c(2) < f_c(1)$ may be expressed as in following equations 53 and 54, respectively.

(Equation 53)
$$\frac{f_c(2)}{f_c(1)} > \frac{1}{1 - \frac{\alpha(N_t + \delta)}{N_c}} \quad [39]$$

(Equation 54)
$$\frac{f_c(2)}{f_c(1)} < 1 - \frac{\alpha(N_t + \delta)}{N_c} \quad [40]$$

As an example, when $f_c(2)>f_c(1)$ in a case where $f_c(1)=78$ GHz, $f_c(2)$ is configured to be larger than 80.51 GHz with $\alpha=1$, Nc=128, Nt=3, and $\delta=1$, and $f_c(2)=83.2$ GHz is configured with $\alpha=2$ and Nc=128. Further, for example, $f_c(2)=79.23$ GHz is configured with $\alpha=1$, Nc=256, Nt=3, and $\delta=1$, and $f_c(2)$ is configured to be larger than 80.51 GHz with $\alpha=2$ and Nc=256.

Note that, the second determinable condition is a condition that difference $|f_c(2)-f_c(1)|$ between the central frequencies of chirp signals spreads more than in the first determinable condition. For example, in a case where the second determinable condition is satisfied, the first determinable condition is also satisfied.

Further, $f_c(1)$ and $f_c(2)$ may be configured within the pass frequency range of radar transmitter 100 or radar receiver 200. The extension of the Doppler frequency detection range may be subjected to constraints of the pass-frequency characteristics of radar transmitter 100 or radar receiver 200.

Further, in the second determinable condition, the constraints of frequency conditions indicated by equation 18 or 19 may also be taken into consideration and configured in the same manner. Thus, it is possible to obtain the effect of Embodiment 1 in the same manner.

Further, in the second determinable condition, a frequency condition that the difference between Doppler frequencies observed in $f_c(1)$ and $f_c(2)$ is less than Doppler multiplexing intervals $\Delta f_{DDM}$ may be added. For example, $f_c(1)$ and $f_c(2)$ may be configured such that the conditions indicated by following equations 55 and 56 are satisfied.

(Equation 55)
$$\Delta f_{DDM} > \left| \frac{f_c(2)}{f_c(1)} N_{mul} \Delta f_{DDM} - N_{mul} \Delta f_{DDM} \right| \qquad [41]$$

(Equation 56)
$$\frac{f_c(2)}{f_c(1)} < 1 + \frac{1}{N_{mul}} \text{ (when } f_c(1) > f_c(2)) \qquad [42]$$
$$\frac{f_c(1)}{f_c(2)} < 1 + \frac{1}{N_{mul}} \text{ (when } f_c(1) < f_c(2))$$

Here, $N_{mul}$ is a natural number within an assumed Doppler frequency range. For example, by using maximum number $n_{a1\ max}$ of times of aliasing satisfying equation 19, $N_{mul}$ may be configured to $N_{mul} \in \{1, \ldots, (Nt+\delta) \times n_{a1\ max}\}$ or may be configured to a value within a range narrower than $N_{mul} \in \{1, \ldots, (Nt+\delta) \times n_{a1\ max}\}$.

The determinable condition has been described above.

[Doppler Determination Method]

Next, Doppler determiner 213 may perform an operation as described below by using central frequencies $f_c(1)$ and $f_c(2)$ satisfying the second determinable condition described above.

For example, in a case where pieces of demultiplexing index information on Doppler-multiplexed signals outputted from first Doppler demultiplexer 212 and the same number of pieces of demultiplexing index information on Doppler-multiplexed signals outputted from second Doppler demultiplexer 212 are included in distance index $f_{b\_cfar}$, Doppler determiner 213 may perform the same operation as in Embodiment 1. Thus, the same effect as in Embodiment 1 is obtained.

For example, in a case where pieces of demultiplexing index information on Doppler-multiplexed signals outputted from first Doppler demultiplexer 212 and the same number of pieces of demultiplexing index information on Doppler-multiplexed signals outputted from second Doppler demultiplexer 212 are not included in distance index $f_{b\_cfar}$, on the other hand, Doppler determiner 213 may perform the following processing. For example, in a case where there is a plurality of reflected waves from approximately the same distance to radar apparatus 10 and the plurality of reflected waves may be demultiplexed in one of the Doppler analysis of the first chirp signal and the Doppler analysis of the second chirp signal and may not be demultiplexed in the other of the Doppler analyses, Doppler determiner 213 may perform the following processing, for example.

<Case 1>

In Case 1, for example, a case where a plurality of pieces of demultiplexing index information on Doppler-multiplexed signals outputted from first Doppler demultiplexer 212 is included in distance index $f_{b\_cfar}$ and demultiplexing index information on Doppler-multiplexed signals outputted from second Doppler demultiplexer 212 is not included in distance index $f_{b\_cfar}$ will be described. For example, Case 1 is a case where a Doppler-multiplexed signal is demultiplexed in first Doppler demultiplexer 212 and a Doppler-multiplexed signal is not demultiplexed in second Doppler demultiplexer 212, and an example thereof is a case as described below.

In a case where there are two reflected waves from approximately the same distance to radar apparatus 10, it is expected that demultiplexing index information on Doppler-multiplexed signals with respect to the two reflected waves is outputted to demultiplexing index information on Doppler-multiplexed signals outputted from first Doppler demultiplexer 212 and demultiplexing index information on Doppler-multiplexed signals outputted from second Doppler demultiplexer 212, respectively.

However, in a case where transmission using the second chirp signal causes reflected wave #1 and reflected wave #2 to match Doppler multiplexing intervals $\Delta f_{DDM}$ or a multiple of Doppler multiplexing intervals as illustrated in (c) of FIG. 1, for example, a Doppler frequency component in which some Doppler-multiplexed signals overlap between reflected wave #1 and reflected wave #2 may be received. For this reason, it becomes difficult to perform Doppler-multiplexed signal demultiplexing, which results in a case where demultiplexing index information on Doppler-multiplexed signals outputted from second Doppler demultiplexer 212 is not included.

On the other hand, even in a case where there is such a reflected wave, radar apparatus 10 satisfies the second determinable condition by transmission using the first chirp signal so that a Doppler frequency component in which some Doppler-multiplexed signals overlap between reflected wave #1 and reflected wave #2 is no longer received, which therefore results in a case where demultiplexing index information on Doppler-multiplexed signals outputted from first Doppler demultiplexer 212 is included. In such a case, the following operation is performed.

Hereinafter, a case where demultiplexing index information on Doppler-multiplexed signals of reflected waves from two target objects (for example, Target #1 and Target #2) is included as demultiplexing index information on Doppler-multiplexed signals outputted from first Doppler demultiplexer 212 will be described as an example.

For example, in a case where the chirp signal of central frequency $f_c(2)$ is used, Doppler determiner 213 may determine (may assume) that Doppler frequencies $f_{d2\_T\#1}$ and $f_{d2\_T\#2}$ of reflected waves from the two target objects (Target #1 and Target #2) have arrived at Doppler frequency intervals that are Doppler multiplexing intervals $\Delta f_{DDM}$ (or multiple $N_{mul}$ of Doppler multiplexing intervals×$\Delta f_{DDM}$). In this case, Doppler determiner 213 may perform Doppler determination processing at the time of arrival wave overlapping as described below.

For example, Doppler determiner 213 may calculate number $n_{a1\_T\ \#1}$ of Doppler aliasing for Target #1 and number $n_{a1\_T\ \#2}$ of Doppler aliasing for Target #2, in which following equation 57 becomes minimum.

(Equation 57)

$$\min_{n_{al\_T\#1}, n_{al\_T\#2}} \{\mod \quad [43]$$
$$(|f_{est}(d_{d\_T\#1\_VFT(1)}, n_{al\_T\#1}) - f_{est}(d_{d\_T\#2\_VFT(1)}, n_{al\_T\#2})|, \Delta f_{DDM}\}$$

Here, numbers $n_{a1\_T\ \#1}$ and $n_{a1\_T\ \#2}$ of Doppler aliasing are integer values, and may be calculated within a range of integer values covering an assumed target Doppler frequency range. For example, $n_{a1\_T\ \#1}$ and $n_{a1\_T\ \#2}$ may be calculated within a range of $\pm n_{a1\ max}$ by using maximum number $n_{a1\ max}$ of times of aliasing satisfying equation 19. Further, the numbers of Doppler aliasing at which equation 57 becomes minimum in a case where numbers $n_{a1\_T\ \#1}$ and $n_{a1\_T\ \#2}$ of Doppler aliasing are variable are denoted as $n_{a1est\_}T\ \#2$, respectively. Further, mod[x, y] is a function representing the residue when x is divided by y.

For example, in a case where the chirp signal of central frequency $f_c(2)$ is used, equation 57 becomes minimum when a condition that Doppler frequencies $f_{d2\_T\ \#1}$ and $f_{d2\_T\ \#2}$ of reflected waves from two target objects (Target #1 and Target #2) arrive at Doppler frequency intervals that are Doppler multiplexing intervals $\Delta f_{DDM}$ (or multiple $N_{mul}$ of Doppler multiplexing intervals×$\Delta f_{DDM}$) is satisfied. Doppler determiner 213 utilizes the above to estimate numbers $n_{a1est\_T\ \#1}$ and $n_{a1est\_T\ \#2}$ of Doppler aliasing for Target #1 and Target #2.

Note that, in equation 57, Doppler frequencies $f_{d2\_T\#1}$ and $f_{d2\_T\ \#2}$ in the case of numbers $n_{a1\_T\ \#1}$ and $n_{a1\_T\ \#2}$ of Doppler aliasing are estimated, for example, by using $f_{est}$ ($f_{d\_T\ \#1\_VFT(1)}$, $n_{a1\_T\ \#1}$) and $f_{est}(f_{d\_T\ \#2\_VFT(1)}$, $n_{a1\_T\ \#2})$, respectively. Here, $f_{est}(f_{d\_VFT(1)}, n_{a1})$ may be the function indicated by equation 17. Further, each of estimated Doppler frequency values $f_{d\_T\ \#1\_VFT(1)}$ and $f_{d\_T\ \#2\_VFT})$ is, for example, an estimated Doppler frequency value in a case where the Doppler frequency of a target object is assumed to be in Doppler frequency range $-1/(2T^*) \leq f_{d\_TargetDoppler} < 1/(2T_{rs})$ based on demultiplexing index information on Doppler-multiplexed signals in distance index $f_{b\_cfar}$ outputted from first Doppler demultiplexer 212.

<Case 2>

In Case 2, for example, a case where a plurality of pieces of demultiplexing index information on Doppler-multiplexed signals outputted from second Doppler demultiplexer 212 is included in distance index $f_{b\_cfar}$ and demultiplexing index information on Doppler-multiplexed signals outputted from first Doppler demultiplexer 212 is not included in distance index $f_{b\_cfar}$ will be described. For example, Case 2 is a case where a Doppler-multiplexed signal is not demultiplexed in first Doppler demultiplexer 212 and a Doppler-multiplexed signal is demultiplexed in second Doppler demultiplexer 212, and an example thereof is a case as described below.

In a case where there are two reflected waves from approximately the same distance to radar apparatus 10, it is expected that demultiplexing index information on Doppler-multiplexed signals with respect to the two reflected waves is outputted to demultiplexing index information on Doppler-multiplexed signals outputted from first Doppler demultiplexer 212 and demultiplexing index information on Doppler-multiplexed signals outputted from second Doppler demultiplexer 212, respectively.

However, in a case where transmission using the first chirp signal causes reflected wave #1 and reflected wave #2 to match Doppler multiplexing intervals $\Delta f_{DDM}$ or a multiple of Doppler multiplexing intervals as illustrated in (c) of FIG. 1, for example, a Doppler frequency component in which some Doppler-multiplexed signals overlap between reflected wave #1 and reflected wave #2 may be received.

For this reason, it becomes difficult to perform Doppler-multiplexed signal demultiplexing, which results in a case where demultiplexing index information on Doppler-multiplexed signals outputted from first Doppler demultiplexer 212 is not included.

On the other hand, even in a case where there is such a reflected wave, radar apparatus 10 satisfies the second determinable condition by transmission using the second chirp signal so that a Doppler frequency component in which some Doppler-multiplexed signals overlap between reflected wave #1 and reflected wave #2 is no longer received, which therefore results in a case where demultiplexing index information on Doppler-multiplexed signals outputted from second Doppler demultiplexer 212 is included. In such a case, the following operation is performed.

Hereinafter, a case where demultiplexing index information on Doppler-multiplexed signals of reflected waves from two target objects (for example, Target #1 and Target #2) is included as demultiplexing index information on Doppler-multiplexed signals outputted from second Doppler demultiplexer 212 will be described as an example.

For example, in a case where the chirp signal of central frequency $f_c(1)$ is used, Doppler determiner 213 may determine (may assume) that Doppler frequencies $f_{d1\_T\ \#1}$ and $f_{d1\_T\#2}$ of reflected waves from the two target objects (Target #1 and Target #2) have arrived at Doppler frequency intervals that are Doppler multiplexing intervals $\Delta f_{DDM}$ (or multiple $N_{mul}$ of Doppler multiplexing intervals×$\Delta f_{DDM}$). In this case, Doppler determiner 213 may perform Doppler determination processing at the time of arrival wave overlapping as described below.

For example, Doppler determiner 213 may calculate numbers $n_{a1\_T\ \#1}$ and $n_{a1\_T\ \#2}$ of Doppler aliasing for Target #1 and Target #2, in which following equation 58 becomes minimum.

(Equation 58)

$$\min_{n_{al\_T\#1}, n_{al\_T\#2}} \{\mod \quad [44]$$
$$(|f_{est2}(f_{d1\_T\#1\_VFT(2)}, n_{al\_T\#1}) - f_{est2}(d_{d1\_T\#2\_VFT(2)}, n_{al\_T\#2})|, \Delta f_{DDM}\}$$

Here, numbers $n_{a1\_T\ \#1}$ and $n_{a1\_T\ \#2}$ of Doppler aliasing are integer values, and may be calculated within a range of integer values covering an assumed target Doppler frequency range. For example, $n_{a1\_T\ \#1}$ and $n_{a1\_T\ \#2}$ may be calculated within a range of $\pm n_{a1\ max}$ by using maximum number $n_{a1\ max}$ of times of aliasing satisfying equation 19. Further, the numbers of Doppler aliasing at which equation 58 becomes minimum in a case where numbers $n_{a1\_T\ \#1}$ and $n_{a1\_T\ \#2}$ of Doppler aliasing are variable are denoted as $n_{a1est\_}T\ \#1$ and $n_{a1est\_}T\ \#2$, respectively.

For example, in a case where the chirp signal of central frequency $f_c(1)$ is used, equation 58 becomes minimum when a condition that Doppler frequencies $f_{d1\_T\ \#1}$ and $f_{d\_T\ \#2}$ of reflected waves from two target objects (Target #1 and Target #2) arrive at Doppler frequency intervals that are Doppler multiplexing intervals $\Delta f_{DDM}$ (or multiple $N_{mul}$ of Doppler multiplexing intervals $\times \Delta f_{DDM}$) is satisfied. Doppler determiner 213 utilizes the above to estimate numbers $n_{a1est\_T}\#1$ and $n_{a1est\_T}\#2$ of Doppler aliasing for Target #1 and Target #2.

Note that, in equation 58, Doppler frequencies $f_{d1\_T\ \#1}$ and $f_{d1\_T\ \#2}$ in the case of numbers $n_{a1\_T\ \#1}$ and $n_{a1\_T\ \#2}$ of Doppler aliasing are estimated, for example, by using $f_{est2}(f_{d\_T\ \#1\_VFT}(2), n_{a1\_T\ \#1})$ and $f_{est2}(f_{d\_T\ \#2\_VFT}(2), n_{a1\_T\ \#2})$, respectively. Further, each of estimated Doppler frequency values $f_{d\_T\ \#2\_VFT(2)}$ and $f_{d\_T\ \#2\_VFT}(2)$ is an estimated Doppler frequency value in a case where the Doppler frequency of a target object is assumed to be in Doppler frequency range $-1/(2T_{rs}) \leq f_{d\_TargetDoppler} < 1/(2T_{rs})$ based on demultiplexing index information on Doppler-multiplexed signals in distance index $f_{b\_cfar}$ outputted from second Doppler demultiplexer 212.

Further, $f_{est2}(f_{d\_VFT(2)}, na1)$ is a function indicated by following equation 59, and represents a function that outputs a value obtained by calculating Doppler frequency $(f_{d\_T\ \#1\_VFT(2)}+n_{a1}/T_{rs})$ in a case where estimated Doppler frequency value $f_{d\_VFT(2)}$ calculated based on demultiplexing index information on Doppler-multiplexed signals outputted from second Doppler demultiplexer 212 is assumed to be number $n_{a1}$ of Doppler aliasing and by multiplying Doppler frequency $(f_{d\_T\ \#1\_VFT(2)}+n_{a1}/T_{rs})$ by $f_c(1)/f_c(2)$ so as to convert Doppler frequency $(f_{d\_T\ \#1\_VFT(2)}+n_{a1}/T_{rs})$ into a Doppler frequency observed by using the first chirp signal of central frequency $f_c(1)$.

(Equation 59)

$$f_{est2}(f_{d\_VFT(2)}, n_{al}) = F\mathrm{mod}\left[\frac{f_c(1)}{f_c(2)}\left(f_{d\_VFT(2)} + \frac{n_{al}}{T_{rs}}\right)\right] \quad [45]$$

By the operation of Doppler determiner 213 as described above, even in a case where pieces of demultiplexing index information on Doppler-multiplexed signals outputted from first Doppler demultiplexer 212 and the same number of pieces of demultiplexing index information on Doppler-multiplexed signals outputted from second Doppler demultiplexer 212 are not included in distance index $f_{b\_cfar}$, Doppler determiner 213 assumes, based on demultiplexing index information on Doppler-multiplexed signals obtained in one Doppler demultiplexer 212, that the Doppler frequency of a reflected wave in a case where the chirp signal of another central frequency is used arrives at Doppler frequency intervals that are Doppler multiplexed intervals $\Delta f_{DDM}$ (or multiple $N_{mul}$ of Doppler multiplexing intervals $\times \Delta f_{DDM}$), and can estimate the numbers of Doppler aliasing thereof as in Case 1 or 2.

For example, Doppler determiner 213 estimates, based on the result of, between Doppler analysis corresponding to the first chirp signal and Doppler analysis corresponding to the second chirp signal, one Doppler analysis in which a plurality of reflected wave signals is demultiplexed, the respective Doppler peaks of a plurality of target objects in the other Doppler analysis in which a plurality of reflected wave signals is not demultiplexed, and determines, based on the intervals of the estimated Doppler peaks between the plurality of target objects and the Doppler multiplexing intervals, the respective numbers of times of aliasing of the Doppler frequencies of the plurality of target objects, for example.

In the present embodiment, the subsequent processing of radar apparatus 10 may be the same as in Embodiment 1. Further, for example, radar apparatus 10 may output estimated Doppler frequency values as positioning output by using $n_{a1est\_T}\#1$ and $n_{a1est\_T}\#2$ that are the estimated numbers of Doppler aliasing. With the above, in the present embodiment, radar apparatus 10 can obtain the effect of Embodiment 1 by using central frequency $f_c(1)$ of the first chirp signal and central frequency $f_c(2)$ of the second chirp signal, which satisfy the second determinable condition.

Further, for example, there may be a case where, for example, the Doppler frequencies of reflected waves from two target objects arrive at Doppler frequency intervals that are Doppler multiplexing intervals $\Delta f_{DDM}$ (or multiple $N_{mul}$ of Doppler multiplexing intervals $\times \Delta f_{DDM}$) and it is difficult for radar apparatus 10 to perform Doppler demultiplexing of those target objects by using one chirp signal. Even in this case, with respect to the other chirp signal, radar apparatus 10 can perform Doppler multiplexing of the two target objects by causing the Doppler frequencies of the reflected waves from the two target objects not to match Doppler frequency intervals that are Doppler multiplexing intervals $\Delta f_{DDM}$ (or multiple $N_{mul}$ of Doppler multiplexing intervals $\times \Delta f_{DDM}$) and by causing the Doppler frequencies of the reflected waves from the two target objects to differ from at least the Doppler resolution of Doppler analyzer 210.

Thus, in the present embodiment, radar apparatus 10 can improve the performance of detecting a plurality of waves arriving from the same distance, it is possible to improve the target object detection probability in radar apparatus 10 and to reduce the non-detection probability, and it is possible to improve the radar detection performance.

Modification of Embodiment 2

As a modification of Embodiment 2, in a case where assumed target object Doppler frequency $f_{d\_TargetDoppler}$ is in Doppler frequency range $-1/(2T_{rs}) \leq f_{d\_TargetDoppler} < 1/(2T_{rs})$, radar apparatus 10 may cause Doppler determiner 213 to perform processing in which processing of estimating the number of times of aliasing is omitted, by using central frequency $f_c(1)$ of the first chirp signal and central frequency $f_c(2)$ of the second chirp signal, which satisfy the second determinable condition. For example, radar apparatus 10 may perform processing of demultiplexing and detecting a plurality of reflected waves without estimating the number of times of aliasing, for example.

In this case, for example, Doppler determiner 213 may perform following processing of Cases 1a and 2a instead of the processing of Cases 1 and 2 described above.

<Case 1a>

Case 1a is, for example, a case where a plurality of pieces of demultiplexing index information on Doppler-multiplexed signals outputted from first Doppler demultiplexer 212 is included in distance index $f_{b\_cfar}$ and demultiplexing index information on Doppler-multiplexed signals outputted from second Doppler demultiplexer 212 is not included in distance index $f_{b\_cfar}$, and an example thereof is a case as described below.

In a case where there are two reflected waves from approximately the same distance to radar apparatus 10, it is expected that demultiplexing index information on Doppler-multiplexed signals with respect to the two reflected waves is outputted to demultiplexing index information on Doppler-multiplexed signals outputted from first Doppler demultiplexer 212 and demultiplexing index information on Doppler-multiplexed signals outputted from second Doppler demultiplexer 212, respectively.

However, in a case where transmission using the second chirp signal causes reflected wave #1 and reflected wave #2 to match Doppler multiplexing intervals $\Delta f_{DDM}$ or a multiple of Doppler multiplexing intervals as illustrated in (c) of FIG. 1, for example, a Doppler frequency component in which some Doppler-multiplexed signals overlap between reflected wave #1 and reflected wave #2 may be received.

For this reason, it becomes difficult to perform Doppler-multiplexed signal demultiplexing, which results in a case where demultiplexing index information on Doppler-multiplexed signals outputted from second Doppler demultiplexer 212 is not included. On the other hand, even in a case where there is such a reflected wave, radar apparatus 10 satisfies the second determinable condition by transmission using the first chirp signal so that a Doppler frequency component in which some Doppler-multiplexed signals overlap between reflected wave #1 and reflected wave #2 is no longer received.

The above therefore results in a case where demultiplexing index information on Doppler-multiplexed signals outputted from first Doppler demultiplexer 212 is included (a case where reflected waves #1 and #2 arrive as in Case 1 is assumed). In such a case, the following operation different from that in Case 1 is performed.

Hereinafter, a case where demultiplexing index information on Doppler-multiplexed signals of reflected waves from two target objects (for example, Target #1 and Target #2) is included as demultiplexing index information on Doppler-multiplexed signals outputted from first Doppler demultiplexer 212 will be described as an example.

For example, in a case where the chirp signal of central frequency $f_c(2)$ is used, Doppler determiner 213 may determine (may assume) that Doppler frequencies $f_{d2\_T\,\#1}$ and $f_{d2\_T\,\#2}$ of reflected waves from the two target objects (Target #1 and Target #2) have arrived at Doppler frequency intervals that are Doppler multiplexing intervals $\Delta f_{DDM}$ (or multiple $N_{mul}$ of Doppler multiplexing intervals×$\Delta f_{DDM}$). In this case, for example, Doppler determiner 213 may output demultiplexing index information on Doppler-multiplexed signals outputted from first Doppler demultiplexer 212 to direction estimator 214.

Direction estimator 214 performs direction estimation processing by using distance index $f_{b\_cfar}$ and demultiplexing index information on Doppler-multiplexed signals (q=1), which are Doppler-multiplexed and outputted from first Doppler demultiplexer 212. For example, in equation 21, direction estimator 214 may perform direction estimation processing by using q=1.

<Case 2a>

Case 2a is, for example, a case where a plurality of pieces of demultiplexing index information on Doppler-multiplexed signals outputted from second Doppler demultiplexer 212 is included in distance index $f_{b\_cfar}$ and demultiplexing index information on Doppler-multiplexed signals outputted from first Doppler demultiplexer 212 is not included in distance index $f_{b\_cfar}$, and an example thereof is a case as described below.

Ina case where there are two reflected waves from approximately the same distance to radar apparatus 10, it is expected that demultiplexing index information on Doppler-multiplexed signals with respect to the two reflected waves is outputted to demultiplexing index information on Doppler-multiplexed signals outputted from first Doppler demultiplexer 212 and demultiplexing index information on Doppler-multiplexed signals outputted from second Doppler demultiplexer 212, respectively.

However, in a case where transmission is performed by using the first chirp signal and reflected wave #1 and reflected wave #2 match Doppler multiplexing intervals $\Delta f_{DDM}$ or a multiple of Doppler multiplexing intervals as illustrated in (c) of FIG. 1, for example, a Doppler frequency component in which some Doppler-multiplexed signals overlap between reflected wave #1 and reflected wave #2 may be received.

For this reason, it becomes difficult to perform Doppler-multiplexed signal demultiplexing, which results in a case where demultiplexing index information on Doppler-multiplexed signals outputted from first Doppler demultiplexer 212 is not included.

On the other hand, even in a case where there is such a reflected wave, radar apparatus 10 satisfies the second determinable condition by transmission using the second chirp signal so that a Doppler frequency component in which some Doppler-multiplexed signals overlap between reflected wave #1 and reflected wave #2 is no longer received, which therefore results in a case where demultiplexing index information on Doppler-multiplexed signals outputted from second Doppler demultiplexer 212 is included (a case where reflected waves #1 and #2 arrive as in Case 2 is assumed) In such a case, the following operation different from that in Case 2 is performed.

Hereinafter, a case where demultiplexing index information on Doppler-multiplexed signals of reflected waves from two target objects (for example, Target #1 and Target #2) is included as demultiplexing index information on Doppler-multiplexed signals outputted from second Doppler demultiplexer 212 will be described as an example.

For example, in a case where the chirp signal of central frequency $f_c(1)$ is used, Doppler determiner 213 may determine (may assume) that Doppler frequencies $f_{d1\_T\,\#1}$ and $f_{d1\_T\,\#2}$ of reflected waves from the two target objects (Target #1 and Target #2) have arrived at Doppler frequency intervals that are Doppler multiplexing intervals $\Delta f_{DDM}$ (or multiple $N_{mul}$ of Doppler multiplexing intervals×$\Delta f_{DDM}$). In this case, for example. Doppler determiner 213 may output demultiplexing index information on Doppler-multiplexed signals outputted from second Doppler demultiplexer 212 to direction estimator 214.

Direction estimator 214 performs direction estimation processing by using distance index $f_{b\_cfar}$ and demultiplexing index information on Doppler-multiplexed signals (q=2), which are Doppler-multiplexed and outputted from second Doppler demultiplexer 212. For example, in equation 21, direction estimator 214 may perform direction estimation processing by using q=2.

Cases 1a and 2a have been described above.

As described above, in a Doppler frequency range in which Doppler frequency $f_{d\_TargetDoppler}$ of a target object is $-1/(2T_{rs}) \leq f_{d\_TargetDoppler} < 1/(2T_{rs})$, the following effect can be obtained by using central frequency $f_c(1)$ of the first chirp signal and central frequency $f_c(2)$ of the second chirp signal, which satisfy the second determinable condition.

For example, there may be a case where the Doppler frequencies of reflected waves from two target objects arrive at Doppler frequency intervals that are Doppler multiplexing intervals $\Delta f_{DDM}$ (or multiple $N_{mul}$ of Doppler multiplexing intervals×$\Delta f_{DDM}$) and it is difficult to perform Doppler demultiplexing of the target objects based on one chirp signal. Even in this case, the use of the other chirp signal (the chirp signal with a different central frequency) makes it possible to cause the intervals of the Doppler frequencies of the reflected waves from the two target objects not to match Doppler frequency intervals that are Doppler multiplexing intervals $\Delta f_{DDM}$ (or multiple $N_{mul}$ of Doppler multiplexing intervals×$\Delta f_{DDM}$), but to differ from and be larger than at least the Doppler resolution of Doppler analyzer 210. Thus, radar apparatus 10 can perform Doppler multiplexing of the two target objects.

Thus, in the modification of Embodiment 2, radar apparatus 10 may perform direction estimation processing based on the result of, between the Doppler analysis of the first chirp signal and the Doppler analysis of the second chirp signal, one Doppler analysis in which a plurality of reflected wave signals is demultiplexed.

Thus, for example, in a Doppler analysis of a reflected wave signal corresponding to one chirp signal, even in a case where the intervals of Doppler frequencies (Doppler peaks) corresponding to a plurality of reflected wave of approximately the same distance to radar apparatus 10 match the Doppler multiplexing intervals (or a multiple of a Doppler multiplexing intervals), radar apparatus 10 can demultiplex and detect the Doppler multiplexing signals corresponding to the plurality of reflected waves, respectively, based on the Doppler analysis of the reflected wave signal corresponding to the other chirp signal.

Thus, in the modification of Embodiment 2, radar apparatus 10 can improve the performance of detecting a plurality of reflected waves arriving from the same distance, it is possible to improve the target object detection probability in radar apparatus 10, and it is possible to reduce the non-detection probability. Thus, according to the modification of Embodiment 2, it is possible to improve the radar detection performance in radar apparatus 10.

Embodiment 3

In Embodiment 1, a configuration example of the radar apparatus including one radar transmission signal generator has been indicated, but the configuration of the radar apparatus is not limited thereto, and the radar apparatus including a plurality of radar transmission signal generators may also be used.

Figure 11:
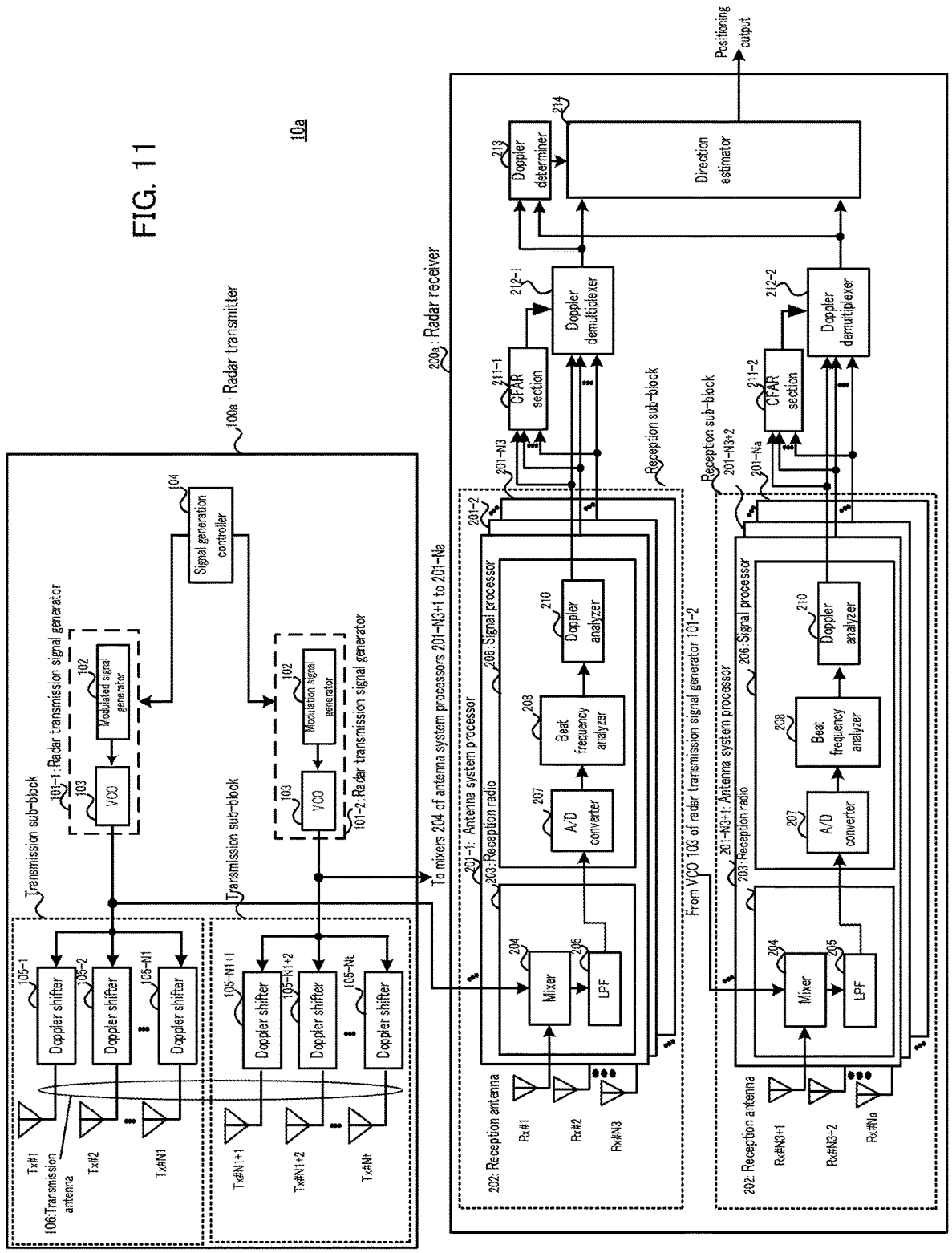
FIG. 11 illustrates a configuration example of the radar apparatus.

For example, FIG. 11 illustrates a configuration example in which radar transmitter 100a of radar apparatus 10a includes two radar transmission signal generators 101. In Embodiment 1, radar apparatus 10 is configured to include one radar transmission signal generator 101, and the operation in which radar transmission waves (for example, chirp signals) with different central frequencies are switched timewise for each transmission period $T_r$ and are alternately transmitted has been described. In the present embodiment, on the other hand, radar apparatus 10a including a plurality of radar transmission signal generators 101 simultaneously transmits radar transmission waves (for example, chirp signals) with different central frequencies from a plurality of transmission antennas 106 for each transmission period $T_r$ as illustrated in FIG. 11. Even such a configuration makes it possible to obtain the effect of extending a detectable Doppler frequency range as in Embodiment 1.

Hereinafter, with respect to the operation in the present embodiment, mainly an operation example different from that in Embodiment 1 will be described.

[Configuration Example of Radar Transmitter 100a]

As an example, FIG. 11 illustrates a configuration in which radar transmitter 100a of radar apparatus 10a includes two radar transmission signal generators 101. Hereinafter, two radar transmission signal generators 101 will be referred to as "first radar transmission signal generator 101 (or radar transmission signal generator 101-1)" and "second radar transmission signal generator 101 (or radar transmission signal generator 101-2)", respectively.

In FIG. 11, the configuration of each radar transmission signal generator 101 may be the same as in Embodiment 1. For example, each radar transmission signal generator 101 generates a radar transmission signal based on control from signal generation controller 104.

Signal generation controller 104 controls the generation of radar transmission signals with respect to first and second radar transmission signal generators 101 (for example, modulated signal generator 102 and VCO 103). For example, signal generation controller 104 may configure chirp signal-related parameters (for example, modulation parameters) such that chirp signals with different central frequencies are transmitted from first and second radar transmission signal generators 101, respectively. Hereinafter, the chirp signal generated in first radar transmission signal generator 101 will be referred to as "first chirp signal", and the chirp signal generated in second radar transmission signal generator 101 will be referred to as "second chirp signal".

As in Embodiment 1, the chirp signal-related modulation parameters may include, for example, central frequency $f_c(q)$, frequency sweep bandwidth $B_w(q)$, sweep starting frequency $f_{cstart}(q)$, sweep ending frequency $f_{cend}(q)$, frequency sweeping time $T_{sw}(q)$, and frequency sweeping rate-of-change $D_m(q)$. Note that, $D_m(q)=B_w(q)/T_{sw}(q)$. Further, $B_w(q)=f_{cend}(q)-f_{cstart}(q)$ and $f_c(q)=(f_{cstart}(q)+f_{cend}(q))/2$. Further, for example, q=1 or 2, and a case where q=1 may represent the modulation parameters of the first chirp signal, and a case where q=2 may represent the modulation parameters of the second chirp signal.

As in Embodiment 1, signal generation controller 104 may configure (or select), for example, central frequency $f_c(q)$ satisfying a predetermined condition. Further, hereinafter, a case where, among the modulation parameters configured to each of the first and second chirp signals, central frequencies $f_c(q)$ are different from each other and other modulation parameters other than the central frequency are the same (or common) will be described as an example. However, the present disclosure is not limited thereto. Since the application of one exemplary embodiment of the present disclosure requires, for example, a matching resolution of the distance axis in the first and second chirp signals, chirp signals in which frequency sweep bandwidths $B_w(q)$ are in the same relationship may be configured.

Further, signal generation controller 104 may control modulated signal generator 102 and VCO 103 such that each of two chirp signals with different central frequencies $f_c(q)$ is simultaneously transmitted (or outputted) Ne times, for example.

Figure 12:
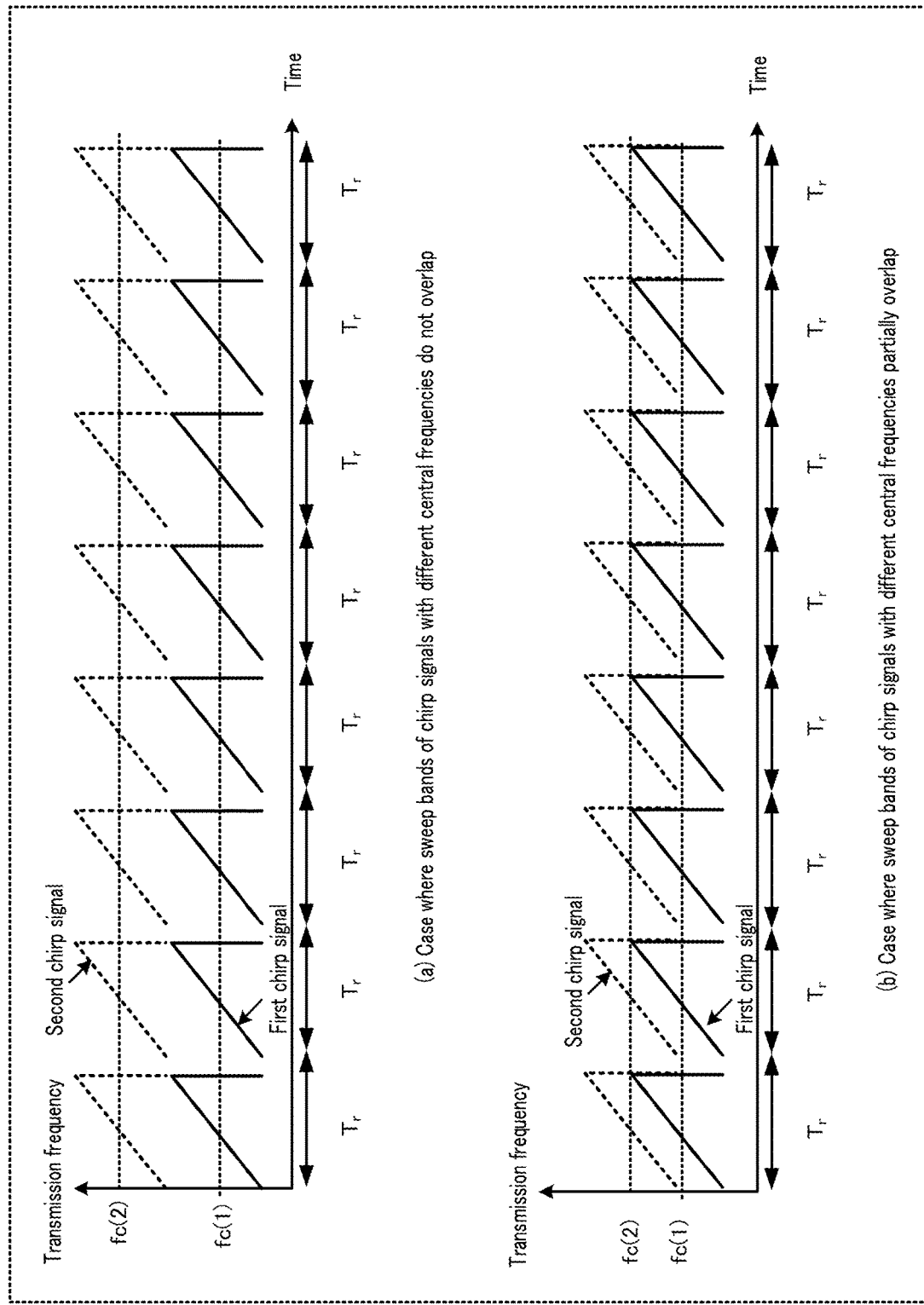
FIG. 12 illustrates examples of the radar transmission signals.

FIG. 12 illustrates examples of chirp signals (for example, the first and second chirp signals) outputted by first and second radar transmission signal generators 101 based on the control of signal generation controller 104. Note that, although FIG. 12 indicates an example of the waveform of an up-chirp in which a modulation frequency gradually increases with time, the present disclosure is not limited thereto, and a down-chirp in which a modulation frequency gradually decreases with time may also be applied. The same effect can be obtained regardless of an up-chirp modulation frequency or a down-chirp modulation frequency.

In FIG. 12, each of the first and second chirp signals is simultaneously transmitted in transmission period $T_r$. Note that, hereinafter, the frequency sweep bandwidth, the frequency sweeping time (or referred to as the range gate), and the frequency sweeping rate-of-change represent, unless otherwise specified, the same-valued parameters with respect to each of the first and second chirp signals, and may be expressed as $B_w(1)=B_w(2)=B_w$, $T_{sw}(1)=T_{sw}(2)=T_{sw}$, and $D_m(1)=D_m(2)=D_m$.

Further, the frequency sweep bandwidth of each of the chirp signals with different central frequencies may not include an overlapping band as illustrated in (a) of FIG. 12 or may include an overlapping band as illustrated in (b) of FIG. 12. In one exemplary embodiment of the present disclosure, for example, when the central frequency relationship between the first and second chirp signals satisfies a predetermined condition, the same effect can be obtained regardless of whether the frequency sweep bandwidths include an overlapping band.

Note that, in one exemplary embodiment of the present disclosure, transmission period $T_r$ may be configured to, for example, several hundreds of µs or less, and the transmission time intervals of radar transmission signals may be configured to be relatively short. Thus, for example, even in a case where the first and second chirp signals have different central frequencies, the frequency of the beat signal of a received reflected wave (for example, beat frequency index) does not change so that radar apparatus $10a$ is capable of detecting the above as a change in Doppler frequency.

The first chirp signal outputted from first radar transmission signal generator 101 (for example, VCO 103) is inputted to, among Nt Doppler shifters 105, for example, N1 Doppler shifters 105 (for example, referred to as Doppler shifters 105-1 to 105-N1), respectively. Further, the first chirp signal outputted from first radar transmission signal generator 101 is inputted to, among Na mixers 204 of radar receiver $200a$, for example, N3 mixers 204 (for example, mixers 204 of antenna system processors 201-1 to 201-N3), respectively.

On the other hand, the second chirp signal outputted from second radar transmission signal generator 101 (for example, VCO 103) is inputted to, among Nt Doppler shifters 105, for example, N2 Doppler shifters 105 (for example, referred to as Doppler shifters 105-N1+1 to 105-Nt), respectively. Further, the second chirp signal outputted from second radar transmission signal generator 101 is inputted to, among Na mixers 204 of radar receiver $200a$, for example, N4 mixers 204 (for example, mixers 204 of antenna system processors 201-N3+1 to 201-Na), respectively.

Here, N1+N2=Nt, and N3+N4=Na. Note that, N1 and N2 are two or more, respectively, and Nt may be four or more. Further, N3 and N4 are one or more, respectively, and Na may be two or more.

Then, the output signals of N1 Doppler shifters 105 to which the first chirp signal is inputted are amplified to predetermined transmission power and are radiated from each of transmission antennas 106 (for example, Tx #1 to Tx #N1) to space. Further, the output signals of N2 Doppler shifters 105 to which the second chirp signal is inputted are amplified to predetermined transmission power and are radiated from each of transmission antennas 106 (for example, Tx #N1+1 to Tx #Nt) to space. Thus, the first and second chirp signals are simultaneously transmitted for each transmission period $T_r$, respectively.

Hereinafter, N1 Doppler shifters 105 (for example, Doppler shifters 105-1 to 105-N1) to which the first chirp signal is inputted and transmission antennas 106 (for example, Tx #1 to Tx #N1) which transmit the output signals of N1 Doppler shifters 105 described above will be referred to as "first transmission sub-block". Further, N2 Doppler shifters 105 (for example, Doppler shifters 105-N1+1 to 105-Nt) to which the second chirp signal is inputted and transmission antennas 106 (for example, Tx #N1+1 to Tx #Nt) which transmit the output signals of N2 Doppler shifters 105 described above will be referred to as "second transmission sub-block".

For example, Doppler shifters 105 included in the first transmission sub-block give phase rotation $\varphi_{nsub1}$ to the first chirp signal in order to give Doppler shift amount $DOP_{nsub1}$ for each transmission period $T_r$ of the chirp signal, and output the signal subjected to the Doppler shift to transmission antennas 106 (for example, Tx #1 to Tx #N1). Here, $n_{sub1}$=an integer of 1 to N1. Further, Doppler shifters 105 included in the second transmission sub-block give phase rotation $\varphi_{nsub2}$ to the second chirp signal in order to give Doppler shift amount $DOP_{nsub2}$ for each transmission period $T_r$ of the chirp signal, and output the signal subjected to the Doppler shift to transmission antennas 106 (for example, Tx #N1+1 to Tx #Nt). Here, nsub2=an integer of 1 to N2.

Note that, an example of the method of applying Doppler shift amount $DOP_{nsub1}$ (or phase rotation $\varphi_{nsub1}$) and Doppler shift amount $DOP_{nsub2}$ (or phase rotation $\varphi_{nsub2}$) in Doppler shifters 105 included in the first and second transmission sub-blocks will be described later.

Further, in a case where Nt is an even number, the number of transmission antennas 106 included in the first transmission sub-block and the number of transmission antennas 106 included in the second transmission sub-block may be the same by configuring N1=N2, for example. Further, in a case where Nt is an odd number, the number of transmission antennas 106 included in the first transmission sub-block and the number of transmission antennas 106 included in the second transmission sub-block may be approximately the same with a difference by one transmission antenna by configuring N1=(Nt+1)/2 or N1=(Nt−1)/2, for example. Thus, the number of transmission antennas 106 (for example, transmission antennas 106 that transmit the first chirp signal) included in the first transmission sub-block and the number of transmission antennas 106 (for example, transmission antennas 106 that transmit the second chirp signal) included in the second transmission sub-block may be configured to be the same or may be configured to differ by one. By configuring the number of transmission antennas 106 included in the first transmission sub-block and the number of transmission antennas 106 included in the second transmission sub-block to be the same or approximately the same, radar apparatus $10a$ makes it possible to obtain the effect of further extending the Doppler multiplexing intervals when Doppler multiplexing is performed (for example, the effect of extending the Doppler multiplexing intervals approximately twice) by using the first and second chirp signals in comparison with Embodiment 1.

Further, Embodiment 1 switches between the first and second chirp signals by time division (for example, the first and second chirp signals are transmitted alternately for each transmission period $T_r$). Accordingly, Doppler-multiplexed signals are multiplexed and transmitted in Doppler frequency range $\pm \frac{1}{2}T_{rs}$ (where $T_{rs} > T_r$). In the present embodiment, on the other hand, the first and second chirp signals are simultaneously transmitted for each transmission period $T_r$ as illustrated in FIG. 12 so that it is possible to perform multiplexing of Doppler-multiplexed signals in Doppler frequency range $\pm \frac{1}{2}T_r$. For example, the present embodiment makes it possible to perform multiplex transmission of Doppler-multiplexed signals in a Doppler frequency range twice that in the case of Doppler multiplex transmission with $T_r=2T_r$ in Embodiment 1. Accordingly, by causing the number of transmission antennas 106 included in the first transmission sub-block and the number of transmission antennas 106 included in the second transmission sub-block to be the same or approximately the same, it is possible to obtain the effect of extending the Doppler multiplexing intervals when Doppler multiplexing is performed by using the first and second chirp signals by approximately four times in comparison with Embodiment 1.

For example, when Doppler multiplexing intervals at the time of Doppler multiplex transmission are close to each other, the interference between Doppler-multiplexed signals is likely to occur in the case of such a target object in which a Doppler component spreads, and the direction estimation accuracy deteriorates and the target object detection accuracy is likely to deteriorate. The present embodiment makes it possible to extend the Doppler multiplexing intervals when Doppler multiplexing is performed so that such occurrence of the interference between Doppler-multiplexed signals can be reduced and the deterioration of the direction estimation accuracy and the deterioration of the target object detection accuracy can be suppressed.

Further, the present embodiment makes it possible to extend the Doppler multiplexing intervals when Doppler multiplexing is performed so that the occurrence of the interference between Doppler-multiplexed signals can be reduced and the deterioration of the direction estimation accuracy and the deterioration of the target object detection accuracy can be suppressed even when more transmission antennas 106 are used in Doppler multiplex transmission Accordingly, the present embodiment makes it possible to use more transmission antennas 106 in Doppler multiplex transmission in comparison with Embodiment 1. Accordingly, in a case where Doppler multiplex transmission is performed by using more transmission antennas 106, the present embodiment is preferred in comparison with Embodiment 1.

[Configuration Example of Radar Receiver 200a]

In FIG. 11, radar receiver 200a includes, for example, Na reception antennas 202 (for example, Rx #1 to Rx #Na), which form an array antenna. Further, radar receiver 200a includes, for example, Na antenna system processors 201-1 to 201-Na, CFAR section 211, Doppler demultiplexer 212, Doppler determiner 213, and direction estimator 214.

Each reception antenna 202 receives reflected wave signals (for example, the first and second chirp signals) that are radar transmission signals reflected by a target object (target), and outputs, as reception signals, the received reflected wave signals to corresponding antenna system processors 201.

Each antenna system processor 201 includes reception radio 203 and signal processor 206.

Reception radio 203 includes mixer 204 and LPF 205. In reception radio 203, mixer 204 mixes a received reflected wave signal (reception signal) with a chirp signal that is a transmission signal.

Here, the first chirp signal outputted from first radar transmission signal generator 101-1 (for example, VCO 103) is inputted to mixers 204 of, among Na antenna system processors 201, for example, N3 antenna system processors 201 (for example, antenna system processors 201-1 to 201-N3), respectively. By passing the output of mixer 204 through LPF 205 in antenna system processors 201-1 to 201-N3, the output of mixer 204 corresponding to the reflected wave of the second chirp signal becomes a high frequency outside the pass range of LPF 205 so that a beat signal with a frequency in accordance with a delay time of the reflected wave signal of the first chirp signal is likely to be outputted from LPF 205.

In the same manner, the second chirp signal outputted from second radar transmission signal generator 101-2 (for example, VCO 103) is inputted to mixers 204 of, among Na antenna system processors 201, for example, N4 antenna system processors 201 (for example, antenna system processors 201-N3+1 to 201-Na), respectively. Bypassing the output of mixer 204 through LPF 205 in antenna system processors 201-N3+1 to 201-Na, the output of mixer 204 corresponding to the reflected wave of the first chirp signal becomes a high frequency outside the pass range of LPF 205 so that a beat signal with a frequency in accordance with a delay time of the reflected wave signal of the second chirp signal is likely to be outputted from LPF 205.

Accordingly, antenna system processors 201-1 to 201-N3 process the reflected wave signal of the first chirp signal received by reception antennas 202-1 to 202-N3. Hereinafter, antenna system processors 201 (for example, reception radio 203 and signal processor 206) that process the reflected wave of the first chirp signal, and reception antennas 202 connected to antenna system processors 201 that process the reflected wave of the first chirp signal will be referred to as "first reception sub-block".

Further, antenna system processors 201-N3+1 to 201-Na process the reflected wave signal of the second chirp signal received by reception antennas 202-N3+1 to 202-Na. Hereinafter, antenna system processors 201 (for example, reception radio 203 and signal processor 206) that process the reflected wave of the second chirp signal, and reception antennas 202 connected to antenna system processors 201 that process the reflected wave of the second chirp signal will be referred to as "second reception sub-block".

Here, N3+N4=Na. Note that, N3 and N4 may be one or more, respectively, and Na may be two or more.

Signal processor 206 of each antenna system processor 201-$z_q$ included in the q-th reception sub-block includes AD converter 207, beat frequency analyzer 208, and Doppler analyzer 210. Here, in a case where q=1, $z_1$=one of 1 to N3, and in a case where q=2, $z_2$=one of N3+1 to Na.

In signal processor 206, AD converter 207 converts a signal (for example, a beat signal) outputted from LPF 205 into discrete sample data that is discretely sampled.

Beat frequency analyzer 208 included in the q-th reception sub-block performs FFT processing on $N_{data}$ pieces of discrete sample data, which are obtained in a predetermined time range (range gate), for each transmission period $T_r$. Here, frequency sweeping time $T_{sw}(q)$ is configured for the range gate. For example, q=1 or 2, and $T_{sw}(1)$ represents the frequency sweeping time of the first chirp signal in a case where q=1, and $T_{sw}(2)$ represents the frequency sweeping time of the second chirp signal in a case where q=2. Thus, signal processor 206 outputs a frequency spectrum in which a peak appears at a beat frequency in accordance with a delay time of a reflected wave signal (radar reflected wave). Note that, during the FFT processing, beat frequency analyzer 208 may perform multiplication by a window function coefficient such as a Han window or a Hamming window, for example. The use of the window function coefficient makes it possible to suppress side lobes that appear around beat frequency peaks.

Here, a beat frequency response outputted from beat frequency analyzer 208 in $z_q$-th signal processor 206 of the q-th reception sub-block, which is obtained through the m-th chirp pulse transmission of the q-th chirp signal, is represented by $RFT_{zq}(f_b, m)$, where $f_b$ represents the beat frequency index and corresponds to the index (bin number) of FFT. For example, $f_b=0, \ldots, N_{data}/2-1$, $z_1=1$ to N3, $z_2=N3+1$ to Na, $m=1, \ldots, Nc$, and $q=1$ or 2. As beat frequency index $f_b$ decreases, beat frequency index $f_b$ indicates a beat frequency with a smaller delay time of a reflected wave signal (for example, with a closer distance to a target object).

Doppler analysis is performed by Doppler analyzer 210 in $z_q$-th signal processor 206 of the q-th reception sub-block for each distance index $f_b$ by using beat frequency responses $RFT_{zq}(f_b, 1), RFT_{zq}(f_b, 2), \ldots, RFTzq(f_b, NC)$ obtained by Nc times chirp pulse transmissions of the q-th chirp signal. For example, Doppler analyzer 210 of the q-th reception sub-block may estimate a Doppler frequency from a reflected wave signal that is the q-th chirp signal reflected by a target.

For example, in a case where Nc is the value of a power of two, FFT processing can be applied in Doppler analysis. In this case, the FFT size is Nc, and the maximum Doppler frequency at which no aliasing occurs and which is derived from the sampling theorem is $\pm 1/(2T_r)$. Further, the Doppler frequency intervals of Doppler frequency index $f_s$ are $1/(Nc \times T_r)$, and the range of Doppler frequency index $f_s$ is $f_s=-Nc/2, \ldots, 0, \ldots, Nc/2-1$.

Hereinafter, a case where Nc is the value of a power of two will be described as an example. Note that, in a case where Nc is not a power of two, inclusion of zero-padded data makes it possible to perform FFT processing with power-of-two data sizes, for example. Further, during the FFT processing, Doppler analyzer 210 may perform multiplication by a window function coefficient such as a Han window or a Hamming window. The application of the window function makes it possible to suppress side lobes that appear around beat frequency peaks.

For example, output $VFT_{zq}(f_b, f_s)$ of Doppler analyzer 210 in $z_q$-th signal processor 206 of the q-th reception sub-block is indicated by following equation 60, where j is the imaginary unit, $z_1=1$ to N3, $z_2=N3+1$ to Na, and $q=1$ or 2.

(Equation 60)

$$VFT_{z_q}(f_b, f_s) = \sum_{m=1}^{N_c} RFT_{z_q}(f_b, m)\exp\left[-\frac{j2\pi(m-1)f_s}{N_c}\right] \quad [46]$$

The processing in each component of signal processor 206 has been described above.

CFAR section 211 may include, for example, first CFAR section 211 (or CFAR section 211-1) and second CFAR section 211 (or CFAR section 211-2) that correspond to the first and second chirp signals with different central frequencies, respectively. In the same manner, Doppler demultiplexer 212 may include, for example, first Doppler demultiplexer 212 (or Doppler demultiplexer 212-1) and second Doppler demultiplexer 212 (or Doppler demultiplexer 212-2) that correspond to the first and second chirp signals with different central frequencies, respectively.

Note that, although FIG. 11 indicates a configuration in which CFAR sections 211 are provided in parallel (CFAR sections 211-1 and 211-2), it may also be configured such that one CFAR section 211 is provided and the input thereof is sequentially switched and processed. Further, although FIG. 11 indicates a configuration in which Doppler demultiplexers 212 are provided in parallel (Doppler demultiplexers 212-1 and 212-2), it may also be configured such that one Doppler demultiplexer 212 is provided and the input thereof is sequentially switched and processed.

In FIG. 11, CFAR section 211 performs CFAR processing (for example, adaptive threshold determination) by using the output from Doppler analyzer 210 of signal processor 206 included in the q-th reception sub-block and extracts distance index $f_{b\_cfar}$ and Doppler frequency index $f_{s\_cfar}$, that give a local peak signal.

As illustrated in FIG. 11, CFAR section 211 may include first CFAR section 211 (or referred to as CFAR section 211-1) that performs CFAR processing by using the output of Doppler analyzer 210 of signal processor 206 included in the first reception sub-block, and second CFAR section 211 (or referred to as CFAR section 211-2) that performs CFAR processing by using the output of Doppler analyzer 210 of signal processor 206 included in the second reception sub-block.

For example, q-th CFAR section 211 ($q=1$ or 2) performs power addition of the output of Doppler analyzer 210 of signal processor 206 included in the q-th reception sub-block as in following equation 61 and performs two-dimensional CFAR processing formed of the distance axis and the Doppler frequency axis (corresponding to the relative velocity) or CFAR processing combined with one-dimensional CFAR processing.

[47]

$$PowerFT_q(f_b,f_s)=\Sigma_{z_q}|VFT_{z_q}(f_b,f_s)|^2 \quad \text{(Equation 61)}$$

Processing disclosed in, for example, NPL 2 may be applied as the two-dimensional CFAR processing or the CFAR processing combined with the one-dimensional CFAR processing.

Here, $z_1=1$ to N3, and $z_2=N3+1$ to Na.

A threshold is adaptively configured by q-th CFAR section 211, and q-th CFAR section 211 outputs distance index $f_{b\_cfar}(q)$, Doppler frequency index $f_{s\_cfar}(q)$, and reception power information $PowerFT(f_{b\_cfar}(q), f_{s\_cfar}(q))$, which become reception power larger than the threshold, to q-th Doppler demultiplexer 212.

Doppler demultiplexer 212 may include first Doppler demultiplexer 212 (or referred to as Doppler demultiplexer 212-1) that performs Doppler demultiplexing processing by using the outputs of Doppler analyzer 210 of signal processor 206 included in the first reception sub-block and first CFAR section 211, and second Doppler demultiplexer 212 (or referred to as Doppler demultiplexer 212-2) that performs Doppler demultiplexing processing by using the outputs of Doppler analyzer 210-2 of signal processor 206 included in the second reception sub-block and second CFAR section 211.

Based on information inputted from q-th CFAR section 211 (for example, distance index $f_{b\_cfar}(q)$, Doppler frequency index $f_{s\_cfar}(q)$, and reception power information $PowerFT(f_{b\_cfar}(q), f_{s\_cfar}(q))$), q-th Doppler demultiplexer 212 ($q=1$ or 2) demultiplexes a transmission signal to be transmitted from each transmission antenna 106 (for example, a reflected wave signal with respect to the transmission signal) from a Doppler-multiplexed and transmitted signal (hereinafter referred to as "Doppler-multiplexed signal") by using the output from Doppler analyzer 210 included in the q-th reception sub-block.

For example, q-th Doppler demultiplexer 212 outputs information on a demultiplexed signal to Doppler determiner 213 and direction estimator 214. The information on a demultiplexed signal may include, for example, distance index $f_{b\_cfar}(q)$ and Doppler frequency index (hereinafter may also be referred to as demultiplexing index information) both of which correspond to the demultiplexed signal. Here, the demultiplexing index information of first Doppler demultiplexer 212 is Doppler frequency indices which are obtained by demultiplexing signals transmitted from transmission antennas Tx #1, Tx #2, . . . Tx #N1 included in the first transmission sub-block, and which will be referred to as ($f_{demul\_Tx\ \#1}$, $f_{demul\_Tx\ \#2}$, . . . , $f_{demul\_Tx\ \#N1}$) correspondingly. In the same manner, the demultiplexing index information of second Doppler demultiplexer 212 is Doppler frequency indices which are obtained by demultiplexing signals transmitted from transmission antennas Tx #N1+1, Tx #N1+2, . . . , and Tx #Nt included in the second transmission sub-block, and which will be referred to as ($f_{demul\_Tx\ \#N1+1}$, $f_{demul\_Tx\ \#N1+2}$, . . . , $f_{demul\_Tx\ \#Nt}$) correspondingly.

Further, q-th Doppler demultiplexer 212 outputs the output from q-th Doppler analyzer 210 to direction estimator 214. Note that, based on information inputted from q-th CFAR section 211 (for example, distance index $f_{b\_cfar}(q)$. Doppler frequency index $f_{s\_cfar}(q)$, and reception power information PowerFT($f_{b\_cfar}(q)$, $f_{s\_cfar}(q)$)), q-th Doppler demultiplexer 212 may also output the output from Doppler analyzer 210 included in the q-th reception sub-block to direction estimator 214.

Hereinafter, an operation example of q-th Doppler demultiplexer 212 will be described along with the operation of Doppler shifter 105 in radar transmitter 100a.

[Method of Configuring Doppler Shift Amount]

Doppler shifters 105-1 to 105-N1 included in the first transmission sub-block give phase rotation $\varphi_{nsub1}$ to the first chirp signal in order to give Doppler shift amount $DOP_{nsub1}$ for each transmission period $T_r$ of the chirp signal, and output the signal subjected to the Doppler shift to transmission antennas 106 (for example, Tx #1 to Tx #N1). Here, $n_{sub1}$=1 to N1. In the present embodiment, among Doppler shifters 105-1 to 105-N1 (or among transmission antennas 106-1 to 106-N1), the intervals of Doppler shift amounts $DOP_{nsub1}$ (Doppler shift intervals) may not be configured to be equal, but may be configured such that at least one Doppler interval is different.

For example, $n_{sub1}$-th Doppler shifter 105 gives phase rotation $\varphi_{nsub1}(m)$ to the m-th first chirp signal, which is inputted, such that Doppler shift amounts $DOP_{nsub1}$ are different from each other, and outputs the chirp signal. Thus, Doppler shift amounts different from each other are given to transmission signals to be transmitted from the plurality of transmission antennas 106. For example, Doppler multiplexing number $N_{DM}$=N1 may be in the present embodiment. Here, m=an integer of 1 to Nc, and nsub1=an integer of 1 to N1.

In the same manner, Doppler shifters 105-N1+1 to 105-Nt included in the second transmission sub-block give phase rotation $\varphi_{nsub2}$ to the second chirp signal in order to give Doppler shift amount $DOP_{nsub2}$ for each transmission period $T_r$ of the chirp signal, and output the signal subjected to the Doppler shift to transmission antennas 106 (for example. Tx #N1+1 to Tx #Nt). Here, nsub2=1 to N2. In the present embodiment, among Doppler shifters 105-N1+1 to 105-Nt (or among transmission antennas 106-1 to 106-Nt), the intervals of Doppler shift amounts $DOP_{nsub2}$ (Doppler shift intervals) may not be configured to be equal, but may be configured such that at least one Doppler interval is different.

Thus, by configuring the Doppler shift amounts in Doppler shifters 105 of the first and second transmission sub-blocks, first Doppler demultiplexer 212 to be described later is capable of demultiplexing Doppler indices Tx #1 to Tx #N1 and calculating Doppler frequencies in a range of $\pm 1/T_r$ by the same operation as Doppler demultiplexer 212 in Embodiment 1. Further, second Doppler demultiplexer 212 to be described later is capable of demultiplexing, Doppler indices Tx #N1+1 to Tx #Nt and calculating Doppler frequencies in the range of $\pm 1/T_r$ by the same operation as Doppler demultiplexer 212 in Embodiment 1. Based on the outputs of these Doppler demultiplexers 212, Doppler determiner 213 to be described later is capable of determining the presence or absence of times of aliasing of a Doppler frequency based on the difference in Doppler frequency and calculating a Doppler frequency exceeding the range of $1/T_r$ by the same operation as Doppler determiner 213 in Embodiment 1.

Since the operation of Doppler shifters 105-1 to 105-N1 included in the first transmission sub-block is the same as the operation in which "Nt" is replaced with "N1" and "$T_{rs}$" is replaced with "$T_r$" in the description of the operation among Doppler shifters 105-1 to 105-Nt (or among transmission antennas 106-1 to 106-Nt) in Embodiment 1, a description of the detailed operation thereof will be omitted.

Further, since the operation of Doppler shifters 105-N1+1 to 105-Nt included in the second transmission sub-block is the same as the operation in which "Nt" is replaced with "N2" and "$T_{rs}$" is replaced with "$T_r$" in the description of the operation among Doppler shifters 105-N1+1 to 105-Nt (or among transmission antennas 106-N1+1 to 106-Nt) in Embodiment 1, a description of the detailed operation thereof will be omitted.

For example, with respect to equation 5 described in Embodiment 1, in the present embodiment, Doppler shifters 105-1 to 105-N1 of the first transmission sub-block give phase rotation $\varphi_{nsub1}(m)$ as in following equation 62 to the m-th first chirp signal, which has been inputted, such that Doppler shift amounts $DOP_{nsub1}$ are different from each other among Doppler shifters 105.

(Equation 62)

$$\phi_{nsub1}(m) = \left\{ A \frac{2\pi}{N_c} \text{round}\left(\frac{N_c}{N1+\delta 1}\right)(n-1) + \Delta\phi_{01} \right\}(m-1) + \phi_{01} \quad [48]$$

In the same manner, Doppler shifters 105-N1+1 to 105-Nt of the second transmission sub-block give phase rotation $\varphi_{nsub2}(m)$ as in following equation 63 to the m-th second chirp signal, which has been inputted, such that Doppler shift amounts $DOP_{nsub2}$ are different from each other among Doppler shifters 105.

(Equation 63)

$$\phi_{nsub2}(m) = \left\{ A \frac{2\pi}{N_c} \text{round}\left(\frac{N_c}{N2+\delta 2}\right)(n-1) + \Delta\phi_{02} \right\}(m-1) + \phi_{02} \quad [49]$$

Here, A is a coefficient giving positive or negative polarity, which is 1 or −1. Further, δ1 and δ2δ are integers larger than or equal to one. Note that, the terms round($N_c/(N1+\delta 1)$) and round($N_c/(N2+\delta 2)$) are introduced in order to cause the phase rotation amount to be an integer multiple of the Doppler frequency interval in Doppler analyzer 210, but the present disclosure is not limited thereto, and $2\pi(N1+\delta 1)$ may also be used instead of the term $(2\pi/N_c)\times$round($N_c/(N1+$ δ1)) in equation 62. In the same manner, $2\pi/(N2+\delta2)$ may also be used instead of the term $(2\pi/Nc)\times \text{round}(Nc/(N2+\delta2))$ in equation 63.

Further, $\varphi01$ and $\varphi02$ are initial phases, respectively, and may be equal to or different from each other. For example, the Doppler frequencies match even when $\varphi01$ and $\varphi02$ are equal to or different from each other. Further, $\Delta\varphi01$ and $\Delta\varphi02$ are reference Doppler shift phases, and may be equal to or different from each other. For example, the Doppler frequencies match even when $\Delta_{\varphi01}$ and $\Delta_{\varphi02}$ are equal to or different from each other.

For example, radar apparatus 10a performs Doppler multiplexing with unequal intervals on the first and second chirp signals with Doppler multiplexing numbers N1 and N2, respectively.

Note that, hereinafter, $(2\pi/Nc)\times\text{round}(Nc/(N1+\delta1))$ or $2\pi/(N1+\delta1)$ in equation 62 will be referred to as Doppler multiplexing intervals "$\Delta DOP_{min\ 1}$" of a Doppler-multiplexed signal to be assigned to the first chirp signal. In the same manner, $(2\pi/Nc)\times\text{round}(Nc/(N2+\delta2))$ or $2\pi/(N2+\delta2)$ in equation 63 will be referred to as Doppler multiplexing intervals "$\Delta DOP_{min\ 2}$" of a Doppler-multiplexed signal to be assigned to the second chirp signal.

As an example of a case where number Nt of transmission antennas=four, phase rotation $\varphi_{nsub1}(m)=2\pi(nsub1-1)\times(m-1)/3$ is given to the first chirp signal for each transmission period $T_r$ with N1=2, $\Delta\varphi_{01}=0$, $\varphi_{01}=0$, A=1, $\delta1=1$, and Nc as a multiple of three in equation 62 so that the Doppler shift amounts become $DOP_1=\varphi_1(m)/(\{2\pi(m-1)T_r\})=0$ and $DOP_2=\varphi_2(m)/\{2\pi(m-1)T_r\}=1/(3T_r)$. Each upper stage of (a) to (d) of FIG. 13 indicates a Doppler-multiplexed signal mapping example when the first chirp signal is transmitted.

Further, as an example of a case where number Nt of transmission antennas=four, phase rotation $\varphi_{nsub2}(m)=2\pi(nsub2-1)\times(m-1)/3$ is given to the second chirp signal for each transmission period $T_r$ with Nt=4, N2=2, $\Delta\varphi_{02}=0$, $\varphi_{02}=0$, A=1, $\delta2=1$, and Nc as a multiple of three in equation 63 so that the Doppler shift amounts become $DOP_1=0$ and $DOP_2=1/(3T_r)$. Each lower stage of (a) to (d) of FIG. 13 indicates a Doppler-multiplexed signal mapping example when the second chirp signal is transmitted.

Figure 13:
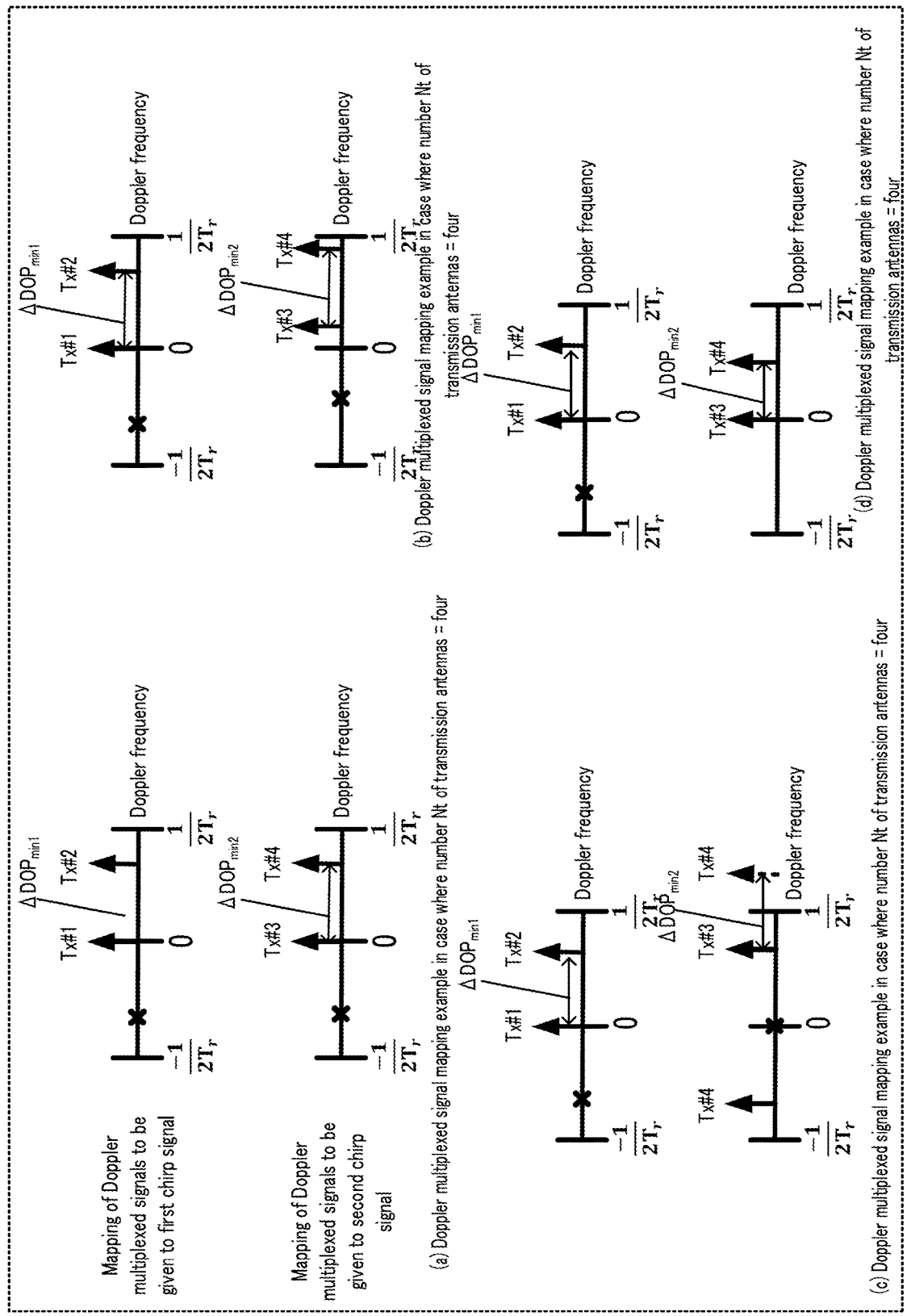
FIG. 13 illustrates examples of Doppler multiplex transmission.

The mappings of Doppler-multiplexed signals with respect to the first and second chirp signals indicated in (a) of FIG. 13 are the same mapping. Such mapping enables Doppler determiner 213 to be described later to easily calculate a Doppler frequency deviation in Doppler-multiplexed signals multiplexed into the first and second chirp signals when the first and second chirp signals are received.

Note that, the mapping of Doppler-multiplexed signals is not limited to the example of (a) in FIG. 13, and Doppler-multiplexed signals with respect to the first and second chirp signals may be differently mapped as illustrated in (b) of FIG. 13, (c) of FIG. 13, and (d) of FIG. 13, for example.

For example, in (b) of FIG. 13, by causing $\Delta\varphi02\neq0$ in equation 63, a Doppler-multiplexed signal with respect to the second chirp signal may be mapped with offset by a predetermined Doppler frequency in the Doppler-multiplexed signal mapping with respect to the first chirp signal.

Further, in (c) of FIG. 13, for example, two Doppler-multiplexed signals among those in which the Doppler range of $\pm 1/T_r$ is divided by three $(=(N2+\delta2))$ with respect to each of the first and second chirp signals are assigned. In (c) of FIG. 13, a Doppler-multiplexed signal with respect to the first chirp signal may be mapped with nsub1=one or two in equation 62, and a Doppler-multiplexed signal with respect to the second chirp signal may be mapped with nsub2=two or three in equation 63. For example, the assignment of Doppler-multiplexed signals in division by $(N1+\delta1)$ $(=(N2+\delta2))$ may be differently configured with Doppler-multiplexed signals between the first and second chirp signals.

Further, for example, in (d) of FIG. 13, by causing $\delta2$=two in equation 63, a different assignment (for example, $\Delta DOP\ min\ 1 \neq \Delta DOP\ min\ 2$) from that in the Doppler multiplexing intervals of a Doppler-multiplexed signal with respect to the first chirp signal may be applied to a Doppler-multiplexed signal with respect to the second chirp signal.

Further, as an example of a case where number Nt of transmission antennas=five, phase rotation $\varphi_{nsub1}(m)=\pi(nsub1-1)\times(m-1)/2$ is given to the first chirp signal for each transmission period $T_r$ with N1=2, $\Delta_{\varphi01}=0$, $\varphi_{01}=0$, A=1, $\delta1=2$, and Nc as a multiple of four in equation 62 so that the Doppler shift amounts become $DOP_1=\varphi_1(m)/(2\pi(m-1)T_1)=0$ and $DOP_2=\varphi_2(m)/\{2\pi(m-1)T_r\}=1/(4T_r)$. Each upper stage of (a) to (d) of FIG. 14 indicates a Doppler-multiplexed signal mapping example when the first chirp signal is transmitted.

Further, as an example of a case where number Nt of transmission antennas=five, phase rotation $\varphi_{nsub2}(m)=\pi\times(m-1)/2$ is given to the second chirp signal for each transmission period $T_r$ with Nt=5, N2=3, $\Delta\varphi_{02}2=0$, $\varphi_{02}=0$, A=1, $\delta2=1$, and Nc as a multiple of four in equation 63 so that the Doppler shift amounts become $DOP_1=0$ and $DOP_2=1/(4T_r)$. Each lower stage of (a) to (d) of FIG. 14 indicates a Doppler-multiplexed signal mapping example when the second chirp signal is transmitted.

Figure 14:
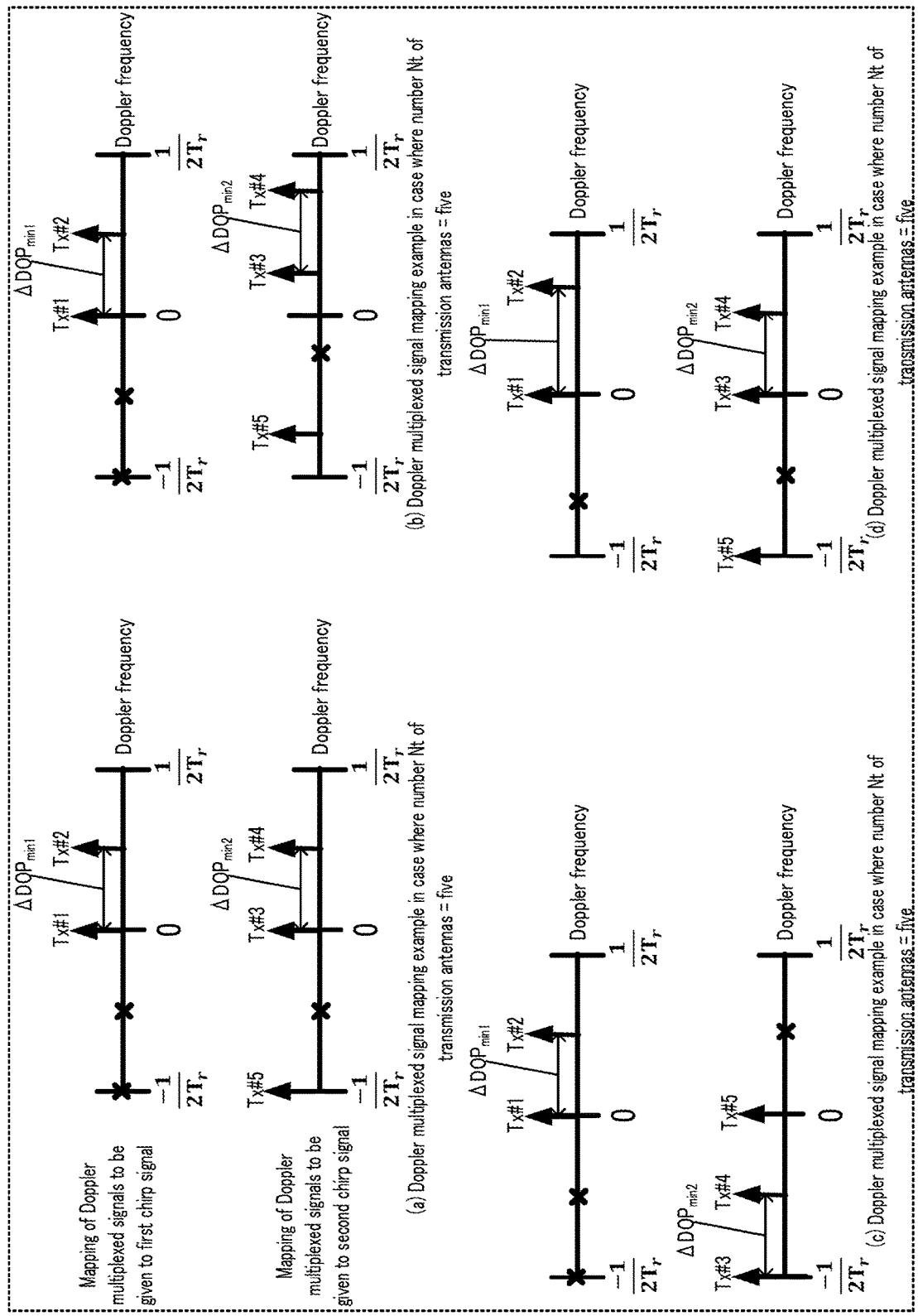
FIG. 14 illustrates examples of the Doppler multiplex transmission.

The mappings of Doppler-multiplexed signals with respect to the first and second chirp signals indicated in (a) of FIG. 14 are the same mapping. Such mapping enables Doppler determiner 213 to be described later to easily calculate a Doppler frequency deviation in Doppler-multiplexed signals multiplexed into the first and second chirp signals when the first and second chirp signals are received.

Note that, the mapping of Doppler-multiplexed signals is not limited to the example of (a) in FIG. 14, and Doppler-multiplexed signals with respect to the first and second chirp signals may be differently mapped as illustrated in (b) of FIG. 14, (c) of FIG. 14, and (d) of FIG. 14, for example.

For example, in (b) of FIG. 14, by causing $\Delta\varphi_{02}=0$ in equation 63, a Doppler-multiplexed signal with respect to the second chirp signal may be mapped with offset by a predetermined Doppler frequency in the Doppler-multiplexed signal mapping with respect to the first chirp signal.

Further, in (c) of FIG. 14, for example, two or three Doppler-multiplexed signals among those in which the Doppler range of $\pm 1/T_r$ is divided by four $(=(N2+\delta2))$ with respect to each of the first and second chirp signals are assigned. In (c) of FIG. 14, a Doppler-multiplexed signal with respect to the first chirp signal may be mapped with nsub1=one or two in equation 62, and a Doppler-multiplexed signal with respect to the second chirp signal may be mapped with nsub2=three, four, or five in equation 63. For example, the assignment of Doppler-multiplexed signals in division by $(N1+\delta1)(=(N2+\delta2))$ may be differently configured with Doppler-multiplexed signals between the first and second chirp signals.

Further, for example, in (d) of FIG. 14, by causing $\delta1$=one in equation 62, a different assignment (for example, $\Delta DOPmin\ 1 \neq \Delta DOPmin\ 2$) from that in the Doppler multiplexing intervals of a Doppler-multiplexed signal with respect to the first chirp signal may be applied to a Doppler-multiplexed signal with respect to the second chirp signal.

[Operation Example of Doppler Demultiplexer 212]

First Doppler demultiplexer 212 demultiplexes and receives signals that are transmitted by being configured such that, among Doppler shifters 105-1 to 105-N1 (for example, among transmission antennas 106-1 to 106-N1) included in the first transmission sub-block, the intervals of Doppler shift amounts DOPnsub1 (Doppler shift intervals) are not equal, but at least one Doppler interval is different.

First Doppler demultiplexer 212 demultiplexes signals that are Doppler-multiplexed at unequal intervals by the same operation as in Embodiment 1 based on the outputs of Doppler analyzer 210 and CFAR section 211 in the first reception sub-block. Then, first Doppler demultiplexer 212 outputs distance index $f_{b\_cfar}(1)$, demultiplexing index information ($f_{demul\_Tx\ \#1}$, $f_{demul\_Tx\ \#2}$, ..., $f_{demul\_Tx\ \#N1}$) on N1 Doppler-multiplexed signals multiplexed and transmitted in the first transmission sub-block in distance index $f_{b\_cfar}(1)$, and the output of Doppler analyzer 210 to Doppler determiner 213.

Note that, correspondingly to the fact that the operation of Doppler shifters 105-1 to 105-N1 included in the first transmission sub-block becomes the same as the operation in which Nt is replaced with N1 and $T_{rs}$ is replaced with $T_r$ in the description of the operation among Doppler shifters 105-1 to 105-Nt (for example, among transmission antennas 106-1 to 106-Nt) of Embodiment 1, the operation of first Doppler demultiplexer 212 makes it possible to demultiplex signals that are Doppler-multiplexed among transmission antennas 106-1 to 106-N1 by using the same operation as the operation in which "Nt" is replaced with "N1" and "$T_{rs}$" is replaced with "$T_r$" in the description of the operation of Doppler shifter 105 of Embodiment 1. Accordingly, a detailed description of the operation of first Doppler demultiplexer 212 will be omitted.

Further, second Doppler demultiplexer 212 demultiplexes and receives signals that are transmitted by being configured such that, among Doppler shifters 105-N1+1 to 105-Nt (for example, among transmission antennas 106-N1+1 to 106-Nt) included in the second transmission sub-block, the intervals of Doppler shift amounts $DOP_{nsub2}$ (Doppler shift intervals) are not equal, but at least one Doppler interval is different.

Second Doppler demultiplexer 212 demultiplexes signals that are Doppler-multiplexed at unequal intervals by the same operation as in Embodiment 1 based on the outputs of Doppler analyzer 210 and CFAR section 211 in the second reception sub-block. Then, second Doppler demultiplexer 212 outputs distance index $f_{b\_cfar}(2)$, demultiplexing index information ($f_{demul\_Tx\ \#N1+1}$, $f_{demul\_Tx\ \#N1+2}$, ..., $f_{demul\_Tx\ \#Nt(=N1+N2)}$) on N2 Doppler-multiplexed signals multiplexed and transmitted in the second transmission sub-block in distance index $f_{b\_cfar}(2)$, and the output of Doppler analyzer 210 to Doppler determiner 213.

Note that, correspondingly to the fact that the operation of Doppler shifters 105-N1+1 to 105-Nt included in the second transmission sub-block becomes the same as the operation in which Nt is replaced with N2 and $T_{rs}$ is replaced with $T_r$ in the description of the operation among Doppler shifters 105-1 to 105-Nt (for example, among transmission antennas 106-1 to 106-Nt) of Embodiment 1, the operation of second Doppler demultiplexer 212 makes it possible to demultiplex signals that are Doppler-multiplexed among transmission antennas 106-N1+1 and 106-Nt by using the same operation as the operation in which "Nt" is replaced with "N2" and "$T_{rs}$" is replaced with "$T_r$" in the description of the operation of Doppler shifter 105 of Embodiment 1. Accordingly, a detailed description of the operation of second Doppler demultiplexer 212 will be omitted.

[Operation Example of Doppler Determiner 213]

In FIG. 11. Doppler determiner 213 determines Doppler frequencies corresponding to Doppler peaks based on the respective outputs of first Doppler demultiplexer 212 and second Doppler demultiplexer 212. For example, even in a case where a target object with target object Doppler frequency $f_{d\_TargetDoppler}$ exceeding Doppler frequency range $-1/(2T_{rs}) \leq f_{d\_TargetDoppler} \leq 1/(2T_r)$ is included, Doppler determiner 213 can further extend a Doppler detection range by determining the Doppler frequency of the target object.

For example, Doppler determiner 213 determines the Doppler frequency of a target object including a Doppler frequency exceeding Doppler frequency range $-1/(2T_r) \leq f_{d\_TargetDoppler} \leq 1/(2T_{rs})$ by using demultiplexing index information ($f_{demul\_Tx\ \#1}$, $f_{demul\_Tx\ \#2}$, ..., $f_{demul\_Tx\ \#Nt}$) on Doppler-multiplexed signals outputted from first Doppler demultiplexer 212 and demultiplexing index information ($f_{demul\_Tx\ \#N1+1}$, $f_{demul\_Tx\ \#N1+2}$, ..., $f_{demul\_Tx\ \#Nt}$) on Doppler-multiplexed signals outputted from second Doppler demultiplexer 212, where distance index $f_{b\_cfar}(1)$ and distance index $f_{b\_cfar}(2)$ are common.

The principle for Doppler determiner 213 to determine the Doppler frequency of a target object including a Doppler frequency exceeding Doppler frequency range $-1/(2T_r) \leq f_{d\_TargetDoppler} \leq 1/(2T_r)$ utilizes, as in Embodiment 1, the fact that central frequencies between the first and second chirp signals, which are radar transmission signals generated by signal generation controller 104 and radar transmission signal generator 101, differ from each other.

In Embodiment 1, Doppler frequencies are determined based on changes in Doppler frequencies in Doppler-multiplexed signals with respect to the same transmission antenna 106. In the present embodiment, on the other hand, Doppler determiner 213 determines Doppler frequencies based on changes in Doppler frequencies in Doppler-multiplexed signals with respect to different transmission antennas 106. In a case where different transmission antennas 106 are used, the reception phase changes, but the Doppler frequency to be received does not change. Accordingly, as in Embodiment 1, Doppler determiner 213 can determine the Doppler frequency of a target object including a Doppler frequency exceeding Doppler frequency range $-1/(2T_r) \leq f_{d\_TargetDoppler} \leq 1/(2T_r)$.

The operation principle of the Doppler frequency determination processing and an operation example of Doppler determiner 213 differ in description from the operation principle of the Doppler frequency determination processing and an operation example of Doppler determiner 213 in Embodiment 1 in terms of the following points (1), (2) and (3).

(1) "$T_{rs}$" is replaced with "$T_r$";

(2) Doppler determiner 213 in Embodiment 1 calculates, based on demultiplexing index information ($f_{demul\_Tx\ \#1}(1)$, $f_{demul\_Tx\ \#2}(1)$, ..., $f_{demul\_Tx\ \#Nt}(1)$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(2T_{rs}) \leq f_{d\_TargetDoppler} \leq 1/(2T_{rs})$, whereas in the present embodiment, Doppler determiner 213 calculates, based on demultiplexing index information ($f_{demul\_Tx\ \#1}$, $f_{demul\_Tx\ \#2}$, ..., $f_{demul\_Tx\ \#Nt}$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(2T_r) \leq f_{d\_TargetDoppler} \leq 1/(2T_r)$; and (3) Doppler determiner 213 in Embodiment 1 calculates, based on demultiplexing index information ($f_{demul\_Tx\ \#1}(2)$, $f_{demul\_Tx\ \#2}(2)$, ..., $f_{demul\_Tx\ \#Nt}(2)$) on Doppler-multiplexed signals in distance index $f_{b\_cfar}(2)$ outputted from second Doppler demultiplexer 212, estimated Doppler frequency value $f_{d\_VFT}(2)$ in a case where the Doppler frequency of a target object is assumed to be within Doppler frequency range $-1/(2T_{rs}) \leq f_{d\_TargetDoppler} \leq 1/(2T_{rs})$, whereas in the present embodiment, Doppler determiner 213 calculates, based on demultiplexing index information ($f_{demul\_Tx\ \#N1+1}$, $f_{demul\_Tx\ \#N1+2}$, ..., $f_{demul\_Tx\ \#Nt}$) on Doppler-multiplexed signals in distance index $f_{b\_cfar}(2)$ outputted from second Doppler demultiplexer 212, estimated Doppler frequency value $f_{d\_VFT}(2)$ in a case where the Doppler frequency of a target object is assumed to be within Doppler frequency range $-1/(2T_r) \leq f_{d\_TargetDoppler} \leq 1/(2T_r)$.

In the present embodiment, the operation of Doppler determiner 213 other than the three points described above is the same as in Embodiment 1 so that a description of the operation thereof will be omitted.

Further, as with Doppler determiner 213 in Embodiment 1, Doppler determiner 213 can determine the Doppler frequency of a target object by configuring central frequencies $f_c(1)$ and $f_c(2)$ satisfying one of the determinable conditions of equations 10 to 15 in which "$T_{rs}$" is replaced with "$T_r$" even in a case where a target object with a Doppler frequency exceeding Doppler frequency range $-1/(2T_r) \leq f_{d\_TargetDoppler} \leq 1/(2T_r)$ is included (for example, in a case where Doppler aliasing occurs). Note that, although equations 10 and 13 are equations including $T_{rs}$, equation modification makes it possible to obtain equations including no $T_{rs}$ as in equations 11, 12, 14, and 15. Accordingly, the condition for central frequencies $f_c(1)$ and $f_c(2)$ satisfying the determinable condition(s) becomes the same condition as in Embodiment 1.

Note that, equation 18 used in the description of Embodiment 1 is expressed as in following equation 64 by replacing $T_{rs}$ with $T_r$.

(Equation 64)

$$\frac{1}{2T_r} > \left| \frac{f_c(2)}{f_c(1)} \frac{n_{al}}{T_r} - \frac{n_{al}}{T_r} \right| = \Delta_{n_{al}} \quad [50]$$

Equation 64 represents the condition that the difference between Doppler frequency aliasing component $n_{a1} \times (f_c(2)/f_c(1))/T_r$ observed by using the second chirp signal of central frequency $f_c(2)$ and $n_{a1}/T_r$ which is the frequency intervals of number $n_{a1}$ of times of aliasing of first Doppler analyzer 210 does not exceed $\pm 1/(2T_r)$ in the case of number $n_{a1}$ of Doppler aliasing. For example, in a case where $n_{a1}$ is positive, $\Delta n_{a1}$ is in the range of $\pm 1/(2T_r)$ until maximum $n_{a1}$ satisfying equation 19, and Doppler determiner 213 can estimate aliasing without ambiguity. Note that, maximum $n_{a1}$ satisfying equation 19 is referred to as "$n_{a1\ max}$". For example, in a case where $n_{a1}$ is negative, equation 19 is satisfied in the same manner when $n_{a1} = -n_{a1\ max}$.

Here, in Embodiment 1, the first chirp signal or the second chirp signal is transmitted in period $T_{rs}$, and the Doppler frequency detection range is extended $n_{a1\ max}$ times with respect to the Doppler frequency range at the time of one transmission antenna, for example. In the present embodiment, on the other hand, the first and second chirp signals are transmitted in period $T_r$ so that the Doppler frequency detection range is extended $2 \times n_{a1\ max}$ times with respect to the Doppler frequency range at the time of one transmission antenna, for example. Accordingly, in comparison with Embodiment 1, the present embodiment makes it possible to further extend the Doppler frequency detection range with respect to the condition for central frequencies $f_c(1)$ and $f_c(2)$ of the same chirp signal.

For example, when $f_c(1)$ and $f_c(2)$ satisfy the condition in a case where $n_{a1\ max}$=one, the detection range of Doppler frequency $f_d$ becomes $\pm 1/(T_r)$, which is extended twice with respect to Doppler frequency range $\pm 1/(2T_r)$ at the time of one transmission antenna. Further, for example, when $f_c(1)$ and $f_c(2)$ satisfy the condition in a case where $n_{a1\ max}$=two, the detection range of Doppler frequency $f_d$ becomes $\pm 2/(T_r)$, which is extended four times with respect to Doppler frequency range $1/(2T)$ at the time of one transmission antenna.

An operation example of Doppler determiner 213 has been described above.

[Operation Example of Direction Estimator 214]

In FIG. 11, direction estimator 214 extracts the outputs of first Doppler analyzer 210 and second Doppler analyzer 210 based on information inputted from first Doppler demultiplexer 212 (for example, distance index $f_{b\_cfar}(1)$, and demultiplexing index information ($f_{demul\_Tx\ \#1}$, $f_{demul\_Tx\ \#2}$, ..., $f_{demul\_Tx\ \#N1}$) on Doppler-multiplexed signals in distance index $f_{b\_cfar}(1)$) and information inputted from second Doppler demultiplexer 212 (for example, distance index $f_{b\_cfar}(2)$, and demultiplexing index information ($f_{demul\_Tx\ \#N1+1}$, $f_{demul\_Tx\ \#N1+2}$, ..., $f_{demul\_Tx\ \#Nt}$) on Doppler-multiplexed signals in distance index $f_{b\_cfar}(2)$) and performs target direction estimation processing.

In the present embodiment. N1×N3 MIMO virtual reception antennas are configured between N1 transmission antennas 106 included in the first transmission sub-block and N3 reception antennas 202 included in the first reception sub-block. In the same manner. N2×N4 MIMO virtual reception antennas are configured between N2 transmission antennas 106 included in the second transmission sub-block and N4 reception antennas 202 included in the second reception sub-block. Direction estimator 214 may perform direction estimation processing by using these two sets of virtual reception antennas.

For example, direction estimator 214 extracts the output of first Doppler analyzer 210 from the output of first Doppler demultiplexer 212 based on distance index $f_{b\_cfar}(1)$ and demultiplexing index information ($f_{demul\_Tx\ \#1}$, $f_{demul\_Tx\ \#2}$, ..., $f_{demul\_Tx\ \#N1}$) on Doppler-multiplexed signals, and generates first virtual reception array correlation vector $h_1(f_{b\_cfar}(1), f_{demul\_Tx\ \#1}, f_{demul\_Tx\ \#2}, ..., f_{demul\_Tx\ \#N1})$ formed of N1×N3 elements as indicated by following equation 65.

(Equation 65)

$$h_1(f_{b\_cfar}, f_{demul\_Tx\#1}, f_{demul\_Tx\#2}, \ldots, f_{demul\_Tx\#N1}) = \begin{bmatrix} h_{1cal[1]}VFT_1(f_{b\_cfar}, f_{demul\_Tx\#1}) \\ h_{1cal[2]}VFT_2(f_{b\_cfar}, f_{demul\_Tx\#1}) \\ \vdots \\ h_{1cal[N3]}VFT_{N3}(f_{b\_cfar}, f_{demul\_Tx\#1}) \\ h_{1cal[N3+1]}VFT_1(f_{b\_cfar}, f_{demul\_Tx\#2}) \\ h_{1cal[N3+2]}VFT_2(f_{b\_cfar}, f_{demul\_Tx\#2}) \\ \vdots \\ h_{1cal[2N3]}VFT_{N3}(f_{b\_cfar}, f_{demul\_Tx\#2}) \\ \vdots \\ h_{1cal[N3(N1-1)+1]}VFT_1(f_{b\_cfar}, f_{demul\_Tx\#N1}) \\ h_{1cal[N3(N1-1)+2]}VFT_2(f_{b\_cfar}, f_{demul\_Tx\#N1}) \\ \vdots \\ h_{1cal[N3N1]}VFT_{N3}(f_{b\_cfar}, f_{demul\_Tx\#N1}) \end{bmatrix} \quad [51]$$

Further, for example, direction estimator 214 extracts the output of second Doppler analyzer 210 from the output of second Doppler demultiplexer 212 based on distance index $f_{b\_cfar}(2)$ and demultiplexing index information ($f_{demul\_Tx\ \#N1+1}, f_{demul\_Tx\ \#N1+2}, \ldots, f_{demul\_Tx\ \#Nt}$) on Doppler-multiplexed signals, and generates second virtual reception array correlation vector $h_2(f_{b\_cfar}(2), f_{demul\_Tx\ \#N1+1}, f_{demul\_Tx\ \#N1+2}, \ldots, f_{demul\_Tx\ \#Nt})$ formed of N2×N4 elements as indicated by following equation 66.

(Equation 66)

$$h_2(f_{b\_cfar}, f_{demul\_Tx\#N1+1}, f_{demul\_Tx\#N1+2}, \ldots, f_{demul\_Tx\#Nt}) = \begin{bmatrix} h_{2cal[1]}VFT_{N3+1}(f_{b\_cfar}, f_{demul\_Tx\#N1+1}) \\ h_{2cal[2]}VFT_{N3+2}(f_{b\_cfar}, f_{demul\_Tx\#N1+1}) \\ \vdots \\ h_{2cal[N4]}VFT_{Na}(f_{b\_cfar}, f_{demul\_Tx\#N1+1}) \\ h_{2cal[N4+1]}VFT_{N3+1}(f_{b\_cfar}, f_{demul\_Tx\#N1+2}) \\ h_{2cal[N4+2]}VFT_{N3+2}(f_{b\_cfar}, f_{demul\_Tx\#N1+2}) \\ \vdots \\ h_{2cal[2N4]}VFT_{Na}(f_{b\_cfar}, f_{demul\_Tx\#N1+2}) \\ \vdots \\ h_{2cal[N4(N2-1)+1]}VFT_{N3+1}(f_{b\_cfar}, f_{demul\_Tx\#Nt}) \\ h_{2cal[N4(N2-1)+2]}VFT_{N3+2}(f_{b\_cfar}, f_{demu\_Tx\#Nt}) \\ \vdots \\ h_{2cal[N4N2]}VFT_{Na}(f_{b\_cfar}, f_{demul\_Tx\#Nt}) \end{bmatrix} \quad [52]$$

Note that, since direction estimator 214 performs direction estimation processing by using the outputs of first and second Doppler demultiplexers 212 with the same distance index, $f_{b\_cfar}(1)=f_{b\_cfar}(2)=f_{b\_cfar}$ in equations 65 and 66.

In equation 65, $h_{1cal[b]}$ is an array correction value for correcting phase deviations and amplitude deviations among transmission antennas Tx #1 to Tx #N1 and among reception antennas Rx #1 to #N3, and integer b=1 to (N3×N1).

Further, in equation 66, $h_{2cal[b]}$ is an array correction value for correcting phase deviations and amplitude deviations among transmission antennas Tx #N1+1 to Tx #Nt and among reception antennas Rx #N3+1 to #Na, and integer b=1 to (N4×N2).

For example, direction estimator 214 calculates a spatial profile, with azimuth direction $\theta_u$ in direction estimation evaluation function value $P_H(\theta_H, f_{b\_cfar}, f_{demul\_Tx\ \#1}, f_{demul\_Tx\ \#2}, \ldots, f_{demul\_Tx\ \#Nt})$ being variable within a predetermined angular range. Direction estimator 214 extracts a predetermined number of local maximum peaks in the calculated spatial profile in descending order, and outputs the azimuth directions of the local maximum peaks as direction-of-arrival estimation values (for example, positioning output). Here, $f_{b\_cfar}$ represents the distance index in which $f_{b\_cfar}(1)=f_{b\_cfar}(2)$.

Note that, there are various methods with respect to direction estimation evaluation function value $P_H(\theta_u, f_{b\_cfar}, f_{demul\_Tx\ \#1}, f_{demul\_Tx\ \#2}, \ldots, f_{demul\_Tx\ \#Nt})$ depending on direction-of-arrival estimation algorithms. For example, the estimation method using an array antenna, as disclosed in NPL 3, may be used.

For example, a beamformer method can be given by following equation 67.

[53]

$$P_H(\theta_H, f_{b\_cfar}, f_{demul\_Tx\ \#1}, \ldots, f_{demul\_Tx\ \#Nt}) = \|a_1^H(\theta_u) \\ h_1(f_{b\_cfar}, f_{demul\_Tx\ \#1}, f_{demul\_Tx\ \#2}, \ldots, \\ f_{demul\_Tx\ \#N1})\|^2 + |a_2^H(\theta_u)h_2(f_{b\_cfar}, f_{demul\_Tx\ \#N1+1}, \\ f_{demul\_Tx\ \#N1+2}, \ldots, f_{demul\_Tx\ \#Nt})|^2 \quad \text{(Equation 67)}$$

In addition to the beamformer method, a technique such as Capon and MUSIC is also applicable. Note that, in equation 67, superscript H is the Hermitian transpose operator.

In equation 67, $a_1(\theta_u)$ represents the direction vector (column vector with N1×N3 elements) of N1×N3 MIMO virtual reception antennas formed among N1 transmission antennas 106 included in the first transmission sub-block and N3 reception antennas 202 included in the first reception sub-block, and represents the phase response or the complex amplitude response at each virtual reception antenna that forms N1×N3 MIMO virtual reception antennas in a case where reflected waves arrives in the $\theta_u$ direction.

In the same manner, in equation 67, $a_2(\theta_u)$ represents the direction vector (column vector with N2×N4 elements) of N2×N4 MIMO virtual reception antennas formed among N2 transmission antennas 106 included in the second transmission sub-block and N4 reception antennas 202 included in the second reception sub-block, and represents the phase response or the complex amplitude response at each virtual reception antenna that forms N2×N4 MIMO virtual reception antennas in a case where reflected waves arrives in the $\theta_u$ direction.

Note that, the phase response or the complex amplitude response at each virtual reception antenna when the wavelength of a radar transmission signal (for example, the q-th chirp signal) in the case of central frequency $f_c(q)$ is used may be used for direction vector $a_q(\theta_u)$. Alternatively, direction vector $a(\theta_u)$ of a virtual reception array with respect to an arrival wave in azimuth direction θ in the average central frequency of central frequencies $f_c(1)$ and $f_c(2)$ may be commonly used.

Further, azimuth direction $\theta_u$ is a vector that is changed with predetermined azimuth interval $\beta_1$ in an azimuth range in which direction-of-arrival estimation is performed. For example, $\theta_u$ is configured as follows.

$\theta_u = \theta$ min+$u\beta_1$, integer u=0, . . . , NU, and

NU=floor[(θ max−θ min)/$\beta_1$]+1.

Here, floor(x) is a function that returns the maximum integer value that does not exceed real number x.

Further, although the example described above is where direction estimator 214 calculates the azimuth direction as a direction-of-arrival estimation value, the present disclosure is not limited thereto, and the direction-of-arrival estimation of an elevation angle direction or, by using MIMO antennas arranged in a rectangular grid shape, the direction-of-arrival estimation of an azimuth direction and an elevation angle direction are also possible. For example, direction estimator 214 may calculate an azimuth direction and an elevation angle direction as direction-of-arrival estimation values and configure the azimuth direction and the elevation angle direction as positioning output.

With the above operation, direction estimator 214 may output, as positioning output, direction-of-arrival estimation values in distance index $f_{b\_cfar}$ and demultiplexing index information ($f_{demul\_Tx\;\#1}$, $f_{demul\_Tx\;\#2}$, . . . , $f_{demul\_Tx\;\#Nt}$) on Doppler-multiplexed signals. In addition, direction estimator 214 may further output, as positioning output, distance index $f_{b\_cfar}$ and demultiplexing index information ($f_{demul\_Tx\;\#1}$, $f_{demul\_Tx\;\#2}$, . . . , $f_{demul\_Tx\;\#Nt}$) on Doppler-multiplexed signals. For example, direction estimator 214 may output positioning output (or a positioning result) to a vehicle controller (not illustrated) in an in-vehicle-mounted radar (not illustrated) or to an infrastructure controller (not illustrated) in an infrastructure radar (not illustrated).

Further, for example, direction estimator 214 may output one or both of Doppler frequency information $f_{d\_VFT(1)}$+$n_{alest}/T_s$ and $f_c(2)/f_c(1)(f_{d\_VFT}(1)+n_{alest}/T_s)$ determined by Doppler determiner 213.

Further, for example, distance index $f_{b\_cfar}$ may be converted into distance information by using equation 1 and outputted.

Further, Doppler frequency information determined by Doppler determiner 213 may be converted into relative velocity information and outputted. Doppler frequency information $f_{d\_VFT(1)}$+$n_{alest}/T_s$ by central frequency $f_c(1)$, which is determined by Doppler determiner 213, can be converted into relative velocity $v_d$ by using following equation 68.

(Equation 68)

$$v_d\left(f_{d\_VFT(1)} + \frac{n_{alest}}{T_r}\right) = \frac{C_0}{2f_c(1)}\left(f_{d\_VFT(1)} + \frac{n_{alest}}{T_r}\right) \quad [54]$$

In the same manner, when Doppler frequency information $f_c(2)/f_c(1)(f_{d\_VFT(1)}+n_{alest}/T_r)$ by central frequency $f_c(2)$, which is determined by Doppler determiner 213, is converted into relative velocity $v_d$, relative velocity $v_d$ takes the same value as that in equation 68 as in following equation 69 so that the relative velocity information may be outputted as a common value (or a unified value) with respect to different central frequencies.

(Equation 69)

$$v_d\left(\frac{f_c(2)}{f_c(1)}\left(f_{d\_VFT(1)} + \frac{n_{alest}}{T_r}\right)\right) = \frac{C_0}{2f_c(1)}\left(f_{d\_VFT(1)} + \frac{n_{alest}}{T_r}\right) \quad [55]$$

As described above, in the present embodiment, radar apparatus 10a includes a plurality of radar transmission signal generators 101, and transmits a transmission signal from transmission antenna 106 for each predetermined transmission period by using the first central frequency and the second central frequency that satisfy one of equations 10 to 15, for example. Thus, radar apparatus 10a can determine the number of times of aliasing at Doppler determiner 213 based on the deviation between Doppler frequencies in accordance with the difference between central frequencies, where the deviation is detected by Doppler analyzer 210 and Doppler demultiplexer 212. Thus, for example, radar apparatus 10a can extend a Doppler frequency range (or the maximum value of relative velocity) in which a Doppler-multiplexed signal can be demultiplexed in accordance with a determinable number of times of aliasing.

Further, in the present embodiment, the first and second chirp signals are simultaneously transmitted for each transmission period $T_r$ so that it is possible to perform multiplexing of Doppler-multiplexed signals in a range of Doppler frequency range ±½$T_r$. For example, the present embodiment makes it possible to perform multiplex transmission of Doppler-multiplexed signals in a Doppler frequency range twice (or the maximum value of relative velocity) that in the case of Doppler multiplex transmission with $T_{rs}=2T_r$ as in Embodiment 1.

Further, for example, by causing the number of transmission antennas 106 included in the first transmission sub-block and the number of transmission antennas 106 included in the second transmission sub-block to be the same or approximately the same, it is possible to obtain the effect of extending the Doppler multiplexing intervals when Doppler multiplexing is performed by using the first and second chirp signals by approximately four times in comparison with Embodiment 1.

Note that, when Doppler multiplexing intervals at the time of Doppler multiplex transmission are close to each other, the interference between Doppler-multiplexed signals is likely to occur in the case of such a target object in which a Doppler component spreads, and the direction estimation accuracy deteriorates and the target object detection accuracy is likely to deteriorate. In comparison with Embodiment 1, the present embodiment makes it possible to extend the Doppler multiplexing intervals when Doppler multiplexing is performed so that such occurrence of the interference between Doppler-multiplexed signals can be reduced and the deterioration of the direction estimation accuracy and the deterioration of the target object detection accuracy can be suppressed. Further, in comparison with Embodiment 1, the present embodiment makes it possible to extend the Doppler multiplexing intervals when Doppler multiplexing is performed so that the occurrence of the interference between Doppler-multiplexed signals can be reduced and the deterioration of the direction estimation accuracy and the deterioration of the target object detection accuracy can be suppressed even in a case where more transmission antennas are used in Doppler multiplex transmission. Accordingly, the present embodiment makes it possible to perform Doppler multiplex transmission using more transmission antennas 106 in comparison with Embodiment 1.

As described above, the present embodiment makes it possible to extend a Doppler frequency range (or the maximum value of relative velocity) in which no ambiguity occurs. Thus, radar apparatus 10a can detect a target object (for example, a direction of arrival) with high accuracy in a wider Doppler frequency range.

Further, in the present embodiment, a Doppler frequency range in which Doppler-multiplexed signals can be demultiplexed is extended by configuring the central frequencies of chirp signals so that, for example, the application of a method such as making the sampling rate of an A/D converter faster may be omitted. Thus, the present embodiment makes it possible to suppress complexity of the hardware configuration in radar apparatus 10a and further to suppress an increase in power dissipation or heat generation in radar apparatus 10a. Further, in the present embodiment, a Doppler frequency range in which Doppler-multiplexed signals can be demultiplexed is extended by configuring the central frequencies of chirp signals so that the application of a method such as shortening transmission period $T_r$ may be omitted. Thus, the present embodiment makes it possible to reduce a distance range detectable by radar apparatus 10a or to suppress deterioration of the distance resolution.

Note that, in the present embodiment, a case where radar apparatus 10a includes two radar transmission signal generators 101, and transmits a transmission signal from transmission antenna 106 for each predetermined transmission period by using the first central frequency and the second central frequency that satisfy one of equations 10 to 15, for example, has been described, but the present disclosure is not limited thereto. For example, radar apparatus 10a may be configured to include more (three or more) radar transmission signal generators 101.

For example, radar apparatus 10a may include three radar transmission signal generators 101 and may transmit a transmission signal from transmission antenna 106 for each predetermined transmission period by using first central frequency $f_c(1)$ and second central frequency $f_c(2)$ that satisfy one of equations 10 to 15, and further by using second central frequency $f_c(2)$ and third central frequency $f_c(3)$ that satisfy one of equations 10 to 15. Note that, it may be configured such that $f_c(1) > f_c(2) > f_c(3)$ or $f_c(1) < f_c(2) < f_c(3)$. In this case, radar receiver 200a may be provided with three reception sub-blocks, and the outputs from three radar transmission signal generators 101 may be inputted to mixers 204 of the reception sub-blocks, respectively. Further, radar receiver 200a may be provided with CFAR section 211 and Doppler demultiplexer 212 for each reception sub-block and each may perform the same operation as in the present embodiment. Thus, multiplexed reception signals with respect to three chirp signals are obtained and by performing Doppler determination based on the output signals thereof. Doppler determiner 213 can extend a Doppler frequency detection range.

Further, for example, radar apparatus 10a may be configured to include three or more radar transmission signal generators 101, and the number of transmission antennas included in each transmission sub-block may be the same or approximately the same. Thus, the effect of further extending the Doppler multiplexing intervals when Doppler multiplexing is performed by using a plurality of chirp signals is obtained. Accordingly, since the Doppler multiplexing intervals when Doppler multiplexing is performed can be extended, the occurrence of the interference between Doppler-multiplexed signals can be reduced and the deterioration of the direction estimation accuracy and the deterioration of the target object detection accuracy due to the interference can be suppressed. Further, since the Doppler multiplexing intervals when Doppler multiplexing is performed can be extended, the occurrence of the interference between Doppler-multiplexed signals can be reduced and the deterioration of the direction estimation accuracy and the deterioration of the target object detection accuracy can be suppressed even when more transmission antennas 106 are used in Doppler multiplex transmission in comparison with Embodiment 1.

Further, in the present embodiment, a case where other parameters different from the central frequency in the modulation parameters with respect to the first and second chirp signals are common has been described, but the present disclosure is not limited thereto. For example, one exemplary embodiment of the present disclosure may be applied as long as distance resolutions match and frequency sweep bandwidths $B_w(q)$ in chirp signals have the same relationship.

Figure 15:
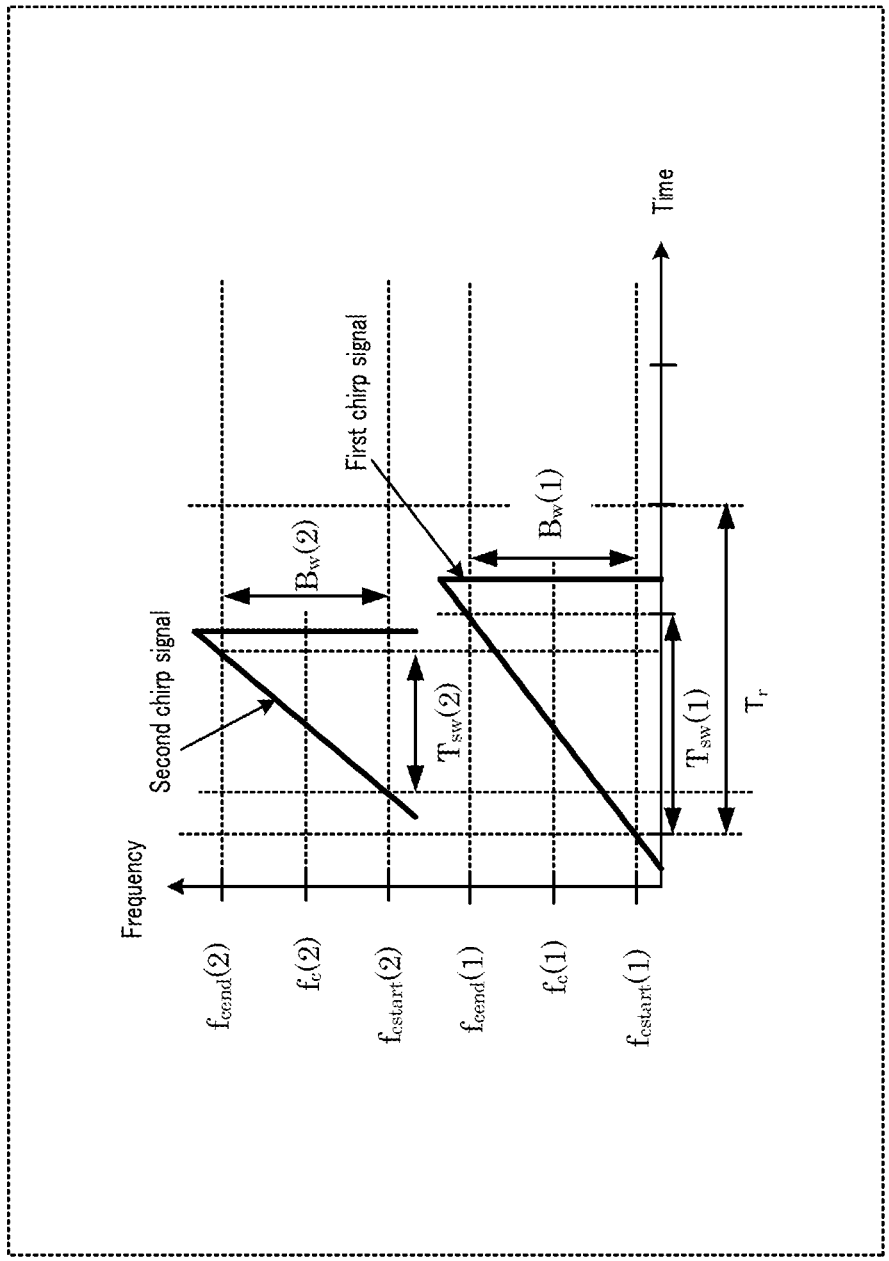
FIG. 15 illustrates an example of the chirp signals.

For example, as illustrated in FIG. 15, the first and second chirp signals configured by modulation parameters in which $B_w(1) = B_w(2)$, $T_{sw}(1) \neq T_{sw}(2)$, and $D_m(1) \neq D_m(2)$ may be used. In this case, although frequency sweep times $T_{sw}$ of the first and second chirp signals differ, frequency sweep bandwidths $B_w$ are the same, and distance resolutions $\Delta R$ ($= C_0/2B_w$) match so that radar apparatus 10a makes it possible to obtain the same effect by performing the operation according to one exemplary embodiment of the present disclosure described above.

Further, for example, as illustrated in FIG. 15, the number of discrete sample data obtained in predetermined time range (range gate) $T_{sw}(1) \neq T_{sw}(2)$ when beat signals outputted from each reception radio 203 are discretely sampled in A/D converters 207 of each signal processor 206 is different by configuring $T_{sw}(1) \neq T_{sw}(2)$. Accordingly, for example, beat frequency analyzer 208 may perform, instead of performing FFT processing, the following operation on $N_{data}$ pieces of discrete sample data obtained in predetermined time range (range gate) $T_{sw}$ for each transmission period $T_r$.

For example, beat frequency analyzer 208 in the first reception sub-block may perform FFT processing on $N_{data}(1)$ pieces of discrete sampling data obtained in predetermined time range (range gate) $T_{sw}(1)$ in a period in which the first chirp signal is transmitted. Further, beat frequency analyzer 208 in the second reception sub-block may perform FFT processing on $N_{data}(2)$ pieces of discrete sampling data obtained in predetermined time range (range gate) $T_{sw}(2)$ in a period in which the second chirp signal is transmitted. Then, for example, beat frequency analyzer 208 may perform subsequent processing (processing of CFAR section 211, Doppler demultiplexer 212, Doppler determiner 213, and direction estimator 214) with the smaller between $N_{data}(1)$ pieces and $N_{data}(2)$ pieces as $N_{data}$ pieces.

Further, radar apparatus 10a in the present embodiment includes a plurality of radar transmission signal generators 101, and transmits a transmission signal from transmission antenna 106 for each predetermined transmission period by using the first central frequency and the second central frequency that satisfy one of equations 10 to 15, for example. Thus, radar apparatus 10a can determine the number of times of aliasing based on the deviation between Doppler frequencies in Doppler analysis in accordance with the difference between central frequencies. Thus, for example, radar apparatus 10a can extend a Doppler frequency range (or the maximum value of relative velocity) in which a Doppler-multiplexed signal can be demultiplexed in accordance with a determinable number of times of aliasing. Further, a Doppler frequency range (or the maximum value of relative velocity) in which a Doppler-multiplexed signal can be demultiplexed can be extended twice in comparison with Embodiment 1.

Further, in the present embodiment, the Doppler detection range in Doppler analyzer 210 becomes twice that in Embodiment 1. Further, in the present embodiment, number N1 or N2 of transmission antennas used for Doppler multiplexing is fewer than number Nt of transmission antennas used for Doppler multiplexing in Embodiment 1. Accordingly, in the present embodiment, the Doppler multiplexing intervals can be at least extended twice in comparison with Embodiment 1. For example, when Doppler multiplexing intervals at the time of Doppler multiplex transmission are close to each other, the interference between Doppler-multiplexed signals is likely to occur in the case of such a target object in which a Doppler component spreads. In the present embodiment, on the other hand, it is possible to perform multiplex transmission by using more transmission antennas 106.

(Modification 1 of Embodiment 3)

Note that, in the present embodiment, the operation in a case where the intervals between each Doppler shift amount $DOP_{nsub1}$ (Doppler shift intervals) of Doppler shifters 105-1 to 105-N1 included in the first transmission sub-block with respect to the first chirp signal and each Doppler shift amounts $DOP_{nsub2}$ (Doppler shift intervals) of Doppler shifters 105-N1+1 to 105-Nt included in the second transmission sub-block with respect to the second chirp signal are not configured to be equal, but are configured to be unequal with at least one Doppler interval being different has been described.

However, the present disclosure is not limited thereto, and at least the Doppler intervals configured by Doppler shifters 105 in the first transmission sub-block or the Doppler intervals configured by Doppler shifters 105 in the second transmission sub-block may not be configured to be equal, but may be configured to be different and unequal, and the other Doppler intervals may be configured to be equal.

As an example, a case where Doppler shifters 105-1 to 105-N1 included in the first transmission sub-block give phase rotation $\varphi_{nsub1}(m)$ as in equation 62 to the m-th first chirp signal, which has been inputted, such that Doppler shift amounts $DOP_{nsub1}$ are different from each other among Doppler shifters, and perform Doppler multiplexing with unequal intervals with Doppler multiplexing number N1 will be described. In this case, Doppler shifters 105-N 1+1 to 105-Nt included in the second transmission sub-block may give phase rotation $\varphi_{nsub2}(m)$ as in following equation 70 to the m-th second chirp signal, which has been inputted, such that Doppler shift amounts $DOP_{nsub2}$ are different from each other among Doppler shifters 105, and may perform Doppler multiplexing with equal intervals with Doppler multiplexing number N2.

(Equation 70)

$$\phi_{nsub2}(m) = \left\{ A\frac{2\pi}{N_c} \text{ round}\left(\frac{N_c}{N2}\right)(n-1) + \Delta\phi_{02} \right\}(m-1) + \phi_{02} \quad [56]$$

Alternatively, as another example, a case where Doppler shifters 105-1 to 105-N1 included in the first transmission sub-block give phase rotation $\varphi_{nsub1}(m)$ as in following equation 71 to the m-th first chirp signal, which has been inputted, such that Doppler shift amounts $DOP_{nsub1}$ are different from each other among Doppler shifters 105, and perform Doppler multiplexing with equal intervals with Doppler multiplexing number N1 will be described.

(Equation 71)

$$\phi_{nsub1}(m) = \left\{ A\frac{2\pi}{N_c} \text{ round}\left(\frac{N_c}{N1}\right)(n-1) + \Delta\phi_{01} \right\}(m-1) + \phi_{01} \quad [57]$$

In this case, Doppler shifters 105-N1+1 to 105-Nt included in the second transmission sub-block may give phase rotation $\varphi_{nsub2}(m)$ as in equation 63 to the m-th second chirp signal, which has been inputted, such that Doppler shift amounts $DOP_{nsub2}$ are different from each other among Doppler shifters 105, and may perform Doppler multiplexing with unequal intervals with Doppler multiplexing number N2.

Here, in equations 70 and 71, A is a coefficient giving positive or negative polarity, which is 1 or −1. Note that, the terms round(Nc/N1) and round(Nc/N2) are introduced in order to cause the phase rotation amount to be an integer multiple of the Doppler frequency interval in Doppler analyzer 210, but the present disclosure is not limited thereto, and 2×N1 may also be used instead of the term $(2\pi/Nc)\times$ round(Nc/N1) in equation 71. In the same manner, $2\pi/N2$ may also be used instead of the term $(2\pi/Nc)\times$round(Nc/N2) in equation 70. Further, $\varphi_{01}$ and $\varphi_{02}$ are initial phases, respectively, and may be equal to or different from each other. The Doppler frequencies match even when $\varphi_{01}$ and $\varphi_{02}$ are equal to or different from each other. Further, $\Delta\varphi_{01}$ and $\Delta\varphi_{02}$ are reference Doppler shift phases, and may be equal to or different from each other. The Doppler frequencies match even when $\Delta\varphi_{01}$ and $\Delta_{\varphi_{02}}$ are equal to or different from each other.

Figure 16:
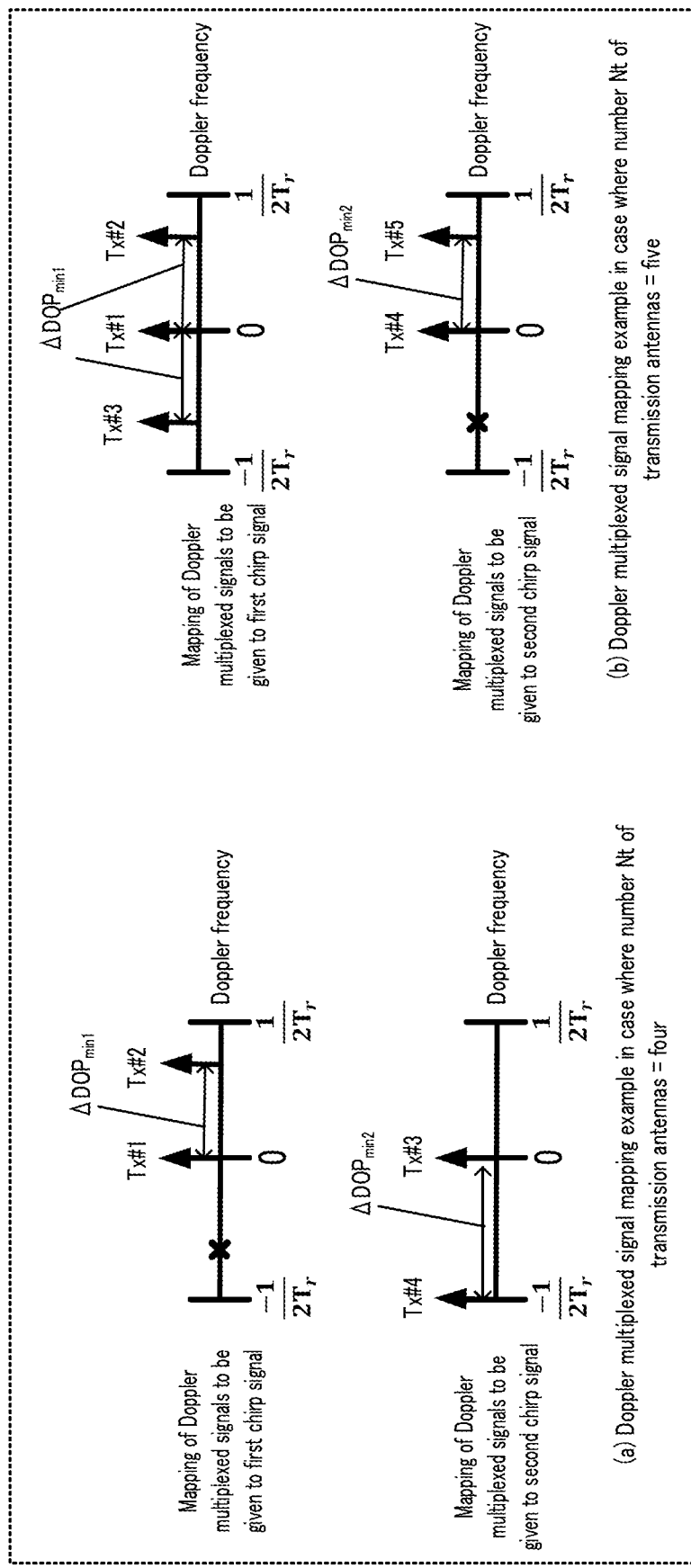
FIG. 16 illustrates examples of the Doppler multiplex transmission.

As an example of a case where number Nt of transmission antennas=four, phase rotation $\varphi_{nsub1}(m)=2\pi(n_{sub1}-1)\times(m-1)/3$ is given to the first chirp signal for each transmission period $T_r$ with N1=2, $\Delta_{\varphi 01}=0$, $\varphi_{01}=0$, A=1, δ1=1, and Nc as a multiple of six in equation 62 so that the Doppler shift amounts become $DOP_1=\varphi_1(m)/(\{2\pi(m-1)T_r\}=0$ and $DOP_2=\varphi_2(m)/\{2\pi(m-1)T_r\}=1/(3T_r)$. The upper stage of (a) of FIG. 16 indicates a Doppler-multiplexed signal mapping example when the first chirp signal is transmitted.

Further, as an example of a case where number Nt of transmission antennas=four, phase rotation $\varphi_{nsub2}(m)=2\pi$ (nsub2−1)×(m−1)/2 is given to the second chirp signal for each transmission period $T_r$ with Nt=4. N2=2, $\Delta\varphi_{02}=0$, $\varphi_{02}=0$, A=1, and Nc as a multiple of six in equation 70 so that the Doppler shift amounts become $DOP_1=0$ and $DOP_2=1/T_r$. The lower stage of (a) of FIG. 16 indicates a Doppler-multiplexed signal mapping example when the second chirp signal is transmitted.

Further, as an example of a case where number Nt of transmission antennas=five, phase rotation $\varphi_{nsub1}(m)=2\pi(n_{sub1}-1)\times(m-1)/3$ is given to the first chirp signal for each transmission period $T_r$ with Nt=3, $\Delta\varphi_{01}=0$, $\varphi_{01}=0$, A=1, and Nc as a multiple of three in equation 71 so that the Doppler shift amounts become $DOP_1=\varphi_1(m)/\{2\pi(m-1)\ T_r\}=0$, $DOP_2=\varphi_2(m)/\{2\pi(m-1)T_r\}=1/(3T_r)$, and $DOP_3=\varphi_3(m)/\{2\pi(m-1)T\}=2/(3T_r)=-1/(3T_r)$. The upper stage of (b) of FIG. 16 indicates a Doppler-multiplexed signal mapping example when the first chirp signal is transmitted.

Further, as an example of a case where number Nt of transmission antennas=five, phase rotation $\varphi_{nsub2}(m)=\pi\times(m-1)/2$ is given to the second chirp signal for each transmission period $T_r$ with Nt=5, N2=2, $\Delta\varphi_{02}2=0$, $\varphi_{02}=0$, A=1, δ2=1, and Nc as a multiple of three in equation 63 so that the Doppler shift amounts become $DOP_1=0$ and $DOP_2=1/(3T_r)$. The lower stage of (b) of FIG. 16 indicates a Doppler-multiplexed signal mapping example when the second chirp signal is transmitted.

As described above, in a case where the Doppler intervals between Doppler-multiplexed signals configured in Doppler shifters 105 in the first or second transmission sub-block are caused to be equal, Doppler frequency estimation becomes difficult in Doppler frequency range $\pm 1/T_r$ in Doppler demultiplexer 212 in radar receiver 200a and it therefore becomes difficult to output demultiplexing index information on Doppler-multiplexed signals. For example, radar receiver 200a performs demultiplexing processing by using the output of Doppler demultiplexer 212 with respect to a reception signal corresponding to a signal of the transmission sub-block in which the Doppler intervals between Doppler-multiplexed signals configured in Doppler shifters 105 in the first or second transmission sub-block become unequal.

Figure 17:
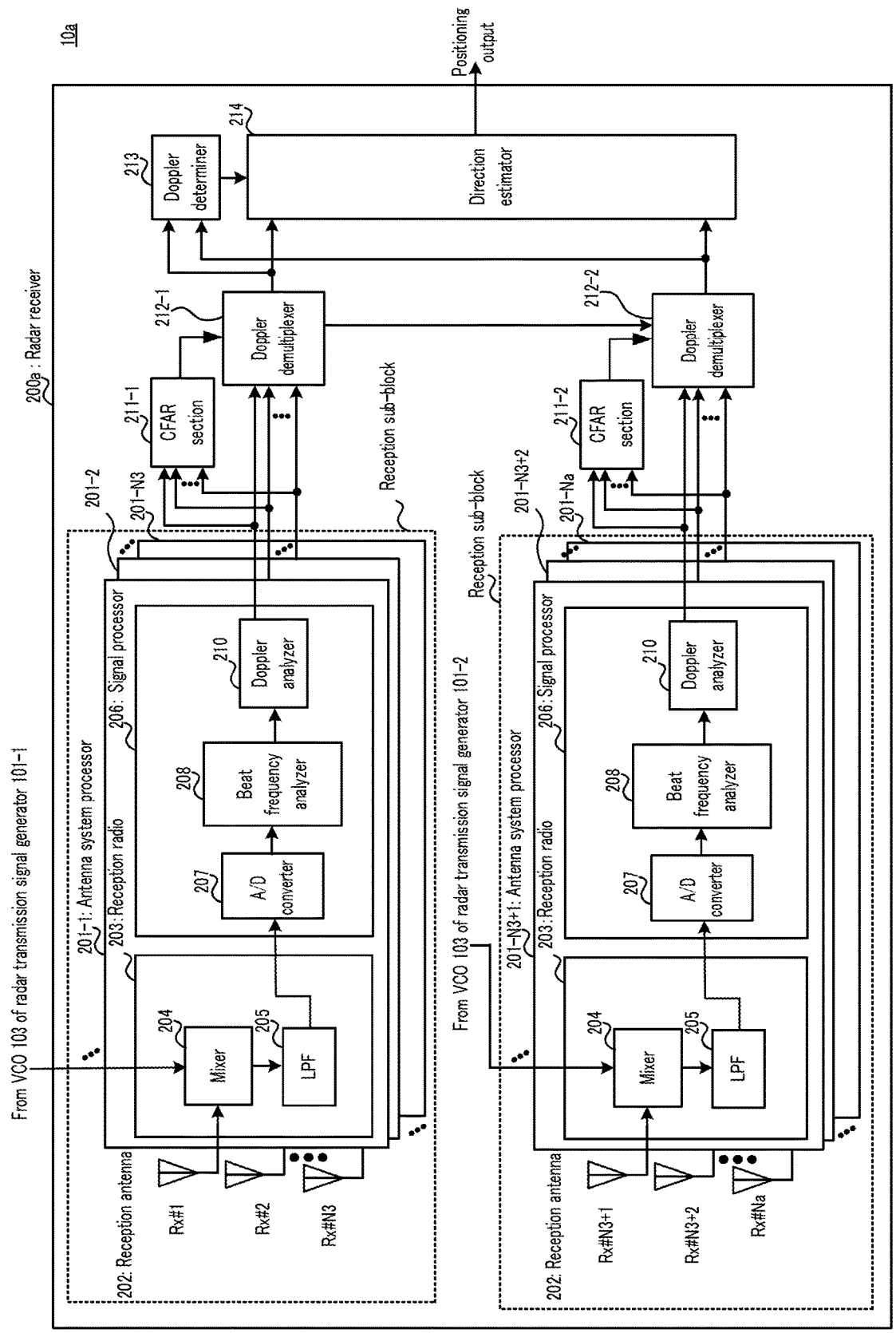
FIG. 17 illustrates a configuration example of a radar receiver.

FIG. 17 illustrates a configuration example of radar receiver 200a in a case where in radar apparatus 10a. Doppler shifters 105 in the first transmission sub-block perform Doppler multiplexing with unequal intervals and Doppler shifters 105 in the second transmission sub-block perform Doppler multiplexing with equal intervals.

The first reception sub-block performs processing of receiving reflected waves of the first transmission sub-block. The configuration of radar receiver 200a illustrated in FIG. 17 differs from that of radar receiver 200a illustrated in FIG. 11 in that the output from first Doppler demultiplexer 212 is inputted to second Doppler demultiplexer 212, for example. Hereinafter, an operation example of Doppler demultiplexer 212 in radar receiver 200a illustrated in FIG. 17 will be described, which differs from that in radar receiver 200a illustrated in FIG. 11.

The demultiplexing operation of a Doppler multiplex signal in first Doppler demultiplexer 212 is the same as the operation described above (the operation in FIG. 11), but first Doppler demultiplexer 212 outputs information on distance index $f_{b\_cfar}(1)$, and demultiplexing index information ($f_{demul\_Tx\ \#1}$, $f_{demul\_Tx\ \#2}$, . . . , $f_{demul\_Tx\ \#N1}$) on N1 Doppler multiplex signals multiplexed and transmitted in the first transmission sub-block in distance index $f_{b\_cfar}(1)$ to second Doppler demultiplexer 212.

For example, second Doppler demultiplexer 212 calculates, based on demultiplexing index information ($f_{demul\_Tx\ \#1}$, $f_{demul\_Tx\ \#2}$, . . . , $f_{demul\_Tx\ \#N1}$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(2T_r) \leq f_{d\_TargetDoppler} \leq 1/(2T_r)$. For example, second Doppler demultiplexer 212 may calculate estimated Doppler frequency value $f_{d\_VFT}(1)$ from which a component with a known predetermined Doppler shift amount assigned to each transmission antenna 106 in radar transmitter 100a is eliminated.

Then, second Doppler demultiplexer 212 demultiplexes, based on estimated Doppler frequency value $f_{d\_VFT}(1)$ that has been calculated, a Doppler-multiplexed signal by using a peak (distance index $f_{b\_cfar}(2)$ and Doppler frequency index $f_{s\_cfar}(2)$) which is inputted from second CFAR section 211 and at which the reception power becomes larger than a threshold. For example, second Doppler demultiplexer 212 uses estimated Doppler frequency value $f_{d\_VFT}(1)$ to determine, with respect to a plurality of Doppler frequency indices $f_{s\_cfar}(2) \in \{fd_{\#N1+1}, fd_{\#N1+2}, \ldots, fd_{\#Nt}\}$ with distance index $f_{b\_cfar}(1)=f_{b\_cfar}(2)$, to which of transmission signals transmitted from transmission antennas Tx #N1+1 to Tx #Nt each reflected wave signal corresponds.

For example, the Doppler shift amounts given by Doppler shifters 105 in the second transmission sub-block to the second chirp signals outputted from transmission antennas Tx #N1+1 to Tx #Nt, respectively, are known. Accordingly, second Doppler demultiplexer 212 can calculate reception Doppler frequencies with respect to transmission antennas Tx #N1+1 to Tx #Nt in which a case where the Doppler frequency of a target object is estimated Doppler frequency value $f_{d\_VFT}(1)$ is assumed.

The reception Doppler frequencies with respect to transmission antennas Tx #N1+1 to Tx #Nt in this case will be referred to as $\{fdRef_{\#N1+1}, fdRef_{\#N1+2}, \ldots, fdRef_{\#Nt}\}$, respectively.

Second Doppler demultiplexer 212 can generate signals with respect to each transmission antenna 106 as such. For example, with respect to these Doppler frequencies, second Doppler demultiplexer 212 determines that Doppler frequencies, which have the smallest difference among Doppler frequency indices $f_{s\_cfar}(2)$ from second CFAR section 211 and are smaller than $\pm\Delta DOP_{min\ 2}/2$, are the reception Doppler frequencies with respect to transmission antennas Tx #N1+1 to Tx #Nt.

Then, second Doppler demultiplexer 212 demultiplexes and outputs the determined reflected wave signals for each of transmission antennas Tx #N+1 to Tx #Nt. For example, second Doppler demultiplexer 212 outputs information on distance index $f_{b\_cfar}(2)$, demultiplexing index information ($f_{demul\_Tx\ \#N1+1}$, $f_{demul\_Tx\ \#N1+2}$, . . . , $f_{demul\_Tx\ \#Nt}$) on N2 Doppler-multiplexed signals multiplexed and transmitted in the first transmission sub-block in distance index $f_{b\_cfar}(2)$, and the output of Doppler analyzer 210 to Doppler determiner 213.

Note that, as the premise that such an operation of second Doppler demultiplexer 212 is possible, it is assumed that in a condition that the difference between target object Doppler frequencies due to the difference between the central frequency of the first chirp signal and the central frequency of the second chirp signal is within $\pm\Delta DOP_{min\ 2}/2$, the target object relative velocity is within this range.

Further, a case where in radar apparatus 10a, Doppler shifters 105 in the second transmission sub-block perform Doppler multiplexing with unequal intervals and Doppler shifters 105 in the first transmission sub-block perform Doppler multiplexing with equal intervals may be possible. In this case, in the same manner as in the example in FIG. 17, Doppler demultiplexing in first Doppler demultiplexer 212 is possible by inputting the output from second Doppler demultiplexer 212 to first Doppler demultiplexer 212 in radar receiver 200a.

As described above, Doppler shifters 105 in at least one of the first transmission sub-block and the second transmission sub-block may be configured to perform Doppler multiplexing with unequal intervals and Doppler shifters 105 in the remaining transmission sub-block may be configured to perform Doppler multiplexing with equal intervals. Thus, radar apparatus 10a makes it possible to obtain the effect of further extending the Doppler multiplexing intervals when Doppler multiplexing is performed by using the first and second chirp signals. By extending the Doppler multiplexing intervals when Doppler multiplexing is performed, the occurrence of the interference between Doppler-multiplexed signals can be reduced and the deterioration of the direction estimation accuracy and the deterioration of the target object detection accuracy can be suppressed. Note that, in Doppler shifter 105 of the subsequent embodiment, the configurations of Doppler multiplexing with unequal intervals and Doppler multiplexing with equal intervals are also applicable in the same manner and the same effect can be obtained.

(Modification 2 of Embodiment 3)

Figure 18:
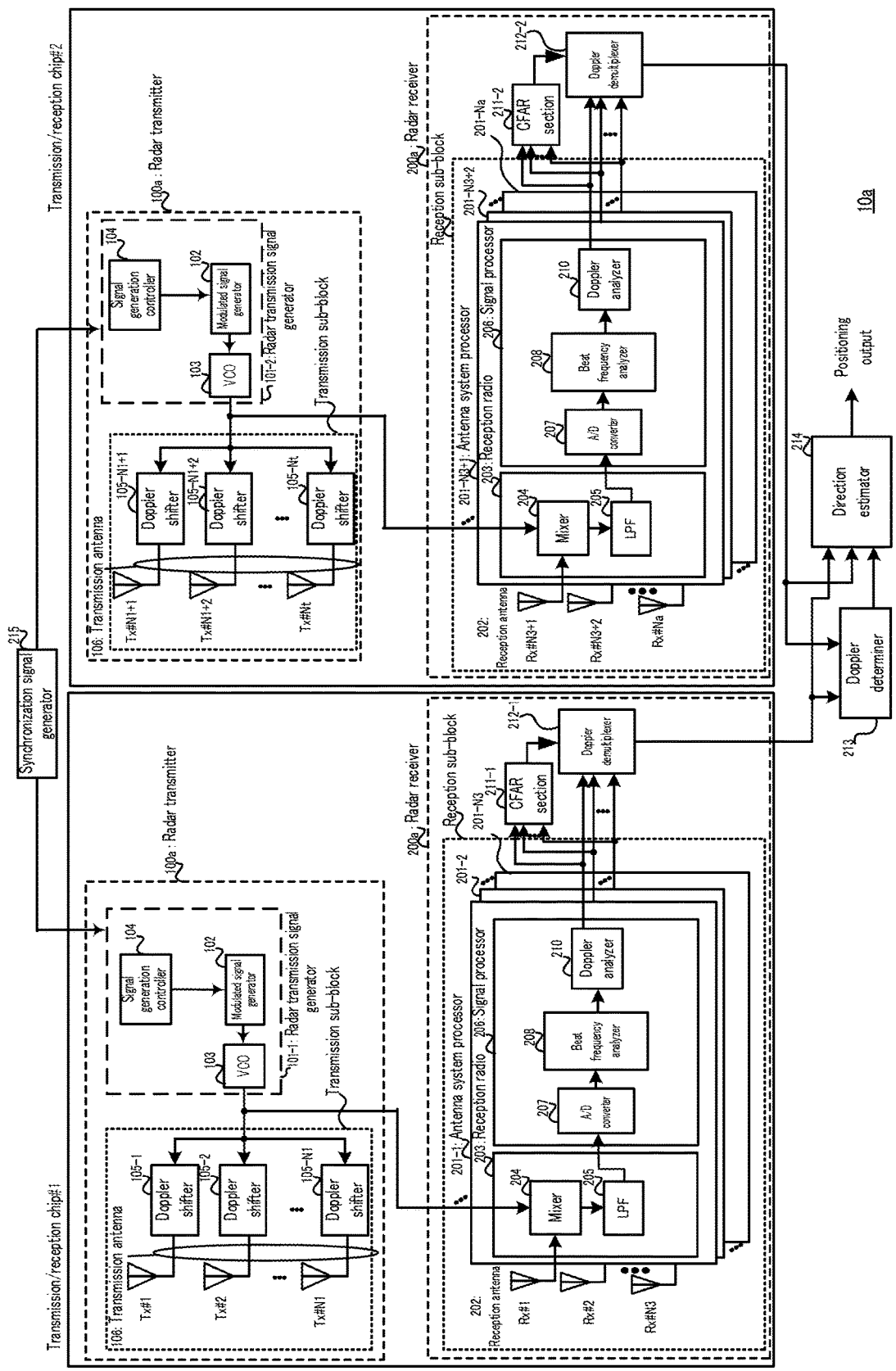
FIG. 18 illustrates a configuration example of the radar apparatus.

Further, the configuration of radar apparatus 10a illustrated in FIG. 11 may be implemented by combining a plurality of transmission/reception chips as illustrated in FIG. 18, for example. In the example of FIG. 18, radar apparatus 10a is formed of transmission/reception chip #1 and transmission/reception chip #2.

Transmission/reception chip #q includes radar transmission signal generator 101-q, q-th transmission sub-block, q-th reception sub-block, q-th CFAR section 211 (or CFAR section 211-q), and q-th Doppler demultiplexer 212 (or Doppler demultiplexer 212-q). Here, q=1 or 2.

Note that, at least one of Doppler determiner 213 and direction estimator 214 may be implemented in another signal processing chip, ECU or the like, or may be configured to be incorporated in one of the transmission/reception chips.

FIG. 18 differs from FIG. 11 in that synchronization signal generator 215 is provided and a synchronization signal (for example, a signal serving as a reference) outputted from synchronization signal generator 215 is outputted to radar transmission signal generator 101 of radar transmitter 100a of each transmission/reception chip. Thus, the outputs of chirp signals become possible such that the frequency difference between the first chirp signal outputted from the transmission sub-block of transmission/reception chip #1 and the second chirp signal outputted from the transmission sub-block of transmission/reception chip #2 is within predetermined allowable errors. Even the configuration as in FIG. 18 makes it possible to obtain the same effect as in Embodiment 3, and further to reduce the cost by combination of a general-purpose transmission/reception chip.

Embodiment 4

In Embodiment 3, an operation in which, with a MIMO antenna configuration of Nt transmission antennas and Na reception antennas, direction estimator 214 performs direction estimation processing by using N1×N3 MIMO virtual reception antennas and N2×N4 MIMO virtual reception antennas has been described. Here, N1+N2=Nt, and N3+N4=Na. In this case, the number of antennas that can be used by direction estimator 214 is fewer than Nt×Na.

In the present embodiment, a method in which, in a case where radar transmission signals with different frequencies are simultaneously transmitted for each transmission period in the same manner as in Embodiment 3, the number of MIMO virtual reception antennas that can be used by direction estimator 214 is caused to be Nt×Na in the same manner as in Embodiment 1 will be described.

Figure 19:
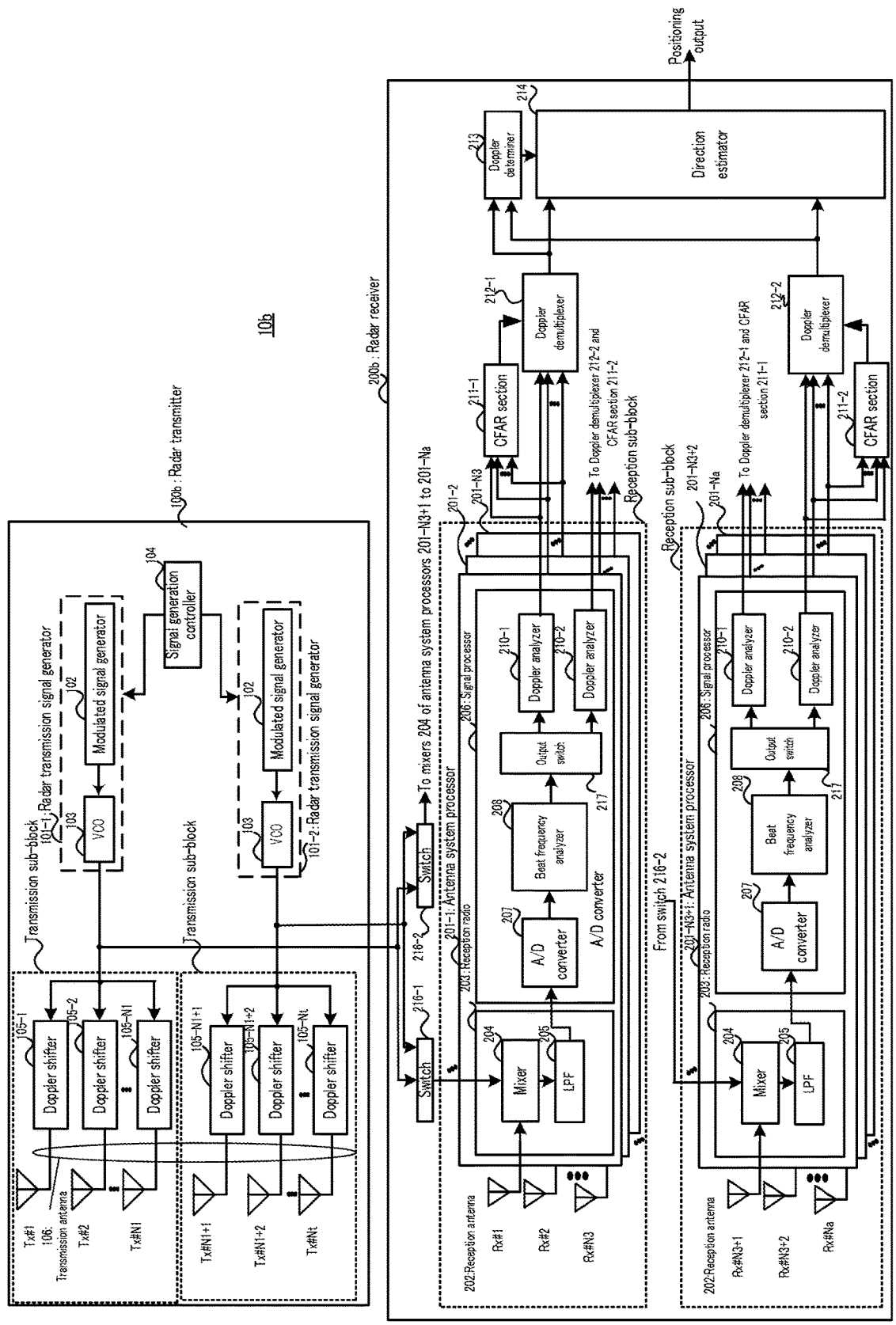
FIG. 19 illustrates a configuration example of the radar apparatus.

For example. FIG. 19 illustrates a configuration example in which radar transmitter 100b of radar apparatus 10b includes two radar transmission signal generators 101. In the same manner as the configuration of radar apparatus 10a illustrated in FIG. 11 in Embodiment 3, radar apparatus 10b simultaneously transmits radar transmission signals (for example, chirp signals) with different central frequencies generated in a plurality of radar transmission signal generators 101 from a plurality of transmission antennas 106 for each transmission period $T_r$ as illustrated in FIG. 19.

On the other hand, there is a difference from FIG. 11 in that radar receiver 200b illustrated in FIG. 19 is provided with switch 216 that switches the output destinations of the plurality of radar transmission signal generators 101 to mixer 204 of one of the two reception sub-blocks. Further, radar receiver 200b illustrated in FIG. 19 includes output switch 217 that switches and outputs the output destination of beat frequency analyzer 208 to one of two Doppler analyzers 210 in conjunction with the switching operation of switch 216.

Hereinafter, with respect to the operation in the present embodiment, mainly an operation example different from that in Embodiment 3 will be described.

FIG. 19 illustrates a configuration in which radar transmitter 100b of radar apparatus 10b includes two radar transmission signal generators 101 as an example. Hereinafter, two radar transmission signal generators 101 will be referred to as "first radar transmission signal generator 101 (or, radar transmission signal generator 101-1)" and "second radar transmission signal generator 101 (or, radar transmission signal generator 101-2)", respectively.

In FIG. 19, the configuration of each radar transmission signal generator 101 may be the same as in Embodiment 1. For example, each radar transmission signal generator 101 generates a radar transmission signal based on control from signal generation controller 104.

Signal generation controller 104 controls the generation of radar transmission signals with respect to first and second radar transmission signal generators 101 (for example, modulated signal generator 102 and VCO 103). For example, signal generation controller 104 may configure chirp signal-related parameters (for example, modulation parameters) such that chirp signals with different central frequencies are transmitted from first and second radar transmission signal generators 101, respectively. Hereinafter, the chirp signal generated in first radar transmission signal generator 101 will be referred to as "first chirp signal", and the chirp signal generated in second radar transmission signal generator 101 will be referred to as "second chirp signal".

As in Embodiment 1, signal generation controller 104 may configure (or select), for example, central frequency $f_c(q)$ satisfying a predetermined condition. Further, hereinafter, a case where, among the modulation parameters configured to each of the first and second chirp signals, central frequencies $f_c(q)$ are different from each other and other modulation parameters other than the central frequency are the same (or common) will be described as an example. However, the present disclosure is not limited thereto. Since the application of one exemplary embodiment of the present disclosure requires, for example, a matching resolution of the distance axis in the first and second chirp signals, chirp signals in which frequency sweep bandwidths $B_w(q)$ are in the same relationship may be configured. Here, q=1 or 2.

Further, in the same manner as in Embodiment 3, signal generation controller 104 may control modulated signal generator 102 and VCO 103 such that each of two chirp signals with different central frequencies $f_c(q)$ is simultaneously transmitted (or outputted) 2Nc times, as illustrated in FIG. 12, for example.

Note that, in one exemplary embodiment of the present disclosure, transmission period $T_r$ may be configured to, for example, several hundreds of μs or less, and the transmission time intervals of radar transmission signals may be configured to be relatively short. Thus, for example, even in a case where the first and second chirp signals have different central frequencies, the frequency of the beat signal of a received reflected wave (for example, beat frequency index) does not change so that radar apparatus 10b is capable of detecting the above as a change in Doppler frequency.

The first chirp signal outputted from first radar transmission signal generator 101 (for example, VCO 103) is inputted to, among Nt Doppler shifters 105, for example, N1 Doppler shifters 105 (for example, referred to as Doppler shifters 105-1 to 105-N1), respectively. Further, the first chirp signal outputted from first radar transmission signal generator 101 is inputted to first switch 216 (or referred to as switch 216-1) and second switch 216 (or referred to as a switch 216-2), respectively.

On the other hand, the second chirp signal outputted from second radar transmission signal generator 101 (for example, VCO 103) is inputted to, among Nt Doppler shifters 105, for example, N2 Doppler shifters 105 (for example, referred to as Doppler shifters 105-N1+1 to 105-Nt), respectively. Further, the second chirp signal outputted from second radar transmission signal generator 101 is inputted to first and second switches 216, respectively.

Here, N1+N2=Nt.

Then, the output signals of N1 Doppler shifters 105 to which the first chirp signal is inputted are amplified to predetermined transmission power and are radiated from each of transmission antennas 106 (for example, Tx #1 to Tx #N1) to space. Further, the output signals of N2 Doppler shifters 105 to which the second chirp signal is inputted are amplified to predetermined transmission power and are radiated from each of transmission antennas 106 (for example, Tx #N1+1 to Tx #Nt) to space. Thus, the first and second chirp signals are simultaneously transmitted for each transmission period $T_r$.

For example, first and second switches 216 switches between the first chirp signal inputted from first radar transmission signal generator 101 and the second chirp signal inputted from second radar transmission signal generator 101 for each transmission period of the radar transmission signal to perform the output to one of mixers 204 of Na antenna system processors 201 of radar receiver 200b.

For example, in an odd-numbered transmission period, the first chirp signal may be inputted to mixers 204 of, among Na antenna system processors 201 of radar receiver 200b, N3 antenna system processors 201 (for example, antenna system processors 201-1 to 201-N3), respectively, by first and second switches 216. Further, for example, in an odd-numbered transmission period, the second chirp signal may be inputted to mixers 204 of, among Na antenna system processors 201 of radar receiver 200b, N4 antenna system processors 201 (for example, antenna system processors 201-N3+1 to 201-Na), respectively, by first and second switches 216.

Here, N3+N4=Na.

Further, for example, in an even-numbered transmission period, the first chirp signal may be inputted to mixers 204 of, among Na antenna system processors 201 of radar receiver 200b, N4 antenna system processors 201 (for example, antenna system processors 201-N3+1 to 201-Na), respectively, by first and second switches 216. Further, for example, in an even-numbered transmission period, the second chirp signal may be inputted to mixers 204 of, among Na antenna system processors 201 of radar receiver 200b, N3 antenna system processors 201 (for example, antenna system processors 201-1 to 201-N3), respectively.

Note that, the output destinations of the first and the second chirp signals (the switching destinations of first and second switches 216) in odd-numbered and even-numbered transmission periods may be reversed. Thus, the output destinations (reception sub-blocks to be described later) of the first and second chirp signals may be switched alternately for each transmission period.

Hereinafter, N1 Doppler shifters 105 to which the first chirp signal is inputted and transmission antennas 106 (for example, Tx #1 to Tx #N1) which transmit the output signals of N1 Doppler shifters 105 described above will be referred to as "first transmission sub-block". Further, N2 Doppler shifters 105 to which the second chirp signal is inputted and transmission antennas 106 (for example, Tx #N1+1 to Tx #Nt) which transmit the output signals of N2 Doppler shifters 105 described above will be referred to as "second transmission sub-block". Here, N1+N2=Nt. Note that, N1 and N2 are two or more respectively, and Nt is four or more.

For example, Doppler shifters 105 included in the first transmission sub-block give phase rotation $\varphi_{nsub1}$ to the first chirp signal in order to give Doppler shift amount $DOP_{nsub1}$ for each transmission period $T_r$ of the chirp signal, and output the signal subjected to the Doppler shift to transmission antennas 106 (for example, Tx #1 to Tx #N1). Here, $n_{nsub1}$=an integer of 1 to N1. Further, Doppler shifters 105 included in the second transmission sub-block give phase rotation $\varphi_{nsub2}$ to the second chirp signal in order to give Doppler shift amount $DOP_{nsub2}$ for each transmission period $T_r$ of the chirp signal, and output the signal subjected to the Doppler shift to transmission antennas 106 (for example, Tx #N1+1 to Tx #Nt). Here, nsub2=an integer of 1 to N2.

Note that, an example of the method of applying Doppler shift amount $DOP_{nsub1}$ (or phase rotation $\varphi_{nsub1}$) and Doppler shift amount $DOP_{nsub2}$ (or phase rotation $\varphi_{nsub2}$) in Doppler shifters 105 included in the first and second transmission sub-blocks partially differs from that in Embodiment 3 and will be described later.

Further, in a case where Nt is an even number, the number of transmission antennas 106 included in the first transmission sub-block and the number of transmission antennas 106 included in the second transmission sub-block may be the same by configuring N1=N2, for example. Further, in a case where Nt is an odd number, the number of transmission antennas 106 included in the first transmission sub-block and the number of transmission antennas 106 included in the second transmission sub-block may be approximately the same with a difference by one transmission antenna by configuring N1=(Nt+1)/2 or N1=(Nt−1)/2, for example. Thus, the number of transmission antennas 106 (for example, transmission antennas 106 that transmit the first chirp signal) included in the first transmission sub-block and the number of transmission antennas 106 (for example, transmission antennas 106 that transmit the second chirp signal) included in the second transmission sub-block, respectively, may be configured to be the same or may be configured to differ by one. By configuring the number of transmission antennas 106 included in the first transmission sub-block and the number of transmission antennas 106 included in the second transmission sub-block to be the same or approximately the same, radar apparatus 10*b* makes it possible to obtain the effect of further extending the Doppler multiplexing intervals when Doppler multiplexing is performed (for example, the effect of extending the Doppler multiplexing intervals approximately twice) by using the first and second chirp signals in comparison with Embodiment 1.

For example, when Doppler multiplexing intervals at the time of Doppler multiplex transmission are close to each other, the interference between Doppler-multiplexed signals is likely to occur in the case of such a target object in which a Doppler component spreads, and the direction estimation accuracy deteriorates and the target object detection accuracy is likely to deteriorate. The present embodiment makes it possible to extend the Doppler multiplexing intervals when Doppler multiplexing is performed so that such occurrence of the interference between Doppler-multiplexed signals can be reduced and the deterioration of the direction estimation accuracy and the deterioration of the target object detection accuracy can be suppressed.

Further, the present embodiment makes it possible to extend the Doppler multiplexing intervals when Doppler multiplexing is performed so that the occurrence of the interference between Doppler-multiplexed signals can be reduced and the deterioration of the direction estimation accuracy and the deterioration of the target object detection accuracy can be suppressed even when more transmission antennas 106 are used in Doppler multiplex transmission Accordingly, the present embodiment makes it possible to use more transmission antennas 106 in Doppler multiplex transmission in comparison with Embodiment 1. Accordingly, in a case where Doppler multiplex transmission is performed by using more transmission antennas 106, the present embodiment is preferred in comparison with Embodiment 1.

[Configuration Example of Radar Receiver 200*b*]

In FIG. 19, radar receiver 200*b* includes, for example, Na reception antennas 202 (for example, Rx #1 to Rx #Na), which form an array antenna. Further, radar receiver 200*b* includes, for example, Na antenna system processors 201-1 to 201-Na, CFAR section 211, Doppler demultiplexer 212, Doppler determiner 213, and direction estimator 214.

Each reception antenna 202 receives reflected wave signals (for example, the first and second chirp signals) that are radar transmission signals reflected by a target object (target), and outputs, as reception signals, the received reflected wave signals to corresponding antenna system processors 201.

Each antenna system processor 201 includes reception radio 203 and signal processor 206.

Reception radio 203 includes mixer 204 and LPF 205. In reception radio 203, mixer 204 mixes a received reflected wave signal (reception signal) with a chirp signal that is a transmission signal.

Here, for example, the first chirp signal outputted from first or second switch 216 in an odd-numbered transmission period is inputted to mixers 204 within reception radios 203 of, among Na antenna system processors 201, N3 antenna system processors 201, respectively. By passing the output of mixer 204 through LPF 205 in antenna system processors 201-1 to 201-N3, the output of mixer 204 corresponding to the reflected wave of the second chirp signal becomes a high frequency outside the pass range of LPF 205 so that a beat signal with a frequency in accordance with a delay time of the reflected wave signal of the first chirp signal is likely to be outputted from LPF 205.

Further, for example, the second chirp signal outputted from first or second switch 216 in an odd-numbered transmission period is inputted to mixers 204 within reception radios 203 of, among Na antenna system processors 201, N4 antenna system processors 201, respectively. By passing the output of mixer 204 through LPF 205 in antenna system processors 201-N3+1 to 201-Na, the output of mixer 204 corresponding to the reflected wave of the first chirp signal becomes a high frequency outside the pass range of LPF 205 so that a beat signal with a frequency in accordance with a delay time of the reflected wave signal of the second chirp signal is likely to be outputted from LPF 205.

On the other hand, for example, the second chirp signal outputted from first or second switch 216 in an even-numbered transmission period is inputted to mixers 204 within reception radios 203 of, among Na antenna system processors 201, N3 antenna system processors 201, respectively. By passing the output of mixer 204 through LPF 205 in antenna system processors 201-1 to 201-N3, the output of mixer 204 corresponding to the reflected wave of the first chirp signal becomes a high frequency outside the pass range of LPF 205 so that a beat signal with a frequency in accordance with a delay time of the reflected wave signal of the second chirp signal is likely to be outputted from LPF 205.

Further, for example, the first chirp signal outputted from first or second switch 216 in an even-numbered transmission period is inputted to mixers 204 within reception radios 203 of, among Na antenna system processors 201, N4 antenna system processors 201, respectively. By passing the output of mixer 204 through LPF 205 in antenna system processors 201-N3+1 to 201-Na, the output of mixer 204 corresponding to the reflected wave of the second chirp signal becomes a high frequency outside the pass range of LPF 205 so that a beat signal with a frequency in accordance with a delay time of the reflected wave signal of the first chirp signal is likely to be outputted from LPF 205.

Accordingly, for example, antenna system processors 201-1 to 201-N3 process the reflected wave signal of the first chirp signal received by reception antennas 202-1 to 202-N3 in an odd-numbered transmission period and process the reflected wave signal of the second chirp signal received by reception antennas 202-1 to 202-N3 in an even-numbered transmission period. Hereinafter, antenna system processors 201 (for example, reception radio 203 and signal processor 206) that process the reflected wave signal of the first chirp signal in an odd-numbered transmission period and the reflected wave signal of the second chirp signal in an even-numbered transmission period, and reception antennas 202 connected to antenna system processors 201 above will be referred to as "first reception sub-block".

Further, for example, antenna system processors 201-N3+1 to 201-Na process the reflected wave signal of the second chirp signal received by reception antennas 202-N3+1 to 202-Na in an odd-numbered transmission period and process the reflected wave signal of the first chirp signal received by reception antennas 202-N3+1 to 202-Na in an even-numbered transmission period. Hereinafter, antenna system processors 201 (for example, reception radio 203 and signal processor 206) that process the reflected wave of the second chirp signal in an odd-numbered transmission period and the reflected wave of the first chirp signal in an even-numbered transmission period, and reception antennas 202 connected to antenna system processors 201 above will be referred to as "second reception sub-block".

Here, N3+N4=Na. Note that, N3 and N4 may be one or more, respectively, and Na may be two or more.

For example, the first reception sub-block (corresponding to the first reception circuitry, for example) mixes a signal received by reception antenna 202 in an odd-numbered transmission period by using the first chirp signal to output a reflected wave signal which is the first chirp signal reflected by a target, and mixes a signal received by reception antenna 202 in an even-numbered transmission period by using the second chirp signal to output a reflected wave signal which is the second chirp signal reflected by a target. Further, the second reception sub-block (corresponding to the second reception circuitry, for example) mixes a signal received by reception antenna 202 in an odd-numbered transmission period by using the second chirp signal to output a reflected wave signal which is the second chirp signal reflected by a target, and mixes a signal received by reception antenna 202 in an even-numbered transmission period by using the first chirp signal to output a reflected wave signal which is the first chirp signal reflected by a target.

Note that, the chirp signals to be processed in the respective reception sub-blocks in odd-numbered and even-numbered transmission periods (for example, the switching destinations of first and second switches 216) may be reversed. Thus, the chirp signals to be processed in the respective reception sub-blocks may be alternately switched for each transmission period.

Signal processor 206 of each antenna system processor 201-$z_q$ included in the q-th reception sub-block includes A/D converter 207, beat frequency analyzer 208, output switch 217, and Doppler analyzer 210. Here, in a case where q=1, $z_1$=one of 1 to N3, and in a case where q=2, $z_2$=one of N3+1 to Na.

In signal processor 206, A/D converter 207 converts a signal (for example, a beat signal) outputted from LPF 205 into discrete sample data that is discretely sampled.

Beat frequency analyzer 208 included in the first reception sub-block performs FFT processing on $N_{data}$ pieces of discrete sample data, which are obtained in a predetermined time range (range gate), for each transmission period $T_r$. Here, frequency sweeping time $T_{sw}(q)$ is configured for the range gate. For example, q=1 or 2, and $T_{sw}(1)$ represents the frequency sweeping time of the first chirp signal in a case where q=1, and $T_{sw}(2)$ represents the frequency sweeping time of the second chirp signal in a case where q=2. In beat frequency analyzer 208 included in the first reception sub-block, for example, q=1 may be configured in an odd-numbered transmission period, and q=2 may be configured in an even-numbered transmission period. Thus, for example, signal processor 206 in the first reception sub-block outputs a frequency spectrum in which a peak appears at a beat frequency in accordance with a delay time of a reflected wave signal (radar reflected wave) with respect to the first chirp signal in an odd-numbered transmission period and the second chirp signal in an even-numbered transmission period.

Further, beat frequency analyzer 208 included in the second reception sub-block performs FFT processing on $N_{data}$ pieces of discrete sample data, which are obtained in a predetermined time range (range gate), for each transmission period $T_r$. Here, frequency sweeping time $T_{sw}(q)$ is configured for the range gate. For example, q=1 or 2, and $T_{sw}(1)$ represents the frequency sweeping time of the first chirp signal in a case where q=1, and $T_{sw}(2)$ represents the frequency sweeping time of the second chirp signal in a case where q=2. In beat frequency analyzer 208 included in the second reception sub-block, for example, q=2 may be configured in an odd-numbered transmission period, and q=1 may be configured in an even-numbered transmission period. Thus, for example, signal processor 206 in the second reception sub-block outputs a frequency spectrum in which a peak appears at a beat frequency in accordance with a delay time of a reflected wave signal (radar reflected wave) with respect to the second chirp signal in an odd-numbered transmission period and the first chirp signal in an even-numbered transmission period.

Here, a beat frequency response outputted from beat frequency analyzer 208 in $z_q$-th signal processor 206 of the q-th reception sub-block, which is obtained through the m-th chirp pulse transmission, is represented by $RFT_{zq}(f_b, m)$, where $f_b$ represents the beat frequency index and corresponds to the index (bin number) of FFT. For example, $f_b=0, \ldots N_{data}/2-1$, $z_1=1$ to N3, $z_2=N3+1$ to Na, m=1 to 2Nc, and q=1 or 2. As beat frequency index $f_b$ decreases, beat frequency index $f_b$ indicates a beat frequency with a smaller delay time of a reflected wave signal (for example, with a closer distance to a target object).

For example, in a case where m is an odd number, $RFT_{z1}(f_b, m)$ represents a frequency spectrum in which a peak appears at a beat frequency in accordance with a delay time of a reflected wave signal (radar reflected wave) with respect to the first chirp signal, and $RFT_{z2}(f_b, m)$ represents a frequency spectrum in which a peak appears at a beat frequency in accordance with a delay time of a reflected wave signal (radar reflected wave) with respect to the second chirp signal. On the other hand, for example, in a case where m is an even number, $RFT_{z1}(f_b, m)$ represents a frequency spectrum in which a peak appears at a beat frequency in accordance with a delay time of a reflected wave signal (radar reflected wave) with respect to the second chirp signal, and $RFT_{z2}(f_b, m)$ represents a frequency spectrum in which a peak appears at a beat frequency in accordance with a delay time of a reflected wave signal (radar reflected wave) with respect to the first chirp signal.

Output switch 217 in $z_1$-th signal processor 206 in the first reception sub-block performs a switching operation such that beat frequency response $RFT_{z1}(f_b, m)$ inputted from beat frequency analyzer 208 is outputted to first Doppler analyzer 210 (or Doppler analyzer 210-1) in a case where m is an odd number and is outputted to second Doppler analyzer 210 (or Doppler analyzer 210-2) in a case where m is an even number.

Further, output switch 217 in $z_2$-th signal processor 206 of the second reception sub-block performs a switching operation such that beat frequency response $RFT_{z2}(f_b, m)$ inputted from beat frequency analyzer 208 is outputted to second Doppler analyzer 210 in a case where m is an odd number and is outputted to first Doppler analyzer 210 in a case where m is an even number.

Thus, one of first Doppler analyzers 210 of each reception sub-block processes a reflected wave signal with respect to the first chirp signal, which is received by reception antennas 202-1 to 202-N3 in an odd-numbered transmission period, and a reflected wave signal with respect to the first chirp signal, which is received by reception antennas 202-N3+1 to 202-Na in an even-numbered transmission period. Further, one of second Doppler analyzers 210 of each reception sub-block processes a reflected wave signal with respect to the second chirp signal, which is received by reception antennas 202-N3+1 to 202-Na in an odd-numbered transmission period, and a reflected wave signal with respect to the second chirp signal, which is received by reception antennas 202-1 to 202-N3 in an even-numbered transmission period.

Further, for example, the first reception sub-block processes a reflected wave signal with respect to the first chirp signal, which is received by reception antennas 202-1 to 202-N3 in an odd-numbered transmission period, and processes a reflected wave signal with respect to the second chirp signal, which is received by reception antennas 202-1 to 202-N3 in an even-numbered transmission period, for example. Further, for example, the second reception sub-block processes a reflected wave signal with respect to the second chirp signal, which is received by reception antennas 202-N3+1 to 202-Na in an odd-numbered transmission period, and processes a reflected wave signal with respect to the first chirp signal, which is received by reception antennas 202-N3+1 to 202-Na in an even-numbered transmission period, for example.

Doppler analysis is performed by first Doppler analyzer 210 in $z_1$-th signal processor 206 in the first reception sub-block for each distance index $f_b$ by using beat frequency responses $RFT_{z1}(f_b, 1)$, $RFT_{z1}(f_b, 3)$, ... obtained by Nc times chirp pulse transmissions of the first chirp signal. For example, first Doppler analyzer 210 may estimate a Doppler frequency from a reflected wave signal that is the first chirp signal reflected by a target.

Further, Doppler analysis is performed by second Doppler analyzer 210 in $z_1$-th signal processor 206 in the first reception sub-block for each distance index $f_b$ by using beat frequency responses $RFT_{z1}(f_b, 2)$, $RFT_{z1}(f_b, 4)$, ... obtained by Nc times chirp pulse transmissions of the second chirp signal. For example, second Doppler analyzer 210 may estimate a Doppler frequency from a reflected wave signal that is the second chirp signal reflected by a target.

Further, Doppler analysis is performed by first Doppler analyzer 210 in $z_2$-th signal processor 206 of the second reception sub-block for each distance index $f_b$ by using beat frequency responses $RFT_{z2}(f_b, 2)$, $RFT_{z2}(f_b, 4)$, ... obtained by Nc times chirp pulse transmissions of the first chirp signal. For example, first Doppler analyzer 210 may estimate a Doppler frequency from a reflected wave signal that is the first chirp signal reflected by a target.

Further, Doppler analysis is performed by second Doppler analyzer 210 in $z_2$-th signal processor 206 of the second reception sub-block for each distance index $f_b$ by using beat frequency responses $RFT_{z2}(f_b, 1)$, $RFT_{z2}(f_b, 3)$, ... obtained by Nc times chirp pulse transmissions of the second chirp signal. For example, second Doppler analyzer 210 may estimate a Doppler frequency from a reflected wave signal that is the second chirp signal reflected by a target.

For example, in a case where Nc is the value of a power of two, FFT processing can be applied in Doppler analysis. In this case, the FFT size is Nc, and the maximum Doppler frequency at which no aliasing occurs and which is derived from the sampling theorem is $\pm 1/(4T_r)$. Further, the Doppler frequency intervals of Doppler frequency index $f_s$ are $1/(Nc \times 2T_r)$, and the range of Doppler frequency index $f_s$ is $f_s = -Nc/2, \ldots, 0, \ldots, Nc/2-1$.

Hereinafter, a case where Nc is the value of a power of two will be described as an example. Note that, in a case where Nc is not a power of two, inclusion of zero-padded data makes it possible to perform FFT processing with power-of-two data sizes, for example. Further, during the FFT processing, Doppler analyzer 210 may perform multiplication by a window function coefficient such as a Han window or a Hamming window. The application of the window function makes it possible to suppress side lobes that appear around beat frequency peaks.

For example, output $VFT_{z1,1}(f_b, f_s)$ of first Doppler analyzer 210 and output $VFT_{z1,2}(f_b, f_s)$ of second Doppler analyzer 210 in $z_1$-th signal processor 206 in the first reception sub-block are indicated by following equations 72 and 73, where j is the imaginary unit, and $z_1 = 1$ to N3.

(Equation 72)
$$VFT_{z_1,1}(f_b, f_s) = \sum_{u=1}^{N_c} RFT_{z_1}(f_b, 2u-1)\exp\left[-\frac{j2\pi(u-1)f_s}{N_c}\right] \quad [58]$$

(Equation 73)
$$VFT_{z_1,2}(f_b, f_s) = \sum_{u=1}^{N_c} RFT_{z_1}(f_b, 2u)\exp\left[-\frac{j2\pi(u-1)f_s}{N_c}\right] \quad [59]$$

Further, for example, output $VFT_{z2,1}(f_b, f_s)$ of first Doppler analyzer 210 and output $VFT_{z2,2}(f_b, f_s)$ of second Doppler analyzer 210 in $z_2$-th signal processor 206 of the second reception sub-block are indicated by following equations 74 and 75, where j is the imaginary unit, and $z_2 = N3+1$ to Na.

(Equation 74)
$$VFT_{z_2,1}(f_b, f_s) = \sum_{u=1}^{N_c} RFT_{z_2}(f_b, 2u)\exp\left[-\frac{j2\pi(u-1)f_s}{N_c}\right] \quad [60]$$

(Equation 75)
$$VFT_{z_2,2}(f_b, f_s) = \sum_{u=1}^{N_c} RFT_{z_2}(f_b, 2u-1)\exp\left[-\frac{j2\pi(u-1)f_s}{N_c}\right] \quad [61]$$

The processing in each component of signal processor 206 has been described above.

CFAR section 211 may include, for example, first CFAR section 211 (or CFAR section 211-1) and second CFAR section 211 (or CFAR section 211-2) that correspond to the first and second chirp signals with different central frequencies, respectively. In the same manner, Doppler demultiplexer 212 may include, for example, first Doppler demultiplexer 212 (or Doppler demultiplexer 212-1) and second Doppler demultiplexer 212 (or Doppler demultiplexer 212-2) that correspond to the first and second chirp signals with different central frequencies, respectively.

Note that, although FIG. 19 indicates a configuration in which CFAR sections 211 are provided in parallel (CFAR sections 211-1 and 211-2), it may also be configured such that one CFAR section 211 is provided and the input thereof is sequentially switched and processed. Further, although FIG. 19 indicates a configuration in which Doppler demultiplexers 212 are provided in parallel (Doppler demultiplexers 212-1 and 212-2), it may also be configured such that one Doppler demultiplexer 212 is provided and the input thereof is sequentially switched and processed.

In FIG. 19, CFAR section 211 performs CFAR processing (for example, adaptive threshold determination) by using the outputs from Doppler analyzers 210 of signal processors 206 included in the first and second reception sub-blocks and extracts distance index $f_{b\_cfar}$ and Doppler frequency index $f_{s\_cfar}$ that give a local peak signal.

In FIG. 19, CFAR section 211 may include first CFAR section 211 (or referred to as CFAR section 211-1) that performs CFAR processing by using the outputs of first Doppler analyzers 210 of signal processors 206 included in the first and second reception sub-blocks, and second CFAR section 211 (or referred to as CFAR section 211-2) that performs CFAR processing by using the outputs of second Doppler analyzers 210 of signal processors 206 included in the first and second reception sub-blocks.

For example, first CFAR section 211 performs CFAR processing (for example, adaptive threshold determination) by using the outputs of first Doppler analyzers 210 of signal processors 206 included in the first and second reception sub-blocks, which is a result of estimation of a Doppler frequency from a reflected wave signal that is the first chirp signal reflected by a target, and extracts distance index $f_{b\_cfar}$ and Doppler frequency index $f_{s\_cfar}$ that give a local peak signal.

Further, for example, second CFAR section 211 performs CFAR processing (for example, adaptive threshold determination) by using the outputs of second Doppler analyzers 210 of signal processors 206 included in the first and second reception sub-blocks, which is a result of estimation of a Doppler frequency from a reflected wave signal that is the second chirp signal reflected by a target, and extracts distance index $f_{b\_cfar}$ and Doppler frequency index $f_{b\_cfar}$ that give a local peak signal.

For example, q-th CFAR section 211 (q=1 or 2) performs power addition of the outputs of q-th Doppler analyzers 210 of signal processors 206 included in the first and second reception sub-blocks as in following equation 76 and performs two-dimensional CFAR processing formed of the distance axis and the Doppler frequency axis (corresponding to the relative velocity) or CFAR processing combined with one-dimensional CFAR processing.

[62]

$$\text{PowerFT}_q(f_b, f_s) = \sum_{z_1} |VFT_{z_1,q}(f_b, f_s)|^2 + \sum_{z_2} |VFT_{z_2,q}(f_b, f_s)|^2 = \sum_{z=1}^{Na} |VFT_{z,q}(f_b, f_s)|^2 \quad \text{(Equation 76)}$$

Processing disclosed in, for example, NPL 2 may be applied as the two-dimensional CFAR processing or the CFAR processing combined with the one-dimensional CFAR processing.

Here, $z_1=1$ to N3, and $z_2=N3+1$ to Na.

A threshold is adaptively configured by q-th CFAR section 211, and q-th CFAR section 211 outputs distance index $f_{b\_cfar}(q)$, Doppler frequency index $f_{s\_cfar}(q)$, and reception power information PowerFT($f_{b\_cfar}a(q)$, $f_{s\_cfar}(q)$), which become reception power larger than the threshold, to q-th Doppler demultiplexer 212.

Doppler demultiplexer 212 may include first Doppler demultiplexer 212 (or referred to as Doppler demultiplexer 212-1) that performs Doppler demultiplexing processing by using the output of first CFAR section 211 and the output of first Doppler analyzer 210 of signal processor 206 included in each reception sub-block and, and second Doppler demultiplexer 212 (or referred to as Doppler demultiplexer 212-2) that performs Doppler demultiplexing processing by using the output of second CFAR section 211 and the output of second Doppler analyzer 210 of signal processor 206 included in each reception sub-block.

Based on information inputted from q-th CFAR section 211 (for example, distance index $f_{b\_cfar}(q)$, Doppler frequency index $f_{s\_cfar}(q)$, and reception power information PowerFT($f_{b\_cfar}(q)$, $f_{s\_cfar}(q)$)), q-th Doppler demultiplexer 212 (q=1 or 2) demultiplexes a transmission signal to be transmitted from each transmission antenna 106 (for example, a reflected wave signal with respect to the transmission signal) from a Doppler-multiplexed and transmitted signal (hereinafter referred to as "Doppler-multiplexed signal") by using the output from q-th Doppler analyzer 210 included in each reception sub-block.

For example, q-th Doppler demultiplexer 212 outputs information on a demultiplexed signal to Doppler determiner 213 and direction estimator 214. The information on a demultiplexed signal may include, for example, distance index $f_{b\_cfar}(q)$ and Doppler frequency index (hereinafter may also be referred to as demultiplexing index information) both of which correspond to the demultiplexed signal. Here, the demultiplexing index information of first Doppler demultiplexer 212 is Doppler frequency indices which are obtained by demultiplexing signals transmitted from transmission antennas Tx #1, Tx #2, . . . , Tx #N1 included in the first transmission sub-block, and which will be referred to as ($f_{demul\_Tx\ \#1}$, $f_{demul\_Tx\ \#2}$, . . . , $f_{demul\_Tx\ \#N1}$) correspondingly. In the same manner, the demultiplexing index information of second Doppler demultiplexer 212 is Doppler frequency indices which are obtained by demultiplexing signals transmitted from transmission antennas Tx #N1+1, Tx #N1+2, . . . , and Tx #Nt included in the second transmission sub-block, and which will be referred to as ($f_{demul\_Tx\ \#N1+1}$, $f_{demul\_Tx\ \#N1+2}$, . . . , $f_{demul\_Tx\ \#Nt}$) correspondingly.

Further, q-th Doppler demultiplexer 212 outputs the output from q-th Doppler analyzer 210 to direction estimator 214. Note that, based on information inputted from q-th CFAR section 211 (for example, distance index $f_{b\_cfar}(q)$, Doppler frequency index $f_{s\_cfar}(q)$, and reception power information PowerFT($f_{b\_cfar}(q)$, $f_{s\_cfar}(q)$)), q-th Doppler demultiplexer 212 may also output the output from Doppler analyzer 210 included in the q-th reception sub-block to direction estimator 214.

Hereinafter, an operation example of q-th Doppler demultiplexer 212 will be described along with the operation of Doppler shifter 105 in radar transmitter 100b.

[Method of Configuring Doppler Shift Amount]

An example of a method of configuring a Doppler shift amount to be given by Doppler shifter 105 will be described.

In the present embodiment, switching between inputting the first chirp signal and inputting the second chirp signal to mixer 204 is performed in odd-numbered and even-numbered transmission periods, and the same transmission phase change is given to these reception signals. Accordingly, the present embodiment and Embodiment 3 differs in that Doppler shifter 105 gives the same phase rotation in odd-numbered and even-numbered transmission periods. For example, in an odd-numbered transmission period, Doppler shifter 105 gives a phase rotation configured to have the same Doppler shift amount as in Embodiment 3 to a chirp signal, and in an even-numbered transmission period, Doppler shifter 105 gives the phase rotation, which is the same as the phase rotation given in the last odd-numbered transmission period, to a chirp signal.

For example, the present embodiment and Embodiment 3 differs in the following points with respect to equations 62 and 63 described in Embodiment 3.

Doppler shifters 105-1 to 105-N1 of the first transmission sub-block give phase rotation $\varphi_{nsub1}(2u-1)$ as in following equation 77 to an odd-numbered and the m=2u-1-th first chirp signal, which has been inputted, such that Doppler shift amounts $DOP_{nsub1}$ are different from each other among Doppler shifters 105, and output the signal subjected to the Doppler shift to transmission antennas 106 (for example, Tx #1 to Tx #N1).

(Equation 77)

$$\phi_{nsub}(2u-1) = \left\{A\frac{2\pi}{N_c}\text{round}\left(\frac{N_c}{N1+\delta1}\right)(n-1)+\Delta\phi_{01}\right\}(2u-2)+\phi_{01} \quad [63]$$

Here, $n_{sub1}=1$ to N1, and u=1 to Nc.

Further. Doppler shifters 105-1 to 105-N1 of the first transmission sub-block give phase rotation $\varphi_{nsub1}(2u)$ as in following equation 78 to the subsequently inputted even-numbered and m=2u-th first chirp signal such that Doppler shift amounts $DOP_{nsub1}$ are different from each other among Doppler shifters 105 as with the odd-numbered first chirp signal.

[64]

$$\phi_{nsub1}(2u)=\phi_{nsub1}(2u-1) \qquad \text{(Equation 78)}$$

Thus, in each transmission period, Doppler shift amounts different from each other are given to transmission signals to be transmitted from a plurality of transmission antennas 106 (for example, Tx #1 to Tx #N1) included in the first transmission sub-block. Further, the transmission signals to be transmitted from transmission antennas 106 (for example, Tx #1 to Tx #N1) included in the first transmission sub-block may be Doppler-multiplexed and transmitted with Doppler multiplexing number NDM=N1, for example.

In the same manner, Doppler shifters 105-N1+1 to 105-Nt of the second transmission sub-block give phase rotation $\varphi_{nsub2}(m)$ as in following equation 79 to an odd-numbered and the m=2u-1-th second chirp signal, which has been inputted, such that Doppler shift amounts $DOP_{nsub2}$ are different from each other among Doppler shifters 105, and output the signal subjected to the Doppler shift to transmission antennas 106 (for example, Tx #1 to Tx #Nt).

(Equation 79)

$$\phi_{nsub2}(2u-1) = \left\{A\frac{2\pi}{N_c}\text{round}\left(\frac{N_c}{N2+\delta2}\right)(n-1)+\Delta\phi_{02}\right\}(2u-2)+\phi_{02} \quad [65]$$

Here, nsub2=1 to N2, and u=1 to Nc.

Further, Doppler shifters 105-N1+1 to 105-Nt of the second transmission sub-block give phase rotation $\varphi_{nsub2}(2u)$ as in following equation 80 to the subsequently inputted even-numbered and in =2u-th second chirp signal such that Doppler shift amounts $DOP_{nsub2}$ are different from each other among Doppler shifters 105 as with the odd-numbered second chirp signal.

[66]

$$\phi_{nsub2}(2u)=\phi_{nsub2}(2u-1) \qquad \text{(Equation 80)}$$

Thus, in each transmission period. Doppler shift amounts different from each other are given to transmission signals to be transmitted from a plurality of transmission antennas 106 (for example, Tx #N1+1 to Tx #Nt) included in the second transmission sub-block. Further, the transmission signals to be transmitted from transmission antennas 106 (for example, Tx #N1+1 to Tx #Nt) included in the second transmission sub-block may be Doppler-multiplexed and transmitted with Doppler multiplexing number NDM=N2, for example.

Note that, the present disclosure is not limited to equations 62 and 63, and the Doppler shift amount configuration in Doppler shifter 105 described in Embodiment 3 may be applied to the present embodiment.

For example, radar apparatus 10*b* may perform Doppler multiplexing with unequal intervals on the first and second chirp signals with Doppler multiplexing numbers N1 and N2, respectively. Alternatively, radar apparatus 10*b* may perform Doppler multiplexing with unequal intervals on at least one of the first and second chirp signals with Doppler multiplexing numbers N1 and N2, respectively.

[Operation Example of Doppler Demultiplexer 212]

First Doppler demultiplexer 212 demultiplexes and receives signals that are transmitted by being configured such that, among Doppler shifters 105-1 to 105-N1 (for example, among transmission antennas 106-1 to 106-N1) included in the first transmission sub-block, the intervals of Doppler shift amounts $DOP_{nsub1}$ (Doppler shift intervals) are not equal, but at least one Doppler interval is different.

First Doppler demultiplexer 212 demultiplexes signals that are Doppler-multiplexed at unequal intervals based on the outputs of first Doppler analyzers 210 and first CFAR sections 211 in the first and second reception sub-blocks. Then, first Doppler demultiplexer 212 outputs distance index $f_{b\_cfar}(1)$, demultiplexing index information ($f_{demul\_Tx\ \#1}, f_{demul\_Tx\ \#2}, \ldots, f_{demul\_Tx\ \#N1}$) on N1 Doppler-multiplexed signals multiplexed and transmitted in the first transmission sub-block in distance index $f_{b\_cfar}(1)$, and the output of Doppler analyzer 210 to Doppler determiner 213.

Note that, in the present embodiment, switching between inputting the first chirp signal and inputting the second chirp signal to mixer 204 is performed in odd-numbered and even-numbered transmission periods, and the same transmission phase change is given to these reception signals. Accordingly, Doppler shifter 105 gives the same phase rotation in odd-numbered and even-numbered transmission periods. Correspondingly, the operation of first Doppler demultiplexer 212 makes it possible to demultiplex signals that are Doppler-multiplexed among transmission antennas 106-1 to 106-N1 by using the same operation as the operation in which "Nt" is replaced with "N1" and "$T_{rs}$" is replaced with "$2T_r$," in the description of the operation of Doppler shifter 105 of Embodiment 1. Accordingly, a detailed description of the operation of first Doppler demultiplexer 212 will be omitted.

In the same manner, second Doppler demultiplexer 212 demultiplexes and receives signals that are transmitted by being configured such that, among Doppler shifters 105-N1+1 to 105-Nt (for example, among transmission antennas 106-N1+1 to 106-Nt) included in the second transmission sub-block, the intervals of Doppler shift amounts $DOP_{nsub2}$ (Doppler shift intervals) are not equal, but at least one Doppler interval is different.

Second Doppler demultiplexer 212 demultiplexes signals that are Doppler-multiplexed at unequal intervals based on the outputs of second Doppler analyzers 210 and second CFAR sections 211 in the first and second reception sub-blocks. Then, second Doppler demultiplexer 212 outputs distance index $f_{b\_cfar}(2)$, demultiplexing index information ($f_{demul\_Tx\ \#1}, f_{demul\_Tx\ \#2}, \ldots, f_{demul\_Tx\ \#Nt}$) on N2 Doppler-multiplexed signals multiplexed and transmitted in the second transmission sub-block in distance index $f_{b\_cfar}(2)$, and the output of Doppler analyzer 210 to Doppler determiner 213.

Note that, in the present embodiment, switching between inputting the first chirp signal and inputting the second chirp signal to mixer 204 is performed in odd-numbered and even-numbered transmission periods, and the same transmission phase change is given to these reception signals. Accordingly, Doppler shifter 105 gives the same phase rotation in odd-numbered and even-numbered transmission periods. Correspondingly, the operation of second Doppler demultiplexer 212 makes it possible to demultiplex signals that are Doppler-multiplexed among transmission antennas 106-N1+1 to 106-Nt by using the same operation as the operation in which "Nt" is replaced with "N2" and "$T_{rs}$" is replaced with "$2T_r$" in the description of the operation of Doppler shifter 105 of Embodiment 1. Accordingly, a detailed description of the operation of second Doppler demultiplexer 212 will be omitted.

[Operation Example of Doppler Determiner 213]

In FIG. 19. Doppler determiner 213 determines Doppler frequencies corresponding to Doppler peaks based on the respective outputs of first Doppler demultiplexer 212 and second Doppler demultiplexer 212. For example, even in a case where a target object with target object Doppler frequency $f_{d\_TargetDoppler}$ exceeding Doppler frequency range $-1/(2T_r) \leq f_{d\_TargetDoppler} \leq 1/(2T_r)$ is included, Doppler determiner 213 can further extend a Doppler detection range by determining the Doppler frequency of the target object.

For example, Doppler determiner 213 determines the Doppler frequency of a target object including a Doppler frequency exceeding Doppler frequency range $-1/(2T_r) \leq f_{d\_TargetDoppler} \leq 1/(2T_r)$ by using demultiplexing index information ($f_{demul\_Tx\ \#1}, f_{demul\_Tx\ \#2}, \ldots, f_{demul\_Tx\ \#N1}$) on Doppler-multiplexed signals outputted from first Doppler demultiplexer 212 and demultiplexing index information ($f_{demul\_Tx\ \#N1+1}, f_{demul\_Tx\ \#N1+2}, \ldots, f_{demul\_Tx\ \#Nt}$) on Doppler-multiplexed signals outputted from second Doppler demultiplexer 212, where distance index $f_{b\_cfar}(1)$ and distance index $f_{b\_cfar}(2)$ are common.

The principle for Doppler determiner 213 to determine the Doppler frequency of a target object including a Doppler frequency exceeding Doppler frequency range $-1/(2T_r) \leq f_{d\_TargetDoppler} \leq 1/(2T_r)$ utilizes, as in Embodiment 1, the fact that central frequencies between the first and second chirp signals, which are radar transmission signals generated by signal generation controller 104 and radar transmission signal generator 101, differ from each other.

In Embodiment 1, Doppler frequencies are determined based on changes in Doppler frequencies in Doppler-multiplexed signals with respect to the same transmission antenna 106. In the present embodiment, on the other hand, Doppler determiner 213 determines Doppler frequencies based on changes in Doppler frequencies in Doppler-multiplexed signals with respect to different transmission antennas 106. In a case where different transmission antennas 106 are used, the reception phase changes, but the Doppler frequency to be received does not change. Accordingly, as in Embodiment 1, Doppler determiner 213 can determine the Doppler frequency of a target object including a Doppler frequency exceeding Doppler frequency range $-1/(2T_r) \leq f_{d\_TargetDoppler} \leq 1/(2T_r)$.

The operation principle of the Doppler frequency determination processing and an operation example of Doppler determiner 213 differ in description from the operation principle of the Doppler frequency determination processing and an operation example of Doppler determiner 213 in Embodiment 1 in terms of the following points (1), (2) and (3).

(1) "$T_{rs}$" is replaced with "$2T_r$";

(2) Doppler determiner 213 in Embodiment 1 calculates, based on demultiplexing index information ($f_{demul\_Tx\ \#1}(1), f_{demul\_Tx\ \#2}(1), \ldots, f_{demul\_Tx\ \#Nt}(1)$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(2T_{rs}) \leq f_{d\_TargetDoppler} \leq 1/(2T_{rs})$, whereas in the present embodiment, Doppler determiner 213 calculates, based on demultiplexing index information ($f_{demul\_Tx\ \#1}, f_{demul\_Tx\ \#2}, \ldots, f_{demul\_Tx\ \#N1}$) on Doppler-multiplexed signals in distance index $f_{b\_cfar}(1)$ outputted from first Doppler demultiplexer 212, estimated Doppler frequency value $f_{d\_VFT}(1)$ in a case where the Doppler frequency of a target object is assumed to be within Doppler frequency range $-1/(4T_r) \leq f_{d\_TargetDoppler} \leq 1/(4T_r)$; and (3) Doppler determiner 213 in Embodiment 1 calculates, based on demultiplexing index information ($f_{demul\_Tx\ \#1}(2), f_{demul\_Tx\ \#2}(2), \ldots, f_{demul\_Tx\ \#Nt}(2)$) on Doppler-multiplexed signals in distance index $f_{b\_cfar}(2)$ outputted from second Doppler demultiplexer 212, estimated Doppler frequency value $f_{d\_VFT}(2)$ in a case where the Doppler frequency of a target object is assumed to be within Doppler frequency range $-1/(2T_{rs}) \leq f_{d\_TargetDoppler} \leq 1/(2T_{rs})$, whereas in the present embodiment, Doppler determiner 213 calculates, based on demultiplexing index information ($f_{demul\_Tx\ \#N1+1}, f_{demul\_Tx\ \#N1+2}, \ldots, f_{demul\_Tx\ \#Nt}$) on Doppler-multiplexed signals in distance index $f_{b\_cfar}(2)$ outputted from second Doppler demultiplexer 212, estimated Doppler frequency value $f_{d\_VFT}(2)$ in a case where the Doppler frequency of a target object is assumed to be within Doppler frequency range $-1/(4T_r) \leq f_{d\_TargetDoppler} \leq 1/(4T_r)$.

In the present embodiment, the operation of Doppler determiner 213 other than the three points described above is the same as in Embodiment 1 so that a description of the operation thereof will be omitted.

Further, as with Doppler determiner 213 in Embodiment 1, Doppler determiner 213 can determine the Doppler frequency of a target object by configuring central frequencies $f_c(1)$ and $f_c(2)$ satisfying one of the determinable conditions of equations 10 to 15 in which "$T_{rs}$" is replaced with "$2T_r$," even in a case where a target object with a Doppler frequency exceeding Doppler frequency range $-1/(2T_r) \leq f_{d\_TargetDoppler} \leq 1/(2T_r)$ is included (for example, in a case where Doppler aliasing occurs). Note that, although equations 10 and 13 are equations including $T_{rs}$, equation modification makes it possible to obtain equations including no $T_{rs}$ as in equations 11, 12, 14, and 15. Accordingly, the condition for central frequencies $f_c(1)$ and $f_c(2)$ satisfying the determinable condition(s) becomes the same condition as in Embodiment 1.

Note that, equation 18 used in the description of Embodiment 1 is expressed as in following equation 81 by replacing $T_{rs}$ with $2T_r$.

(Equation 81)

$$\frac{1}{4T_r} > \left| \frac{f_c(2)}{f_c(1)} \frac{n_{al}}{2T_r} - \frac{n_{al}}{2T_r} \right| = \Delta_{n_{al}} \qquad [67]$$

Equation 81 represents the condition that the difference between Doppler frequency aliasing component $n_{a1} \times \{f_c(2)/f_c(1)\}/2T_r$ observed by using the second chirp signal of central frequency $f_c(2)$ and $2n_{a1}/T_r$ which is the frequency intervals of number $n_{a1}$ of times of aliasing of first Doppler analyzer 210 does not exceed $\pm 1/(4T_r)$ in the case of number $n_{a1}$ of Doppler aliasing. For example, in a case where n is positive, Ana is in the range of $1/(4T_r)$ until maximum $n_{a1}$ satisfying equation 19, and Doppler determiner 213 can estimate aliasing without ambiguity. Note that, maximum $n_{a1}$ satisfying equation 19 is referred to as "$n_{a1\ max}$". For example, in a case where $n_{a1}$ is negative, equation 19 is satisfied in the same manner when $n=-n_{a1\ max}$.

Here, in Embodiment 1, the first chirp signal or the second chirp signal is transmitted in period $T_{rs}$, and the Doppler frequency detection range is extended $n_{a1\ max}$ times with respect to the Doppler frequency range at the time of one transmission antenna, for example. In the present embodiment, on the other hand, a signal corresponding to the first chirp signal or the second chirp signal is inputted to first or second Doppler analyzer 210 via output switch 217 in period $2T_r$, and frequency analysis processing is performed. Accordingly, in the present embodiment, the Doppler frequency detection range becomes the same as in the case of reception sub-block, and N4 reception antennas 202 included in the second reception sub-block. In the same manner, $N2\times(N3+N4)=N2\times Na$ MIMO virtual reception antennas are configured among N2 transmission antennas 106 included in the second transmission sub-block, N3 reception antennas 202 included in the first reception sub-block, and N4 reception antennas 202 included in the second reception sub-block. Direction estimator 214 may perform direction estimation processing by using these two sets of virtual reception antennas, for example, $Nt\times Na$ MIMO virtual reception antennas.

For example, direction estimator 214 extracts the output of first Doppler analyzer 210 from the output of first Doppler demultiplexer 212 based on distance index $f_{b\_cfar}(1)$ and demultiplexing index information ($f_{demul\_Tx\ \#1}$, $f_{demul\_Tx\ \#2}, \ldots, f_{demul\_Tx\ \#N1}$) on Doppler-multiplexed signals in distance index $f_{b\_cfar}(1)$, and generates first virtual reception array correlation vector $h_1(f_{b\_cfar}(1), f_{demul\_Tx\ \#1}, f_{demul\_Tx\ \#2}, \ldots, f_{demul\_Tx\ \#Nt})$ formed of $N1\times(N3+N4)$ elements as indicated by following equation 82.

(Equation 82)

$$h_1(f_{b\_cfar}, f_{demul\_Tx\#1}, f_{demul\_Tx\#2}, \ldots, f_{demul\_Tx\#N1}) = \begin{bmatrix} h_{11}(f_{b\_cfar}, f_{demul\_Tx\#1}, f_{demul\_Tx\#2}, \ldots, f_{demul\_Tx\#N1}) \\ \exp[-j2\pi f_{dest}T_r] \times h_{21}(f_{b\_cfar}, f_{demul\_Tx\#1}, f_{demul\_Tx\#2}, \ldots, f_{demul\_Tx\#N1}) \end{bmatrix}$$

[68]

Embodiment 1 and is extended $n_{a1\ max}$ times with respect to the Doppler frequency range at the time of one transmission antenna, for example.

An operation example of Doppler determiner 213 has been described above.

[Operation Example of Direction Estimator 214]

In FIG. 19, direction estimator 214 extracts the outputs of first Doppler analyzer 210 and second Doppler analyzer 210 based on information inputted from first Doppler demultiplexer 212 (for example, distance index $f_{b\_cfar}(1)$, and demultiplexing index information ($f_{demul\_Tx\ \#1}$, $f_{demul\_Tx\ \#2}, \ldots, f_{demul\_Tx\ \#N1}$) on Doppler-multiplexed signals in distance index $f_{b\_cfar}(1)$), information inputted from second Doppler demultiplexer 212 (for example, distance index $f_{b\_cfar}(2)$, and demultiplexing index information ($f_{demul\_Tx\ \#N1+1}$, $f_{demul\_Tx\ \#N1+2}, \ldots f_{demul\_Tx\ \#Nt}$) on Doppler-multiplexed signals in distance index $f_{b\_cfar}(2)$), and Doppler frequency information $f_{dest}=f_{d\_VFT}(1))+n_{a1est}/(2T_r)$ or $f_c(2)/f_c(1)$ $(f_{d\_VFT})+n_{a1est}/(2T_r)$ determined by Doppler determiner 213 and performs target direction estimation processing.

In the present embodiment, $N1\times(N3+N4)=N1\times Na$ MIMO virtual reception antennas are configured among N1 transmission antennas 106 included in the first transmission sub-block, N3 reception antennas 202 included in the first Further, for example, direction estimator 214 extracts the output of second Doppler analyzer 210 from the output of second Doppler demultiplexer 212 based on distance index $f_{b\_cfar}(2)$ and demultiplexing index information ($f_{demul\_Tx\ \#N1+1}$, $f_{demul\_Tx\ \#N1+2}, \ldots, f_{demul\_Tx\ \#Nt}$) on Doppler-multiplexed signals in distance index $f_{b\_cfar}(2)$, and generates second virtual reception array correlation vector $h_2(f_{b\_cfar}(2), f_{demul\_Tx\ \#N1+1}, f_{demul\_Tx\ \#N1+2}, \ldots, f_{demul\_Tx\ \#Nt})$ formed of $N2\times(N3+N4)$ elements as indicated by following equation 83.

(Equation 83)

$$h_2(f_{b\_cfar}, f_{demul\_Tx\#N1+1}, f_{demul\_Tx\#N1+2}, \ldots, f_{demul\_Tx\#Nt}) = \begin{bmatrix} \exp[-j2\pi f_{dest}T_r] \times h_{12}(f_{b\_cfar}, f_{demul\_Tx\#N1+1}, f_{demul\_Tx\#N1+2}, \ldots, f_{demul\_Tx\#Nt}) \\ h_{22}(f_{b\_cfar}, f_{demul\_Tx\#N1+1}, f_{demul\_Tx\#N1+2}, \ldots, f_{demul\_Tx\#Nt}) \end{bmatrix}$$

[69]

Note that, since direction estimator 214 performs direction estimation processing by using the outputs of first and second Doppler demultiplexers 212 with the same distance index, $f_{b\_cfar}(1)=f_{b\_cfar}(2)=f_{b\_cfar}$ in equations 82 and 83.

In equation 82, $h_{11}(f_{b\_cfar}(1), f_{demul\_Tx\ \#1}, f_{demul\_Tx\ \#2}, \ldots, f_{demul\_Tx\ \#N1})$ represents a column vector formed of $N1\times N3$ elements as in following equation 84, and the vector includes, as an element, the output of first Doppler analyzer 210 obtained by receiving signals transmitted from N1 transmission antennas 106 included in the first transmission sub-block at N3 reception antennas 202 included in the first reception sub-block.

(Equation 84)

$$h_{11}(f_{b\_cfar}, f_{demul\_Tx\#1}, f_{demul\_Tx\#2}, \ldots, f_{demul\_Tx\#N1}) = \begin{bmatrix} h_{1cal[1]}VFT_1(f_{b\_cfar}, f_{demul\_Tx\#1}) \\ h_{1cal[2]}VFT_2(f_{b\_cfar}, f_{demul\_Tx\#1}) \\ \vdots \\ h_{1cal[N3]}VFT_{N3}(f_{b\_cfar}, f_{demul\_Tx\#1}) \\ h_{1cal[N3+1]}VFT_1(f_{b\_cfar}, f_{demul\_Tx\#2}) \\ h_{1cal[N3+2]}VFT_2(f_{b\_cfar}, f_{demul\_Tx\#2}) \\ \vdots \\ h_{1cal[2N3]}VFT_{N3}(f_{b\_cfar}, f_{demul\_Tx\#2}) \\ \vdots \\ h_{1cal[N3(N1-1)+1]}VFT_1(f_{b\_cfar}, f_{demul\_Tx\#1}) \\ h_{1cal[N3(N1-1)+2]}VFT_2(f_{b\_cfar}, f_{demul\_Tx\#1}) \\ \vdots \\ h_{1cal[N3N1]}VFT_{N3}(f_{b\_cfar}, f_{demul\_Tx\#N1}) \end{bmatrix} \quad [70]$$

Further, in equation 82, $h_2(f_{b\_cfar}, f_{demul\_Tx\ \#1}, f_{demul\_Tx\ \#2}, \ldots, f_{demul\_Tx\ \#N1})$ represents a column vector formed of N1×N4 elements as in following equation 85, and the vector includes, as an element, the output of second Doppler analyzer 210 obtained by receiving signals transmitted from N1 transmission antennas 106 included in the first transmission sub-block at N4 (=Na−N3) reception antennas 202 included in the second reception sub-block.

(Equation 85)

$$h_{21}(f_{b\_cfar}, f_{demul\_Tx\#1}, f_{demul\_Tx\#2}, \ldots, f_{demul\_Tx\#N1}) = \begin{bmatrix} h_{1cal[N3N]}VFT_{N3+1}(f_{b\_cfar}, f_{demul\_Tx\#1}) \\ h_{1cal[N3N1+]}VFT_{N3+2}(f_{b\_cfar}, f_{demul\_Tx\#1}) \\ \vdots \\ h_{1cal[N3N1+N4]}VFT_{Na}(f_{b\_cfar}, f_{demul\_Tx\#1}) \\ h_{1cal[N3+1+N4+1]}VFT_{N3+1}(f_{b\_cfar}, f_{demul\_Tx\#2}) \\ h_{1cal[N3+1+N4+2]}VFT_{N3+2}(f_{b\_cfar}, f_{demul\_Tx\#2}) \\ \vdots \\ h_{1cal[N3N1+2N4]}VFT_{Na}(f_{b\_cfar}, f_{demul\_Tx\#2}) \\ \vdots \\ h_{1cal[N3N1+N4(N1-1)+1]}VFT_{N3+1}(f_{b\_cfar}, f_{demul\_Tx\#1}) \\ h_{1cal[N3N1+N4(N1-1)+2]}VFT_{N3+2}(f_{b\_cfar}, f_{demul\_Tx\#1}) \\ \vdots \\ h_{1cal[NaN1]}VFT_{Na}(f_{b\_cfar}, f_{demul\_Tx\#N1}) \end{bmatrix} \quad [71]$$

Further, in equation 83, $h_{12}(f_{b\_cfar}, f_{demul\_Tx\ \#N1+1}, f_{demul\_Tx\ \#N1+2}, \ldots, f_{demul\_Tx\ \#Nt})$ represents a column vector formed of N2×N3 elements as in following equation 86, and the vector includes, as an element, the output of second Doppler analyzer 210 obtained by receiving signals transmitted from N2 (=Nt−N1) transmission antennas 106 included in the second transmission sub-block at N3 reception antennas 202 included in the first reception sub-block.

(Equation 86)

$$h_{12}(f_{b\_cfar}, f_{demul\_Tx\#N1+1}, f_{demul\_Tx\#N1+2}, \ldots, f_{demul\_Tx\#Nt}) = \begin{bmatrix} h_{2cal[1]}VFT_1(f_{b\_cfar}, f_{demul\_Tx\#N1+1}) \\ h_{2cal[2]}VFT_2(f_{b\_cfar}, f_{demul\_Tx\#N1+1}) \\ \vdots \\ h_{2cal[N3]}VFT_{N3}(f_{b\_cfar}, f_{demul\_Tx\#N1+1}) \\ h_{2cal[N3+1]}VFT_1(f_{b\_cfar}, f_{demul\_Tx\#N1+2}) \\ h_{2cal[N3+2]}VFT_2(f_{b\_cfar}, f_{demul\_Tx\#N1+2}) \\ \vdots \\ h_{2cal[2N3]}VFT_{N3}(f_{b\_cfar}, f_{demul\_Tx\#N1+2}) \\ \vdots \\ h_{2cal[N3(N1-1)+1]}VFT_1(f_{b\_cfar}, f_{demul\_Tx\#Nt}) \\ h_{2cal[N3(N1-1)+2]}VFT_2(f_{b\_cfar}, f_{demul\_Tx\#Nt}) \\ \vdots \\ h_{2cal[N3N2]}VFT_{N3}(f_{b\_cfar}, f_{demul\_Tx\#Nt}) \end{bmatrix}$$

Further, in equation 83, $h22(f_{b\_cfar}, f_{demul\_Tx\ \#N1+1}, f_{demul\_Tx\ \#N1+2}, \ldots, f_{demul\_Tx\ \#Nt})$ represents a column vector formed of N2×N4 elements as in following equation 87, and the vector includes, as an elements, the output of second Doppler analyzer 210 obtained by receiving signals transmitted from N2 (=Nt−N1) transmission antennas 106 included in the first transmission sub-block at N4 (=Na−N3) reception antennas 202 included in the second reception sub-block.

(Equation 87)

$$h_{21}(f_{b\_cfar}, f_{demul\_Tx\#N1+1}, f_{demul\_Tx\#N1+2}, \cdots, f_{demul\_Tx\#Nt}) = \begin{bmatrix} h_{2cal[N3N2+1]}VFT_{N3+1}(f_{b\_cfar}, f_{demul\_Tx\#N1+1}) \\ h_{2cal[N3N2+2]}VFT_{N3+2}(f_{b\_cfar}, f_{demul\_Tx\#N1+1}) \\ \vdots \\ h_{2cal[N3N2+N4]}VFT_{Na}(f_{b\_cfar}, f_{demul\_Tx\#N1+1}) \\ h_{2cal[N3N2+N4+1]}VFT_{N3+1}(f_{b\_cfar}, f_{demul\_Tx\#N1+2}) \\ h_{2cal[N3N2+N4+2]}VFT_{N3+2}(f_{b\_cfar}, f_{demul\_Tx\#N1+2}) \\ \vdots \\ h_{2cal[N3N2+N4]}VFT_{Na}(f_{b\_cfar}, f_{demul\_Tx\#N1+2}) \\ \vdots \\ h_{2cal[N3N2+4(N1-1)+1]}VFT_{N3+1}(f_{b\_cfar}, f_{demul\_Tx\#Nt}) \\ h_{2cal[N3N(N1-1)+2]}VFT_{N3+2}(f_{b\_cfar}, f_{demul\_Tx\#Nt}) \\ \vdots \\ h_{2cal[N3N2]}VFT_{Na}(f_{b\_cfar}, f_{demul\_Tx\#Nt}) \end{bmatrix}$$

Further, the reception timing of $h_{21}(f_{b\_cfar}, f_{demul\_Tx\ \#1}, f_{demul\_Tx\ \#2}, \ldots, f_{demul\_Tx\ \#N1})$ is delayed by $T_r$ with respect to the reception timing of $h_{11}(f_{b\_cfar}, f_{demul\_Tx\ \#1}, f_{demul\_Tx\ \#2}, \ldots, f_{demul\_Tx\ \#N1})$. The term $\exp[-j2\pi f_{dest}T_r]$ included in equation 82 is a correction term for correcting, based on Doppler frequency $f_{dest}$ of a target object estimated by Doppler determiner 213, the phase variation due to the delay thereof.

Further, the reception timing of $h_{12}(f_{b\_cfar}, f_{demul\_Tx\ \#1}, f_{demul\_Tx\ \#2}, \ldots, f_{demul\_Tx\ \#N1})$ is delayed by $T_r$ with respect to the reception timing of $h_{22}(f_{b\_cfar}, f_{demul\_Tx\ \#1}, f_{demul\_Tx\ \#2}, \ldots, f_{demul\_Tx\ \#N1})$. The term $\exp[-j2\pi f_{dest}T_r]$ included in equation 83 is a correction term for correcting, based on Doppler frequency $f_{dest}$ of a target object estimated by Doppler determiner 213, the phase variation due to the delay thereof.

Further, in equations 84 and 85, $h_{1cal[b]}$ is an array correction value for correcting phase deviations and amplitude deviations among transmission antennas Tx #1 to Tx #N1 and among reception antennas Rx #1 to #Na, and integer b=1 to (Na×N1).

Further, in equations 86 and 87, $h_{2cal[bb]}$ is an array correction value for correcting phase deviations and amplitude deviations among transmission antennas Tx #N1+1 to Tx #Nt and among reception antennas Rx #1 to #Na, and integer bb=1 to (Na×N2).

For example, direction estimator 214 calculates a spatial profile, with azimuth direction $\theta_u$ in direction estimation evaluation function value $P_H(\theta_u, f_{b\_cfar}, f_{demul\_Tx\ \#1}, f_{demul\_Tx\ \#2}, \ldots, f_{demul\_Tx\ \#Nt})$ being variable within a predetermined angular range. Direction estimator 214 extracts a predetermined number of local maximum peaks in the calculated spatial profile in descending order, and outputs the azimuth directions of the local maximum peaks as direction-of-arrival estimation values (for example, positioning output). Here, $f_{b\_cfar}w$ represents the distance index in which $f_{b\_cfar}(1)=f_{b\_cfar}(2)$.

Note that, there are various methods with respect to direction estimation evaluation function value $P_H(\theta_u, f_{b\_cfar}, f_{demul\_Tx\ \#1}, f_{demul\_Tx\ \#2}, \ldots, f_{demul\_Tx\ \#Nt})$ depending on direction-of-arrival estimation algorithms. For example, the estimation method using an array antenna, as disclosed in NPL 3, may be used.

For example, a beamformer method can be given by following equation 88.

[74]

$$P_H(\theta_u, f_{b\_cfar}, f_{demul\_Tx\ \#1}, \cdots, f_{demul\_Tx\ \#Nt}) = |a_1^H(\theta_u) \\ h_1(f_{b\_cfar}, f_{demul\_Tx\ \#1}, f_{demul\_Tx\ \#2}, \cdots, \\ f_{demul\_Tx\ \#N1})|^2 + |a_2(\theta_u)h_2(f_{b\_cfar}, f_{demul\_Tx\ \#N1+1}, \\ f_{demul\_Tx\ \#N1+2}, \cdots, f_{demul\_Tx\ \#Nt})|^2$$

(Equation 88)

In addition to the beamformer method, a technique such as Capon and MUSIC is also applicable. Note that, in equation 88, superscript H is the Hermitian transpose operator.

In equation 88, $a_1(\theta_u)$ represents the direction vector (column vector with N1×Na elements) of N1×Na MIMO virtual reception antennas formed among N1 transmission antennas 106 included in the first transmission sub-block and Na reception antennas 202 included in the first and second reception sub-blocks, and represents the phase response or the complex amplitude response at each virtual reception antenna that forms N1×Na MIMO virtual reception antennas in a case where reflected waves arrives in the $\theta_u$ direction.

Further, in equation 88, $a_2(\theta_u)$ represents the direction vector (column vector with N2×Na elements) of N2×Na MIMO virtual reception antennas formed among N2 transmission antennas 106 included in the second transmission sub-block and Na reception antennas 202 included in the first and second reception sub-blocks, and represents the phase response or the complex amplitude response at each virtual reception antenna that forms N2×Na MIMO virtual reception antennas in a case where reflected waves arrives in the $\theta_u$ direction.

Note that, the phase response or the complex amplitude response at each virtual reception antenna when the wavelength of a radar transmission signal (for example, the q-th chirp signal) in the case of central frequency $f_c(q)$ is used may be used for direction vector $a_q(\theta_u)$. Alternatively, direction vector $a(\theta_u)$ of a virtual reception array with respect to an arrival wave in azimuth direction θ in the average central frequency of central frequencies $f_c(1)$ and $f_c(2)$ may be commonly used.

Further, azimuth direction $\theta_u$ is a vector that is changed with predetermined azimuth interval $\beta_1$ in an azimuth range in which direction-of-arrival estimation is performed. For example, $\theta_u$ is configured as follows.

$\theta_u = \theta$ min+$u\beta_1$, integer u=0, ..., NU, and
NU=floor[($\theta$ max−$\theta$ min)/$\beta_1$]+1.

Here, floor(x) is a function that returns the maximum integer value that does not exceed real number x.

Further, although the example described above is where direction estimator 214 calculates the azimuth direction as a direction-of-arrival estimation value, the present disclosure is not limited thereto, and the direction-of-arrival estimation of an elevation angle direction or, by using MIMO antennas arranged in a rectangular grid shape, the direction-of-arrival estimation of an azimuth direction and an elevation angle direction are also possible. For example, direction estimator 214 may calculate an azimuth direction and an elevation angle direction as direction-of-arrival estimation values and configure the azimuth direction and the elevation angle direction as positioning output.

With the above operation, direction estimator 214 may output, as positioning output, direction-of-arrival estimation values in distance index $f_{b\_cfar}$ and demultiplexing index information ($f_{demul\_Tx\ \#1}$, $f_{demul\_Tx\ \#2}$, ..., $f_{demul\_Tx\ \#Nt}$) on Doppler-multiplexed signals. In addition, direction estimator 214 may further output, as positioning output, distance index $f_{b\_cfar}$, and demultiplexing index information ($f_{demul\_Tx\ \#1}$, $f_{demul\_Tx\ \#2}$, ..., $f_{demul\_Tx\ \#Nt}$) on Doppler-multiplexed signals. For example, direction estimator 214 may output positioning output (or a positioning result) to a vehicle controller (not illustrated) in an in-vehicle-mounted radar (not illustrated) or to an infrastructure controller (not illustrated) in an infrastructure radar (not illustrated).

Further, for example, direction estimator 214 may output one or both of Doppler frequency information $f_{d\_VFT}+n_{alest}/T_{rs}$ and $f_c(2)/f_c(1)$ ($f_{d\_VFT(1)}+n_{alest}/T_{rs}$) determined by Doppler determiner 213.

Further, for example, distance index $f_{b\_cfar}$ may be converted into distance information by using equation 1 and outputted.

Further, Doppler frequency information determined by Doppler determiner 213 may be converted into relative velocity information and outputted. Doppler frequency information $f_{d\_VFT}+n_{alest}/2T_r$ by central frequency fc(1), which is determined by Doppler determiner 213, can be converted into relative velocity $v_d$ by using following equation 89.

(Equation 89)
$$v_d\left(f_{d\_VFT(1)} + \frac{n_{alest}}{2T_r}\right) = \frac{C_0}{2f_c(1)}\left(f_{d\_VFT(1)} + \frac{n_{alest}}{2T_r}\right) \quad [75]$$

In the same manner, when Doppler frequency information $f_c(2)/f_c(1)$ ($f_{d\_VFT}(1)+n_{alest}/T_r$) by central frequency $f_c(2)$, which is determined by Doppler determiner 213, is converted into relative velocity $v_d$, relative velocity $v_d$ takes the same value as that in equation 89 as in following equation 90 so that the relative velocity information may be outputted as a common value (or a unified value) with respect to different central frequencies.

(Equation 90)
$$v_d\left(\frac{f_c(2)}{f_c(1)}f_{d\_VFT(1)} + \frac{n_{alest}}{2T_r}\right) = \frac{C_0}{2f_c(1)}\left(f_{d\_VFT(1)} + \frac{n_{alest}}{2T_r}\right) \quad [76]$$

As described above, in the present embodiment, radar apparatus 10b includes a plurality of radar transmission signal generators 101, and transmits a transmission signal from transmission antenna 106 for each predetermined transmission period by using the first central frequency and the second central frequency that satisfy one of equations 10 to 15, for example. Thus, radar apparatus 10b can determine the number of times of aliasing at Doppler determiner 213 based on the deviation between Doppler frequencies in accordance with the difference between central frequencies, where the deviation is detected by Doppler analyzer 210 and Doppler demultiplexer 212. Thus, for example, radar apparatus 10b can extend a Doppler frequency range (or the maximum value of relative velocity) in which a Doppler-multiplexed signal can be demultiplexed in accordance with a determinable number of times of aliasing.

As described above, the present embodiment makes it possible to extend a Doppler frequency range (or the maximum value of relative velocity) in which no ambiguity occurs. Thus, radar apparatus 10b can detect a target object (for example, a direction of arrival) with high accuracy in a wider Doppler frequency range.

Further, in the present embodiment, a Doppler frequency range in which Doppler-multiplexed signals can be demultiplexed is extended by configuring the central frequencies of chirp signals so that, for example, the application of a method such as making the sampling rate of an A-D converter faster may be omitted. Thus, the present embodiment makes it possible to suppress complexity of the hardware configuration in radar apparatus 10b and further to suppress an increase in power dissipation or heat generation in radar apparatus 10b. Further, in the present embodiment, a Doppler frequency range in which Doppler-multiplexed signals can be demultiplexed is extended by configuring the central frequencies of chirp signals so that the application of a method such as shortening transmission period $T_r$ may be omitted. Thus, the present embodiment makes it possible to reduce a distance range detectable by radar apparatus 10b or to suppress deterioration of the distance resolution.

Further, the present embodiment makes it possible to use a larger number of MIMO virtual reception antennas in direction estimator 214 in comparison with Embodiment 3. Thus, radar apparatus 10b makes it possible to improve the SNR and to improve the directional estimation accuracy.

Further, since the present embodiment makes it possible to use a larger number of MIMO virtual reception antennas in comparison with Embodiment 3, it is possible to extend the opening length of the MIMO virtual reception antenna and it is also possible to improve the angular resolution.

Figure 20:
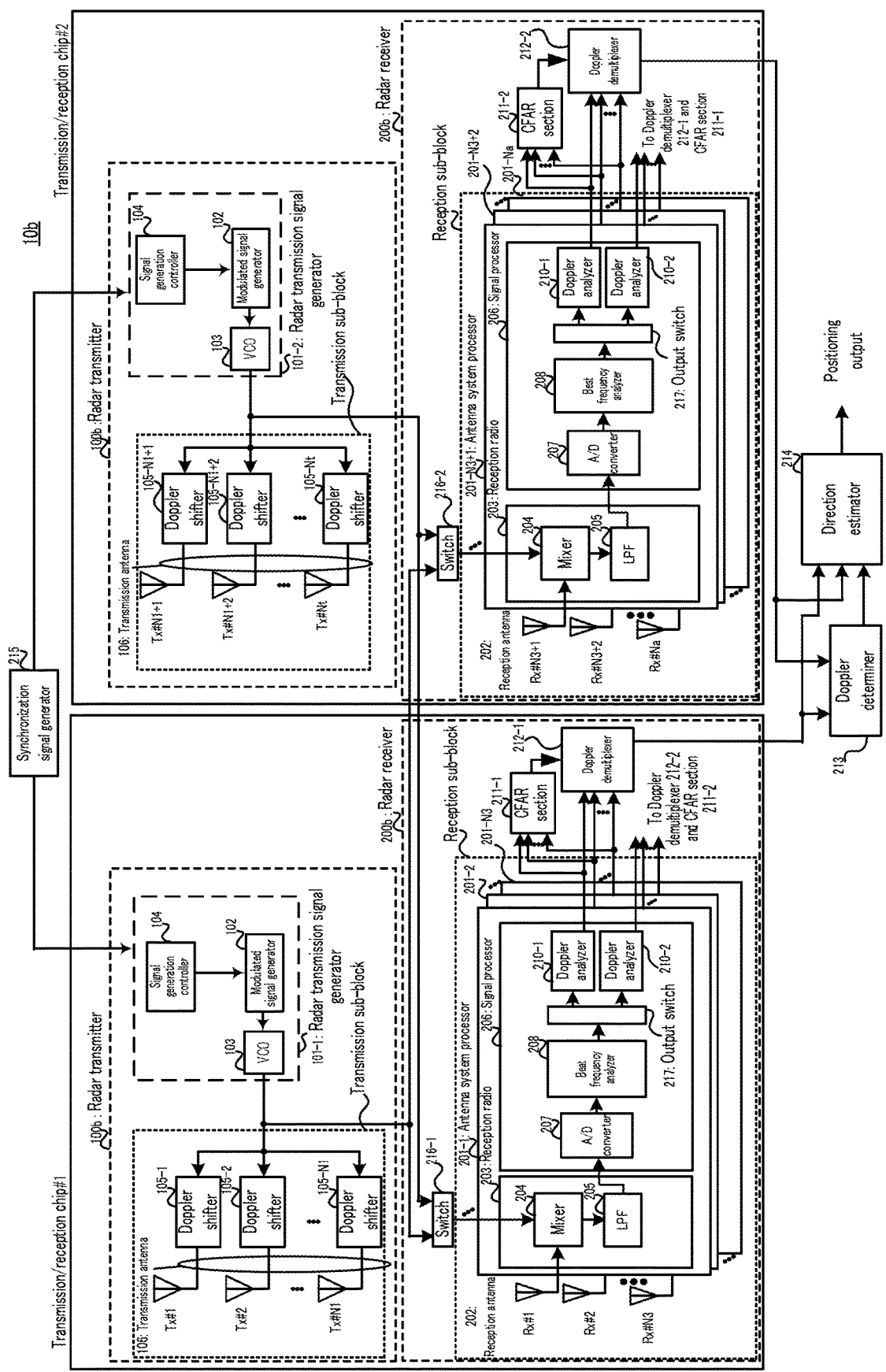
FIG. 20 illustrates a configuration example of the radar apparatus.

(Modification 1 of Embodiment 4) The configuration of radar apparatus 10b illustrated in FIG. 19 may be implemented, for example, by combining a plurality of transmission/reception chips as illustrated in FIG. 20. In the example of FIG. 20, radar apparatus 10b is formed of transmission/reception chip #1 and transmission/reception chip #2.

Transmission/reception chip #q includes radar transmission signal generator 101-q, q-th transmission sub-block, q-th reception sub-block, q-th CFAR section 211, q-th Doppler demultiplexer 212, and q-th switch 216. Here, q=1 or 2.

Note that, at least one of Doppler determiner 213 and direction estimator 214 may be implemented in another signal processing chip, ECU or the like, or may be configured to be incorporated in one of the transmission/reception chips.

FIG. 20 differs from FIG. 19 in that synchronization signal generator 215 is provided and a synchronization signal(for example, a signal serving as a reference) outputted from synchronization signal generator 215 is outputted to radar transmission signal generator 101 of radar transmitter 100b of each transmission/reception chip. Thus, the outputs of chirp signals become possible such that the frequency difference between the first chirp signal outputted from the first transmission sub-block of transmission/reception chip #1 and the second chirp signal outputted from the second transmission sub-block of transmission/reception chip #2 is within predetermined allowable errors. Even the configuration as in FIG. 20 makes it possible to obtain the same effect as in Embodiment 4, and further to reduce the cost by combination of a general-purpose transmission/reception chip.

One exemplary embodiment according to the present disclosure has been described above.

OTHER EMBODIMENTS (Variation 1)

For example, although an example of application to a Doppler multiplex transmission-MIMO radar in which the Doppler multiplexing intervals are unequal has been indicated in Embodiment 1, the present disclosure is not limited thereto, and can be applied to a radar in the case of one transmission antenna (Nt=1) (for example SIMO (Single Input Multiple Output) radar).

Further, the operation according to Embodiment 1 can also be applied to a radar in the case of one reception antenna (Na=1) (for example, MISO (Multiple Input Single Output) radar), for example.

Further, the operation according to Embodiment 1 can also be applied to a radar in the case of one transmission antenna (Nt-1) and one reception antenna (Na-1) (for example, SISO (Single Input Single Output) radar).

Note that, the case of one reception antenna (Na=1) corresponds to, for example, the configuration of Na=1 in Embodiment 1, and makes it possible to obtain the effect described in Embodiment 1 in the same manner.

Further, the case of one transmission antenna (Nt=1) corresponding to, for example, the configuration of Nt=1 in Embodiment 1, and makes it possible to obtain the effect described in Embodiment 1 in the same manner.

Note that, in the case of one transmission antenna (Nt=1). Doppler multiplex transmission may be omitted. Accordingly, the Doppler shift in Doppler shifter 105 may be omitted. Further, Doppler demultiplexer 212 may not perform Doppler demultiplexing, and may perform processing of extracting peaks of indices, which are indicated by the output from CFAR section 211 and are extracted from Doppler analyzer 210. Thus, in the case of one transmission antenna (Nc=1), the configuration of the radar apparatus illustrated in FIG. 21 may be employed.

Figure 21:
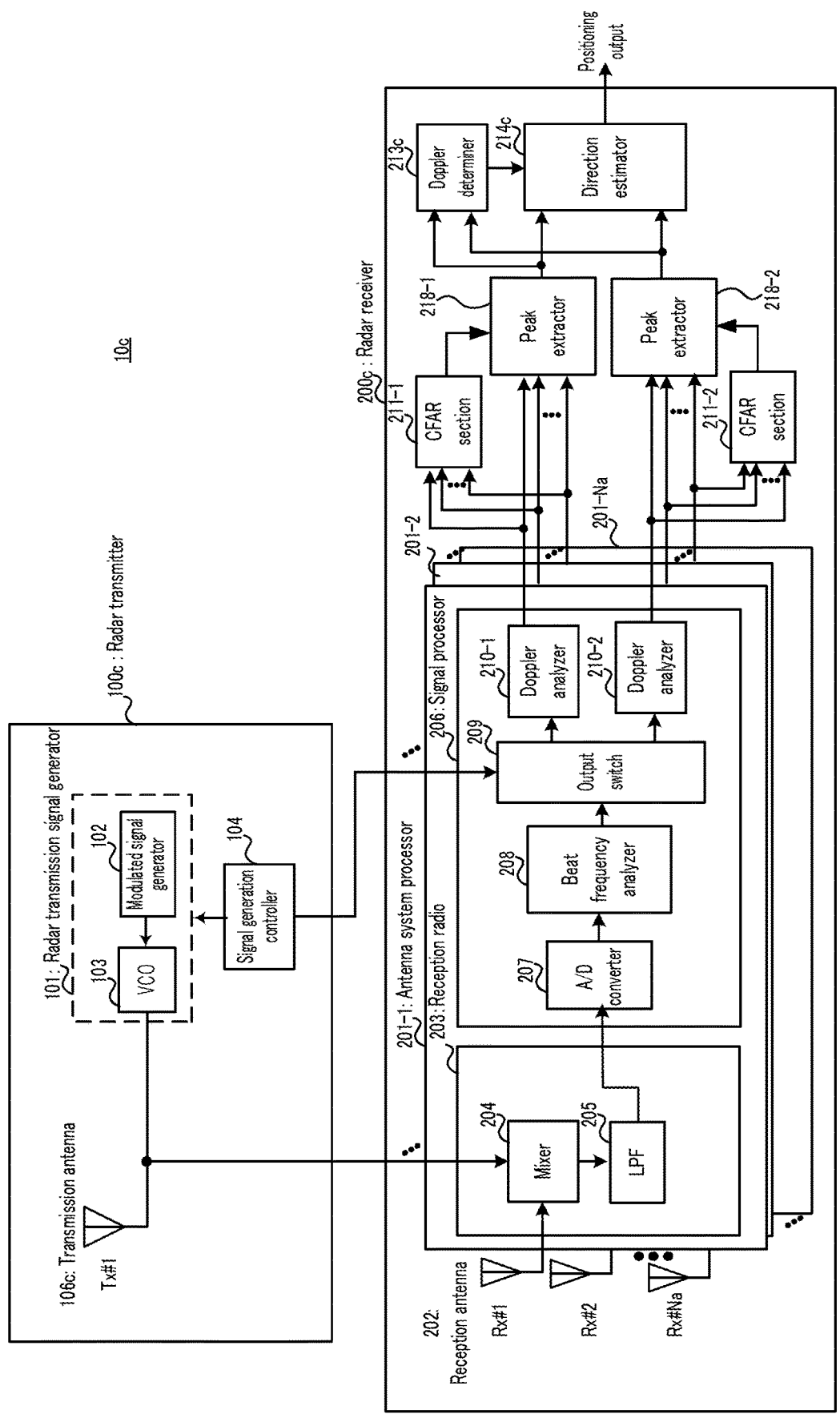
FIG. 21 is a block diagram illustrating another configuration example of the radar apparatus.

FIG. 21 is a block diagram illustrating a configuration example of radar apparatus 10c. Note that, in FIG. 21, the same configurations as in Embodiment 1 (for example, FIG. 2) are denoted with the same reference signs, and descriptions thereof will be omitted. For example, radar apparatus 10c illustrated in FIG. 21 may include one transmission antenna 106c (for example, Tx #1). Further, for example, radar apparatus 10c may be omitted to include Doppler shifter 105 in radar apparatus 10 illustrated in FIG. 1. Further, radar apparatus 10c may also include, for example, q-th peak extractor 218 instead of q-th Doppler demultiplexer 212.

Hereinafter, an operation of radar apparatus 10c, which differs from that of radar apparatus 10, will be described.

In FIG. 21, the radar transmission signal outputted from radar transmission signal generator 101 is outputted (radiated) from transmission antenna Tx #1 without passing through Doppler shifter 105.

In FIG. 21, a threshold is adaptively configured by q-th CFAR section 211, and q-th CFAR section 211 outputs distance index $f_{b\_cfar}(q)$, Doppler frequency index $f_{s\_cfar}(q)$ information, and reception power information $PowerFT_q$ $(f_{b\_cfar}(q), f_{s\_cfar}(q))$, which become reception power larger than the threshold, to q-th peak extractor 218. Here, q=1 or 2.

Q-th peak extractor 218 configures, for example, information on Doppler frequency index $f_{s\_cfar}(q)$ to Doppler index information $(f_{demul\_Tx\,\#1}(q))$. Further, q-th peak extractor 218 outputs, for example, distance index $f_{b\_cfar}(q))$ and Doppler index information $(f_{demul\_Tx\,\#1}(q))$ to Doppler determiner 213c. Further, for example, q-th peak extractor 218 outputs, in addition to distance index $f_{b\_cfar}(q))$. Doppler index information $(f_{demul\_Tx\,\#1}(q))$ and the output of q-th Doppler analyzer 210 corresponding to Doppler index information $(f_{demul\_Tx\,\#1}(q))$ to direction estimator 214c. Here, q=1 or 2.

Doppler determiner 213c uses Doppler index information $(f_{demul\_Tx\,\#1}(1))$ outputted from first peak extractor 218 and Doppler index information $(f_{demul\_Tx\,\#2}(2))$ outputted from second peak extractor 218, where distance index $f_{b\_cfar}(1)$ and distance index $f_{b\_cfar}(2)$ are common, to determine a Doppler frequency in which a case where a target object with a Doppler frequency exceeding Doppler frequency range $-1/(2T_{rs}) \le f_{d\_TargetDoppler} \le 1/(2T_{rs})$ is included is assumed. Note that, the operation of Doppler determiner 213c is the same as the operation of Doppler determiner 213 in Embodiment 1 and therefore a description thereof will be omitted.

Based on distance index $f_{b\_cfar}(q)$ and Doppler index information $(f_{demul\_Tx\,\#1}(q))$ from q-th peak extractor 218, direction estimator 214c extracts the output of q-th Doppler analyzer 210, generates q-th virtual reception array correlation vector $h_q(f_{b\_cfar}(q), f_{demul\_Tx\,\#1}(q), f_{demul\_Tx\,\#2}(q), \ldots, f_{demul\_Tx\,\#Nt}(q))$, and performs the direction estimation processing. Here, q=1 or 2.

The above operation makes it possible to obtain the same effect as in Embodiment 1 even with in radar apparatus 10 in the case of one transmission antenna (Nt-1) (for example, SIMO radar).

(Variation 2)

In each embodiment described above, a case where in radar apparatus 10, radar transmission signals are simultaneously transmitted (Doppler multiplex transmission) from a plurality of transmission antennas 106 has been described, but the present disclosure is not limited thereto, and radar transmission signals may be transmitted by switching between a plurality of transmission antennas 106, for example.

Figure 22:
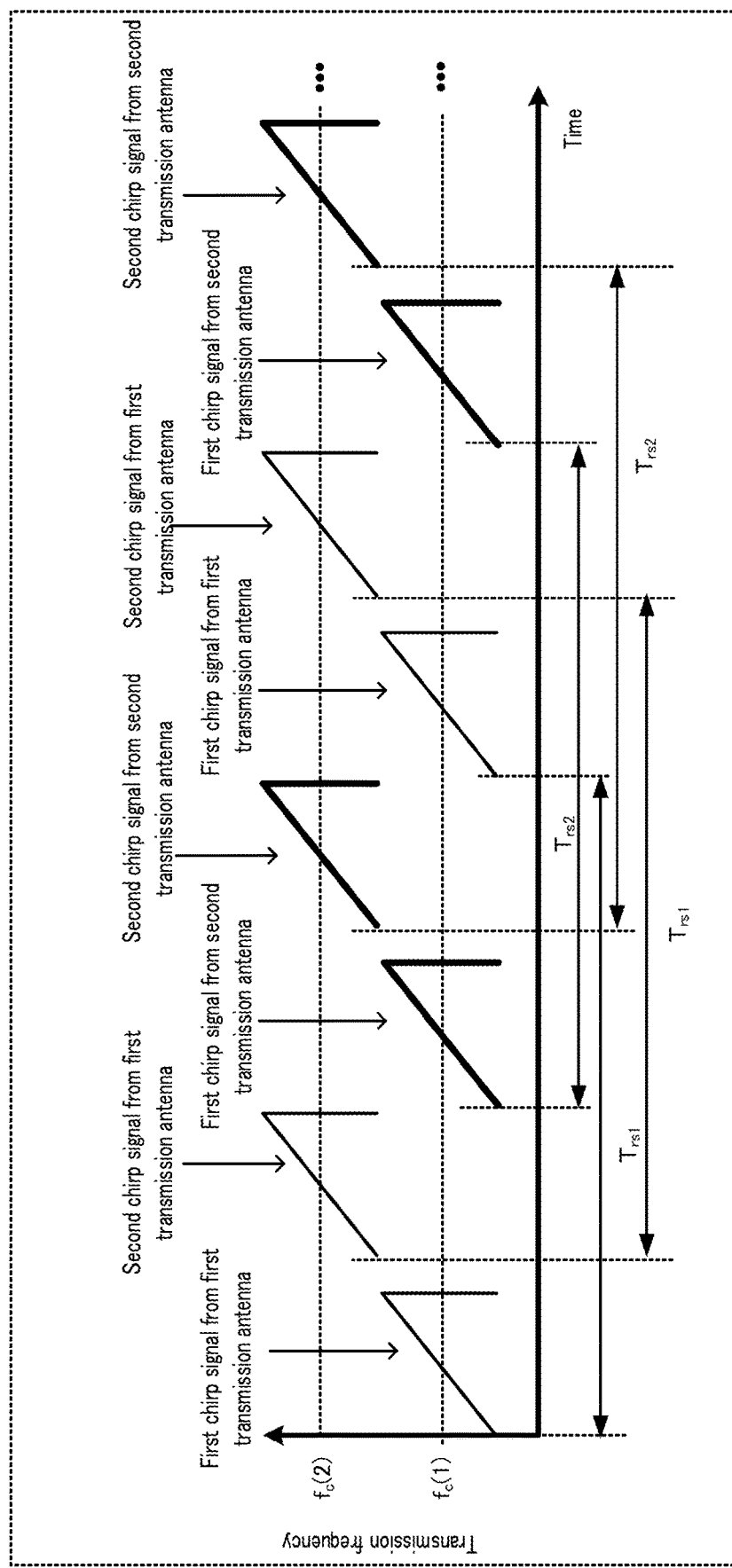
FIG. 22 illustrates other examples of the radar transmission signals.

For example, as illustrated in FIG. 22, in a case where radar transmission signals (for example, chirp signals) are transmitted by switching between two transmission antennas 106, radar apparatus 10 may transmit, from first transmission antenna 106 (first transmission antenna), the first chirp signal with central frequency $f_c(1)$ in periodic $T_{rs1}$ and the second chirp signal with central frequency $f_c(2)$ in periodic $T_{rs1}$, and may perform the same processing as in Embodiment 1 on reception signals obtained from reflected waves of the above-mentioned transmission signals. Thus, even in a case where Doppler frequency $f_{d\_TargetDoppler}$ of a target object exceeds Doppler frequency range $-1/(2T_{rs1}) \le f_{d\_TargetDoppler} \le 1/(2T_{rs1})$, radar apparatus 10 makes it possible to determine the Doppler frequency. Here, $T_{rs1}$ is a period in which the first chirp signal is transmitted (or a period in which the second chirp signal is transmitted) from first transmission antenna 106.

Further, as illustrated in FIG. 22, radar apparatus 10 may transmit, from second transmission antenna 106 (second transmission antenna), the first chirp signal with central frequency $f_c(1)$ in periodic $T_{rs2}$ and the second chirp signal with central frequency $f_c(2)$ in periodic $T_{rs2}$, and may perform the same processing as in Embodiment 1 on reception signals obtained from reflected waves of the above-mentioned transmission signals. Thus, even in a case where Doppler frequency $f_{d\_TargetDoppler}$ of a target object exceeds Doppler frequency range $-1/(2T_{rs2}) \leq f_{d\_TargetDoppler} \leq 1/(2T_{rs2})$, radar apparatus 10 makes it possible to determine the Doppler frequency. Here, $T_{rs2}$ is a period in which the first chirp signal is transmitted (or a period in which the second chirp signal is transmitted) from second transmission antenna 106.

Note that, the number of transmission antennas 106 for switching the transmission of radar transmission signals is not limited to two, but may be three or more.

Variation 2 has been described above.

In a radar apparatus according to one exemplary embodiment of the present disclosure, a radar transmitter and a radar receiver may be individually disposed at physically remote places. Further, in a radar receiver according to one exemplary embodiment of the present disclosure, a direction estimator and other components may be individually disposed at physically remote places.

Further, the numerical values used for, for example, central frequency $f_c(q)$, number Nt of transmission antennas, number Na of reception antennas, Doppler multiplexing number $N_{DM}$, the determinable condition-related values ($\alpha$, Nc, and the like), the phase rotation-related values ($\delta$, $\varphi_0$, $\delta$, $\Delta\varphi_0$, $dp_u$, and the like), and the frequencies in one exemplary embodiment of the present disclosure are exemplary, and the present disclosure is not limited to those values.

The radar apparatus according to one exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited to those examples. Obviously, a person skilled in the art would arrive at variations and modification examples within a scope described in the claims, and it is understood that these variations and modifications are within the technical scope of the present disclosure. Each constituent element of the above-mentioned embodiments may be combined optionally without departing from the spirit of the disclosure.

The expressions "section", "-er", "-or", and "-ar" used in the above-described embodiments may be replaced with other expressions such as "circuitry", "device", "unit", or "module".

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit or a general-purpose processor and a memory. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

<Summary of the Present Disclosure>

A radar apparatus according to one exemplary embodiment of the present disclosure includes: transmission circuitry, which, in operation, transmits outputs a first transmission signal with a first central frequency and a second transmission signal with a second central frequency for each transmission period, where the second central frequency is higher than the first central frequency; and one or a plurality of transmission antennas, which, in operation, transmit the first transmission signal and the second transmission signal. The second central frequency is higher than a frequency (1+1/Nc) times the first central frequency, where Nc is an integer indicating a number of times of transmission of each of the first transmission signal and the second transmission signal for the each transmission period within a predetermined duration.

In one exemplary embodiment of the present disclosure, the second central frequency is lower than a frequency 1.25 times the first central frequency.

In one exemplary embodiment of the present disclosure, the second central frequency is lower than a frequency (7/6) times the first central frequency.

In one exemplary embodiment of the present disclosure, the one or plurality of transmission antennas alternately transmit the first transmission signal and the second transmission signal for the each transmission period.

In one exemplary embodiment of the present disclosure, the one or plurality of transmission antennas simultaneously transmit the first transmission signal and the second transmission signal for the each transmission period.

In one exemplary embodiment of the present disclosure, the one or plurality of transmission antennas are a plurality of transmission antennas, and a number of transmission antennas transmitting the first transmission signal and a number of transmission antennas transmitting the second transmission signal are identical or differ by one in the plurality of transmission antennas.

In one exemplary embodiment of the present disclosure, the radar apparatus further includes: a reception antenna, which, in operation, receives a first reflected wave signal and a second reflected wave signal, where the first reflected wave signal is the first transmission signal reflected by a target and the second reflected wave signal is the second transmission signal reflected by the target: and reception circuitry including first Doppler frequency analysis circuitry, second Doppler frequency analysis circuitry, and determination circuitry, where the first Doppler frequency analysis circuitry is circuitry, which, in operation, estimates a first Doppler frequency from the first reflected wave signal, the second Doppler frequency analysis circuitry is circuitry, which, in operation, estimates a second Doppler frequency from the second reflected wave signal, and the determination circuitry is circuitry, which, in operation, determines a number of times of aliasing of the first Doppler frequency and a number of times of aliasing of the second Doppler frequency. The determination circuitry estimates a first peak position of the first Doppler frequency, where the first peak position is observed in the first reflected wave signal. The determination circuitry estimates a second peak position of the second Doppler frequency based on a ratio of the first central frequency to the second central frequency, and the determination circuitry determines a number of times of aliasing of a Doppler frequency of the target based on a degree of agreement between the second peak position and a third peak position observed in the second reflected wave signal.

In one exemplary embodiment of the present disclosure, the one or plurality of transmission antennas are a plurality of transmission antennas, and the transmission circuitry gives a Doppler shift amount with intervals to at least one of the first transmission signal and the second transmission signal that are transmitted from the plurality of transmission antennas. The intervals are obtained by unequally dividing a Doppler frequency range based on which a number of times of aliasing of a Doppler frequency is determined.

In one exemplary embodiment of the present disclosure, in a case where the intervals, which are unequally divided, of the Doppler shift amount are $\Delta f_{DDM}=1/(T_{rs}(Nt+\delta))$, where Nt is an integer indicating a number of the plurality of transmission antennas, $\delta$ is an integer of one or more, and $T_{rs}$ is a transmission period in which a set of the first transmission signal and the second transmission signal is transmitted, the second central frequency is higher than a frequency $Nc/(Nc-(Nt+\delta))$ times the first central frequency.

In one exemplary embodiment of the present disclosure, the radar apparatus further includes: a reception antenna, which, in operation, receives a plurality of first reflected wave signals and a plurality of second reflected wave signals, where each of the plurality of first reflected wave signals is the first transmission signal reflected by a plurality of targets and each of the plurality of second reflected wave signals is the second transmission signal reflected by the plurality of targets; and reception circuitry including first Doppler frequency analysis circuitry, second Doppler frequency analysis circuitry, and determination circuitry, where the first Doppler frequency analysis circuitry is circuitry, which, in operation, estimates a first Doppler frequency from the plurality of first reflected wave signals, the second Doppler frequency analysis circuitry is circuitry, which, in operation, estimates a second Doppler frequency from the plurality of second reflected wave signals, and the determination circuitry is circuitry, which, in operation, determines a number of times of aliasing of the first Doppler frequency and a number of times of aliasing of the second Doppler frequency. The determination circuitry determines a number of times of aliasing of each Doppler frequency of the plurality of targets based on intervals of peak positions between the plurality of targets and the intervals of the Doppler shift amount based on a Doppler frequency estimated by one of the first Doppler frequency analysis circuitry and the second Doppler frequency analysis circuitry. The one of the first Doppler frequency analysis circuitry and the second Doppler frequency analysis circuitry is circuitry in which the plurality of first reflected wave signals and the plurality of second reflected wave signals are demultiplexed.

In one exemplary embodiment of the present disclosure, the radar apparatus further includes: a reception antenna, which, in operation, receives a plurality of first reflected wave signals and a plurality of second reflected wave signals, where each of the plurality of first reflected wave signals is the first transmission signal reflected by a plurality of targets and each of the plurality of second reflected wave signals is the second transmission signal reflected by the plurality of targets; and reception circuitry including first Doppler frequency analysis circuitry, second Doppler frequency analysis circuitry, and determination circuitry, where the first Doppler frequency analysis circuitry being circuitry, which, in operation, estimates a first Doppler frequency from the plurality of first reflected wave signals, the second Doppler frequency analysis circuitry is circuitry, which, in operation, estimates a second Doppler frequency from the plurality of second reflected wave signals, and the determination circuitry being circuitry, which, in operation, determines a number of times of aliasing of the first Doppler frequency and a number of times of aliasing of the second Doppler frequency. The reception circuitry includes direction estimation circuitry, which, in operation, performs directional estimation based on a Doppler frequency estimated by one of the first Doppler frequency analysis circuitry and the second Doppler frequency analysis circuitry, where the one of the first Doppler frequency analysis circuitry and the second Doppler frequency analysis circuitry being circuitry in which the plurality of first reflected wave signals and the plurality of second reflected wave signals are demultiplexed.

In one exemplary embodiment of the present disclosure, the radar apparatus further includes: a reception antenna, which, in operation, receives a plurality of first reflected wave signals and a plurality of second reflected wave signals, where each of the plurality of first reflected wave signals is the first transmission signal reflected by a plurality of targets and each of the plurality of second reflected wave signals is the second transmission signal reflected by the plurality of targets: and reception circuitry including first Doppler frequency analysis circuitry, second Doppler frequency analysis circuitry, and determination circuitry, where the first Doppler frequency analysis circuitry being circuitry, which, in operation, estimates a first Doppler frequency from the plurality of first reflected wave signals, the second Doppler frequency analysis circuitry is circuitry, which, in operation, estimates a second Doppler frequency from the plurality of second reflected wave signals, and the determination circuitry being circuitry, which, in operation, determines a number of times of aliasing of the first Doppler frequency and a number of times of aliasing of the second Doppler frequency. The reception antenna includes a first reception antenna and a second reception antenna. The first Doppler frequency analysis circuitry processes the first reflected wave signal received by the first reception antenna in one transmission period of an even-numbered transmission period and an odd-numbered transmission period, and processes the first reflected wave signal received by the second reception antenna in another transmission period of the even-numbered transmission period and the odd-numbered transmission period, and the second Doppler frequency analysis circuitry processes the second reflected wave signal received by the second reception antenna in the one transmission period, and processes the second reflected wave signal received by the first reception antenna in the other transmission period.

In one exemplary embodiment of the present disclosure, the radar apparatus further includes: a reception antenna; first reception circuitry, which, in operation, mixes a signal received by the reception antenna in one transmission period of an even-numbered transmission period and an odd-numbered transmission period by using the first transmission signal to output a first reflected wave signal, and, which, in operation, mixes the signal received by the reception antenna in another transmission period of the even-numbered transmission period and the odd-numbered transmission period by using the second transmission signal to output a second reflected wave signal, where the first reflected wave signal is a signal reflected by a target and the second reflected wave signal is a signal reflected by the target; and second reception circuitry, which, in operation, mixes a signal received by the reception antenna in the one transmission period by using the second transmission signal to output the second reflected wave signal, and, which, in operation, mixes the signal received by the reception antenna in the other transmission period by using the first transmission signal to output the first reflected wave signal.

In one exemplary embodiment of the present disclosure, the first transmission signal and the second transmission signal are chirp signals, and the chirp signal of the first central frequency and the chirp signal of the second central frequency have an identical frequency sweep bandwidth.

In one exemplary embodiment of the present disclosure, the chirp signal of the first central frequency and the chirp signal of the second central frequency have different frequency sweep bandwidths.

In one exemplary embodiment of the present disclosure, the radar apparatus further includes: a first reception antenna, which, in operation, receives a first reflected wave signal that is the first transmission signal reflected by a target; a second reception antenna, which, in operation, receives a second reflected wave signal that is the second transmission signal reflected by the target; first reception circuitry, which, in operation, processes the first reflected wave signal; and second reception circuitry, which, in operation, processes the second reflected wave signal. The transmission circuitry includes first transmission circuitry, which, in operation, outputs the first transmission signal, and second transmission circuitry, which, in operation, outputs the second transmission signal. The one or plurality of transmission antennas include a first transmission antenna, which, in operation, transmits the first transmission signal, and a second transmission antenna, which, in operation, transmits the second transmission signal. The first transmission antenna, the first transmission circuitry, the first reception antenna, and the first reception circuitry are included in a first chip, and the second transmission antenna, the second transmission circuitry, the second reception antenna, and the second reception circuitry are included in a second chip.

In one exemplary embodiment of the present disclosure, the radar apparatus further includes: a first reception antenna, which, in operation, receives a first reflected wave signal and a second reflected wave signal, where the first reflected wave signal is the first transmission signal reflected by a target and the second reflected wave signal is the second transmission signal reflected by the target; a second reception antenna, which, in operation, receives the first reflected wave signal and the second reflected wave signal; first reception circuitry processes the first reflected wave signal received by the first reception antenna in one transmission period of an even-numbered transmission period and an odd-numbered transmission period, and processes the second reflected wave signal received by the first reception antenna in another transmission period of the even-numbered transmission period and the odd-numbered transmission period; and second reception circuitry processes the second reflected wave signal received by the second reception antenna in the one transmission period, and processes the first reflected wave signal received by the second reception antenna in the other transmission period. The transmission circuitry includes first transmission circuitry, which, in operation, outputs the first transmission signal, and second transmission circuitry, which, in operation, outputs the second transmission signal. The one or plurality of transmission antennas include a first transmission antenna, which, in operation, transmits the first transmission signal, and a second transmission antenna, which, in operation, transmits the second transmission signal. The first transmission antenna, the first transmission circuitry, the first reception antenna, and the first reception circuitry are included in a first chip, and the second transmission antenna, the second transmission circuitry, the second reception antenna, and the second reception circuitry are included in a second chip.

A radar apparatus according to one exemplary embodiment of the present disclosure includes: transmission circuitry, which, in operation, gives a Doppler shift amount with intervals to a first transmission signal with a first central frequency and a second transmission signal with a second central frequency, where the second central frequency is higher than the first central frequency and the intervals are obtained by unequally dividing a Doppler frequency range based on which a number of times of aliasing of a Doppler frequency is determined; and a plurality of transmission antennas, which, in operation, transmits the first transmission signal and the second transmission signal each being a signal to which the Doppler shift amount is given. The transmission circuitry outputs the first transmission signal and the second transmission signal for each transmission period. The second central frequency is higher than a frequency $(1+1/Nc)$ times the first central frequency, where Nc is an integer indicating a number of times of transmission of each of the first transmission signal and the second transmission signal for the each transmission period within a predetermined duration. In a case where the intervals, which are unequally divided, of the Doppler shift amount are $\Delta f_{DDM}=1/(T_{rs}(Nt+\delta))$, where Nt is an integer indicating a number of the plurality of transmission antennas, $\delta$ is an integer of one or more, and $T_{rs}$ is a transmission period in which a set of the first transmission signal and the second transmission signal is transmitted, the second central frequency is higher than a frequency $Nc/(Nc-(Nt+\delta))$ times the first central frequency.

While various embodiments have been described herein above, it is to be appreciated that various changes in form and detail may be made without departing from the sprit and scope of the invention(s) presently or hereafter claimed.

This application is entitled to and claims the benefit of Japanese Patent Application No. 2021-129947, filed on Aug. 6, 2021, and Japanese Patent Application No. 2022-33509, filed on Mar. 4, 2022, the disclosure of which including the specification, drawings and abstract is incorporated herein by reference in its entirety.

INDUSTRIAL APPLICABILITY

The present disclosure is suitable as a radar apparatus that detects a wide-angle range.

REFERENCE SIGNS LIST 10, 10a, 10b, 10c Radar apparatus
100, 100a, 100b, 100c Radar transmitter
101 Radar transmission signal generator
102 Modulated signal generator
103 VCO
104 Signal generation controller
105 Doppler shifter
106, 106c Transmission antenna
200, 200a, 200b, 200c Radar receiver
201 Antenna system processor
202 Reception antenna
203 Reception radio
204 Mixer
205 LPF
206 Signal processor
207 A/D converter
208 Beat frequency analyzer
209, 217 Output switch
210 Doppler analyzer
211 CFAR section
212 Doppler demultiplexer
213, 213c Doppler determiner
214, 214c Direction estimator
215 Synchronization signal generator
216 Switch
218 Peak extractor

The invention claimed is:

1. A radar apparatus, comprising:
transmission circuitry, which, in operation, outputs a first transmission signal with a first central frequency and a second transmission signal with a second central frequency for each transmission period, the second central frequency being higher than the first central frequency; and
one or a plurality of transmission antennas, which, in operation, transmit the first transmission signal and the second transmission signal, wherein:
the second central frequency is higher than a frequency $(1+1/N_c)$ times the first central frequency, where $N_c$ is an integer indicating a number of times of transmission of each of the first transmission signal and the second transmission signal for the each transmission period within a predetermined duration.

2. The radar apparatus according to claim 1, wherein the second central frequency is lower than a frequency 1.25 times the first central frequency.

3. The radar apparatus according to claim 1, wherein the second central frequency is lower than a frequency (7/6) times the first central frequency.

4. The radar apparatus according to claim 1, wherein the one or plurality of transmission antennas alternately transmit the first transmission signal and the second transmission signal for the each transmission period.

5. The radar apparatus according to claim 1, wherein the one or plurality of transmission antennas simultaneously transmit the first transmission signal and the second transmission signal for the each transmission period.

6. The radar apparatus according to claim 5, wherein:
the one or plurality of transmission antennas are a plurality of transmission antennas, and
a number of transmission antennas transmitting the first transmission signal and a number of transmission antennas transmitting the second transmission signal are identical or differ by one in the plurality of transmission antennas.

7. The radar apparatus according to claim 1, further comprising:
a reception antenna, which, in operation, receives a first reflected wave signal and a second reflected wave signal, the first reflected wave signal being the first transmission signal reflected by a target, the second reflected wave signal being the second transmission signal reflected by the target; and
reception circuitry including first Doppler frequency analysis circuitry, second Doppler frequency analysis circuitry, and determination circuitry, the first Doppler frequency analysis circuitry being circuitry, which, in operation, estimates a first Doppler frequency from the first reflected wave signal, the second Doppler frequency analysis circuitry being circuitry, which, in operation, estimates a second Doppler frequency from the second reflected wave signal, the determination circuitry being circuitry, which, in operation, determines a number of times of aliasing of the first Doppler frequency and a number of times of aliasing of the second Doppler frequency, wherein
the determination circuitry estimates a first peak position of the first Doppler frequency, the first peak position being observed in the first reflected wave signal,
the determination circuitry estimates a second peak position of the second Doppler frequency based on a ratio of the first central frequency to the second central frequency, and
the determination circuitry determines a number of times of aliasing of a Doppler frequency of the target based on a degree of agreement between the second peak position and a third peak position observed in the second reflected wave signal.

8. The radar apparatus according to claim 1, wherein:
the one or plurality of transmission antennas are a plurality of transmission antennas, and
the transmission circuitry gives a Doppler shift amount with intervals to at least one of the first transmission signal and the second transmission signal that are transmitted from the plurality of transmission antennas, the intervals being obtained by unequally dividing a Doppler frequency range based on which a number of times of aliasing of a Doppler frequency is determined.

9. The radar apparatus according to claim 8, wherein in a case where the intervals of the Doppler shift amount are $$\Delta f_{DDM} = \frac{1}{T_{rs}(N_t + \delta)}, \quad [1]$$

where Nt is an integer indicating a number of the plurality of transmission antennas, $\delta$ is an integer of one or more, and $T_{rs}$ is a transmission period in which a set of the first transmission signal and the second transmission signal is transmitted, the second central frequency is higher than a frequency $$\frac{N_C}{N_C - (N_t + \delta)} \quad [2]$$

times the first central frequency, the intervals being unequally divided.

10. The radar apparatus according to claim 9, further comprising:

a reception antenna, which, in operation, receives a plurality of first reflected wave signals and a plurality of second reflected wave signals, each of the plurality of first reflected wave signals being the first transmission signal reflected by a plurality of targets, each of the plurality of second reflected wave signals being the second transmission signal reflected by the plurality of targets; and reception circuitry including first Doppler frequency analysis circuitry, second Doppler frequency analysis circuitry, and determination circuitry, the first Doppler frequency analysis circuitry being circuitry, which, in operation, estimates a first Doppler frequency from the plurality of first reflected wave signals, the second Doppler frequency analysis circuitry being circuitry, which, in operation, estimates a second Doppler frequency from the plurality of second reflected wave signals, the determination circuitry being circuitry, which, in operation, determines a number of times of aliasing of the first Doppler frequency and a number of times of aliasing of the second Doppler frequency, wherein the determination circuitry determines a number of times of aliasing of each Doppler frequency of the plurality of targets based on intervals of peak positions between the plurality of targets and the intervals of the Doppler shift amount based on a Doppler frequency estimated by one of the first Doppler frequency analysis circuitry and the second Doppler frequency analysis circuitry, the one of the first Doppler frequency analysis circuitry and the second Doppler frequency analysis circuitry being circuitry in which the plurality of first reflected wave signals and the plurality of second reflected wave signals are demultiplexed.

11. The radar apparatus according to claim 9, further comprising:

a reception antenna, which, in operation, receives a plurality of first reflected wave signals and a plurality of second reflected wave signals, each of the plurality of first reflected wave signals being the first transmission signal reflected by a plurality of targets, each of the plurality of second reflected wave signals being the second transmission signal reflected by the plurality of targets; and reception circuitry including first Doppler frequency analysis circuitry, second Doppler frequency analysis circuitry, and determination circuitry, the first Doppler frequency analysis circuitry being circuitry, which, in operation, estimates a first Doppler frequency from the plurality of first reflected wave signals, the second Doppler frequency analysis circuitry being circuitry, which, in operation, estimates a second Doppler frequency from the plurality of second reflected wave signals, the determination circuitry being circuitry, which, in operation, determines a number of times of aliasing of the first Doppler frequency and a number of times of aliasing of the second Doppler frequency, wherein the reception circuitry includes direction estimation circuitry, which, in operation, performs directional estimation based on a Doppler frequency estimated by one of the first Doppler frequency analysis circuitry and the second Doppler frequency analysis circuitry, the one of the first Doppler frequency analysis circuitry and the second Doppler frequency analysis circuitry being circuitry in which the plurality of first reflected wave signals and the plurality of second reflected wave signals are demultiplexed.

12. The radar apparatus according to claim 5, further comprising:

a reception antenna, which, in operation, receives a first reflected wave signal and a second reflected wave signal, the first reflected wave signal being the first transmission signal reflected by a target, the second reflected wave signal being the second transmission signal reflected by the target; and reception circuitry including first Doppler frequency analysis circuitry, second Doppler frequency analysis circuitry, and determination circuitry, the first Doppler frequency analysis circuitry being circuitry, which, in operation, estimates a first Doppler frequency from the first reflected wave signal, the second Doppler frequency analysis circuitry being circuitry, which, in operation, estimates a second Doppler frequency from the second reflected wave signal, the determination circuitry being circuitry, which, in operation, determines a number of times of aliasing of the first Doppler frequency and a number of times of aliasing of the second Doppler frequency, wherein the reception antenna includes a first reception antenna and a second reception antenna, the first Doppler frequency analysis circuitry processes the first reflected wave signal received by the first reception antenna in one transmission period of an even-numbered transmission period and an odd-numbered transmission period, and processes the first reflected wave signal received by the second reception antenna in another transmission period of the even-numbered transmission period and the odd-numbered transmission period, and the second Doppler frequency analysis circuitry processes the second reflected wave signal received by the second reception antenna in the one transmission period, and processes the second reflected wave signal received by the first reception antenna in the other transmission period.

13. The radar apparatus according to claim 5, further comprising:

a plurality of reception antennas including a first reception antenna and a second reception antenna;

first reception circuitry, which, in operation, mixes a signal received by the first reception antenna for each first period by using the first transmission signal to output a first reflected wave signal, and, which, in operation, mixes the signal received by the first reception antenna for each second period by using the second transmission signal to output a second reflected wave signal, the first reflected wave signal being a signal reflected by a target, the second reflected wave signal being a signal reflected by the target, the second period differing from the first period; and second reception circuitry, which, in operation, mixes a signal received by the second reception antenna for the each first period by using the second transmission signal to output the second reflected wave signal, and, which, in operation, mixes the signal received by the second reception antenna for the each second period by using the first transmission signal to outputs the first reflected wave signal.

14. The radar apparatus according to claim 1, wherein:
the first transmission signal and the second transmission signal are chirp signals, and
the chirp signal of the first central frequency and the chirp signal of the second central frequency have an identical frequency sweep bandwidth.

15. The radar apparatus according to claim 14, wherein the chirp signal of the first central frequency and the chirp signal of the second central frequency have different frequency sweep bandwidths.

16. The radar apparatus according to claim 5, further comprising:
a first reception antenna, which, in operation, receives a first reflected wave signal that is the first transmission signal reflected by a target;
a second reception antenna, which, in operation, receives a second reflected wave signal that is the second transmission signal reflected by the target;
first reception circuitry, which, in operation, processes the first reflected wave signal; and
second reception circuitry, which, in operation, processes the second reflected wave signal, wherein
the transmission circuitry includes first transmission circuitry, which, in operation, outputs the first transmission signal, and second transmission circuitry, which, in operation, outputs the second transmission signal,
the one or plurality of transmission antennas include a first transmission antenna, which, in operation, transmits the first transmission signal, and a second transmission antenna, which, in operation, transmits the second transmission signal,
the first transmission antenna, the first transmission circuitry, the first reception antenna, and the first reception circuitry are included in a first chip, and
the second transmission antenna, the second transmission circuitry, the second reception antenna, and the second reception circuitry are included in a second chip.

17. The radar apparatus according to claim 5, further comprising:
a first reception antenna, which, in operation, receives a first reflected wave signal and a second reflected wave signal, the first reflected wave signal being the first transmission signal reflected by a target, the second reflected wave signal being the second transmission signal reflected by the target;
a second reception antenna, which, in operation, receives the first reflected wave signal and the second reflected wave signal;
first reception circuitry processes the first reflected wave signal received by the first reception antenna in one transmission period of an even-numbered transmission period and an odd-numbered transmission period, and processes the second reflected wave signal received by the first reception antenna in another transmission period of the even-numbered transmission period and the odd-numbered transmission period; and
second reception circuitry processes the second reflected wave signal received by the second reception antenna in the one transmission period, and processes the first reflected wave signal received by the second reception antenna in the other transmission period, wherein
the transmission circuitry includes first transmission circuitry, which, in operation, outputs the first transmission signal, and second transmission circuitry, which, in operation, outputs the second transmission signal,
the one or plurality of transmission antennas include a first transmission antenna, which, in operation, transmits the first transmission signal, and a second transmission antenna, which, in operation, transmits the second transmission signal,
the first transmission antenna, the first transmission circuitry, the first reception antenna, and the first reception circuitry are included in a first chip, and
the second transmission antenna, the second transmission circuitry, the second reception antenna, and the second reception circuitry are included in a second chip.

18. A radar apparatus, comprising:
transmission circuitry, which, in operation, gives a Doppler shift amount with intervals to a first transmission signal with a first central frequency and a second transmission signal with a second central frequency, the second central frequency being higher than the first central frequency, the intervals being obtained by unequally dividing a Doppler frequency range based on which a number of times of aliasing of a Doppler frequency is determined; and
a plurality of transmission antennas, which, in operation, transmits the first transmission signal and the second transmission signal each being a signal to which the Doppler shift amount is given, wherein
the transmission circuitry outputs the first transmission signal and the second transmission signal for each transmission period,
the second central frequency is higher than a frequency $(1+1/N_c)$ times the first central frequency, where $N_c$ is an integer indicating a number of times of transmission of each of the first transmission signal and the second transmission signal for the each transmission period within a predetermined duration, and
in a case where the intervals of the Doppler shift amount are $$\Delta f_{DDM} = \frac{1}{T_{rs}(N_t + \delta)}, \qquad [3]$$

where Nt is an integer indicating a number of the plurality of transmission antennas, $\delta$ is an integer of one or more, and $T_{rs}$ is a transmission period in which a set of the first transmission signal and the second transmission signal is transmitted, the second central frequency is higher than a frequency $$\frac{N_C}{N_C - (N_t + \delta)} \qquad [4]$$

times the first central frequency, the intervals being unequally divided.

* * * * *